(12) United States Patent   (10) Patent No.: US 8,323,828 B2
Yamazaki et al.              (45) Date of Patent:    Dec. 4, 2012

(54) BATTERY CASE FORMING SHEET AND BATTERY PACKET

(75) Inventors: Takuya Yamazaki, Shinjuku-ku (JP); Kiyoshi Oguchi, Shinjuku-Ku (JP); Koji Shimizu, Shinjuku-Ku (JP); Kenichiro Suto, Shinjuku-Ku (JP); Tsutomu Yoshinaka, Shinjuku-Ku (JP); Hideki Kurokawa, Shinjuku-Ku (JP); Hitoshi Sekino, Shinjuku-Ku (JP); Masahiro Yoshikawa, Shinjuku-Ku (JP); Hiroshi Miyama, Shinjuku-Ku (JP); Katsuhiko Hayashi, Shinjuku-Ku (JP); Jun Fukuda, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 2220 days.

(21) Appl. No.: 10/638,326

(22) Filed: Aug. 12, 2003

(65) Prior Publication Data

US 2004/0029001 A1   Feb. 12, 2004

Related U.S. Application Data

(62) Division of application No. 09/402,369, filed on Dec. 13, 1999, now Pat. No. 6,632,538.

(30) Foreign Application Priority Data

| Oct. 14, 1997 | (JP) | 1997-295005 |
| Feb. 5, 1998 | (JP) | 1998-037948 |
| Feb. 5, 1998 | (JP) | 1998-037949 |
| Feb. 5, 1998 | (JP) | 1998-037950 |
| Feb. 12, 1998 | (JP) | 1998-044256 |
| Mar. 20, 1998 | (JP) | 1998-090645 |
| Mar. 20, 1998 | (JP) | 1998-090646 |
| Apr. 20, 1998 | (JP) | 1998-123904 |
| Jul. 16, 1998 | (JP) | 1998-202374 |
| Oct. 19, 1998 | (JP) | 1998-296638 |
| Oct. 20, 1998 | (JP) | 1998-297701 |
| Oct. 20, 1998 | (JP) | 1998-297725 |

(51) Int. Cl.
*H01M 2/02* (2006.01)

(52) U.S. Cl. ........ 429/177; 429/54; 429/171; 429/167; 429/141; 429/163

(58) Field of Classification Search ........... 429/136, 429/171, 185, 167, 141, 175, 168, 163; 428/54, 428/32.79, 343
See application file for complete search history.

(56) References Cited

U.S. PATENT DOCUMENTS 4,732,825 A   3/1988   Kamata et al.
(Continued)

FOREIGN PATENT DOCUMENTS

EP   0 556 402 A1   8/1992
EP   0 789 406 A1   8/1997
(Continued)

OTHER PUBLICATIONS

Office Action issued Aug. 14, 2012 in related U.S. Appl. No. 13/413,412.

*Primary Examiner* — Patrick Ryan
*Assistant Examiner* — Ben Lewis
(74) *Attorney, Agent, or Firm* — Oliff & Berridge, PLC

(57) ABSTRACT

A battery packet (50) comprises a battery case (51) formed by processing a battery case forming laminated sheet (10), a battery 50a contained in the battery case (51), and tabs (59, 60) extending outside from the battery case (51). The battery case forming laminated sheet (10) is formed by laminating a first base film layer (1a), i.e., an outermost layer, a metal foil layer (2), and a heat-adhesive resin layer (3) in that order. The first base film layer (1a) is a biaxially oriented polyethylene terephthalate resin film or a biaxially oriented nylon resin film. The metal foil layer (2) is an aluminum or copper foil. The heat-adhesive resin layer (3) is formed of a polyolefin resin, more preferably, of an acid-denatured polyolefin resin.

7 Claims, 39 Drawing Sheets

U.S. PATENT DOCUMENTS

| | | | | |
|---|---|---|---|---|
| 5,445,856 A | * | 8/1995 | Chaloner-Gill | 428/35.9 |
| 5,665,443 A | * | 9/1997 | Hata et al. | 428/34.9 |
| 6,004,693 A | | 12/1999 | Fukuda et al. | |

FOREIGN PATENT DOCUMENTS

| | | | | |
|---|---|---|---|---|
| JP | 55-124950 | | 9/1980 | |
| JP | 56-118855 | | 9/1981 | |
| JP | 59-112566 | | 6/1984 | |
| JP | 60-195866 | | 10/1985 | |
| JP | 60-221952 | | 11/1985 | |
| JP | 60221952 A | * | 11/1985 | 420/82 |
| JP | 61-116071 | | 7/1986 | |
| JP | A-61-190855 | | 8/1986 | |
| JP | 61-206158 | | 9/1986 | |
| JP | A-61-206158 | | 9/1986 | |
| JP | 62022366 | | 1/1987 | |
| JP | 62055865 | | 3/1987 | |
| JP | A-62-61268 | | 3/1987 | |
| JP | 2-21557 | | 1/1990 | |
| JP | 3-179666 | | 8/1991 | |
| JP | A-03-179666 | | 8/1991 | |
| JP | 4-95339 | | 3/1992 | |
| JP | A-05-038779 | | 2/1993 | |
| JP | 5-309787 | | 11/1993 | |
| JP | 9-161738 | | 6/1997 | |
| JP | 09161738 | * | 6/1997 | 429/82 |
| JP | EP 0789406 A1 | * | 8/1997 | 429/82 |
| JP | 9-274896 | | 10/1997 | |
| JP | A-9-265974 | | 10/1997 | |
| JP | A-9-288998 | | 11/1997 | |
| JP | 10284021 | | 10/1998 | |
| WO | WO97/40539 | | 10/1997 | |

\* cited by examiner

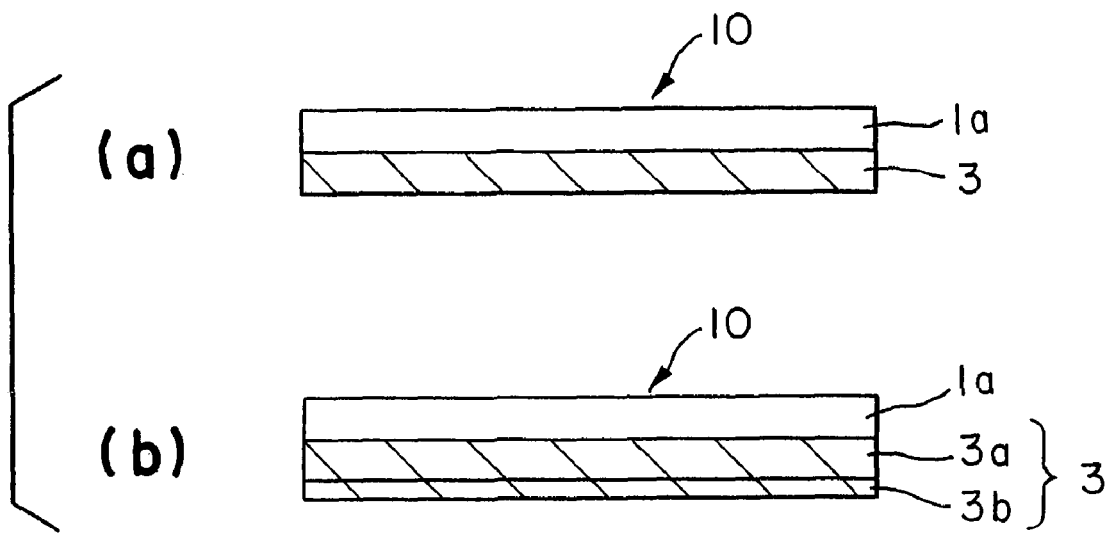
F I G. 10
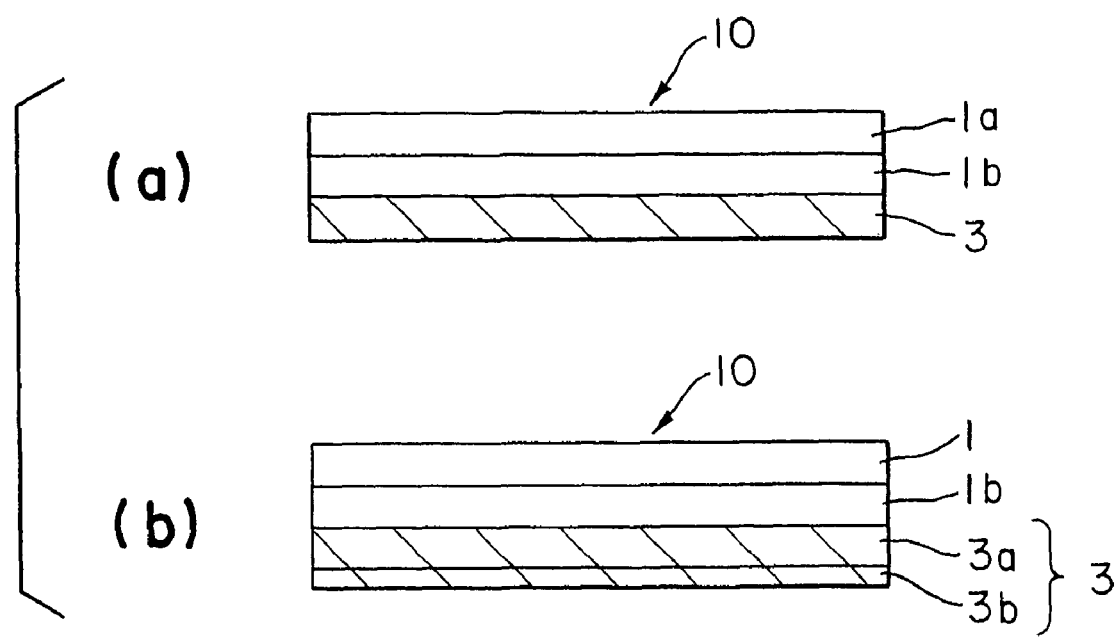
F I G. 11

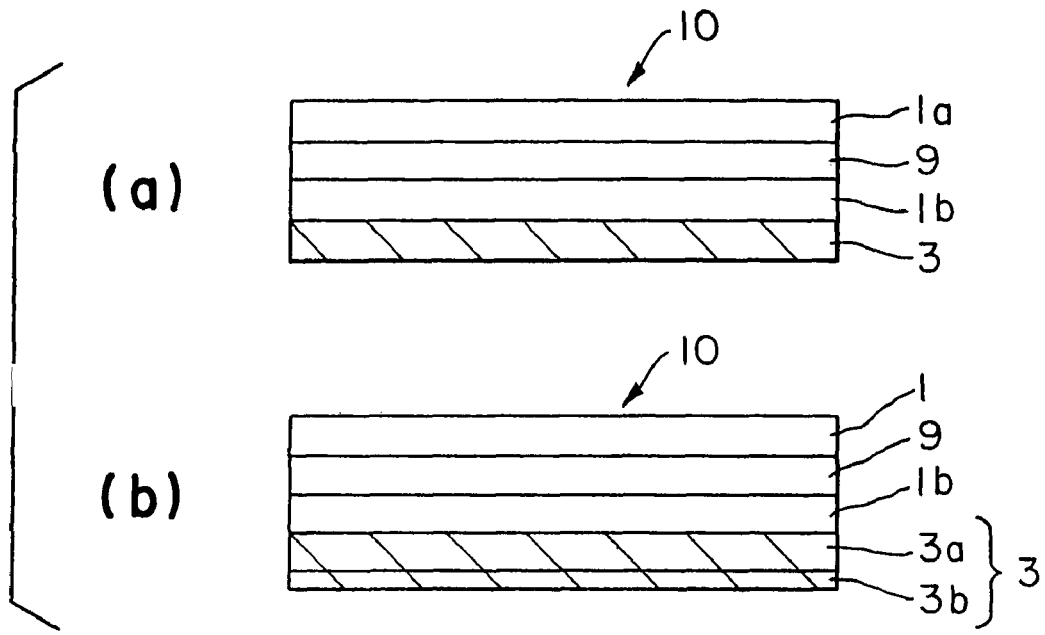
F I G. 12
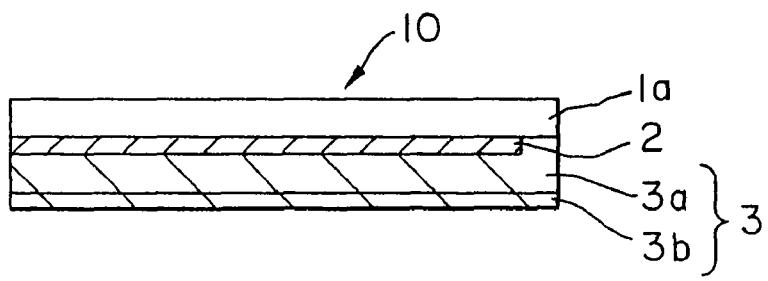
F I G. 13
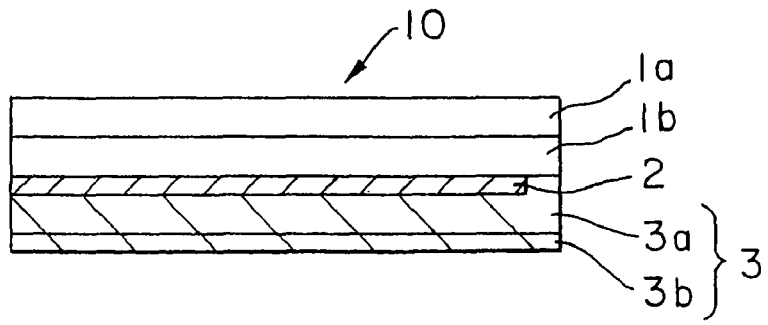
F I G. 14

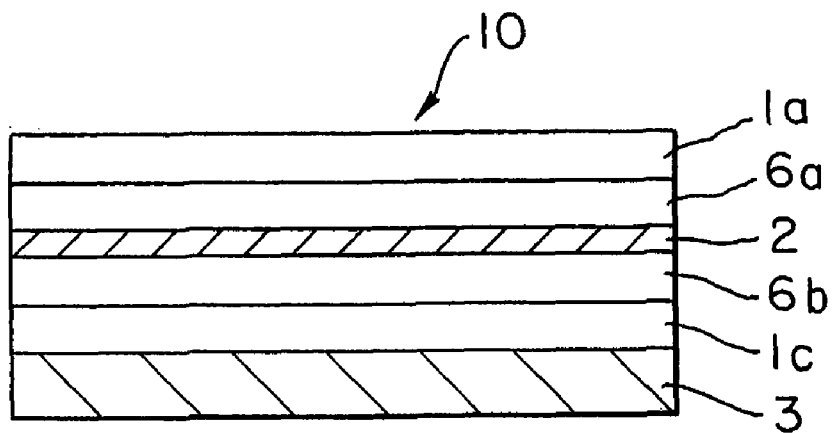
F I G. 23
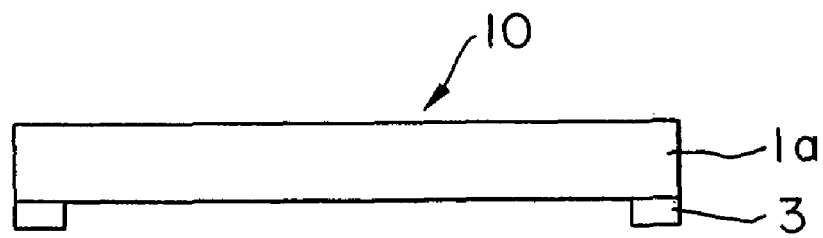
F I G. 24
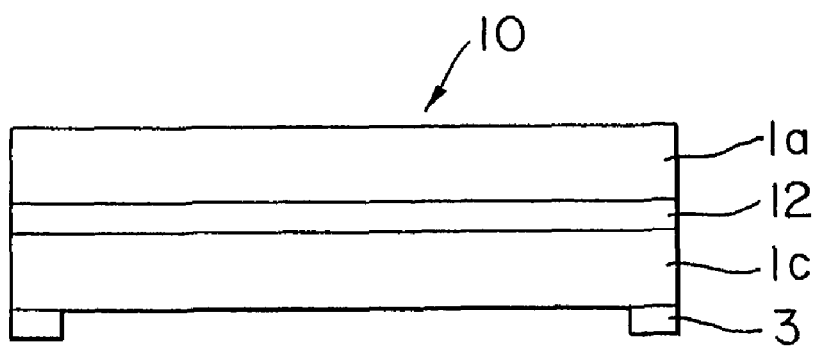
F I G. 25

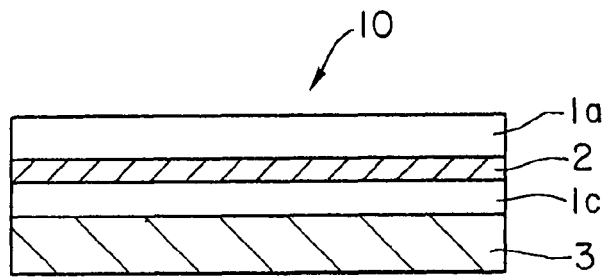
F I G. 29
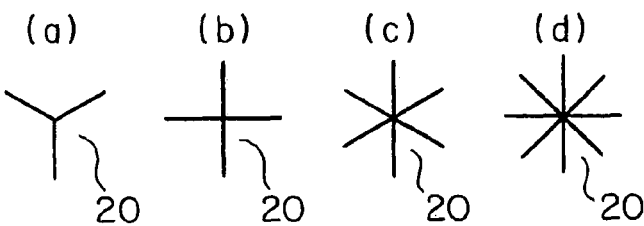
F I G. 30
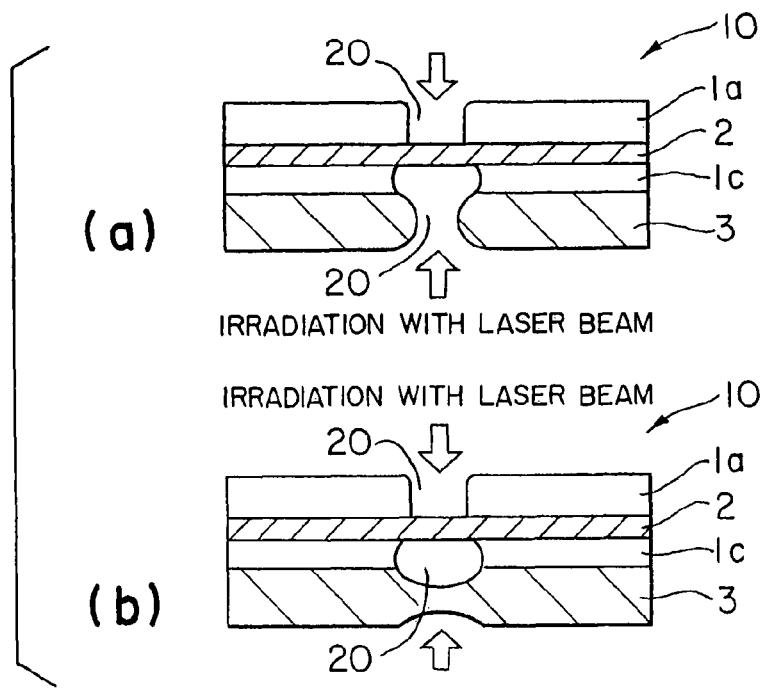
F I G. 31

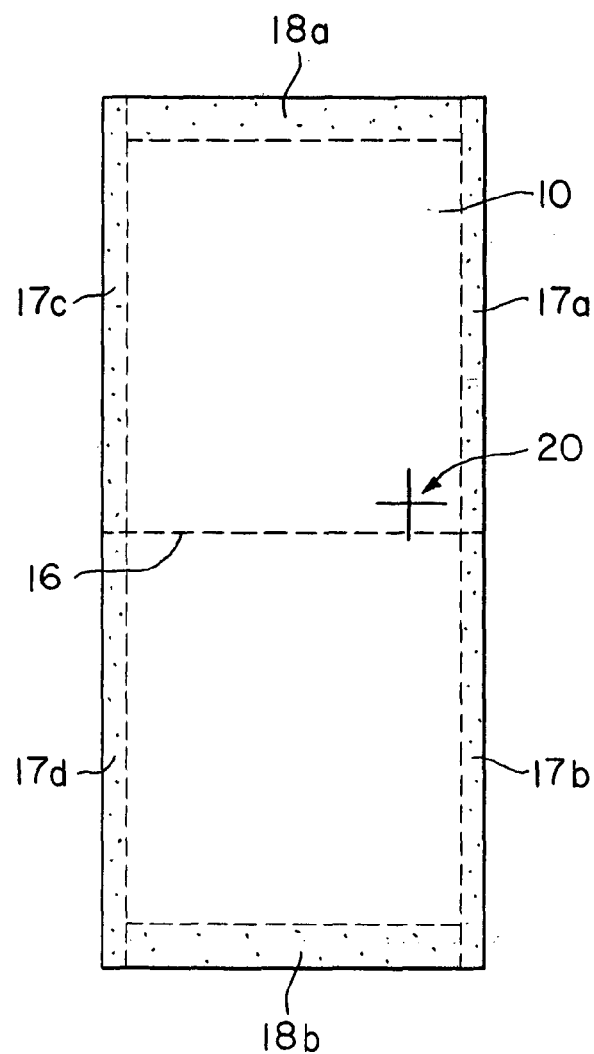
F I G. 32
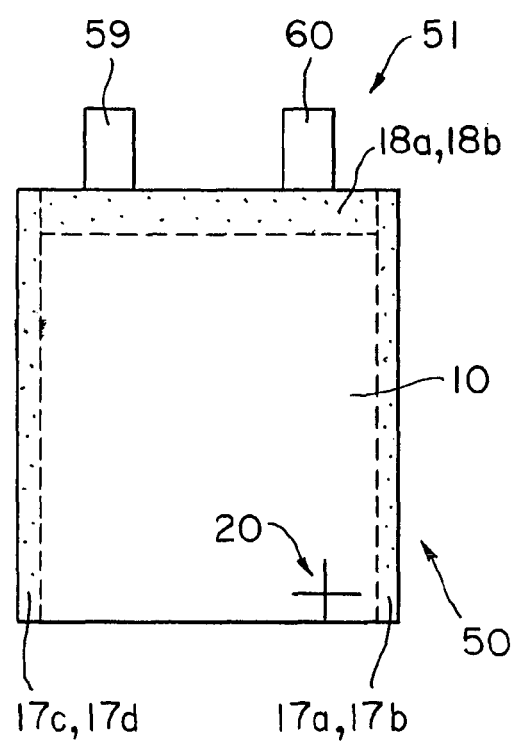
F I G. 33

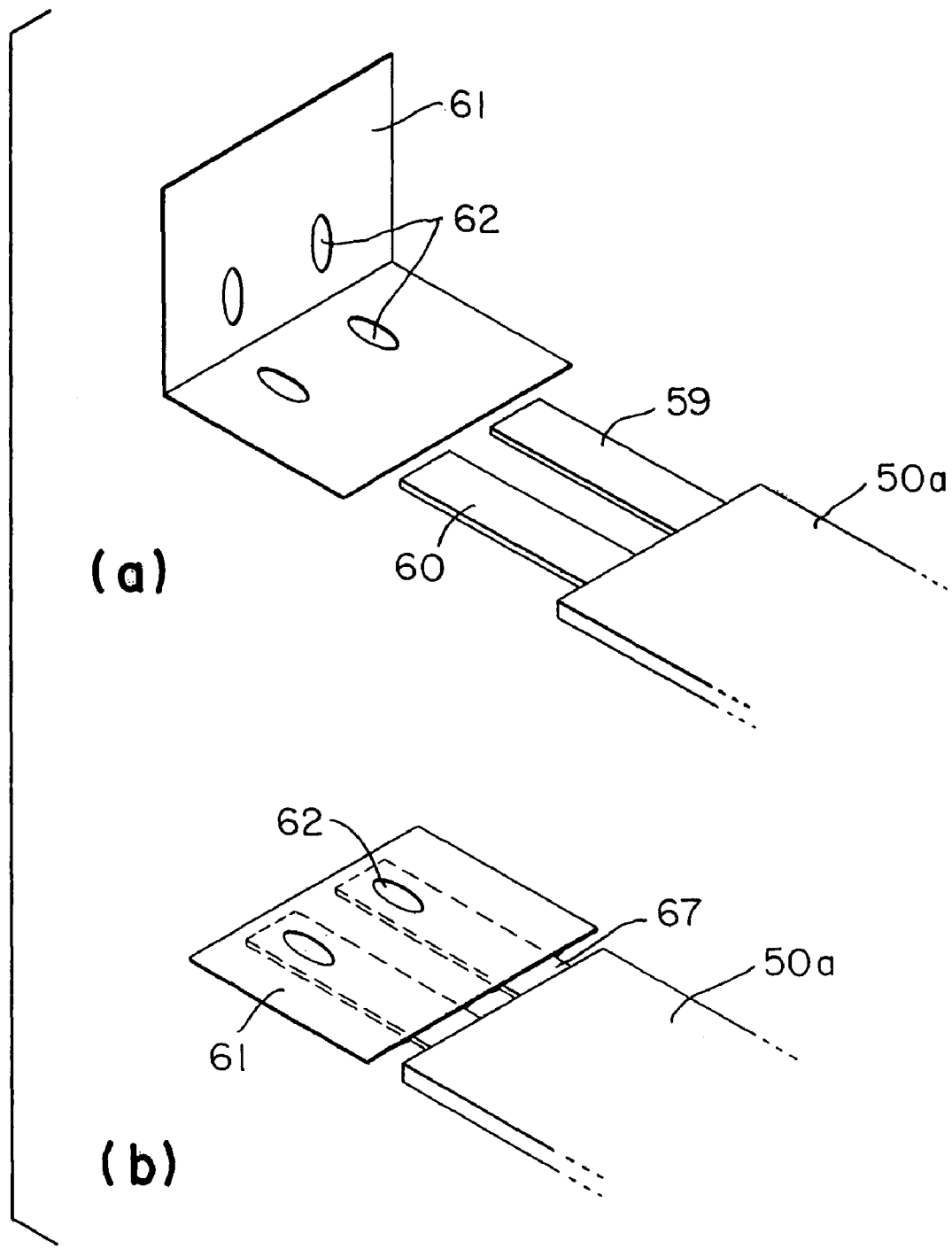
F I G. 38

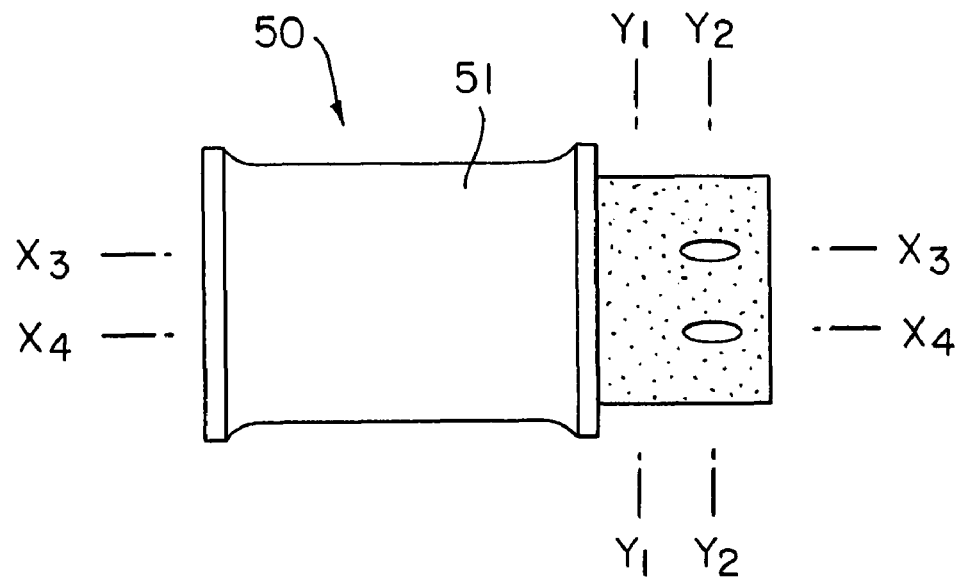
F I G. 40
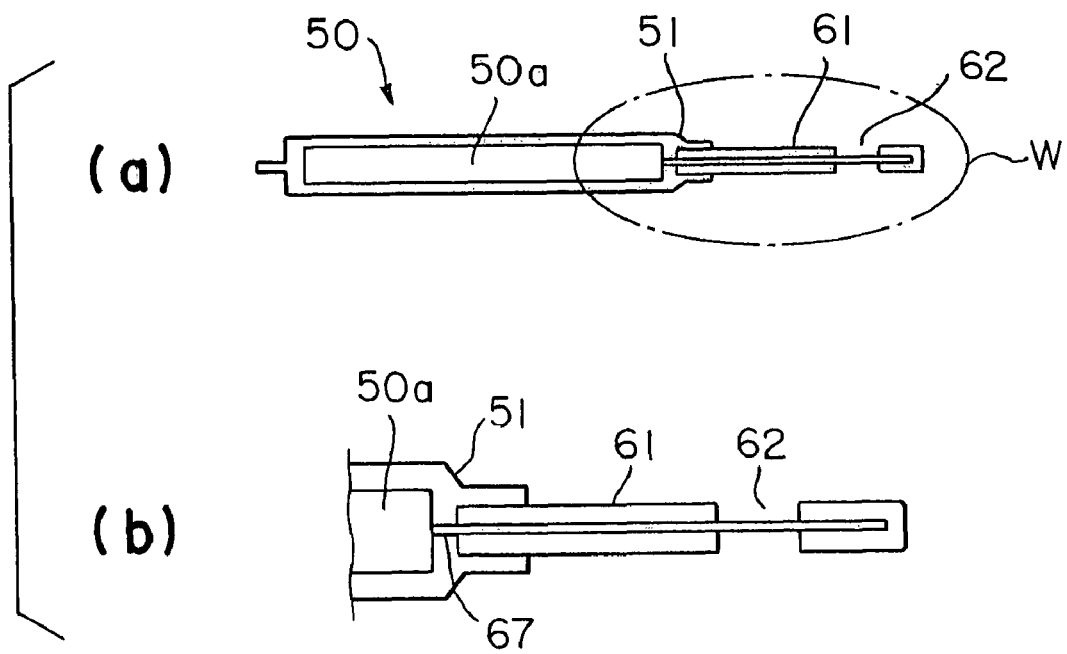
F I G. 41

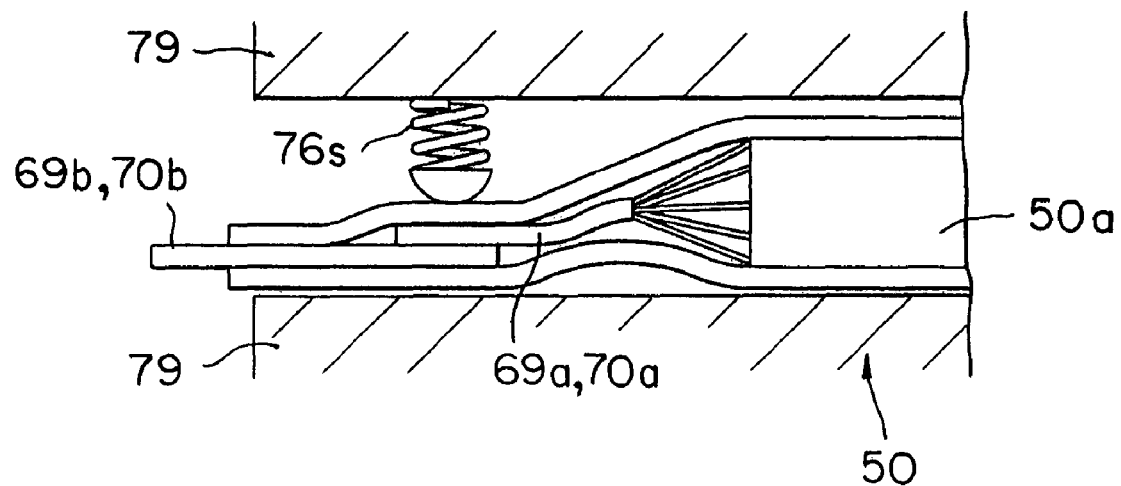
F I G. 47
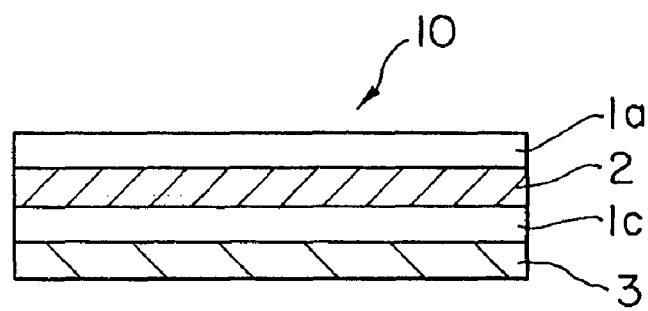
F I G. 48

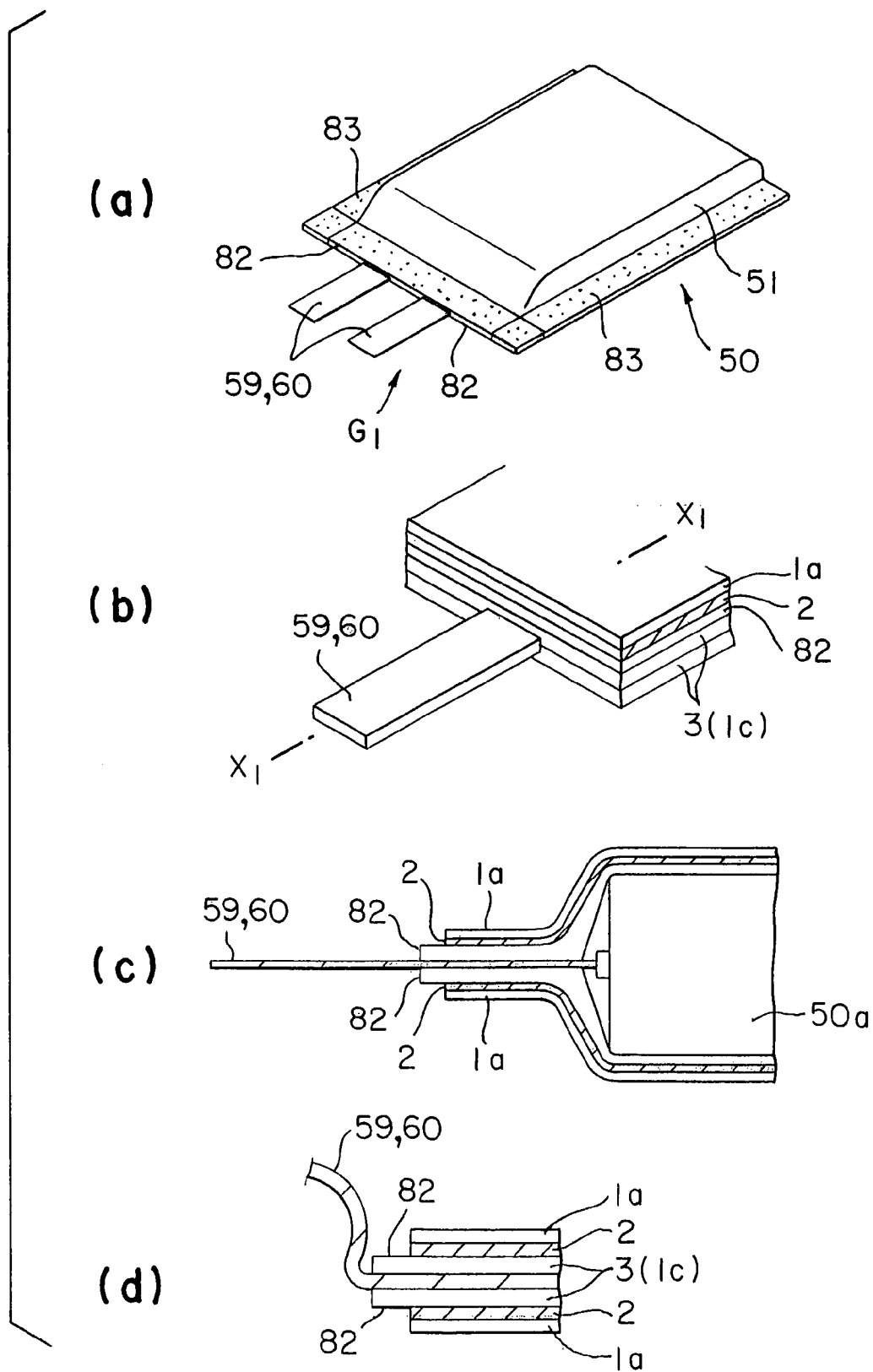
F I G. 49

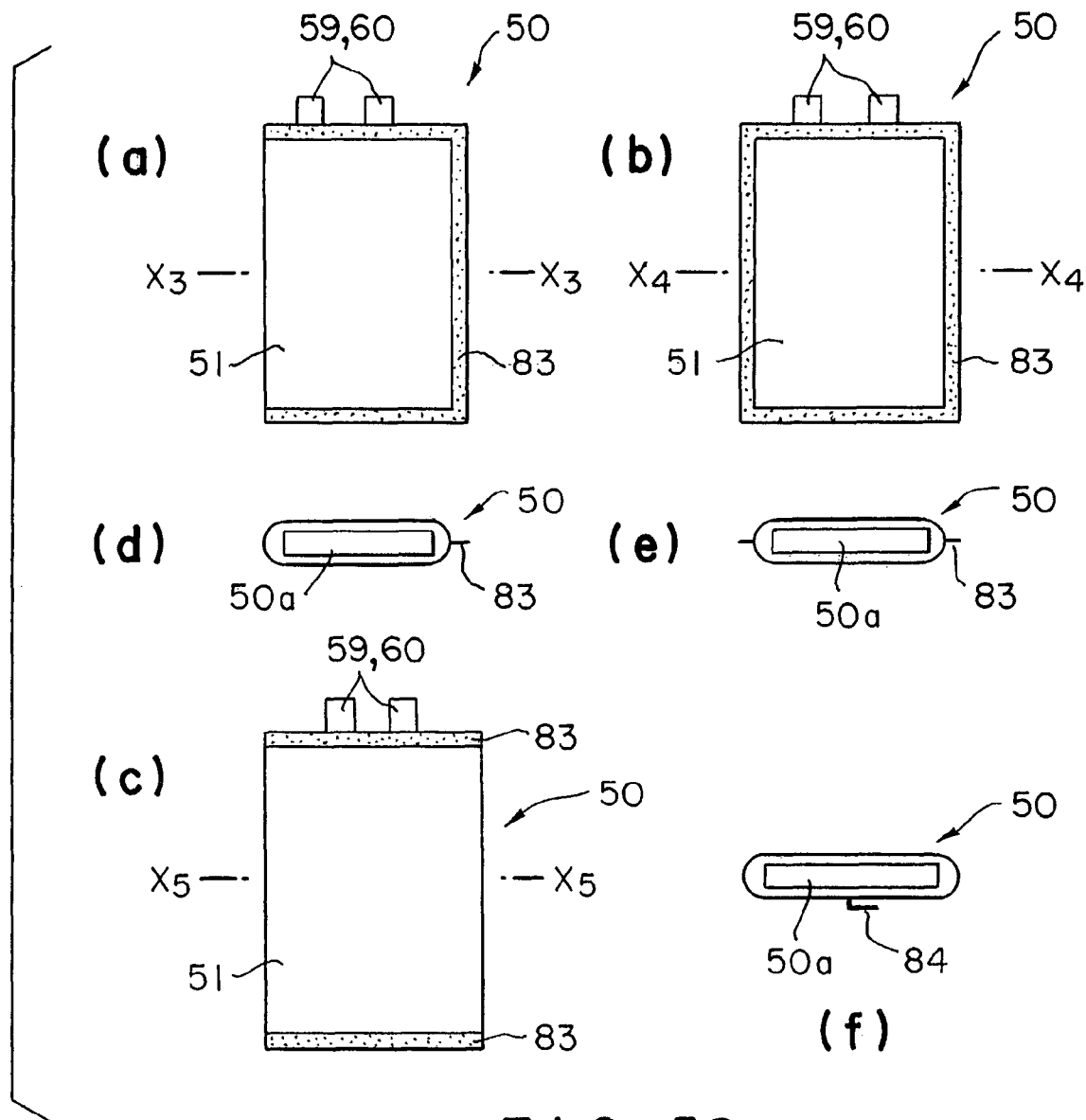
F I G. 52
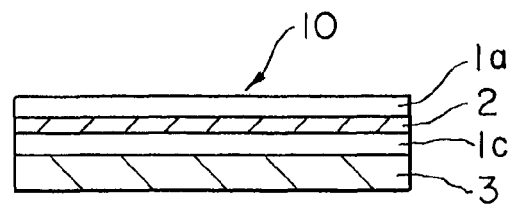
F I G. 53

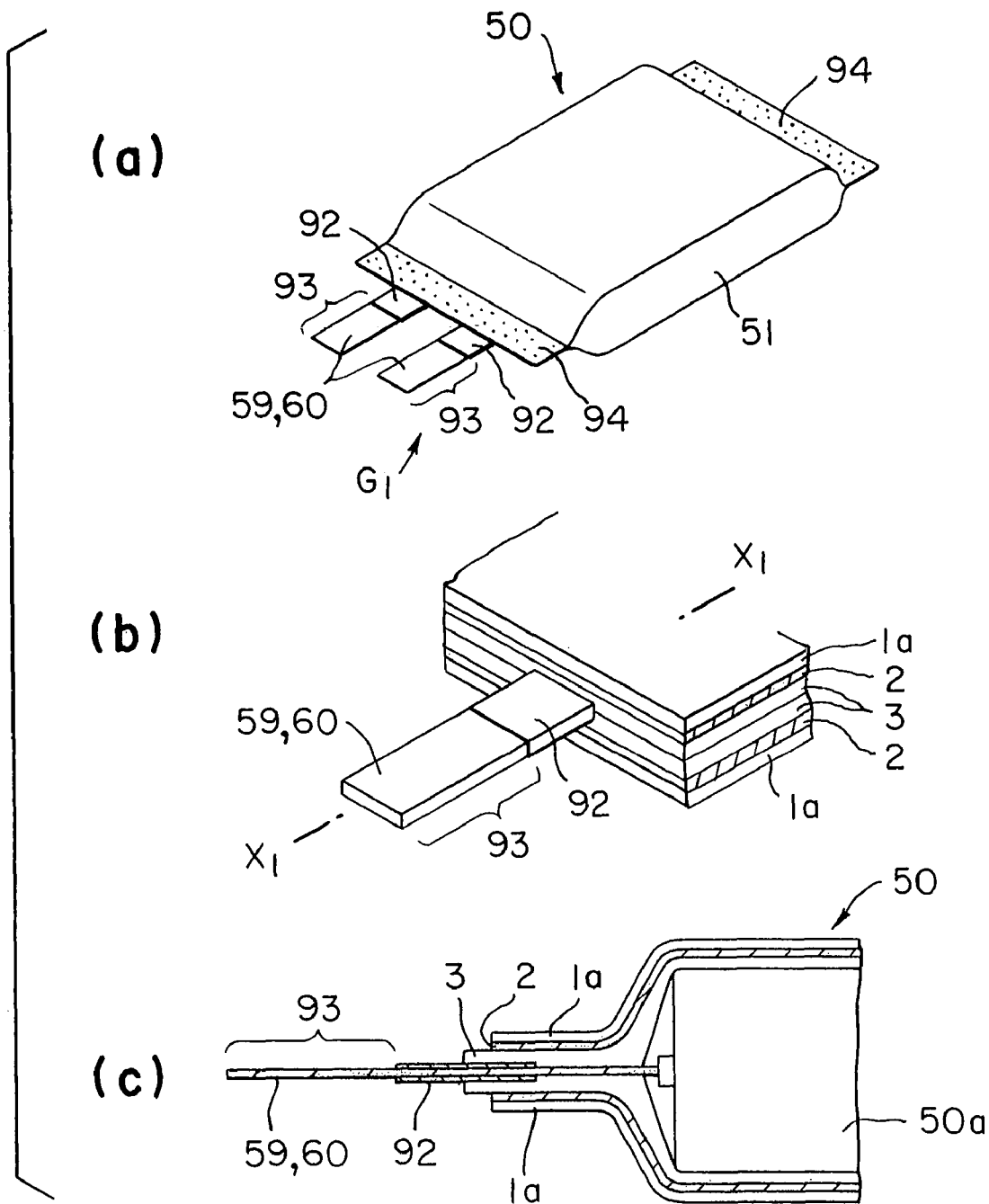
F I G. 55

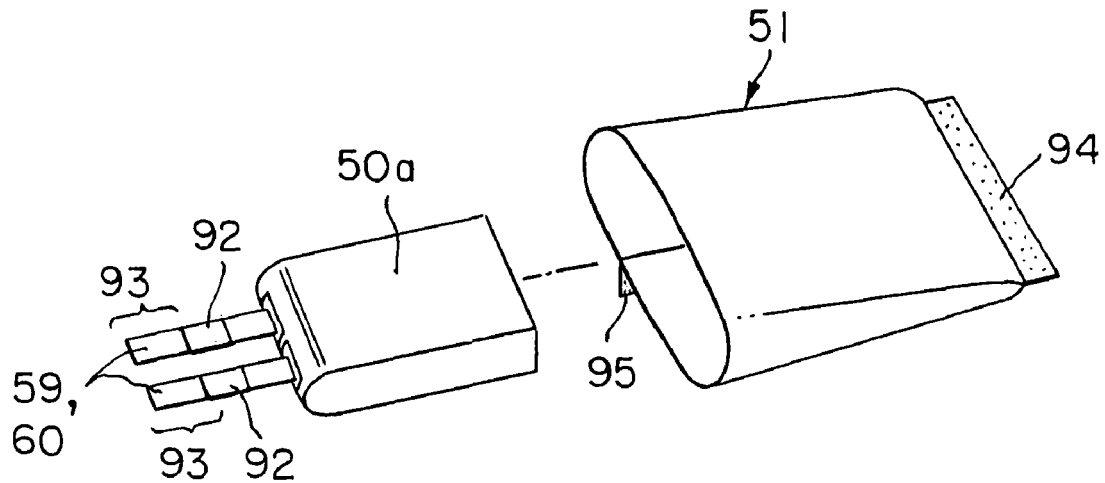
F I G. 56
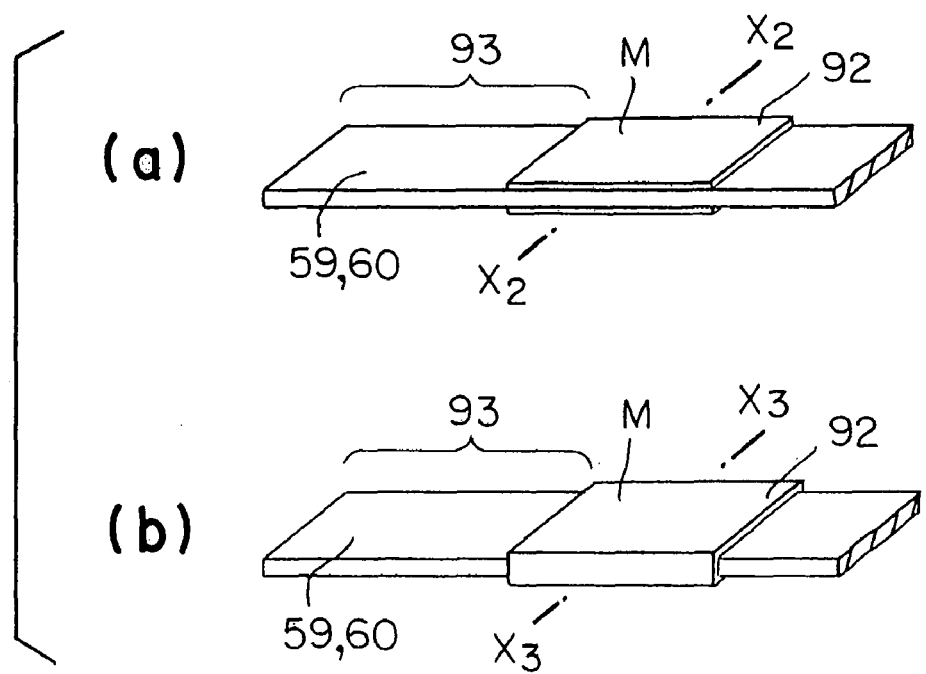
F I G. 57

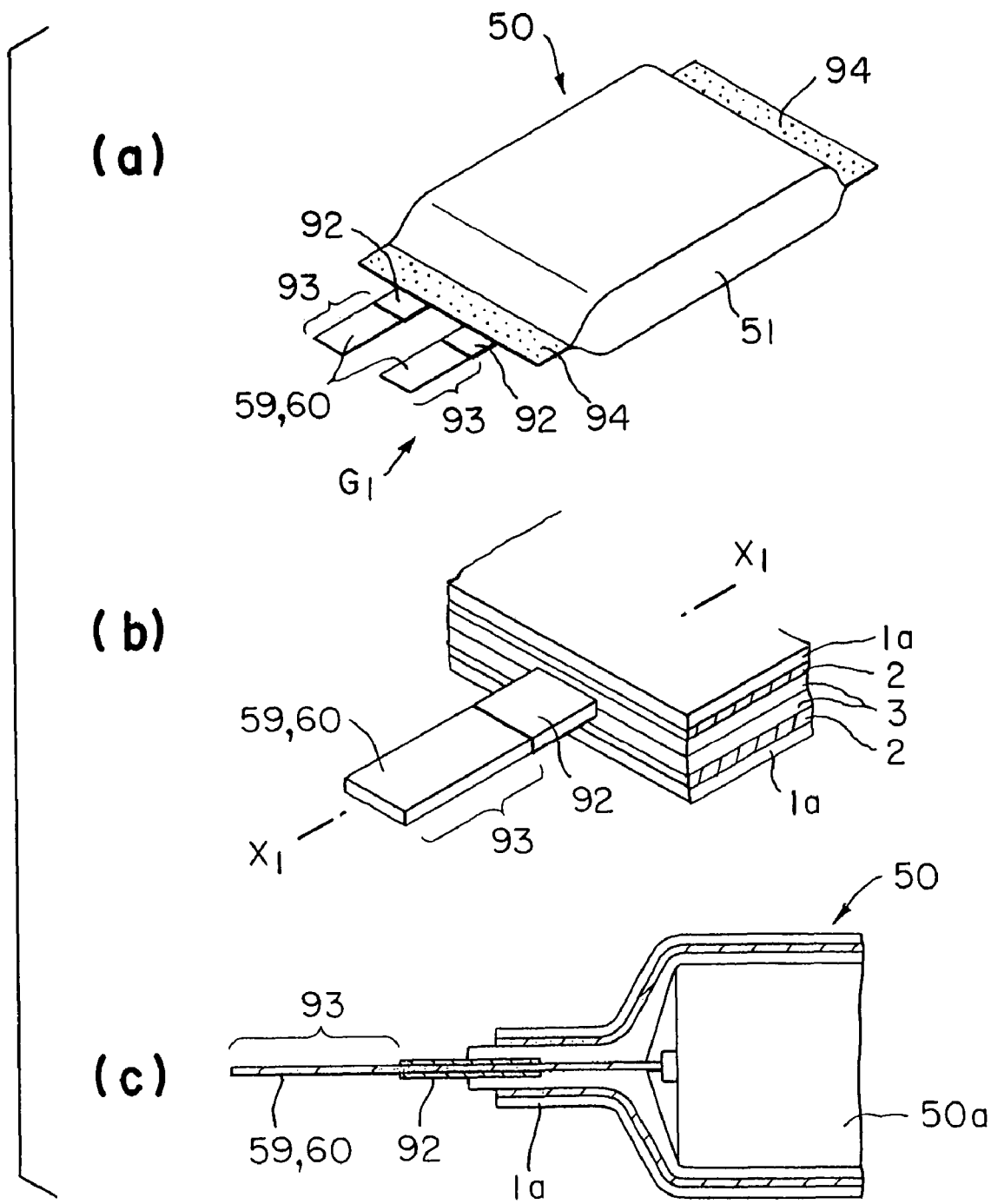
F I G. 58

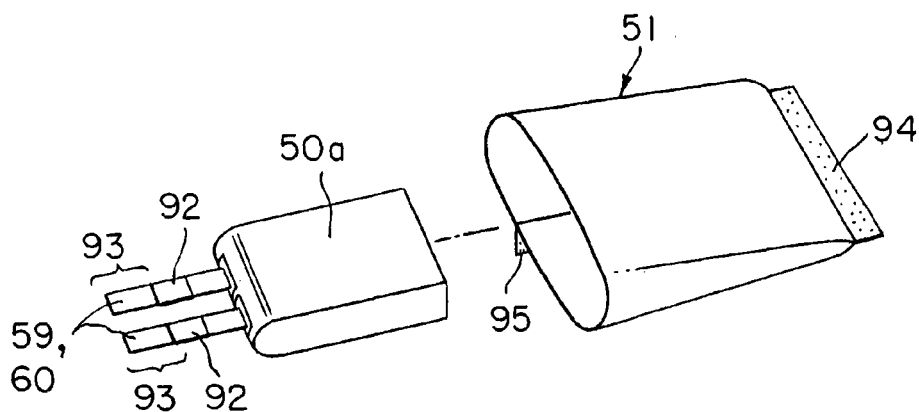
F I G. 59
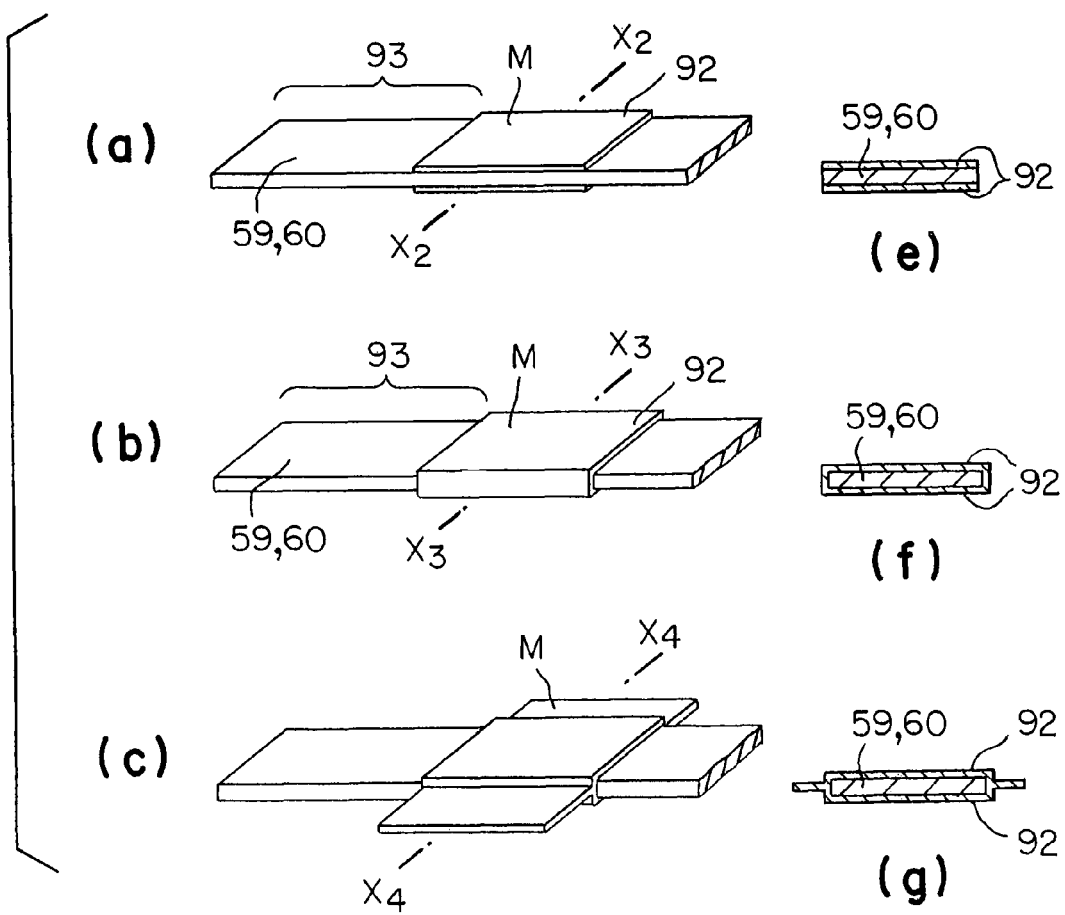
F I G. 60

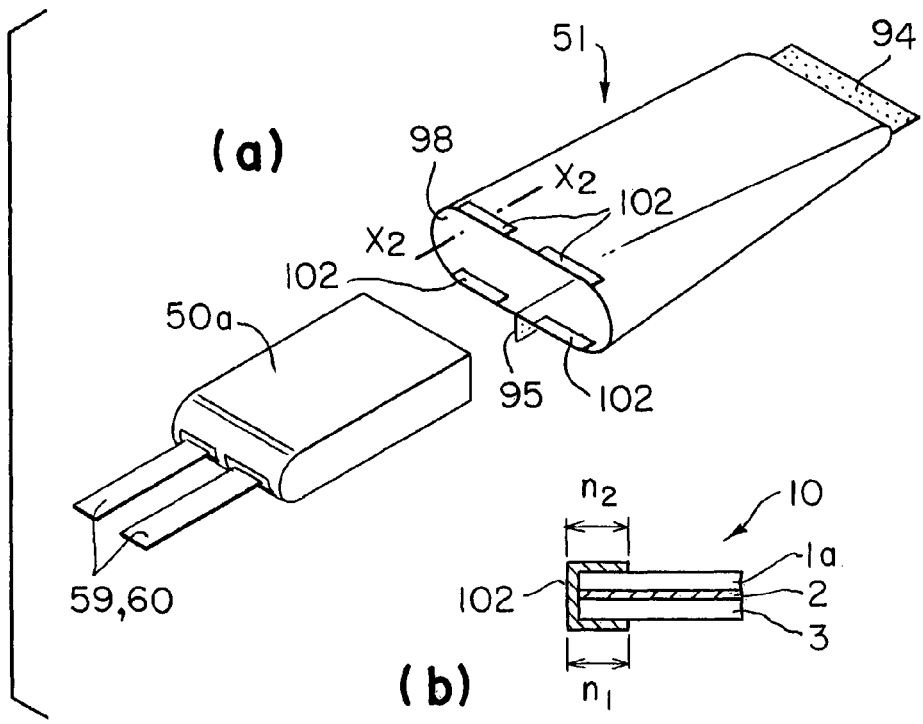
F I G. 66
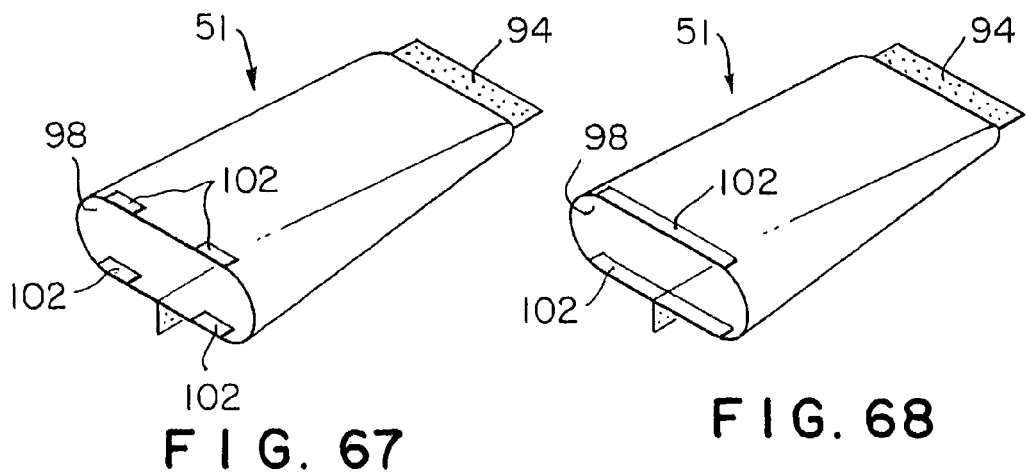
F I G. 67  F I G. 68
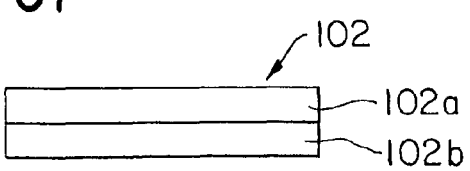
F I G. 69

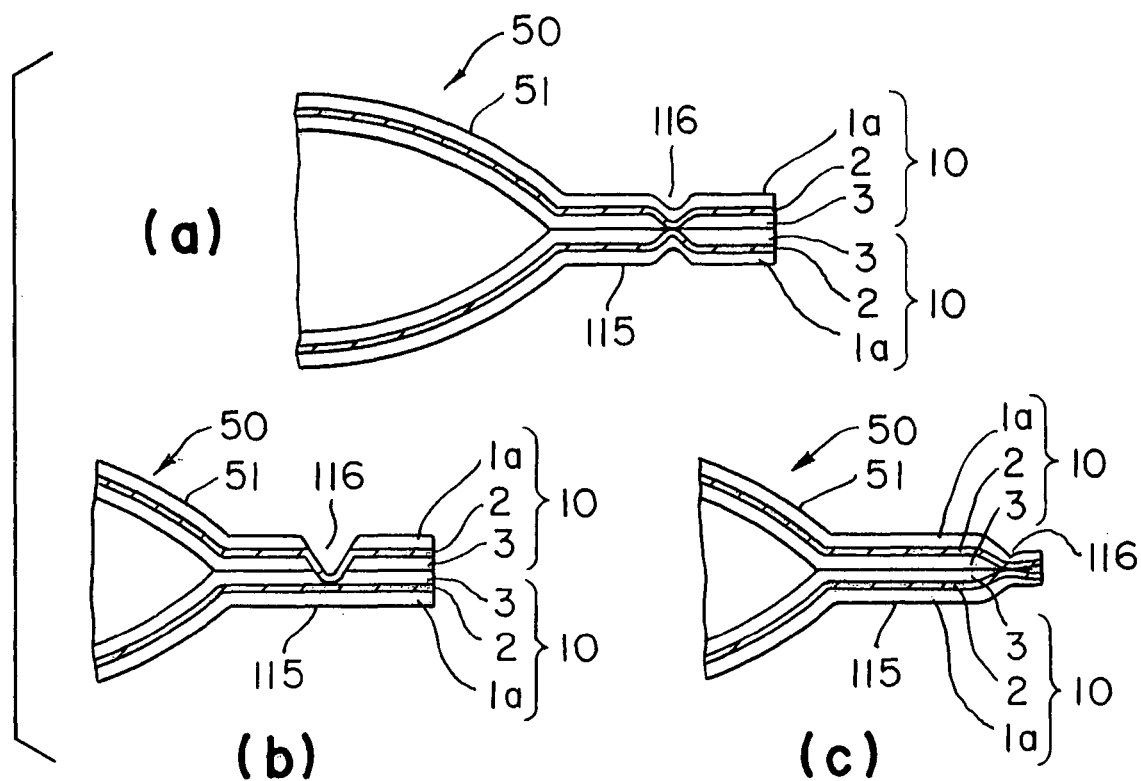
F I G. 72
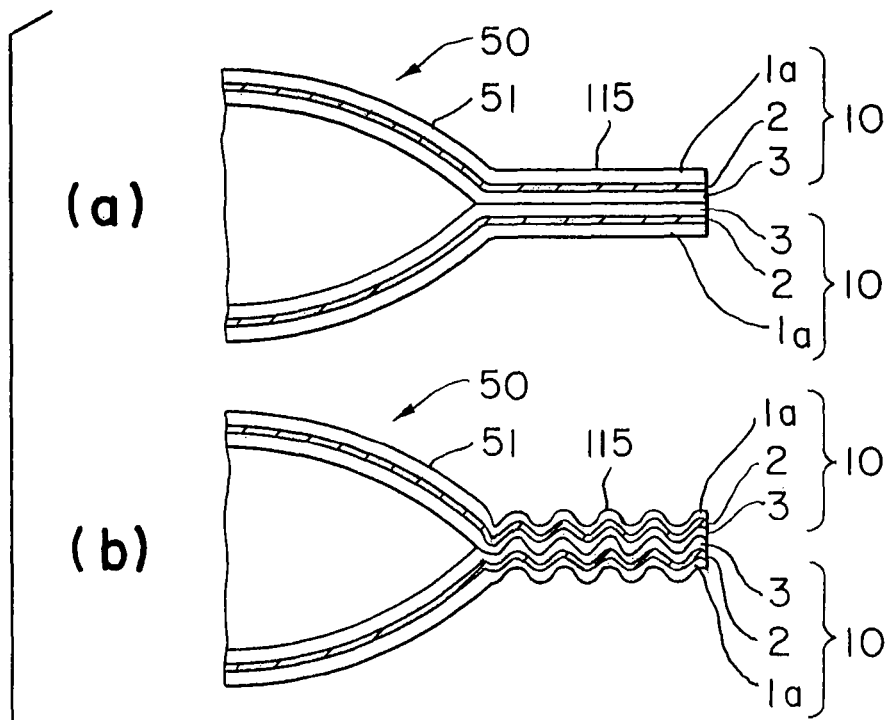
F I G. 73

BATTERY CASE FORMING SHEET AND BATTERY PACKET

TECHNICAL FIELD

The present invention relates to a battery packet, and a battery case forming sheet for forming a battery case for containing the component elements of a battery.

BACKGROUND ART

Most conventional battery cases for containing the component elements of a battery are metal cases. Various electronic apparatuses including notebook computers and portable telephone sets have been developed and have diffused, and efforts have been made in recent years to reduce the weight and thickness of such electronic apparatuses. Demand for the development of lightweight, thin batteries requiring less space has increased with the progressive reduction in the weight and thickness of such electronic apparatuses.

To meet such a demand, activities have been made for the research and development of various lightweight, thin sheet batteries using electrodes and electrolytes of polymeric materials. Nevertheless, any light, thin battery cases for sheet batteries, satisfying all requisite properties including strength, moisture- and gas-impermeability, sealing performance and adhesion to electrodes and terminals have not been provided.

DISCLOSURE OF THE INVENTION

The present invention has been made in view of the foregoing problems and it is therefore an object of the present invention to provide a light, thin sheet for lightweight, thin battery cases, having excellent properties in strength, durability, moisture and gas impermeability, sealing and adhesion to electrodes and terminals, and capable of being easily processed, and to provide a battery packet.

The present invention provides a battery case forming laminated sheet for forming a battery case comprising a first base film, and a heat-adhesive resin layer formed on the inner side of the first base film, a battery packet comprising a battery, a battery case containing the battery, and tabs connected to the battery and projecting outside from the battery case, and a battery packet comprising a battery, tabs connected to the battery, and a battery case containing the battery and the tabs, in which a peripheral part of the battery case is sealed, and recesses are formed in parts of the sealed peripheral part corresponding to the tabs.

BRIEF DESCRIPTION OF THE DRAWINGS

FIGS. 10 to 12 are typical sectional views of a third embodiment according to the present invention;

FIGS. 13 to 16 are typical sectional views of a fourth embodiment according to the present invention;

FIGS. 21 to 23 are typical sectional views of a sixth embodiment according to the present invention;

FIGS. 24 to 28 are typical views of a seventh embodiment according to the present invention;

FIGS. 29 to 33 are typical views of an eighth embodiment according to the present invention;

FIGS. 37 to 44 are typical views of a tenth embodiment according to the present invention;

FIGS. 45 to 48 are typical views of an eleventh embodiment according to the present invention;

FIGS. 49 to 54 are typical views of a twelfth embodiment according to the present invention;

FIGS. 55 to 57 are typical views of a thirteenth embodiment according to the present invention;

FIGS. 58 to 60 are typical views of a fourteenth embodiment according to the present invention;

FIGS. 65 to 69 are typical views of a sixteenth embodiment according to the present invention;

FIGS. 72 to 73 are typical views of an eighteenth embodiment according to the present invention;

BEST MODE FOR CARRYING OUT THE INVENTION

First Embodiment

Figure 1:
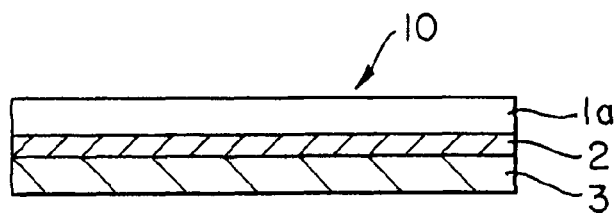
FIGS. 1 to 5 are typical sectional views of a first embodiment according to the present invention.

A first embodiment according to the present invention will be described with reference to FIGS. 1 to 5. A polymer battery packet 50 will be described with reference to FIG. 5.

The polymer battery packet 50 comprises a battery case 51, a polymer battery 50a contained in the battery case 51, and a pair of tabs 59 and 60 connected to the polymer battery 50a and projecting outside from the battery case 51.

The battery case 51 is formed by heat-sealing laminated sheets, which will be described later.

The polymer battery 50a has an electrolytic gel layer 53 containing an organic electrolyte, a positive terminal 55 overlying the electrolytic gel layer 53, a negative terminal 56 underlying the electrolytic gel layer 53, and collectors 57 and 58 connected to the positive terminal 55 and the negative terminal 56, respectively. The collector 57 connected to the positive terminal 55 is made of Al, and the collector 58 connected to the negative terminal 56 is made of Cu.

The tab 59 connected to the positive terminal 55 is a metal tab of Al or a stainless steel, and the tab 60 connected to the negative terminal 56 is a metal tab of Cu, Ni or a stainless steel.

A separator 54 formed by cutting a porous film is embedded in the electrolytic gel layer 53 containing an organic electrolyte. The separator 54 is not necessarily be embedded in the electrolytic gel layer 53.

The polymer battery 50a maybe of a coiled construction, a laminated construction or a folded construction.

The polymer battery 50a may be a lithium polymer battery. Components of a lithium ion polymer battery (LIP) and a lithium metal polymer battery (LP) are tabulated below.

TABLE

|  | Lithium polymer battery | |
| --- | --- | --- |
|  | LIP battery | LP battery |
| Positive terminal | Li-containing metal oxide (Co, Ni, Mn oxide) | Vanadium oxide/polymer |
| Negative terminal | Carbon | Metallic lithium |
| Collector | Metal foil, meshed metal sheet, punched metal sheet, knitted carbon fiber fabric | |
| Electrolyte | Electrolytic gel containing organic electrolyte | |
| Separator | Reinforcing porous films, nonwoven fabrics | |
| Thickness of separator | 70 to 200 μm | |
| Internal structure | Wound, laminated or folded | |

Figure 5:
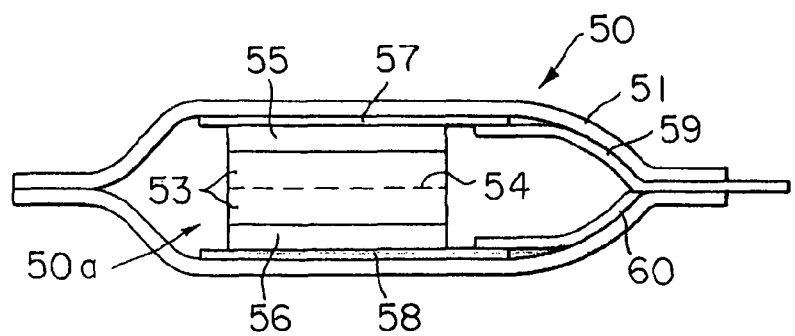

In the polymer battery packet 50 shown in FIG. 5, a potential difference is created between the tabs 59 and 60 extending from the polymer battery 50a, and electric energy can be derived through the tabs 59 and 60.

The battery case 51 will be described. The battery case 51 is formed by heat-sealing laminated sheets (battery case forming sheets).

Any one of laminated sheets described in the following paragraphs (1) to (4) is used for forming the battery case 51. In the laminated sheets (1) to (4), each of first second and third base film is a biaxially oriented polyethylene terephthalate film (hereinafter referred to as "PET film") or a biaxially oriented nylon film (hereinafter referred to as "ON film").

(1) First base film layer/Metal foil layer/Heat-adhesive resin layer (2) First base film layer/Second base film layer/Metal foil layer/Heat adhesive resin layer (3) First base film layer/Metal foil layer/Third base film layer/Heat-adhesive resin layer (4) First base film layer/Second base film layer/Metal foil layer/Third base film layer/Heat-adhesive resin layer These battery case forming sheets are superposed with the heat-adhesive resin layers in contact with each other, side edge parts and end edge parts of the sheets are bonded together by heat-sealing to form a battery case 51 having the shape of a pouch having one open end, the components of the battery 50a including the positive terminal 55, the negative terminal 56 and the electrolytic gel layer 53 are put in the battery case 51, the tabs 59 and 60 are extended outside the battery case 51, and the heat-adhesive resin layers of the edge parts of the sheets of the open end, and the heat-adhesive resin layers of the edge parts of the sheets and the tabs 59 and 60 are bonded together by heat-sealing.

The heat-adhesive resin layers of the sheets are formed of a heat-adhesive resin adhesive not only to itself, but also to the tabs 59 and 60 formed of a conductive material, such as a copper foil or an aluminum foil.

The metal foil layer sandwiched between the base film layers or between the base film layer and the heat-adhesive resin layer serves as a excellent barrier to moisture and gases, and is protected by the first, the second and/or the third base film layer and/or the heat-adhesive resin layer. Therefore, the metal foil layer will not be fissured and any pinholes will not be formed in the metal foil layer, so that the metal foil layer is able to maintain its satisfactory gas-impermeable property.

The first, the second or the third base film layer laminated to the outer or the inner surface of the metal foil layer protects the metal foil layer, gives strength and resistance to various hazardous external effects to the sheet, and the heat-adhesive resin layer, i.e., the innermost layer, gives a heat-sealable property to the sheet.

At least the first base film layer is formed on one surface of the metal foil layer, and at least the heat-adhesive resin layer is formed on the other surface of the metal foil layer. Since the first base film layer and the heat-adhesive resin layer are electrically nonconductive, the battery case forming sheet is an electrically nonconductive sheet.

The heat-adhesive resin layer of the laminated sheet is an acid-denatured polyolefin resin having an acid content in the range of 0.01 to 10% by weight.

The acid-natured polyolefin resin forming the heat-adhesive resin layer is satisfactorily heat-adhesive not only to itself, but also to the tabs 59 and 60 of copper or aluminum. Therefore, the battery case resembling a pouch having one open end can easily be formed by heat-sealing, and the open end through which the tabs 59 and 60 of a metal foil, such as a copper or aluminum foil, extend can satisfactorily and hermetically be sealed by heat-sealing after placing the components of the battery in the battery case.

Materials of the battery case forming sheet according to the present invention and methods of processing the materials will be described hereinafter.

The battery case forming sheet according to the present invention has, as an intermediate layer, the metal foil layer highly impermeable to moisture and gases, some of the first, the second and the third base film layer are laminated to one or both the surfaces of the metal foil layer, and the heat-adhesive resin layer is formed as the innermost layer.

An aluminum foil and a copper foil are suitable materials for forming the gas-impermeable metal foil layer, i.e., the intermediate layer. An aluminum foil is the most preferable material for forming the metal foil layer because an aluminum foil is inexpensive, easy to process and easy to bond to a film. A suitable thickness of the metal foil layer is in the range of 5 to 25 μm.

Each of the first, the second and the third base film layer may be, for example, a PET film, an ON film, a polyethylene naphthalate film, a polyimide film or a polycarbonate film. PET films and ON films are particularly suitable in view of durability, ability, processability and economy.

Although there is no significant difference in properties between PET films and ON films, PET films have a low hygroscopic property and are excellent in rigidity, abrasion resistance and heat resistance, and ON films have a relatively high hygroscopic property and are excellent in flexibility, piercing strength, bending strength and low-temperature resistance.

The thicknesses of those base films are in the range of 5 to 100 μm, more preferably, in the range of 12 to 30 μm.

As mentioned above, it is preferable that the heat-adhesive resin layer, i.e., the innermost layer, is satisfactorily heat-adhesive not only to itself, but also to the metal forming the tabs 59 and 60, and have a low hygroscopic property and a low moisture adsorptivity to restrict the leakage of moisture into the electrolyte of the polymer battery 50a to the least possible extent. It is also preferable that the heat-adhesive resin layer is stable and unsusceptible to the swelling and corrosive actions of the electrolyte.

Heat-adhesive resins meeting such requirements are, for example, ethylene-vinyl acetate copolymers, ethylene-acrylate copolymers, ethylene-methacrylate copolymers, and polyolefin resins prepared by blending a polyethylene resin and one or some of the foregoing copolymers, and polyolefin resins prepared by blending a polypropylene resin and one or some of the foregoing copolymers. Particularly preferable heat-adhesive resins are acid-denatured polyolefin resins produced by modifying ethylene-acrylic acid copolymers, ethylene-methacrylic acid copolymers, polyethylene resins, polypropylene resins, and resins produced by graft copolymerization including ethylen-propylene copolymers, ethylene-α-olefin copolymers, propylene-α-olefin copolymers, ethylene-vinyl acetate copolymers, ethylene-acrylate copolymers, ethylene-methacrylate copolymers and terpolymers of those resins by some of unsaturated carboxylic acids and unhydrides of unsaturated carboxylic acides, such as acrylic acid, methacrylic acid, maleic acid, maleic anhydride, citraconic anhydride, itaconic acid and itaconic anhydride.

Ionomers produced by cross-linking the resins having carboxyl groups included in those resins by $Na^+$ ions or $Zn^{2+}$ ions are suitable materials for forming the heat-adhesive resin layer.

Preferable acid content of the acid-denatured polyolefin resins is in the range of 0.01 to 10% by weight. The heat-adhesion of the resin to a metal is insufficient if the acid content is less than 0.01% by weight, and the film forming performance of the resin is inferior if the acid content is higher than 10% by weight.

A suitable thickness of the heat-adhesive resin layer is in the range of 10 to 100 μm.

The component layers may be laminated by a known dry lamination method using a two-component polyurethane adhesive or an extrusion lamination method (also called a sandwich lamination method) which extrudes a molten heat-adhesive resin, such as a polyethylene resin, between two films and compresses the layers of the films and a layer of the heat-adhesive resin sandwiched between the films.

The innermost heat-adhesive resin layer may be formed by attaching a heat-adhesive resin film to a film by a dry lamination method or an extrusion lamination method. If necessary, a molten heat-adhesive resin may be applied to a surface of a film coated with an anchor coating material (AC material, i.e., a primer) by extrusion coating.

The present invention will more concretely be described with reference to the accompanying drawings.

FIGS. 1, 2, 3 and 4 are typical sectional views of battery case forming sheets in examples in accordance with the present invention for forming the battery case 51.

Referring to FIG. 1, a battery case forming sheet 10 is formed by sequentially laminating a first base film layer 1a, a metal foil layer 2 and a heat-adhesive resin layer 3. The first base film layer 1a is a PET film or an ON film serving as the outermost layer. The metal foil layer 2 is, for example, an aluminum foil. Preferably, the heat-adhesive resin layer 3 is a layer of an acid-denatured polyolefin resin having an acid content in the range of 0.01 to 10% by weight.

The first base film layer 1a, such as a PET film or an ON film, forming the outermost layer of the battery case forming sheet 10 provides the battery case forming sheet 10 with various kinds of mechanical strength including tensile strength, piercing strength and bending strength, and various kinds of resistance including abrasion resistance, water resistance, chemical resistance, heat resistance and low-temperature resistance. The metal foil layer, such as an aluminum foil layer, i.e., an intermediate layer, serves as a barrier layer impermeable to moisture and gases. The heat-adhesive resin layer, i.e., the innermost layer, is a layer of an acid-denatured polyolefin resin having an acid content in the range of 0.01 to 10% by weight and provides the battery case forming sheet 10 with excellent heat-sealable property.

If the metal foil layer is a 9 μm thick aluminum foil, the metal foil layer has a water vapor permeability of 0.01 $g/m^2 \cdot 24$ hr or below at 40° C. and 90% RH. The water vapor impermeability can easily be enhanced.

The following are representative examples of the foregoing laminated sheet.

① PET film (12 μm thick)/Aluminum foil (9 μm thick)/Acid-denatured polyolefin resin layer (40 μm thick)

② ON film (15 μm thick)/Aluminum foil (9 μm thick)/Acid-denatured polyolefin resin layer (40 μm thick)

Figure 2:
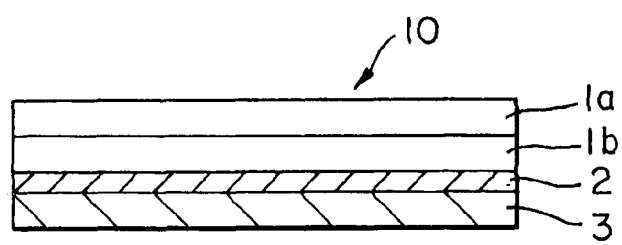

Referring to FIG. 2, a battery case forming sheet 10 is formed by sequentially laminating a first base film layer 1a, a second base film 1b, a metal foil layer 2 and a heat-adhesive resin layer 3. The first base film layer 1a is the outermost layer.

The battery case forming sheet 10, as compared with the sheet 10 shown in FIG. 1, is provided additionally with the second base film 1b to improve the ability of the first base film 1a on the outer side of the metal foil layer 2, and a two-layer base film is formed by the first base film layer 1a and the second base film layer 1b.

Each of the first base film layer 1a and the second base film layer 1b is a PET film or an ON film.

Although the first base film layer 1a and the second base film layer 1b may be the same types of films, it is preferable to use different types of films, such as a PET film and an ON film as the first base film layer 1a and the second-base film layer 1b, respectively, in view of makinging the respective properties of the first base film layer 1a and the second base film layer 1b complement each other.

The following are representative examples of the foregoing laminated sheet.

① PET film (12 μm thick)/ON film (15 μm thick)/Aluminum foil (9 μm thick)/Acid-denatured polyolefin resin layer (40 μm thick)

② ON film (15 μm thick)/PET film (12 μm thick)/Aluminum foil (9 μm thick)/Acid-denatured polyolefin resin layer (40 μm thick)

Figure 3:
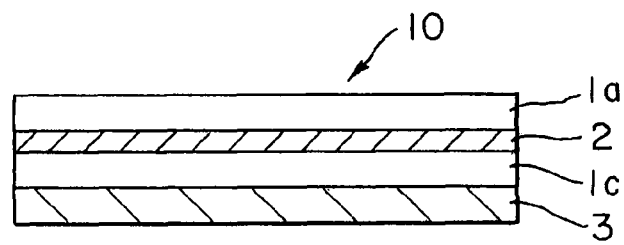

Referring to FIG. 3, a battery case forming sheet 10 is formed by sequentially laminating a first base film layer 1a, a metal foil layer 2, a third base film 1c and a heat-adhesive resin layer 3. The first base film layer 1a is the outermost layer.

The battery case forming sheet 10, as compared with the battery case forming sheet 10 shown in FIG. 1, is provided additionally with the third base film 1c sandwiched between the intermediate metal foil layer 2 and the heat-adhesive resin layer 3 to provided the sheet 10 with stabler barrier effect by enhancing metal foil layer protecting effect.

Each of the first base film layer 1a and the third base film layer 1c is a PET film or an ON film.

The following are representative examples of the foregoing laminated sheet.

① PET film (12 μm thick)/Aluminum foil (9 μm thick)/PET film (12 μm thick)/Acid-denatured polyolefin resin layer (40 μm thick)

② PET film (12 μm thick)/Aluminum foil (9 μm thick)/ON film (15 μm thick)/Acid-denatured polyolefin resin layer (40 μm thick)

③ ON film (15 μm thick)/Aluminum foil (9 μm thick)/PET film (12 μm thick)/Acid-denatured polyolefin resin layer (40 μm thick)

④ ON film (15 μm thick)/Aluminum foil (9 μm thick)/ON film (15 μm thick)/Acid-denatured polyolefin resin layer (40 μm thick)

The battery case forming sheet 10, as compared with the battery case forming sheet 10 shown in FIG. 1, is provided additionally with the third base film 1c to provide the sheet 10 with improved various kinds of mechanical strength and resistance to detrimental effects. Since the metal foil layer 2 is sandwiched between the first base film layer 1a and the third base film layer 1c, the metal foil layer 2 is protected more effectively from both external and internal shocks, abrasion, physical actions and chemical actions, and the sheet 10 has a further stable barrier effect.

Figure 4:
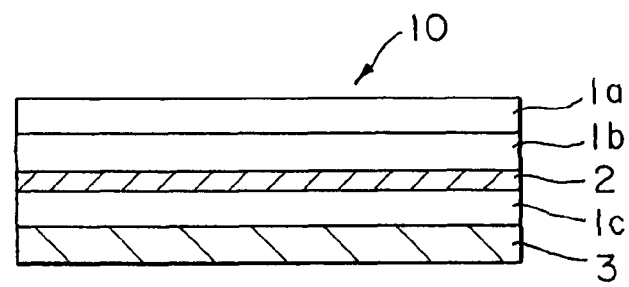

Referring to FIG. 4, a battery case forming sheet 10 is formed by sequentially laminating a first base film layer 1a, a second base film layer 1b, a metal foil layer 2, a third base film 1c and a heat-adhesive resin layer 3. The first base film layer 1a is the outermost layer.

The battery case forming sheet 10, as compared with the battery case forming sheet 10 shown in FIG. 2, is provided additionally with the third base film 1c sandwiched between the metal foil layer 2 and the heat-adhesive resin layer 3.

The first, second and third base film layers 1a, 1b and 1c provides the sheet 10 with improved various kinds of mechanical strength and resistance to detrimental effects. Since the metal foil layer 2 is sandwiched between the laminated layer of the first base film layer 1a and the second base film layer 1b, and the third base film layer 1c, the metal foil layer 2 is further effectively protected for the stabler barrier effect.

When printing a picture of letters and patterns on the surface of each of the battery case forming sheets 10 shown in FIGS. 1 to 4, the picture is printed on the inner surface of the first base film layer to be bonded to the surface of the adjacent layer for second-surface decoration, and then the first base film layer is laminated to the adjacent layer. The thus printed picture will not be damaged even if the surface of the sheet 10 is abraded.

As is apparent form the foregoing description, the present invention provides lightweight, thin, flexible, battery case forming sheets excellent in various kinds of mechanical strength, resistance to detrimental effects, impermeability to moisture and gases, heat-sealability and processability, and capable of being efficiently produced.

Second Embodiment

A second embodiment according to the present invention will be described with reference to FIGS. 6 to 9. A battery case forming sheet in the second embodiment is any one of the following laminated sheets (1) to (4). The laminated sheets in the second embodiment are substantially the same in construction as those in the first embodiment, except that the laminated sheets in the second embodiment have a laminated heat-adhesive resin layer consisting of a polyolefin resin layer and an acid-denatured polyolefin resin layer.

(1) First base film layer/Metal foil layer/Heat-adhesive resin layer (2) First base film layer/Second base film layer/Metal foil layer/Heat-adhesive resin layer (3) First base film layer/Metal foil layer/Third base film layer/Heat-adhesive resin layer (4) First base film layer/Second base film layer/Metal foil layer/Third base film layer/Heat-adhesive resin layer The innermost heat-adhesive resin layer is formed by laminating a polyolefin resin layer and an acid-denatured polyolefin resin layer having an acid content in the range of 0.01 to 10% by weight, and the heat-adhesive resin layer is laminated to the adjacent layer so that the acid-denatured polyolefin resin layer forms the innermost surface. Since the acid-denatured polyolefin resin layer is heat-adhesive not only to itself, but also to metals, such as copper and aluminum, a battery case formed by processing the battery case forming sheet and having the shape of a pouch having one open end through which the tabs 59 and 60 extend outside from the battery case can be sealed by satisfactorily heat-sealing the open end of the battery case.

Since both the polyolefin resin layer and the acid-denatured polyolefin resin act as heat-adhesive resin layers, the heat-sealed part of the battery case has a sufficient adhesive strength. The hygroscopic property and the moisture adsorbing property of the acid-denatured polyolefin resin are relatively high as compared with those of polyolefin resins, such as polyethylene and polypropylene, and hence the acid-denatured polyolefin resin tends to contain moisture. However, since the acid-denatured polyolefin resin layer of the heat-adhesive resin layer can be formed in a small thickness, the moisture content of the heat-adhesive resin layer can be restricted to the least possible extent and the effect of moisture contained in the heat-adhesive resin layer on the electrolyte can be prevented.

Since at least the first base film layer and the heat-adhesive resin layer are attached to the opposite sides of the metal foil layer, respectively, and both the first base film layer and the heat-adhesive resin layer are electrically nonconductive, the battery case forming sheet serves as an electrically nonconductive sheet.

Each of the first, the second and the third base film layer of the laminated sheet is a biaxially oriented polyethylene terephthalate film (hereinafter referred to as "PET film") or a biaxially oriented nylon film (hereinafter referred to as "ON film").

Since PET films and ON films are flexible, are excellent in strength including tensile strength, bending strength and piercing strength, resistance including abrasion resistance, heat resistance, low-temperature resistance and chemical resistance, processability for lamination, and economy, the battery case forming sheet having excellent properties can be produced at a high efficiency and at a low cost.

Materials of the battery case forming sheet according to the present invention and methods of processing the materials will be described hereinafter.

The battery case forming sheet according to the present invention has as an intermediate layer, the metal foil layer highly impermeable to moisture and gases, one or some of the first, the second and the third base film layer excellent in various kinds of strength and resistance to detrimental effects are laminated to one or both the surfaces of the metal foil layer, and the laminated heat-adhesive resin layer consisting of the polyolefin resin layer and the acid-denatured polyolefin resin layer is formed as the innermost layer.

An aluminum foil and copper foil are suitable materials for forming the gas-impermeable metal foil layer, i.e., the intermediate layer. An aluminum foil is the most preferable material for forming the metal foil layer because an aluminum foil is inexpensive, easy to process and easy to bond to a film. A suitable thickness of the metal foil layer is in the range of 5 to 25 μm.

The first, the second and the third base film layer may be layers of, for example, PET films, ON films, polyethylene naphthalate films, polyimide films and polycarbonate films. PET films and ON films are particularly suitable in view of durability, ability, processability and economy.

Although there is no significant difference in properties between PET films and ON films, PET films have a low hygroscopic property and are excellent in rigidity, tensile strength, abrasion resistance and heat resistance, and ON films have a relatively high hygroscopic property and are excellent in flexibility, piercing strength, bending strength and low-temperature resistance.

The thicknesses of those base films are in the range of 5 to 100 µm, more preferably, in the range of 12 to 30 µm.

As mentioned above, it is preferably that the heat-adhesive resin layer, i.e., the innermost layer, is satisfactorily heat-adhesive not only to itself, but also to metal terminals, and have a low hygroscopic property and a low moisture adsorptivity to restrict the leakage of moisture into the electrolyte of a polymer battery to the least possible extent. It is also preferable that the heat-adhesive resin layer is stable and unsusceptible to the swelling and corrosive actions of the electrolyte.

To meet such requirements, the present invention uses a laminated heat-adhesive resin layer consisting of a polyolefin resin layer and an acid-denatured polyolefin resin layer having an acid content in the range of 0.01 to 10% by weight.

The acid-denatured polyolefin resin layer is formed in the least necessary thickness and is laminated to the polyolefin resin layer so as to form the innermost layer in order that the heat-adhesive resin layer can satisfactorily be heat-bonded to terminals formed by processing a metal foil and to restrict the moisture content of the heat-adhesive resin layer to the least possible extent.

Polyolefin resins suitable for forming the polyolefin resin layer of the heat-adhesive resin layer meeting such requirements are, for example, polyethylene resins, polypropylene resins, ethylene-propylene copolymers, ethylene-α-olefin copolymers, ethylene-vinyl acetate copolymesr, ethylene-acrylate copolymers, ethylene-methacrylate copolymers, terpolymers of those resins, and resins prepared by blending some of those resins.

Suitable resins for forming the acid-denatured polyolefin resin layer having an acid content in the range of 0.01 to 10% by weight of the heat-adhesive resin layer are, for example, resins produced by modifying ethylene-acrylic acid copolymers, ethylene-methacrylic acid copolymers, polyethylene resins, polypropylene resins, and resins produced by graft copolymerization including ethylen-propylene copolymers, ethylene-α-olefin copolymers, propylene-α-olefin copolymers, ethylene-vinyl acetate copolymers, ethylene-acrylate copolymers, ethylene-methacrylate copolymers and terpolymers of those resins by some of unsaturated carboxylic acids and unhydrides of unsaturated carboxylic acides, such as acrylic acid, methacrylic acid, maleic acid, maleic anhydride, citraconic anhydride, itaconic acid and itaconic anhydride. The resin having an acid content in the range of 0.01 to 10% by weight is excellent in heat-adhesion to metals.

Ionomers produced by cross-linking the resins having carboxyl groups included in those resins by $Na^+$ ions or $Zn^{2+}$ ions are suitable materials for forming the heat-adhesive resin layer.

Preferable acid content of the acid-denatured polyolefin resins is in the range of 0.01 to 10% by weight. The heat-adhesion of the resin to a metal is insufficient if the acid content is less than 0.01% by weight, and the film forming performance of the resin is inferior if the acid content is higher than 10% by weight.

The acid-denatured polyolefin resin has high heat-adhesion to metals, whereas the same has a relatively high hygroscopic property and a relatively high moisture adsorbing property.

Accordingly, the present invention uses the heat-adhesive resin layer of a laminated sheet consisting of the polyolefin resin layer and the acid-denatured polyolefin resin layer to make the most of the advantages of the acid-denatured polyolefin resin and to make the polyolefin resin layer and the acid-denatured polyolefin resin layer complement each other, forms the innermost layer of the sheet by a acid-denatured polyolefin resin layer of the least possible thickness to suppress the influence of moisture to the least extent.

A suitable thickness of the heat-adhesive resin layer is in the range of 10 to 100 µm, and the thickness of the acid-denatured polyolefin resin layer is in the range of 1 to 50 µm, more preferably, in the range of 5 to 25 µm.

The battery case forming sheet in accordance with the present invention can be formed by properly laminating some of the first, the second and the third base film layer, the metal foil layer, and the heat-adhesive resin layer formed by laminating the polyolefin resin and the acid-denatured polyolefin resin layer. The first to the third base film layers and the metal foil layer are laminated by a known dry lamination method using, for example, a two-component polyurethane adhesive or by an extrusion lamination method which extrudes a molten heat-adhesive resin, such as a polyethylene resin, between two films and compresses the layers of the films and a layer of the heat-adhesive resin sandwiched between the films.

The heat-adhesive resin layer can be formed by putting together a polyolefin resin film of a predetermined thickness and an acid-denatured polyolefin resin film of a predetermined thickness formed by a multilayer tubular film extrusion method and laminating the polyolefin resin film and the acid-denatured polyolefin resin film by a dry lamination method or an extrusion lamination method. The heat-adhesive resin layer can be formed also by coating a surface of a base sheet formed by properly laminating some of the first to the third base film layers and the metal foil layer with an anchor coating material (AC material, i.e., a primer), and laminating a polyolefin resin layer of a predetermined thickness and an acid-denatured polyolefin resin layer of a predetermined thickness to the surface of the base sheet coated with the anchor coating material by coextrusion using a coextrusion machine.

Examples of the second embodiment will concretely be described hereinafter with reference to the drawings.

Examples shown in the drawings are illustrative and not limitative. Like or corresponding parts are designated by the same reference characters throughout the drawings.

FIGS. 6 to 9 are typical sectional views of examples of battery case forming sheets in accordance with the present invention.

Figure 6:
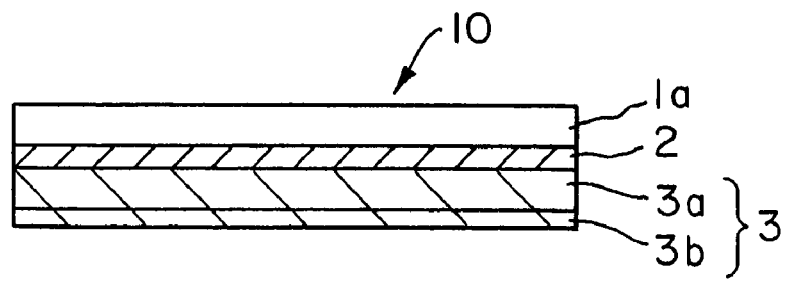
FIGS. 6 to 9 are typical sectional views of a second embodiment according to the present invention.

Referring to FIG. 6, a battery case forming sheet 10 is formed by sequentially laminating a first base film layer 1*a*, a metal foil layer 2 and a heat-adhesive resin layer 3 consisting of a polyolefin resin layer 3*a* and an acid-denatured polyolefin resin layer 3*b*. The first base film layer 1*a* is the outermost layer.

Preferably, the first base film layer 1*a* is a PET film or an ON film. Preferably, the metal foil layer 2 is, for example, an aluminum foil. The acid-denatured polyolefin resin layer 3*b* of the heat-adhesive resin layer 3 is a layer of an acid-denatured polyolefin resin having an acid content in the range of 0.01 to 10% by weight.

The first base film layer 1*a*, such as a PET film or an ON film, forming the outermost layer of the battery case forming sheet 10 provides the battery case forming sheet 10 with various kinds of mechanical strength including tensile strength, piercing strength and bending strength, and various kinds of resistance including abrasion resistance, water resistance, chemical resistance, heat resistance and low-temperature resistance. The metal foil layer 2, such as an aluminum foil layer, i.e., an intermediate layer, serves as a barrier layer impermeable to moisture and gases. As mentioned above, the polyolefin resin layer 3*a* and the acid-denatured polyolefin resin layer 3*b* having an acid content in the range of 0.01 to 10% by weight of the heat-adhesive resin layer 3 provide the battery case forming sheet 10 with excellent heat-sealable property and have a low moisture content.

If the metal foil layer is a 9 μm thick aluminum foil, the metal foil layer has a water vapor permeability of 0.01 g/m²·24 hr or below at 40° C. and 90% RH. The water vapor impermeability can easily be enhanced.

The following are representative examples of the foregoing laminated sheet.

① PET film (12 μm thick)/Aluminum foil (9 μm thick)/Polyethylene layer (30 μm thick)/Acid-denatured polyolefin resin layer (10 μm thick)

② ON film (15 μm thick)/Aluminum foil (9 μm thick)/Polyethylene layer (30 μm thick)/Acid-denatured polyolefin resin layer (10 μm thick)

Figure 7:
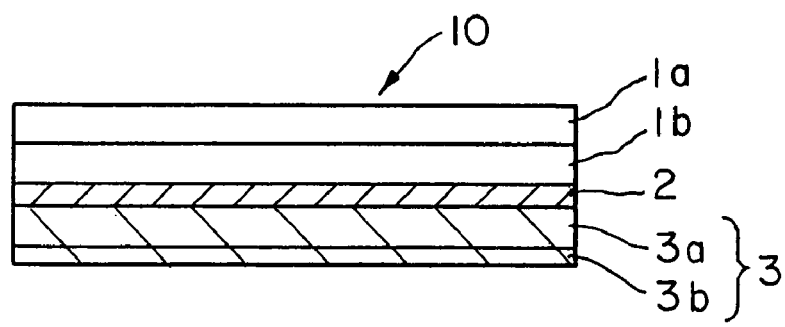

Referring to FIG. 7, a battery case forming sheet 10 is formed by sequentially laminating a first base film layer 1a, a second base film 1b, a metal foil layer 2 and a heat-adhesive resin layer 3 consisting of a polyolefin resin layer 3a and an acid-denatured polyolefin resin layer 3b. The first base film layer 1a is the outermost layer.

The battery case forming sheet 10, as compared with the sheet 10 shown in FIG. 6, is provided additionally with the second base film 1b to improve the ability of the first base film 1a on the outer side of the metal foil layer 2, and a two-layer base film is formed by the first base film layer 1a and the second base film layer 1b.

Each of the first base film layer 1a and the second base film layer 1b is a PET film or an ON film.

Although the first base film layer 1a and the second base film layer 1b may be the same types of films, it is preferable to use different types of films, such as a PET film and an ON film as the first base film layer 1a and the second base film layer 1b, respectively, in view of making the respective properties of the first base film layer 1a and the second base film layer 1b complement each other.

The following are representative examples of the foregoing laminated sheet.

① PET film (12 μm thick)/ON film (15 μm thick)/Aluminum foil (9 μm thick)/Polyethylene layer (30 μm thick)/Acid-denatured polyolefin resin layer (10 μm thick)

② ON film (15 μm thick)/PET film (12 μm thick)/Aluminum foil (9 μm thick)/Polyethylene layer (30 μm thick)/Acid-denatured polyolefin resin layer (10 μm thick)

The base film layers of the battery case forming sheet 10 of this construction on the outer side of the aluminum foil layer have both the advantages of the PET film and the ON film in addition to the effects of the battery case forming sheet 10 shown in FIG. 6. Thus, the outer surface of the battery case forming sheet 10 has enhanced various kinds of mechanical strength and resistance, and has generally excellent properties.

Figure 8:
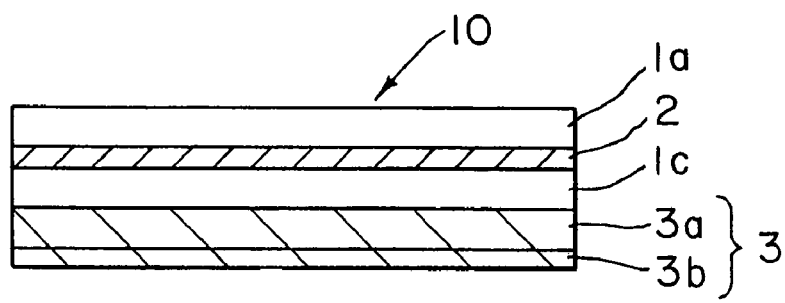

Referring to FIG. 8, a battery case forming sheet 10 is formed by sequentially laminating a first base film layer 1a, a metal foil layer 2, a third base film 1c and a heat-adhesive resin layer 3 consisting of a polyolefin resin layer 3a and an acid-denatured polyolefin resin layer 3b. The first base film layer 1a is the outermost layer.

The battery case forming sheet 10, as compared with the battery case forming sheet 10 shown in FIG. 6, is provided additionally with the third base film 1c sandwiched between the intermediate metal foil layer 2 and the heat-adhesive resin layer 3 (directly, the polyolefin resin layer 3a) to provided the sheet 10 with stabler barrier effect by enhancing the effect of protecting the metal foil layer 2 by sandwiching the metal foil layer 2 between the first base film layer 1a and the third base film layer 1c.

Each of the first base film layer 1a and the third base film layer 1c is a PET film or an ON film.

The following are representative examples of the foregoing laminated sheet.

① PET film (12 μm thick)/Aluminum foil (9 μm thick)/PET film (12 μm thick)/Polyethylene layer (30 μm thick)/Acid-denatured polyolefin resin layer (10 μm thick)

② PET film (12 μm thick)/Aluminum foil (9 μm thick)/ON film (15 μm thick)/Polyethylene layer (30 μm thick)/Acid-denatured polyolefin resin layer (10 μm thick)

③ ON film (15 μm thick)/Aluminum foil (9 μm thick)/PET film (12 μm thick)/Polyethylene layer (30 μm thick)/Acid-denatured polyolefin resin layer (10 μm thick)

④ ON film (15 μm thick)/Aluminum foil (9 μm thick)/ON film (15 μm thick)/Polyethylene layer (30 μm thick)/Acid-denatured polyolefin resin layer (10 μm thick)

The battery case forming sheet 10, as compared with the battery case forming sheet 10 shown in FIG. 6, is provided additionally with the third base film 1c to provide the sheet 10 with improved various kinds of mechanical strength and resistance to detrimental effects. Since the metal foil layer 2 is sandwiched between the first base film layer 1a and the third base film layer 1c, the metal foil layer 2 is protected more effectively from both external and internal shocks, abrasion, physical actions and chemical actions, and the sheet 10 has a stabler barrier effect.

Figure 9:
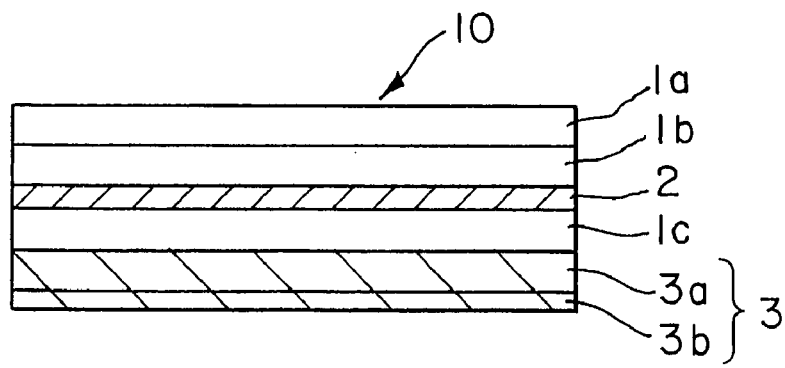

Referring to FIG. 9, a battery case forming sheet 10 is formed by sequentially laminating a first base film layer 1a, a second base film layer 1b, a metal foil layer 2, a third base film 1c and a heat-adhesive resin layer 3 consisting of a polyolefin resin layer 3a and an acid-denatured polyolefin resin layer 3b. The first base film layer 1a is the outermost layer.

The battery case forming sheet 10, as compared with the battery case forming sheet 10 shown in FIG. 7, is provided additionally with the third base film 1c sandwiched between the metal foil layer 2 and the heat-adhesive resin layer 3 (directly, the polyolefin resin layer 3a).

Therefore, as shown in FIG. 9, the first base film layer 1a and the second base film layer 1b are laminated to the outer surface of the metal foil layer 2, and the third base film layer 1c is sandwiched between the metal foil layer 2 and the heat-adhesive resin layer 3.

The battery case forming sheet 10 additionally provided with the third base film layer 1c has, in addition to the functions and effects of the battery case forming sheet 10 shown in FIG. 7, improved various kinds of mechanical strength and resistance to detrimental effects. Since the metal film layer 2 is sandwiched between the laminated layer of the first base film layer 1a and the second base film layer 1b, and the third base film layer 1c, the metal foil layer 2 is further effectively protected for the stabler barrier effect.

When printing a picture of letters and patterns on the surface of each of the battery case forming sheets 10 shown in FIGS. 6 to 9, the picture is printed on the inner surface of the first base film layer 1a to be bonded to the surface of the adjacent layer for second surface decoration, and then the first base film layer is laminated to the adjacent layer. The thus printed picture will not be damaged even if the surface of the sheet 10 is abraded.

As is apparent form the foregoing description, the present invention provides lightweight, thin, flexible, battery case forming sheets excellent in various kinds of mechanical strength, resistance to detrimental effects, impermeability to moisture and gases, heat-sealability and processability, and capable of being efficiently produced.

Third Embodiment

A third embodiment according to the present invention will be described with reference to FIGS. 10 to 12. A battery case forming sheet in the third embodiment is any one of the following laminated sheets (1) to (3). The battery case forming sheet in the third embodiment is substantially the same as the battery case forming sheet in the first embodiment, except that, in the laminated sheets in the third embodiment, each of a first base film layer and a second base film layer is a biaxially oriented polyethylene terephthalate film (hereinafter referred to as "PET film") coated with a silicon dioxide thin film, an aluminum oxide thin film or a polyvinylidene chloride film thin, a biaxially oriented nylon film (hereinafter referred to as "ON film") coated with a silicon dioxide thin film, an aluminum oxide thin film or a polyvinylidene chloride thin film, or a biaxially oriented polypropylene film (hereinafter referred to as "OPP film") coated with a silicon dioxide thin film, an aluminum oxide thin film or a polyvinylidene chloride thin film, and a heat-adhesive resin layer is a single-layer structure of an acid-denatured polyolefin resin layer or a two-layer laminated sheet of a polyolefin resin layer and an acid-denatured polyolefin resin layer.

(1) First base film layer/Heat-adhesive resin layer (2) First base film layer/Second base film layer/Heat-adhesive resin layer (3) First base film layer/Saponified ethylene-vinyl acetate copolymer layer/Second base film layer/Heat-adhesive resin layer In the battery case forming sheet of the laminated sheet (1), the first base film layer is formed by coating a surface of a PET film, an ON film or an OPP film with a thin film of silicon dioxide, aluminum oxide or a polyvinylidene chloride. The PET film, the ON film or the OPP film provides the sheet with various kinds of strength including tensile strength, bending strength and piercing strength, and various kinds of resistance including abrasion resistance, heat resistance, low-temperature resistance and chemical resistance, and the thin film of silicon dioxide, aluminum oxide or a polyvinylidene chloride coating the surface of the PET, ON or OPP film serves as a barrier layer impermeable to moisture and gases.

A PET film, as compared with an ON film, has a relatively low hygroscopic property and is excellent in rigidity, tensile strength, abrasion resistance and heat resistance. An ON film, as compared with a PET film, has a somewhat high hygroscopic property and is excellent in flexibility, piercing strength, bending strength and low-temperature resistance. An OPP film has a particularly low hygroscopic property and excellent moisture-proof property, high tensile strength and high rigidity.

The heat-adhesive resin layer is a single-layer structure of an acid-denatured polyolefin resin layer or a two-layer laminated sheet of a polyolefin resin layer and an acid-denatured polyolefin resin layer. If the heat-adhesive resin layer of a two-layer structure is used, the polyolefin resin layer is on the side of the first base film layer, and the acid-denatured polyolefin resin layer serves as the innermost layer of the battery case forming sheet. In either case, the acid-denatured polyolefin resin layer is the innermost layer. Since the acid-denatured polyolefin resin layer is heat-adhesive not only to itself, but also to metals, such as copper and aluminum, a battery case formed by processing the battery case forming sheet and having the shape of a pouch having one open end through which the tabs 59 and 60 extend outside from the battery case can be sealed by satisfactorily heat-sealing the open end of the battery case.

The hygroscopic property and the moisture adsorbing property of the acid-denatured polyolefin resin forming the innermost layer of the battery case forming sheet are relatively high as compared with those of polyolefin resins, such as polyethylene and polypropylene, and hence the acid-denatured polyolefin resin may possibly absorb moisture contained in the atmosphere. Such a hygroscopic property of the acid-denatured polyolefin resin is detrimental to the electrolyte.

However, since the acid-denatured polyolefin resin layer of the heat-adhesive resin layer can be formed in a small thickness when the acid-denatured polyolefin resin layer is used in combination with the polyolefin resin layer, the amount of moisture, if any, contained in the heat-adhesive resin layer is only a little. Therefore, the effect of moisture can be restricted to the least extent and satisfactory heat-adhesive property can be maintained.

The battery case forming sheet of the laminated sheet (2) has a base film layer of a two-layer structure consisting of the first base film layer and the second base film layer. The base film layer can be, for example, a combination of a PET film and an ON film, which enables the most use of the respective characteristics of the PET film and the ON film in addition to effects of the battery case forming sheet of the laminated sheet (1). The first and the second base film layer provide enhanced mechanical strength and resistance to detrimental effects. The battery case forming sheet has the two thin films coating the first and the second base film layer, i.e., the thin film of silicon dioxide film, the thin film of aluminum oxide and/or the thin film of polyvinylidene chloride, and even if one of the two thin films is broken, the other can serve as a barrier to moisture and gases. Thus, the battery case forming sheet has enhanced impermeability to moisture and gases.

The battery case forming sheet of the laminated sheet (3) is formed by additionally inserting a saponified ethylene-vinyl acetate copolymer between the first and the second base film layer of the battery case forming sheet of the laminated sheet (2). The battery case forming sheet of the laminated sheet (3) has a further enhanced and stabilized impermeability to moisture and gases.

The battery case forming sheet of the laminated sheet (3) having the three barrier layers impermeable to moisture and gases has, in addition to the effects of the battery case forming sheet of the laminated sheet (2), a high, stable permeability to moisture and gases.

As mentioned above, the battery case forming sheet in accordance with the present invention does not use a conductive metal foil, such as an aluminum foil, as a barrier layer, and all the component layers of the sheet are made of electrically nonconductive materials. Therefore, accidental short-circuiting will not occur even if the tabs 59 and 60 extended outside the battery case 51 are bent, which ensures high safety.

The acid-denatured polyolefin resin forming the acid-denatured polyolefin resin layer has an acid content in the range of 0.01 to 10% by weight.

The acid-denatured polyolefin resin layer is easy to form and is heat-adhesive not only to itself, but also to metals, such as copper and aluminum. Accordingly, a battery case formed by processing the battery case forming sheet and having the shape of a pouch having one open end through which the tabs 59 and 60 extend outside from the battery case can be sealed by satisfactorily heat-sealing the open end of the battery case.

Materials of the battery case forming sheet according to the present invention and methods of processing the materials will be described hereinafter.

Each of the first base film layer and the second base film layer is a PET film, an ON film or an OPP film having a surface coated with a silicon dioxide thin film, an aluminum oxide thin film or a polyvinylidene chloride thin film serving as a gas-impermeable barrier layer.

The thin film of silicon dioxide or aluminum oxide may be formed over a surface of a PET film an ON film or an OPP film by a vacuum evaporation method or a sputtering method. When necessary, the surface of the PET film, the ON film or the OPP film may be coated with a known primer coating before forming the thin film of silicon dioxide or the aluminum oxide.

The thickness of the thin film layer of silicon dioxide or aluminum oxide is in the range of 150 to 2000 Å, more preferably, in the range of 300 to 800 Å.

The polyvinylidene chloride thin film can be formed by a known coating method on a PET or On film serving as a base film layer. A suitable thickness of the polyvinylidene chloride thin film is in the range of 1 to 10 µm.

A saponified ethylene-vinyl acetate copolymer film may be used as a gas-impermeable barrier layer. The saponified ethylene-vinyl acetate copolymer film may be formed on the base film layer by a known dry lamination method or an extrusion lamination method.

A suitable thickness of the saponified ethylene-vinyl acetate copolymer film is in the range of 10 to 40 µm.

As mentioned above, it is preferable that the heat-adhesive resin layer forming the innermost layer of the battery case forming sheet is satisfactorily heat-adhesive not only to itself, but also to a metal forming the terminals, has a low hygroscopic property and a low moisture adsorbing property to restrict the leakage of moisture into the electrolyte to the least possible extent, and is stable and resistant to the swelling and corrosive action of the electrolyte.

The heat-adhesive resin layer may be formed of an acid-denatured polyolefin resin. Suitable acid-denatured polyolefin resins are those produced by modifying ethylene-acrylic acid copolymers, ethylene-methacrylic acid copolymers, polyethylene resins, polypropylene resins, and resins produced by graft copolymerization including ethylen-propylene copolymers, ethylene-α-olefin copolymers, propylene-α-olefin copolymers, ethylene-vinyl acetate copolymers, ethylene-acrylate copolymers, ethylene-methacrylate copolymers and terpolymers of those resins by some of unsaturated carboxylic acids and unhydrides of unsaturated carboxylic acides, such as acrylic acid, methacrylic acid, maleic acid, maleic anhydride, citraconic anhydride, itaconic acid and itaconic anhydride.

Ionomers produced by cross-linking the resins having carboxyl groups included in those resins by $Na^+$ ions or $Zn^{2+}$ ions are suitable materials for forming the heat-adhesive resin layer.

Preferable acid content of the acid-denatured polyolefin resins is in the range of 0.01 to 10% by weight. The heat-adhesion of the resin to a metal is insufficient if the acid content is less than 0.01% by weight, and the film forming performance of the resin is inferior if the acid content is higher than 10% by weight.

The heat-adhesive resin layer may be a single-layer structure of one of the foregoing acid-denatured polyolefin resin or may be a two-layer laminated sheet consisting of a polyolefin resin layer and a layer of one of the foregoing acid-denatured polyolefin resins.

The heat-adhesive resin layer of a laminated sheet may consists of a polyolefin resin layer of a polyethylene resin, a polypropylene resin, an ethylene-propylene copolymer, an ethylene-α-olefin copolymer, an ethylene-vinyl acetate copolymer, an ethylene-acrylate copolymer, an ethylene-methacrylate copolymer, an ethylene-propylene copolymer or a terpolymer of some of those resins. These resins may be used individually or in a resin prepared by blending some of those resins.

A suitable thickness of the heat-adhesive resin layer is in the range of 10 to 100 µm, and a suitable thickness of the acid-denatured polyolefin resin layer is in the range of 1 to 50 µm, more preferably, in the range of 5 to 25 µm.

The battery case forming sheet in accordance with the present invention consists of those layers, i.e., a desired combination of some of the first base film layer, the second base film layer, the saponified ethylene-vinyl acetate copolymer layer, and the heat-adhesive resin layer having the acid-denatured polyolefin resin layer or both the polyolefin resin layer and the acid-denatured polyolefin resin layer.

These layers may be laminated by a known dry lamination method, a known extrusion lamination method or an extrusion coating method.

When forming the laminated sheet (1), the first base film layer is coated with an anchor coat (a primer coat), and then a layer of an acid-denatured polyolefin resin or layers of a polyolefin resin and an acid-denatured polyolefin resin may be formed by an extrusion method or a multilayer extrusion method on the first base film layer. The heat-adhesive resin layer can be formed by putting together resin films of predetermined thicknesses formed by a tubular film extrusion method by a dry lamination method using, for example, a two-component polyurethane adhesive or by extruding a polyethylene resin or other heat-adhesive resin between resin layers and compressing the resin layers.

The first and the second base film layer of the laminated sheet (2) can be laminated by either a dry lamination method or an extrusion lamination method. The heat-adhesive resin layer can be formed by the method employed in forming the heat-adhesive resin layer of the laminated sheet (1).

The saponified ethylene-vinyl acetate copolymer layer can be formed by forming a saponified ethylene-vinyl acetate copolymer film in a predetermined thickness, and the first base film layer, the saponified ethylene-vinyl acetate copolymer layer and the second base film layer can be laminated by either a dry lamination method or an extrusion lamination method. The heat-adhesive resin layer can be formed by the method employed in forming the heat-adhesive resin layer of the laminated sheet (1).

Examples of the third embodiment will concretely be described hereinafter with reference to the drawings.

Examples shown in the drawings are illustrative and not limitative. Like or corresponding parts are designated by the same reference characters throughout the drawings.

FIGS. 10 to 12 are typical sectional views of examples of battery case forming sheets in accordance with the present invention.

A battery case forming sheet 10 shown in FIG. 10(*a*) is formed by laminating a first base film layer 1*a*, i.e., an outer layer, and an acid-denatured polyolefin resin layer, i.e., a heat-adhesive resin layer 3.

The first base film layer 1*a* is a PET film or an ON film having a surface coated with a silicon dioxide thin film, an aluminum oxide thin film or a polyvinylidene chloride thin film. Preferably, the heat-adhesive resin layer 3 is joined to the coated surface of the first base film layer 1*a* to prevent damaging the silicon dioxide thin film, the aluminum oxide thin film or the polyvinylindene chloride thin film coating the first base film layer 1*a* by abrasion or the like.

Preferably, the acid-denatured polyolefin resin layer 3 is formed of an acid-denatured polyolefin resin having an acid content in the range of 0.01 to 10% by weight.

In this battery case forming sheet 10, the PET film, an ON film or an OPP film serving as the outermost first base film layer 1a provides the sheet 10 with mechanical strength including tensile strength, piecing strength and bending strength, and resistance including abrasion resistance, water resistance, chemical resistance, heat resistance and low-temperature resistance. The silicon dioxide thin film, the aluminum oxide thin film or the polyvinylindene chloride thin film coating the first base film layer 1a provides the sheet 10 with excellent impermeability to moisture and gases. The heat-adhesive resin layer 3 provides the sheet 10 with an excellent heat-sealability.

The acid-denatured polyolefin resin, as compared with an polyolefin resin, is relatively high in hygroscopic property and moisture adsorbing property. However, the amount of moisture contained in the acid-denatured polyolefin resin layer is small and any practical problem will not arise when the battery cases formed by processing the sheet 10 are not stored in a high-temperature high-humidity place for a long time.

A battery case forming sheet 10 shown in FIG. 10(b) is formed by laminating a first base film layer 1a, i.e., an outer layer, and a heat-adhesive resin layer 3 consisting of a polyolefin resin layer 3a and an acid-denatured polyolefin resin layer 3b instead of the heat-adhesive resin layer 3 of the battery case forming sheet 10 shown in FIG. 10(a).

Although an anchor coat layer or a bonding layer of an adhesive for dry lamination is formed between the first base film layer 1a and the heat-adhesive resin layer 3 in each of the sheets 10 shown in FIGS. 10(a) and 10(b), such an anchor coat layer or a bonding layer is a subsidiary element and hence is omitted in FIGS. 10, 11 and 12.

The acid-denatured polyolefin resin layer 3b of the heat-adhesive resin layer 3 of the battery case forming sheet 10 shown in FIG. 10(b) may be formed in a thickness smaller than that of the acid-denatured polyolefin resin layer serving as the heat-adhesive resin layer 3 of the sheet 10 shown in FIG. 10(a). Therefore, the amount of moisture contained in the acid-denatured polyolefin resin layer 3b is small even if the acid-denatured polyolefin resin layer 3b absorbs moisture, and hence the heat-adhesive layer 3 of the sheet 10 shown in FIG. 10(b) has a low hygroscopic property.

The following are representative examples of the laminated sheets shown in FIGS. 10(a) and 10(b).

① PET film (16 μm thick)/Silicon dioxide thin film layer (500 Å thick)/Acid-denatured polyolefin resin layer (40 μm thick)

② PET film (16 μm thick)/Silicon dioxide thin film layer (500 Å thick)/Polyethylene layer (30 μm thick)/Acid-denatured polyolefin resin layer (10 μm thick)

③ ON film (16 μm thick)/Polyvinylidene chloride film layer (3 μm thick)/Polyethylene layer (30 μm thick)/Acid-denatured polyolefin resin layer (10 μm thick)

A battery case forming sheet 10 shown in FIG. 11(a) is formed by adding a second base film 1b to the battery case forming sheet 10 shown in FIG. 10(a). The sheet 10 shown in FIG. 11(a) is formed by sequentially laminating a first base film layer 1a, the second base film layer 1b, and a heat-adhesive resin layer 3 of an acid-denatured polyolefin resin. The first base film layer 1a is the outermost layer.

Although the first base film layer 1a and the second base film layer 1b may be the same types of films, it is preferable to use different types of films, such as a PET film and an ON film as the first base film layer 1a and the second base film layer 1b, respectively, in view of making the respective properties of the first base film layer 1a and the second base film layer 1b complement each other. The battery case forming sheet 10 shown in FIG. 11(a) has enhanced various kinds of mechanical strength and resistance in addition to the effects of the battery case forming sheet 10 shown in FIG. 10(a), and has an improved impermeability to moisture and gases because the sheet 10 is provided with two barrier layers of silicon dioxide, aluminum oxide and/or polyvinylidene chloride.

A battery case forming sheet 10 shown in FIG. 11(b) is similar in construction as the battery case forming sheet 10 shown in FIG. 11(a) and is provided with a heat-adhesive resin layer 3 consisting of a polyolefin resin layer 3a and an acid-denatured polyolefin resin layer 3b instead of the heat-adhesive resin layer 3 of an acid-denatured polyolefin resin of the battery case forming sheet 10 shown in FIG. 11(a).

The acid-denatured polyolefin resin layer 3b of the heat-adhesive resin layer 3 of the battery case forming sheet 10 shown in FIG. 11(b) may be formed in a small thickness. Therefore, the heat-adhesive layer 3 of the sheet 10 shown in FIG. 11(b) has a satisfactory heat-adhesive property and a low hygroscopic property.

The following are representative examples of the laminated sheets shown in FIGS. 11(a) and 11(b).

① ON film (15 μm thick) with silicon dioxide thin film layer (500 Å thick)/PET film (12 μm thick) with silicon dioxide thin film layer (500 Å thick)/Acid-denatured polyolefin resin layer (40 μm thick)

② PET film (12 μm thick) with silicon dioxide thin film layer (500 Å thick)/ON film (12 μm thick) with silicon dioxide thin film layer (500 Å thick)/Polyethylene layer (30 μm thick)/Acid-denatured polyolefin resin layer (10 μm thick)

A battery case forming sheet 10 shown in FIG. 12(a) is formed by additionally inserting a saponified ethylene-vinyl acetate copolymer layer 9, i.e., a barrier layer, between the first base film layer 1a and the second base film layer 1b of the battery case forming sheet 10 shown in FIG. 11(a); that is, the battery case forming sheet 10 shown in FIG. 12(a) is formed by sequentially laminating a first base film layer 1a, a saponified ethylene-vinyl acetate copolymer layer 9, a second base film layer 1b, and a heat-adhesive resin layer 3 of an acid-denatured polyolefin resin.

The battery case forming sheet 10 thus provided with the three barrier layers has an impermeability to moisture and gases higher than that of the battery case forming sheet 10 shown in FIG. 11(a).

A battery case forming sheet 10 shown in FIG. 12(b) is similar in construction as the battery case forming sheet 10 shown in FIG. 12(a) and is provided with a heat-adhesive resin layer 3 consisting of a polyolefin resin layer 3a and an acid-denatured polyolefin resin layer 3b instead of the heat-adhesive resin layer 3 of an acid-denatured polyolefin resin of the battery case forming sheet 10 shown in FIG. 12(a).

The battery case forming sheet 10 shown in FIG. 12(b) is formed by sequentially laminating a first base film layer 1a, a saponified ethylene-vinyl acetate copolymer layer 9, a second base film 1b, a polyolefin resin layer 3a and an acid-denatured polyolefin resin layer 3b. The first base film layer 1a is the outermost layer.

The acid-denatured polyolefin resin layer 3b of the heat-adhesive resin layer 3 of the battery case forming sheet 10 shown in FIG. 12(b) may be formed in a small thickness. Therefore, the heat-adhesive layer 3 of the sheet 10 shown in FIG. 12(b) has a satisfactory heat-adhesive property and a low hygroscopic property, and the battery case forming sheet 10 has the most excellent composite ability.

The followings are representative examples of the laminated sheets shown in FIGS. 12(a) and 12(b).

① PET film (12 μm thick) with silicon dioxide thin film layer (500 Å thick)/Saponified ethylene-vinyl acetate copolymer layer (25 μm thick)/PET film (12 μm thick) with silicon dioxide thin film layer (500 Å thick)/Acid-denatured polyolefin resin layer (40 μm thick)

② PET film (12 μm thick) with silicon dioxide thin film layer (500 Å thick)/Saponified ethylene-vinyl acetate copolymer layer (25 μm thick)/PET film (12 μm thick) with silicon dioxide thin film layer (500 Å thick)/Polyethylene layer (30 μm thick)/Acid-denatured-polyolefin resin layer (10 μm thick)

③ PET film (12 μm thick) with silicon dioxide thin film layer (500 Å thick)/Saponified ethylene-vinyl acetate copolymer layer (25 μm thick)/ON film (15 μm thick) with silicon dioxide thin film layer (500 Å thick)/Polyethylene layer (30 μm thick)/Acid-denatured polyolefin resin layer (10 μm thick)

When printing a picture of letters and patterns on the surface of each of the battery case forming sheets 10 shown in FIGS. 10 to 12, the picture is printed on the inner surface of the first base film layer to be bonded to the surface of the adjacent layer for second-surface decoration, and then the first base film layer is laminated to the adjacent layer. The thus printed picture will not be damaged even if the surface of the sheet 10 is abraded.

As is apparent from the foregoing description, the present invention provides lightweight, thin, flexible, battery case forming sheets excellent in various kinds of mechanical strength, resistance to detrimental effects, impermeability to moisture and gases, heat-sealability and processability; suitable for forming a battery case capable of satisfactorily sealing the component parts of a battery therein and of protecting the components of the battery from the adverse effect of moisture, and excellent in securing safety in preventing short-circuiting even if terminals of a conductive metal extending outside from the battery case are bent; and capable of being efficiently produced.

Fourth Embodiment

A fourth embodiment according to the present invention will be described with reference to FIGS. 13 to 16. A battery case forming sheet in the fourth embodiment is any one of the following laminated sheets (1) to (4), each of a first base film layer, a second base film layer and a third base film layer of the battery case forming sheet is a biaxially oriented polyethylene terephthalate film, a biaxially oriented nylon film or a biaxially oriented polypropylene film, and a heat-adhesive resin layer of the battery case forming sheet is a single-layer structure of an acid-denatured polyolefin resin layer or a two-layer laminated sheet of a polyolefin resin layer and an acid-denatured polyolefin resin layer. The battery case forming sheet is provided with a metal foil layer smaller than the other layers, and having at least one end edge lying on the inner side of the corresponding end edges of the other layers and not exposed at the edge of the battery case forming sheet. The battery case forming sheet in the fourth embodiment is the same in other respects as that in the first embodiment.

(1) First base film layer/Metal foil layer/Heat-adhesive resin layer (2) First base film layer/Second base film layer/Metal foil layer/Heat adhesive resin layer (3) First base film layer/Metal foil layer/Second base film layer/Heat-adhesive resin layer (4) First base film layer/Second base film layer/Metal foil layer/Third base film layer/Heat-adhesive resin layer The metal foil layer, i.e., an intermediate layer, of the battery case forming sheet is smaller than the other layers, and at least one end edge thereof lies on the inner side of the end edges of the other layers and is not exposed at the edge of the battery case forming sheet. The battery case 51 having the open end part through which the tabs 59 and 60 are extended outside the battery case 51 is formed by heat-sealing two battery case forming sheets in the fourth embodiment so that an end part in which the end edge of the metal foil layer is on the inner side of the edges of the other layers of each battery case forming sheet forms the open end part of the battery case 51. The size of the metal foil layer is determined so that the end edge of the metal foil layer barely reaches a heat-sealed part formed by heat-sealing the open end of the battery case 51. When the battery case 51 is thus formed, the tabs 59 and 60 are not short-circuited by the battery case 51 even if the tabs 59 and 60 are bent, which improves the safety of the battery case 51. The metal foil layer serves as an excellent barrier layer impermeable to moisture and gases.

Since the metal foil layer is sandwiched between some of the first, the second and the third base film layer and the heat-adhesive resin layer, the metal foil layer is protected satisfactorily, fissures and pinholes will not be formed in the metal foil layer, and hence the excellent impermeable property of the metal foil layer can be maintained.

Each of the first, the second and the third base film layer on the opposite sides of the metal foil layer is a biaxially oriented polyethylene terephthalate film (hereinafter referred to as "PET film"), a biaxially oriented nylon film (hereinafter referred to as "ON film") or a biaxially oriented polypropylene film (hereinafter referred to as "OPP film"). The first, the second and the third base film layer protect the metal foil layer and provides the battery case forming sheet with strength, functions and various kinds of resistance to detrimental effects.

The heat-adhesive resin layer, i.e., the innermost layer, is a single-layer structure of an acid-denatured polyolefin resin layer or a two-layer laminated sheet of a polyolefin resin layer and an acid-denatured polyolefin resin layer. The innermost layer of the battery case forming sheet provided with the heat-adhesive resin layer of either the single-layer structure or the two-layer laminated sheet is the acid-denatured polyolefin resin layer. The acid-denatured polyolefin resin layer is satisfactorily heat-adhesive not only to itself, but also to metals, such as copper and aluminum. Accordingly, a battery case formed by processing the battery case forming sheet and having the shape of a pouch having one open end through which the tabs 59 and 60 extend outside from the battery case can be sealed by satisfactorily heat-sealing the open end of the battery case.

Although the acid-denatured polyolefin resin forming the innermost layer of the battery case forming sheet is superior to polyolefin resins, such as polyethylene resins and polypropylene resins, in heat-adhesion to metals, the acid-denatured polyolefin resin has relatively high hygroscopic property and moisture adsorbing property and, in some cases, may possibly absorb some moisture contained in the atmosphere.

Although the degree of moisture absorption of the acid-denatured polyolefin resin layer rarely cause practical problems, the present invention employs a heat-adhesive resin layer consisting of a polyolefin resin layer and an acid-denatured polyolefin resin layer and forms the acid-denatured polyolefin resin layer in a small thickness for the enhancement of the quality of the battery case forming sheet.

When such a heat-adhesive resin layer is employed, the amount of moisture, if any, contained in the heat-adhesive resin layer is only a little. Therefore, the effect of moisture can be restricted to the least extent and satisfactory heat-adhesive property can be maintained.

The acid content of the acid-denatured polyolefin resin layer of the heat-adhesive resin layer in the range of 0.01 to 10% by weight.

The acid-denatured polyolefin resin layer of such a property exhibits satisfactory film forming performance, and is highly adhesive not only to itself, but also to metals, such as copper and aluminum. Accordingly, a battery case formed by processing the battery case forming sheet and having the shape of a pouch having one open end through which the tabs 59 and 60 extend outside from the battery case can be sealed by satisfactorily heat-sealing the open end of the battery case.

Materials of the battery case forming sheet according to the present invention and methods of processing the materials will be described hereinafter.

As mentioned above, the battery case forming sheet in accordance with the present invention employs, as an intermediate layer, a metal foil layer highly impermeable to moisture and gases, and is formed by properly laminating one or some of the first, the second and the third base film layer excellent in various kinds of strength and resistance to the outer surface or the opposite surfaces of the metal foil layer and forming, as the innermost layer, the heat-adhesive resin layer of a single-layer structure of an acid-denatured polyolefin resin layer or a two-layer laminated sheet of a polyolefin resin layer and an acid-denatured polyolefin resin layer so that at least one end edge of the metal foil layer lies on the inner side of the corresponding end edges of the other layers and is not exposed at the edge of the battery case forming sheet.

An aluminum foil and a copper foil are suitable materials for forming the gas-impermeable metal foil layer, i.e., the intermediate layer. An aluminum foil is the most preferable material for forming the metal foil layer because an aluminum foil is inexpensive, easy to process and easy to bond to a film. A suitable thickness of the metal foil layer is in the range off 5 to 25 μm.

The first, the second and the third base film layers may be, for example, a PET film, an ON film, an OPP film, a polyethylene naphthalate film, a polyimide film or a polycarbonate film. PET films and ON films and OPP films are particularly suitable in view of durability, ability, processability and economy.

Although there is no significant difference in properties between PET films and ON films, PET films have a low hygroscopic property and are excellent in rigidity, abrasion resistance and heat resistance, and ON films have a relatively high hygroscopic property and are excellent in flexibility, piercing strength, bending strength and low-temperature resistance.

The thicknesses of those base films are in the range of 5 to 100 μm, more preferably, in the range of 12 to 30 μm.

As mentioned above, it is preferable that the heat-adhesive resin layer, i.e., the innermost layer, is satisfactorily heat-adhesive not only to itself, but also to the metal forming the tabs 59 and 60, and have a low hygroscopic property and a low moisture adsorptivity to restrict the leakage of moisture into the electrolyte to the least possible extent. It is also preferable that the heat-adhesive resin layer is stable and unsusceptible to the swelling and corrosive actions of the electrolyte.

To meet such requirements, the heat-adhesive resin layer is formed in a single-layer structure of an acid-denatured polyolefin resin layer or a two-layer laminated sheet of a polyolefin resin layer and an acid-denatured polyolefin resin layer.

Preferably, the acid content of an acid-denatured polyolefin resin forming the acid-denatured polyolefin resin layer is in the range of 0.01 to 10% by weight.

Materials suitable for forming the polyolefin resin layer of the heat-adhesive resin layer are, for example, polyethylene resins, polypropylene resins, ethylene-propylene copolymers ethylene-α-olefin copolymers, terpolymers of the foregoing polymers. These materials may be used individually or in a resin prepared by blending some of those resins.

Resins suitable for forming the acid-denatured resin layer of the heat-adhesive resin layer are, for example, ethylene-acrylic acid copolymers, ethylene-methacrylic acid copolymers, and resins produced by modifying polyethylene resins, polypropylene resins, and resins produced by graft copolymerization including ethylen-propylene copolymers, ethylene-α-olefin copolymers, propylne-α-olefin copolymers, ethylene-vinyl acetate copolymers, ethylene-acrylate copolymers, ethylene-methacrylate copolymers and terpolymers of those resins by some of unsaturated carboxylic acids and unhydrides of unsaturated carboxylic acides, such as acrylic acid, methacrylic acid, maleic acid, maleic anhydride, citraconic anhydride, itaconic acid and itaconic anhydride.

Ionomers produced by cross-linking the resins having carboxyl groups included in those resins by $Na^+$ ions or $Zn^{2+}$ ions are suitable materials for forming the heat-adhesive resin layer.

Acid-denatured polyolefin resins having an acid content in the range of 0.01 to 10% by weight are satisfactory in film forming performance and a satisfactorily heat-adhesive not only to itself, but also to metals.

The heat-adhesion of the resin to a metal is insufficient if the acid content is less than 0.01% by weight, and the film forming performance of the resin is inferior if the acid content is higher than 10% by weight.

Although the acid-denatured polyolefin resins are highly heat-adhesive to metals, the acid-denatured polyolefin resins have relatively high hygroscopic property and moisture adsorbing property.

Therefore, the present invention may use, instead of a heat-adhesive resin layer of a single-layer structure of an acid-denatured polyolefin resin layer, a heat-adhesive resin layer of a two-layer laminated sheet consisting of a polyolefin resin layer and an acid-denatured polyolefin resin layer serving as the innermost layer. The acid-denatured polyolefin resin layer is formed in the least possible thickness to reduce the effect of moisture to the least possible extent.

A suitable thickness of the heat-adhesive resin layer is in the range of 10 to 100 μm. When the heat-adhesive resin layer is of a two-layer laminated sheet, it is preferable that the thickness of the acid-denatured polyolefin resin layer is in the range of 1 to 50 μm, more preferably, in the range of 5 to 25 μm.

The battery case forming sheet in accordance with the present invention is formed by properly laminating some of the first to the third base film layer, the metal foil layer and the heat-adhesive resin layer so that at least one end edge of the metal foil layer, i.e., the intermediate layer, lies on the inner side of the end edges of the other layers.

When forming the laminated sheet, the first to the third base film layer and the metal foil layer may be laminated by a known dry lamination method using, for example, a two-component polyurethane adhesive or by an extrusion lamination method which extrudes a molten heat-adhesive resin, such as a polyethylene resin, between two films and compresses the layers of the films and a layer of the heat-adhesive resin sandwiched between the films.

A surface of the base film sheet may be coated with an anchor coating material (AC material, i.e., a primer coating) and then an acid-denatured polyolefin resin layer of a desired thickness, or a polyolefin resin layer of a desired thickness and an acid-denatured polyolefin resin layer of a desired thickness may be laminated to the surface coated with the anchor coating material of the base film layer by an extrusion method or a multilayer extrusion method. The heat-adhesive resin layer can be formed by putting together resin films of a predetermined thicknesses formed by a tubular film extrusion method by a dry lamination method.

A battery case forming sheet having a metal foil layer not exposed in the edges thereof can easily be manufactured by laminating a base film serving as one of the first to the third base film layer, and a metal foil so that the opposite end edges of the metal foil are 10 to 15 mm on the inner side of the corresponding end edges of the base film, and trimming the opposite end edge parts of the base film along lines 1 to 2 mm on the outer side of the opposite end edges of the metal foil.

Examples of the fourth embodiment will concretely be described hereinafter with reference to the drawings.

Examples shown in the drawings are illustrative and not limitative. Like or corresponding parts are designated by the same reference characters throughout the drawings.

FIGS. 13 to 16 are typical sectional views of examples of battery case forming sheets in accordance with the present invention.

Referring to FIG. 13, a battery case forming sheet 10 is formed by sequentially laminating a first base film layer 1a, a metal foil layer 2 and a heat-adhesive resin layer 3 consisting of a polyolefin resin layer 3a and an acid-denatured polyolefin resin layer 3b. The first base film layer 1a is the outermost layer. The right end edge, as viewed in FIG. 13, of the metal foil layer 2 lies on the inner side of end edges of the other layers and is not exposed on an end edge of the battery case forming sheet 10.

When the battery case forming sheet 10 is used so that an end edge part thereof in which the end edge of the metal foil layer lies on the inner side of the edges of the other layers corresponds to an open end part of the battery case 51, the tabs 59 and 60 will not be short-circuited by the metal foil layer 2 even if the tabs 59 and 60 extending outside from the battery case 51 are bent, which improves the safety of the battery case 51.

Preferably, the first base film layer 1a is a PET film, an ON film or an OPP film. Preferably, the metal foil layer 2 is, for example, an aluminum foil. It is particularly preferable that the acid-denatured polyolefin resin layer 3b (the innermost layer of the sheet) of the heat-adhesive resin layer 3 is a layer of an acid-denatured polyolefin resin having an acid content in the range of 0.01 to 10% by weight.

The first base film layer 1a forming the outermost layer of the battery case forming sheet 10 provides the battery case forming sheet 10 with various kinds of mechanical strength including tensile strength, piercing strength and bending strength, and various kinds of resistance including abrasion resistance, water resistance, chemical resistance, heat resistance and low-temperature resistance. The metal foil layer 2 serving as an intermediate layer (such as an aluminum foil layer) serves as a barrier layer impermeable to moisture and gases. As mentioned above, the polyolefin resin layer 3a and the acid-denatured polyolefin resin layer 3b of the heat-adhesive resin layer 3 provide the battery case forming sheet 10 with excellent heat-sealable property and have a low moisture content.

If the metal foil layer is a 9 µm thick aluminum foil, the metal foil layer has a water vapor permeability of 0.01 g/m²·24 hr or below at 40° C. and 90% RH. The water vapor impermeability can easily be enhanced.

The following are representative examples of the foregoing laminated sheet.

① PET film (12 µm thick)/Aluminum foil (9 µm thick)/Polyethylene layer (30 µm thick)/Acid-denatured polyolefin resin layer (10 µm thick)

② ON film (15 µm thick)/Aluminum foil (9 µm thick)/Polyethylene layer (30 µm thick)/Acid-denatured polyolefin resin layer (10 µm thick)

③ OPP film (25 µm thick)/Aluminum foil (9 µm thick)/Polyethylene layer (30 µm thick)/Acid-denatured polyolefin resin layer (10 µm thick)

Referring to FIG. 14, a battery case forming sheet 10 is formed by sequentially laminating a first base film layer 1a, a second base film 1b, a metal foil layer 2 and a heat-adhesive resin layer 3 consisting of a polyolefin resin layer 3a and an acid-denatured polyolefin resin layer 3b. The first base film layer 1a is the outermost layer. The right end edge, as viewed in FIG. 14, of the metal foil layer 2 lies on the inner side of end edges of the other layers and is not exposed on an end edge of the battery case forming sheet 10.

The battery case forming sheet 10, as compared with the sheet 10 shown in FIG. 13, is provided additionally with the second base film 1b to improve the ability of the first base film 1a on the outer side of the metal foil layer 2, and a two-layer base film is formed by the first base film layer 1a and the second base film layer 1b.

Each of the first base film layer 1a and the second base film layer 1b is a PET film, an ON film or an OPP film. Although the first base film layer 1a and the second base film layer 1b may be the same types of films, it is preferable to use different types of films, such as a PET film and an ON film as the first base film layer 1a and the second base film layer 1b, respectively, in view of making the respective properties of the first base film layer 1a and the second base film layer 1b complement each other.

The following are representative examples of the foregoing laminated sheet.

① PET film (12 µm thick)/ON film (15 µm thick)/Aluminum foil (9 µm thick)/Polyethylene layer (30 µm thick)/Acid-denatured polyolefin resin layer (10 µm thick)

② ON film (15 µm thick)/PET film (12 µm thick)/Aluminum foil (9 µm thick)/Polyethylene layer (30 µm thick)/Acid-denatured polyolefin resin layer (10 µm thick)

③ PET film (12 µm thick)/OPP film (25 µm thick)/Aluminum foil (9 µm thick)/Polyethylene layer (30 µm thick)/Acid-denatured polyolefin resin layer (10 µm thick)

④ ON film (15 µm thick)/OPP film (25 µm thick)/Aluminum foil (9 µm thick)/Polyethylene layer (30 µm thick)/Acid-denatured polyolefin resin layer (10 µm thick)

The base film layers of the battery case forming sheet 10 of this construction on the outer side of the aluminum foil layer have both the advantages of the PET film and the sheet 10 has enhanced various kinds of mechanical strength and resistance, and has generally excellent properties.

Figure 15:
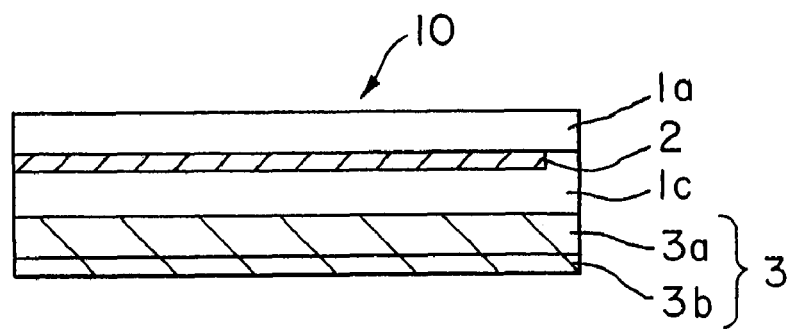

Referring to FIG. 15, a battery case forming sheet 10 is formed by sequentially laminating a first base film layer 1a, a metal foil layer 2, a third base film 1c and a heat-adhesive resin layer 3 consisting of a polyolefin resin layer 3a and an acid-denatured polyolefin resin layer 3b. The first base film layer 1a is the outermost layer.

The -battery case forming sheet 10, as compared with the battery case forming sheet 10 shown in FIG. 13, is provided additionally with the third base film 1c sandwiched between the intermediate metal foil layer 2 and the heat-adhesive resin layer 3 (directly, the polyolefin resin layer 3a) to provided the sheet 10 with stabler barrier effect by enhancing the effect of protecting the metal foil layer 2 by sandwiching the metal foil layer 2 between the first base film layer 1a and the third base film layer 1c.

The right end edge, as viewed in FIG. 15, of the metal foil layer 2 lies on the inner side of end edges of the other layers and is not exposed on an end edge of the battery case forming sheet 10.

Each of the first base film layer 1a and the third base film layer 1c is a PET film, an ON film or a OPP film.

The following are representative examples of the foregoing laminated sheet.

① PET film (12 μm thick)/Aluminum foil (9 μm thick)/PET film (12 μm thick)/Polyethylene layer (30 μm thick)/Acid-denatured polyolefin resin layer (10 μm thick)

② PET film (12 μm thick)/Aluminum foil (9 μm thick)/ON film (15 μm thick)/Polyethylene layer (30 μm thick)/Acid-denatured polyolefin resin layer (10 μm thick)

③ PET film (12 μm thick)/Aluminum foil (9 μm thick)/OPP film (25 μm thick)/Polyethylene layer (30 μm thick)/Acid-denatured polyolefin resin layer (10 μm thick)

④ ON film (15 μm thick)/Aluminum foil (9 μm thick)/PET film (12 μm thick)/Polyethylene layer (30 μm thick)/Acid-denatured polyolefin resin layer (10 μm thick)

⑤ ON film (15 μm thick)/Aluminum foil (9 μm thick)/OPP film (25 μm thick)/Polyethylene layer (30 μm thick)/Acid-denatured polyolefin resin layer (10 μm thick)

The battery case forming sheet 10 is provided additionally with the third base film 1c to provide the sheet with improved various kinds of mechanical strength and resistance to detrimental effects. Since the metal foil layer 2 is sandwiched between the first base film layer 1a and the third base film layer 1c, the metal foil layer 2 is protected more effectively from both external and internal shocks, abrasion, physical actions and chemical actions, and the sheet 10 has a stabler barrier effect.

Figure 16:
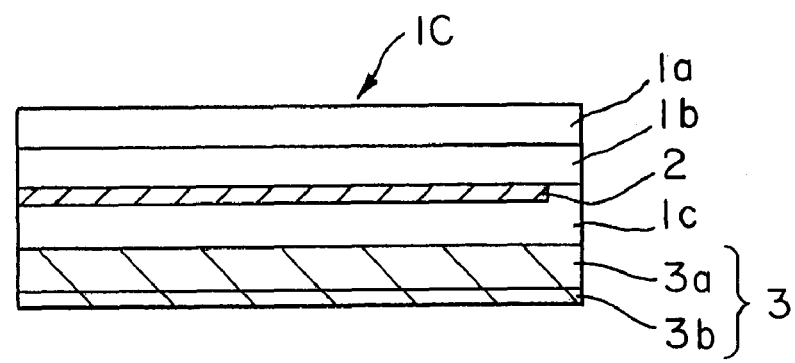

Referring to FIG. 16, a battery case forming sheet 10 is formed by sequentially laminating a first base film layer 1a, a second base film layer 1b, a metal foil layer 2, a third base film 1c and a heat-adhesive resin layer 3 consisting of a polyolefin resin layer 3a and an acid-denatured polyolefin resin layer 3b. The first base film layer 1a is the outermost layer.

The battery case forming sheet 10, as compared with the battery case forming sheet 10 shown in FIG. 14, is provided additionally with the third base film 1c sandwiched between the metal foil layer 2 and the heat-adhesive resin layer 3 (directly, the polyolefin resin layer 3a).

The right end edge, as viewed in FIG. 16, of the metal foil layer 2 lies on the inner side of end edges of the other layers and is not exposed on an end edge of the battery case forming sheet 10. Each of the first base film layer 1a, the second base film layer 1b and the third base film layer 1c is a PET film, an ON film or an OPP film.

The battery case forming sheet 10 additionally provided with the third base film layer 1c has improved various kinds of mechanical strength and resistance to detrimental effects. Since the metal film layer 2 is sandwiched between the laminated layer of the first base film layer 1a and the second base film layer 1b, and the third base film layer 1c, the metal foil layer 2 is further effectively protected for the stabler barrier effect.

When printing a picture of letters and patterns on the surface of each of the battery case forming sheets 10 shown in FIGS. 13 to 16, the picture is printed on the inner surface of the first base film layer 1a to be bonded to the surface of the adjacent layer for second-surface decoration, and then the first base film layer is laminated to the adjacent layer. The thus printed picture will not be damaged even if the surface of the sheet 10 is abraded.

As is apparent form the foregoing description, the present invention provides lightweight, thin, flexible, battery case forming sheets excellent in various kinds of mechanical strength, resistance to detrimental effects, impermeability to moisture and gases, heat-sealability and processability, and capable of protecting the component parts of a battery contained in a battery case formed by processing the battery case forming sheet from the effect of moisture, of preventing short-circuiting the terminals of the battery by the metal foil layer thereof, of securing safety and of being efficiently produced.

Fifth Embodiment

A fifth embodiment according to the present invention will be described with reference to FIGS. 17 to 20. A battery case forming sheet in the fifth embodiment is any one of the following laminated sheets (1) to (4), each of a first base film layer and a third base film layer of the battery case forming sheet is a biaxially oriented polyethylene terephthalate film, a biaxially oriented nylon film or a biaxially oriented polypropylene film, and an acid-denatured polyolefin resin layer serving as the innermost layer of the sheet contains one or some of an antiblocking agent, a lubricant and a slipping agent. The battery case forming sheet in the fifth embodiment is substantially the same in other respects as that in the second embodiment.

(1) First base film layer/Metal foil layer/Acid-denatured polyolefin resin layer (innermost layer)

(2) First base film layer/Metal foil layer/Polyolefin resin layer/Acid-denatured polyolefin resin layer (innermost layer)

(3) First base film layer/Metal foil layer/Third base film layer/Acid-denatured polyolefin resin layer (innermost layer)

(4) First base film layer/Metal foil layer/Third base film layer/Polyolefin resin layer/Acid-denatured polyolefin resin layer (innermost layer)

When necessary, an adhesive layer, not shown, is formed between the adjacent layers of the laminated sheets (1) to (4).

The heat-adhesive resin layer for heat-sealing (sealant layer) in each of the laminated sheets (1) and (3) is a single-layer structure of an acid-denatured polyolefin resin layer, and the heat-adhesive resin layer of each of the laminated sheets (2) and (4) is a two-layer laminated sheet consisting of a polyolefin resin layer and an acid-denatured polyolefin resin layer serving as the innermost layer.

In the following description, biaxially oriented polyethylene terephthalate films, biaxially oriented nylon films and biaxially oriented polypropylene films are designated as PET films, ON films and OPP films, respectively.

The metal foil layer i.e., an intermediate layer, serves as an excellent barrier layer impermeable to moisture and gases. The metal foil layer is protected by one or both of the first and the third base film layer, i.e., one or some of PET films ON films and OPP films, fissures and pinholes will not be formed in the metal foil layer, and hence the laminated sheet is provided with various kinds of strength and resistance to detrimental effects.

The innermost sealant layer is a single-layer structure of an acid-denatured polyolefin resin layer or a two-layer laminated sheet of a polyolefin resin layer and an acid-denatured polyolefin resin layer.

In either case, the innermost layer is the acid-denatured polyolefin resin layer. The acid-denatured polyolefin resin layer is heat-adhesive not only to itself, but also to metals, such as copper and aluminum. Since the acid-denatured polyolefin resin layer contains one or some of an antiblocking agent, a lubricant and the slipping agent, the battery case forming sheet is satisfactory in slipping and antiblocking properties Accordingly, the battery case forming sheet can easily resin layer contains one or some of an antiblocking agent, a lubricant and the slipping agent, the battery case forming sheet is satisfactory in slipping and antiblocking properties.

Accordingly, the battery case forming sheet can easily be processed and can satisfactorily be heat-sealed when processing the same to form a battery case, one end of the battery case can easily be opened when assembling the component parts of a battery in the battery case, and the open end part of the battery case through which the tabs 59 and 60 extend can satisfactorily be heat-sealed.

The sealant layer of a two-layer laminated sheet consisting of a polyolefin resin layer and an acid-denatured polyolefin resin layer has an excellent heat-adhesive property. Since the acid-denatured polyolefin resin layer having a relatively high hygroscopic property may be thin, the amount of moisture contained in the acid-denatured polyolefin resin layer is small, and the component materials of the battery will not adversely be affected by the moisture contained in the acid-denatured polyolefin resin layer.

Since the acid-denatured polyolefin resin layer is thin, the amount of the acid-denatured polyolefin resin and the amount of the antiblocking agent, the lubricant and/or the slipping agent contained in the acid-denatured polyolefin resin layer are small and material costs are low, which is economically advantageous.

The metal foil layer is formed so that at least one end edge of the metal foil layer lies on the inner side of the end edges of the other layers and is not exposed on the end edge of the battery case forming sheet.

When the battery case forming sheet 10 is used so that an end edge part thereof in which the end edge of the metal foil layer lies on the inner side of the edges of the other layers corresponds to an open end part of the battery case, the tabs 59 and 60 will not be short-circuited by the metal foil layer even if the tabs 59 and 60 extending outside from the battery case are bent, which improves the safety of the battery case.

Materials of the battery case forming sheet and a method of manufacturing the battery case forming sheet will be described hereinafter.

As mentioned above, the battery case forming sheet in accordance with the present invention has the metal foil layer having excellent impermeability to moisture and gases as an intermediate layer, the first base film layer is formed on the outer surface of the metal foil layer or the first and the third base film layer are formed on the opposite surfaces of the metal foil layer, a sealant layer, such as an acid-denatured polyolefin resin layer or a laminated sheet of an acid-denatured polyolefin resin layer and a polyolefin resin layer, is formed on the inner side of the metal foil layer, and the acid-denatured polyolefin resin layer serving as the innermost layer contains an antiblocking agent, a lubricant and/or a slipping agent.

The metal foil layer, i.e., the intermediate layer, serving as a gas-impermeable barrier layer may be an aluminum foil or a copper foil. An aluminum foil is most preferable because the same is inexpensive and is excellent in processability. A suitable thickness of the metal foil layer is in the range of 5 to 25 μm.

The first and the third base film layer may be, for example, some of PET films, ON films, OPP films, polyethylene naphthalate films, polyimide films and polycarbonate films. In view of various kinds of strength and resistance, ability including durability, processability and economic effect, PET films, ON films and OPP films are most suitable.

Particularly, PET films have a low hygroscopic property, are excellent in rigidity, tensile strength, bending strength, impact strength, abrasion resistance, heat resistance and water resistance. Thus, PET films have a generally balanced ability and have few drawbacks.

ON films have a relatively high hygroscopic property though, ON films are flexible and are excellent in piercing strength, impact strength, bending strength and low-temperature resistance.

OPP films are excellent in moisture-proof property, waterproof property, chemical resistance, tensile strength and bending strength. Particularly, the low cost is a significant advantage of OPP films.

The thicknesses of the base films are in the range of 5 to 100 μm, more preferably, in the range of 12 to 30 μm.

It is preferable, as mentioned above, that the sealant layer, i.e., the innermost layer, is heat-adhesive not only to itself, but also to metals forming terminals and have a low hygroscopic property to protect the component materials of a battery contained in a battery case formed by processing the battery case forming sheet from the adverse effect of moisture.

To meet such requirements, the present invention uses an acid-denatured polyolefin resin layer or a laminated layer of a polyolefin resin layer and an acid-denatured polyolefin resin layer (innermost layer), and adds an antiblocking agent, a lubricant and/or a slipping agent to the acid-denatured polyolefin resin layer serving as the innermost layer to improve the slipping and antiblocking properties of the acid-denatured polyolefin resin layer.

The polyolefin resin layer of the sealant layer may be formed of, for example, one of polyethylene resins, polypropylene resins, ethylene-propylene copolymers, ethylene-α-olefin copolymers, ethylene-vinyl acetate copolymers, ethylene-acrylate copolymers, ethylene-methacrylate copolymers, terpolymers of those resins, and resins prepared by blending some of those resins.

The acid-denatured polyolefin resin layer of the sealant layer may be formed of, for example, one of ethylene-acrylic acid copolymers, ethylene-methacrylic acid copolymers, and resins produced by the graft copolymerization of polyolefin resins, such as polyethylene resins, polypropylene resins, ethylene-propylene copolymers, ethylene-α-olefin copolymers, ethylene-vinyl acetate copolymers, ethylene-acrylate copolymers, ethylene-methacrylate copolymers and terpolymers of those resins, and modifying resins produced by copolymerization by some of unsaturated carboxylic acids and anhydrides of unsaturated carboxylic acids, such as acrylic acid, methacrylic acid, maleic acid, maleic anhydride, citraconic anhydride, itaconic acid and itaconic anhydride. An acid-denatured polyolefin resin layer having an acid content in the range of 0.01 to 10% by weight is excellently heat-adhesive not only to itself, but also to metals, has a satisfactory film forming property and is easy to use.

The heat-adhesion of the resin to a metal is insufficient if the acid content is less than 0.01% by weight, and the film forming performance of the resin is inferior if the acid content is higher than 10% by weight.

Ionomers produced by cross-linking the resins having carboxyl groups included in those resins by $Na^+$ ions or $Zn^{2+}$ ions are suitable materials for forming the heat-adhesive resin layer.

The thickness of the sealant layer is in the range of 10 to 120 μm, preferably, in the range of 20 to 100 μm.

When the sealant layer is a two-layer laminated sheet consisting of a polyolefin resin layer and an acid-denatured polyolefin resin layer, the acid-denatured polyolefin resin layer may be thin and the thickness may be 1 μm or above. Suppose that the thickness of the sealant layer is 100 μm, the thickness of the acid-denatured polyolefin resin layer may be in the range of 1 to 50 μm, preferably, in the range of 5 to 25 μm.

The acid-denatured polyolefin resin layer is soft and self-adhesive. Therefore, the battery case forming sheet has a low slipping property and the inner surfaces of a pouch formed by processing the battery case forming sheet adhere to each other.

The present invention adds an antiblocking agent, a lubricant and/or a slipping agent to the acid-denatured polyolefin resin layer, i.e., the innermost layer, to solve such a problem.

The antiblocking agent, the lubricant and the slipping agent may be known ones. Suitable antiblocking agents are silica, zeolite, talc, diatomaceous earth, dicarboxylate amide and polyethylene, suitable lubricant are stearyl alcohol and a fluorocarbon elastomer, and suitable slipping agents are stearic acid amide, oleic acid amide, erucic acid amide and ethylene-bisstearic acid amide.

The respective contents of those additives cannot impartially be determined. If only silica is added to the acid-denatured polyolefin resin, suitable ratio of silica to the resin is 0.2 to 0.5 parts by weight silica to 100 parts by weight resin. If a fatty acid amide, such as stearic acid amide or oleic acid amide, is used suitable ratio of the fatty acid amide to the resin is 0.5 to 1.0 parts by weight fatty acid amide to 100 parts by weight resin.

A method of manufacturing the laminated sheet for forming a battery case will be described hereinafter.

The metal foil layer, i.e., the intermediate layer, and the first or the third base film layer may be laminated by a known dry lamination method using, for example, two-component polyurethane adhesive, or by an extrusion lamination method which extrudes a molten heat-adhesive resin, such as a polyethylene resin, in a heat-adhesive resin layer between the component layers to be laminated and compresses a laminated sheet of the component layers and the heat-adhesive resin layer sandwiched between the component layers.

The sealant layer is formed on a surface of a laminated sheet consisting of the base film layer and the metal foil layer; that is, the sealant layer is formed on a surface of the metal foil layer or a surface of the second base film layer. The surface to which the sealant layer is bonded may be coated with an anchor coat (primer coat). An acid-denatured polyolefin resin containing an antiblocking agent and/or other additives is extruded in a desired thickness by extrusion, or a polyolefin resin and an acid-denatured polyolefin resin containing an antiblocking agent and/or other additives are extruded in desired thicknesses, respectively, by coextrusion on the surface of the metal foil layer or the second base film layer. The sealant layer can be formed in a desired thickness by a tubular film extrusion method or a multilayer tubular film extrusion method and may be laminated to the metal foil layer or the base film layer by a dry lamination method or an extrusion lamination method.

A battery case forming sheet having a metal foil layer not exposed in the edges thereof can easily be manufactured by laminating the first or the third base film and a metal foil so that the opposite end edges of the metal foil are about 10 mm on the inner side of the corresponding end edges of the base film, and trimming the opposite end edge parts of the base film along lines 1 to 2 mm on the outer side of the opposite end edges of the metal foil.

Examples of the fourth embodiment will concretely be described hereinafter with reference to the drawings.

Examples shown in the drawings are illustrative and not limitative. Like or corresponding parts are designated by the same reference characters throughout the drawings.

FIGS. 17 to 20 are typical sectional views of examples of battery case forming sheets in accordance with the present invention.

Figure 17:
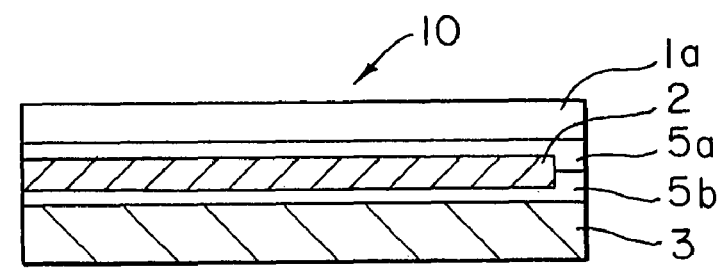
FIGS. 17 to 20 are typical sectional views of a fifth embodiment according to the present invention.

Referring to FIG. 17, a battery case forming sheet 10 is formed by sequentially laminating a first base film layer 1a, i.e., the outermost layer, an adhesive layer 5a, a metal foil layer 2, an adhesive layer 5b and a sealant layer 3, the innermost layer of an acid-denatured polyolefin resin containing one or some of an antiblocking agent, a lubricant and a slipping agent. The right end edge, as viewed in FIG. 17, of the metal foil layer 2, i.e., an intermediate layer, lies on the inner side of end edges of the other layers and is not exposed on an end edge of the battery case forming sheet 10.

Figure 18:
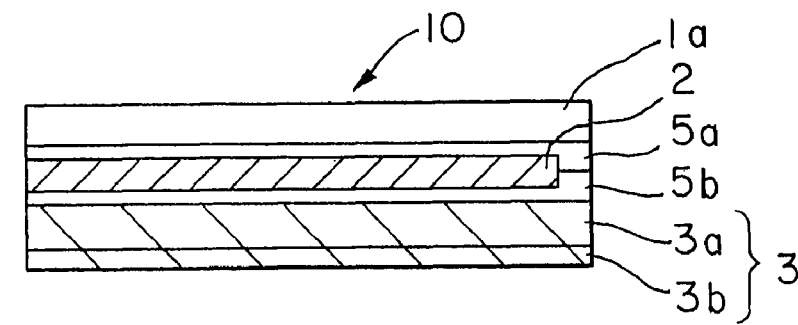

Referring to FIG. 18, a battery case forming sheet 10 is different from the battery case forming sheet 10 shown in FIG. 17 only in that the battery case forming sheet 10 shown in FIG. 18 has a sealant layer 3, i.e., the innermost layer, consisting of a polyolefin resin layer 3a, and an acid-denatured polyolefin resin layer 3b containing one or some of an antiblocking agent, a lubricant and a slipping agent. The battery case forming sheet 10 shown in FIG. 18 is formed by sequentially laminating a first base film layer 1a, an adhesive layer 5a, a metal foil layer 2, an adhesive layer 5b and the sealant layer 3 consisting of a polyolefin resin layer 3a, and an acid-denatured polyolefin resin layer 3b containing one or some of an antiblocking agent, a lubricant and a slipping agent.

The right end edge, as viewed in FIG. 18, of the metal foil layer 2 lies on the inner side of end edges of the other layers and is not exposed on an end edge of the battery case forming sheet 10.

Figure 19:
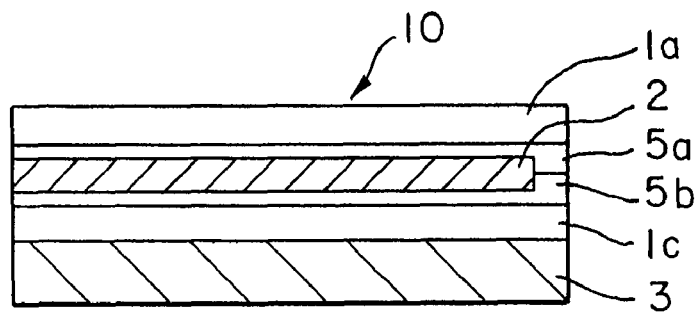

Referring to FIG. 19, a battery case forming sheet 10 has, in addition to the components of the battery case forming sheet 10 shown in FIG. 17, a third base film layer 1c sandwiched between the metal foil layer 2 and the sealant layer 3 of the acid-denatured polyolefin resin containing one or some of an antiblocking agent, a lubricant and a slipping agent. The battery case forming sheet 10 is formed by sequentially laminating a first base film layer 11, i.e., the outermost layer, an adhesive layer 5a, a metal foil layer 2, an adhesive layer 5b, a third base film layer 1c and a sealant layer 3 of an acid-denatured polyolefin resin containing one or some of an antiblocking agent, a lubricant and a slipping agent.

The right end edge, as viewed in FIG. 19, of the metal foil layer 2 lies on the inner side of end edges of the other layers and is not exposed on an end edge of the battery case forming sheet 10.

Figure 20:
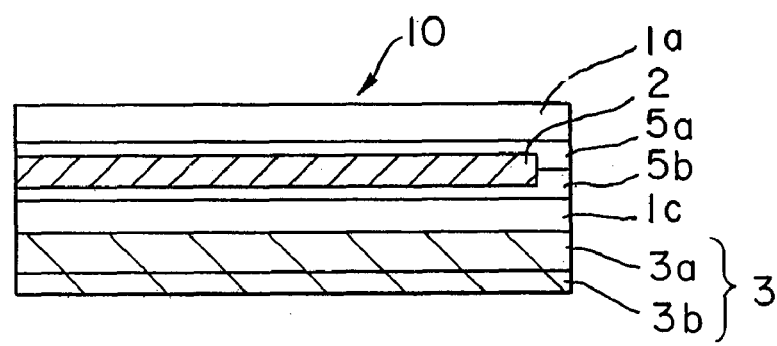

Referring to FIG. 20, a battery case forming sheet 10 is different from the battery case forming sheet 10 shown in FIG. 19 only in that the battery case forming sheet 10 shown in FIG. 20 has a sealant layer 3, i.e., the innermost layer, consisting of a polyolefin resin layer 3a, and an acid-denatured polyolefin resin layer 3b containing one or some of an antiblocking agent, a lubricant and a slipping agent. The battery case forming sheet 10 shown in FIG. 20 is formed by sequentially laminating a first base film layer 1a, i.e., the outermost layer, an adhesive layer 5a, a metal foil layer 2, an adhesive layer 5b, a third base film layer 1c, a polyolefin resin layer 3a, and an acid-denatured polyolefin resin layer 3b containing one or some of an antiblocking agent, a lubricant and a slipping agent.

The right end edge, as viewed in FIG. 20, of the metal foil layer 2 lies on the inner side of end edges of the other layers and is not exposed on an end edge of the battery case forming sheet 10.

In the battery case forming sheets 10 shown in FIGS. 17 to 20, it is preferable that each of the first base film layers 1a and the third base film layers 1c is a PET film, an ON film or an OPP film, and the metal foil layers 2 are aluminum foils.

The adhesive layer 5a sandwiched between the first base film layer 1a and the metal foil layer 2 is capable of satisfactorily bonding together the first base film layer 1a and the metal foil layer 2. The adhesive layer 5a is a layer of a two-component polyurethane adhesive when the first base film layer 1a and the metal foil layer 2 are laminated by a dry lamination method, and the adhesive layer 5a is a layer of a heat-adhesive resin, such as a polyethylene resin, when the first base film layer 1a and the metal foil layer 2 are laminated by an extrusion lamination method.

When the battery case forming sheet 10 is used so that an end edge part thereof in which the end edge of the metal foil layer lies on the inner side of the edges of the other layers corresponds to an open end part of the battery case 51, the tabs 59 and 60 will not be short-circuited by the metal foil layer 2 even if the tabs 59 and 60 extending outside from the battery case 51 are bent, which improves the safety of the battery case 51.

In the battery case forming sheets 10 shown in FIGS. 17 and 18, the adhesive layer 5b formed on the inner surface of the metal foil layer 2, i.e., a surface on the side of the sealant layer 3, attaches the sealant layer 3 firmly to the metal foil layer 2. When forming the sealant layer 3 on the metal foil layer 2 by an extrusion coating method or a multilayer coextrusion coating method, an anchor coat layer is used as the adhesive layer 5b. When forming the sealant layer 3 by laminating a film to the metal foil layer 2 by a dry lamination method or an extrusion lamination method, an adhesive layer for dry lamination or a heat-adhesive resin layer, such as a polyethylene resin layer, is used as the adhesive layer 5b.

In the battery case forming sheets 10 shown in FIGS. 19 and 20, the adhesive layer 5b is sandwiched between the metal foil layer 2 and the third base film layer 1c to bond the metal foil layer 2 and the third base film layer 1c firmly together. The adhesive layer 5b, similarly to the adhesive layer 5a formed on the outer surface of the metal foil layer 2, is formed by a dry lamination method or a multilayer coextrusion lamination method, and is an adhesive layer for dry lamination or a heat-adhesive resin layer, such as a polyethylene resin layer.

In the foregoing battery case forming sheets 10, the sealant layer 3 is attached to the inner surface, i.e., a lower surface as viewed in FIGS. 19 and 20, of the third base film layer 1c. Preferably, an adhesive layer, not shown, is sandwiched between the third base film layer 1c and the sealant layer 3. An anchor coat layer, i.e., an adhesive layer, is formed when forming the sealant layer 3 by an extrusion coating method or a multilayer coextrusion coating method an adhesive layer for dry lamination or a heat-adhesive resin layer, such as a polyethylene resin layer, is formed when forming the sealant layer 3 by laminating a film of a sealant to the third base film layer 1c by a dry lamination method or an extrusion lamination method.

In the battery case forming sheet 10 shown in FIG. 17, the outermost first base film layer 1a, i.e., a PET film, an ON film or an OPP film, protects the metal foil layer 2, i.e., an intermediate layer, and provides the battery case forming sheet 10 with mechanical strength including tensile strength, piercing strength and bending strength, and resistance including abrasion resistance, water resistance, chemical resistance, heat resistance and low-temperature resistance, the metal foil layer 2, such as an aluminum foil serving as an intermediate layer, provides the battery case forming sheet 10 with excellent impermeability to moisture and gases, and the innermost sealant layer 3, i.e., an acid-denatured polyolefin resin layer containing one or some of an antiblocking agent, a lubricant and a slipping agent (hereinafter referred to as "acid-denatured polyolefin resin layer containing an antiblocking agent") provides the battery case forming sheet 10 with excellent heat-adhesive property and satisfactory slipping and antiblocking properties.

Accordingly, the battery case forming sheets can efficiently be joined together by heat-sealing when forming a battery case having the shape of a pouch having one open end, the open end of case can easily be opened and closed by heat-sealing when putting the component materials of a battery in the battery case and closing the open end of the case, and the open end of the case through which the tabs 59 and 60 extend outside from the battery case can be sealed by satisfactorily heat-sealing the open end of the battery case.

Since the metal foil layer 2 of the battery case forming sheet 10 is formed so that at least one end edge thereof lies on the inner side of the edges of the other layers and is not exposed on the end edge of the battery case forming sheet 10, terminals extending outside from the battery case will not be short-circuited by the metal foil layer 2 even if the terminals are bent when the battery case forming sheet 10 is used so that the end part in which the metal foil layer is not exposed corresponds to the open end of the battery case, which further enhances safety.

The battery case forming sheet 10 shown in FIG. 18 is provided with the sealant layer 3 of a two-layer laminated sheet consisting of a polyolefin resin layer 3a and an acid-denatured polyolefin resin layer containing an antiblocking agent instead of the sealant layer 3 of the acid-denatured polyolefin resin layer containing an antiblocking agent employed in the battery case forming sheet 10 shown in FIG. 17.

Therefore, the battery case forming sheet 10 shown in FIG. 18 has the excellent heat-adhesive, slipping and antiblocking properties in addition to the effects of the battery case forming sheet 10 shown in FIG. 17, the amount of moisture contained in the acid-denatured polyolefin resin layer 3b containing an antiblocking agent is small even if the acid-denatured polyolefin resin layer 3b containing an antiblocking layer 3b absorbs moisture because the acid-denatured polyolefin resin layer 3b containing an antiblocking agent can be formed in the least necessary thickness, and the component materials of the battery will not adversely be affected by the moisture contained in the acid-denatured polyolefin resin layer 3b.

The battery case forming sheet 10 shown in FIG. 19 has, in addition to the components of the battery case forming sheet 10 shown in FIG. 17, the third base film layer 1c sandwiched between the metal foil layer 2 and the sealant layer 3 of the acid-denatured polyolefin resin containing an antiblocking agent, and the battery case forming sheet 10 shown in FIG. 20 has, in addition to the components of the battery case forming sheet 10 shown in FIG. 18, the third base film layer 1c sandwiched between the metal foil layer 2 and the polyolefin resin layer 3a of the sealant layer 3.

The additional third base film layers 1c of the battery case forming sheets 10 shown in FIGS. 19 and 20 provide the battery case forming sheets 10 shown in FIGS. 19 and 20 with various kinds of strength and resistance higher than those of the battery case forming sheets 10 shown in FIGS. 17 and 18. Since the metal foil layer 2 is protected securely by the first base film layer 1*a* and the third base film layer 1*c* extending on the opposite sides thereof, the metal foil layer 2 is able to exercise its excellent impermeability to moisture and gases stably with higher reliability.

Particularly, when a PET film having a low hygroscopic property and excellent in various kinds of strength and resistance, particularly, in heat resistance is used as the third base film layer 1*c*, the PET film will neither broken nor torn even if the same is exposed to a high temperature and a high pressure and is capable of protecting the metal foil layer 2 with reliability and therefore a battery case forming sheet can safely be heat-sealed when forming a battery case.

If the metal foil layer is a 9 μm thick aluminum foil, the metal foil layer has a water vapor permeability of 0.01 g/m$^2$·24 hr or below at 40° C. and 90% RH. The water vapor impermeability can easily be enhanced.

The following are representative examples of the foregoing laminated sheets shown in FIGS. 17 to 20.

Laminated sheet Shown in FIG. 17

① PET film. (12 μm thick)/Aluminum foil (9 μm thick)/ Acid-denatured polyolefin resin layer (50 μm thick) (innermost layer)

② ON film (15 μm thick)/Aluminum foil (9 μm thick)/ Acid-denatured polyolefin resin layer (50 μm thick) (innermost layer)

③ OPP film (20 μm thick)/Aluminum foil (9 μm thick)/ Acid-denatured polyolefin resin layer (50 μm thick) (innermost layer)

Laminated sheet Shown in FIG. 18

① PET film (12 μm thick)/Aluminum foil (9 μm thick)/ Polyolefin layer (35 μm thick)/Acid-denatured polyolefin resin layer (15 μm thick) (innermost layer)

③ ON film (15 μm thick)/Aluminum foil (9 μm thick)/ Polyolefin layer (35 μm thick)/Acid-denatured polyolefin resin layer (15 μm thick) (innermost layer)

③ OPP film (20 μm thick)/Aluminum foil (9 μm thick)/ polyolefin layer (35 μm thick)/Acid-denatured polyolefin resin layer (15 μm thick) (innermost layer)

Laminated sheet Shown in FIG. 19

① PET film (12 μm thick)/Aluminum foil (9 μm thick)/ PET film (12 μm thick)/Acid-denatured polyolefin resin layer (40 μm thick) (innermost layer)

② ON film (15 μm thick)/Aluminum foil (9 μm thick)/ PET film (12 μm thick)/Acid-denatured polyolefin resin layer (40 μthick)-(innermost layer)

③ OPP film (20 μm thick)/Aluminum foil (9 μm thick)/ PET film (12 μm thick)/Acid-denatured polyolefin resin layer (40 μm thick) (innermost layer)

Laminated sheet Shown in FIG. 20

① PET film (12 μm thick)/Aluminum foil (9 μm thick)/ PET film (12 μm thick)/Polyethylene resin layer (30 μm thick)/Acid-denatured polyolefin resin layer (10 μm thick) (innermost layer)

② ON film (15 μm thick)/Aluminum foil (9 μm thick)/ PET film (12 μm thick)/Polyethylene resin layer (30 μm thick)/Acid-denatured polyolefin resin layer (10 μm thick) (innermost layer)

③ OPP film (20 μm thick)/Aluminum foil (9 μm thick)/ PET film (12 μm thick)/polyethylene layer (30 μm thick)/ Acid-denatured polyolefin resin layer (10 μm thick) (innermost layer)

④ PET film (12 μm thick)/Aluminum foil (9 μm thick)/ ON film (12 μm thick)/polyethylene layer (30 μm thick)/ Acid-denatured polyolefin resin layer (10 μm thick) (innermost layer)

When printing a picture of letters and patterns on the surface of each of the battery case forming sheets 10 shown in FIGS. 17 to 20, the picture is printed on the inner surface of the first base film layer 1*a* to be bonded to the surface of the adjacent layer for second-surface decoration, and then the first base film layer is laminated to the adjacent layer. The thus printed picture will not be damaged even if the surface of the sheet 10 is abraded.

As is apparent form the foregoing description, the present invention provides lightweight, thin, flexible, battery case forming sheets having principal layers of plastic material, excellent in various kinds of mechanical strength, resistance to detrimental effects, impermeability to moisture and gases, heat-sealability and heat-adhesion to terminals formed of metal foils or the like, capable of preventing short-circuiting terminals, of being easily processed and of being efficiently produced, and provided with a sealant layer having a low hygroscopic property and satisfactory in slipping and antiblocking properties.

Sixth Embodiment

A sixth embodiment according to the present invention will be described with reference to FIGS. 21 to 23. A battery case forming sheet in the sixth embodiment is any one of the following laminated sheets (1) to (3). Battery case forming sheets in the sixth embodiment are substantially the same as those in the first embodiment, except that the battery case forming sheets in the sixth embodiment employ polyolefin resin layers of thicknesses in the range of 10 to 100 μm to be laminated to one or both the surfaces of a metal foil layer.

(1) First base film layer/Metal foil layer/Acid-denatured polyolefin resin layer (innermost layer)

(2) First base film layer/Metal foil layer/Polyolefin resin layer/Third base film layer/Heat-adhesive resin layer (innermost layer)

(3) First base film layer/Polyolefin resin layer/Metal foil layer/Polyolefin resin layer/Third base film layer/Heat-adhesive resin layer (innermost layer)

The metal foil layer, i.e., an intermediate layer, provides the battery case forming sheet with impermeability to moisture and gases, the first and the third base film layers provides the battery case forming sheet with various kinds of strength and resistance and protect the metal foil layer from actions tending to cause fissures and pinholes in the metal foil layer in order that the metal foil layer is able to maintain its barrier property.

A polyolefin resin layer is formed in a thickness in the range of 10 to 100 μm on one or both of the surfaces of the metal foil layer. The polyolefin resin forming the polyolefin resin layer is highly heat-adhesive, have a relatively low melting point or softening point and is excellent in heat-fluidity.

Therefore, when forming a battery case by heat-sealing an end edge part of the laminated sheet, a high temperature and a high pressure are applied particularly to the end edge parts to heat-seal an open end of the battery case. Since the polyolefin resin becomes fluidic when heated and has a sufficient thickness, the polyolefin resin layer can be heat-softened and extruded through the edge of the open end of the battery case so as to cover the metal foil layer exposed on the edge of the open end.

Consequently, the tabs 59 and 60 extending from the battery case so as to extend outside the battery case will not come into contact with the metal foil layer even if the tabs 59 and 60 are bent, which improves the safety of the battery case.

Since the innermost layer of the battery case forming sheet is the heat-adhesive resin layer, an open end of a battery case having the shape of a pouch formed by processing the battery case forming sheet can easily be sealed by heat-sealing after putting the component materials of a battery in the battery case.

Each of the first base film layers and the third base film layers of the foregoing laminated sheets is a biaxially oriented polyethylene terephthalate film, a biaxially oriented nylon film or a biaxially oriented polypropylene film.

In the following description, biaxially oriented polyethylene terephthalate films, biaxially oriented nylon films and biaxially oriented polypropylene films are designated as PET films, ON films and OPP films, respectively.

The PET films, ON films and OPP films are excellent in strength including tensile strength, bending strength, impact strength and piercing strength, resistance including water resistance, chemical resistance, solvent resistance, abrasion resistance, heat resistance and low-temperature resistance, printability and processability including ease of lamination, and are readily available inexpensive, economical general purpose films.

Battery case forming sheets of the foregoing structures having generally excellent properties can efficiently be produced at a low cost.

The polyolefin resin layer laminated to the metal foil layer is formed of an acid-denatured polyolefin resin or an ethylene-α-olefin copolymer produced by polymerization using a single site catalyst.

Acid-denatured polyolefin resins and ethylene-α-olefin copolymers produced by polymerization using a single site catalyst have melting points or softening points lower than those of polyolefin resins, such as polyethylene resins and polypropylene resins, and become fluidic when heated. Therefore, acid-denatured polyolefin resins and ethylene-α-olefin copolymers produced by polymerization using a single site catalyst can easily be heat-softened and extruded through the edge of the open end of the battery case so as to cover the metal foil layer exposed on the edge of the open end when the end edge parts of the sheet are heat-sealed.

Since acid-denatured polyolefin resins are particularly excellent in heat-adhesiveness to metals, an acid-denatured polyolefin resin layer can firmly be laminated to a metal foil layer by an extrusion lamination method. Since ethylene-α-olefin copolymers produced by polymerization using a single site catalyst have a narrow molecular weight distribution and a stable copolymerization ratio, and are excellent in low-temperature heat-sealability and hot-sealability, ethylene-α-olefin copolymers produced by polymerization using a single site catalyst can easily be extruded through the end edges of the sheet during heat-sealing and can properly be used for covering end edges of the metal foil.

The heat-adhesive resin layer, i.e., the innermost layer of the laminated sheet, may be either a single-layer structure of an acid-denatured polyolefin resin layer or a two-layer laminated sheet of a polyolefin resin layer and an acid-denatured polyolefin resin layer.

The heat-adhesive resin layer, i.e., the innermost layer of the laminated sheet, may be formed of any one of polyethylene resins and polyolefin resins. Acid-denatured polyolefin resins are heat-adhesive not only to themselves, but also to metals.

When the heat-adhesive resin layer is only an acid-denatured polyolefin resin layer, an open end of a battery case having the shape of a pouch formed by processing the battery case forming sheet can easily be sealed by heat-sealing even if terminals formed of bear metal foils are extended through the open end of the pouch.

When heat-adhesive resin layer is a two-layer laminated sheet of a polyolefin resin layer and an acid-denatured polyolefin resin layer, the acid-denatured polyolefin resin layer may be very thin. Therefore, the amount of moisture contained in the acid-denatured polyolefin resin layer is very small even if the acid-denatured polyolefin resin layer absorbs moisture during storage, and hence the acid-denatured polyolefin resin layer maintains a satisfactory hat-adhesiveness to the metal forming the terminals and the component materials of the battery contained in the battery case can be protected from the adverse effect of moisture.

Materials for manufacturing the battery case sheet in accordance with the present invention and methods of processing the materials will be described hereinafter.

The battery case forming sheet according to the present invention has, as an intermediate layer, the metal foil layer highly impermeable to moisture and gases, a polyolefin resin layer of a thickness in the range of 10 to 100 μm is laminated to one or both the surfaces of the metal foil layer, the first or the third base film layer excellent in various kinds of strength and resistance is attached to the opposite sides of the intermediate layer, and the heat-adhesive resin layer is formed as the innermost layer.

An aluminum foil and a copper foil are suitable materials for forming the gas-impermeable metal foil layer, i.e., the intermediate layer. An aluminum foil is the most preferable material for forming the metal foil layer because an aluminum foil is inexpensive, easy to process and easy to bond to a film.

A suitable thickness of the metal foil layer is in the range of 5 to 25 μm. A metal foil layer of a thickness less than 5 μm is undesirable because many pinholes are liable to be formed in such a thin metal foil layer to reduce the barrier property of the metal foil layer. A metal foil layer of a thickness above 25 μm is excessively thick, subject to plastic deformation and economically disadvantageous.

For example, if a 9 μm thick aluminum foil is used for forming the metal foil layer, the metal foil layer has a satisfactorily low water vapor permeability less than $0.01 \text{ g/m}^2 \cdot 24$ hr or below at 40° C. and 90% RH. The moisture impermeability of the metal foil layer can easily be enhanced.

As mentioned above, the polyolefin resin layer contiguous with the metal foil layer is extruded through the edge of the open end of the battery case so as to cover the metal foil layer exposed on the edge of the open end when the end edge parts of the sheet are heat-sealed. Therefore, a preferable thickness of the polyolefin resin layer is in the range of 10 to 100 μm.

A polyolefin resin layer of a thickness less than 10 μm is undesirable because it is difficult to extrude such a thin polyolefin resin layer through the edge of the open end of the battery case so as to cover the metal foil layer. A polyolefin resin layer of a thickness over 100 μm is excessively thick, takes much time for heating the same by conduction for heat-sealing, reduces productivity and is economically disadvantageous.

The polyolefin resin layer must have satisfactory hot-fluidity and high hot-adhesiveness as well as an appropriate thickness. Suitable materials for forming the polyolefin resin layer are polyethylene resins, polyethylene copolymers and blends of olefin elastomers. Preferable polyethylene resins are those having a density in the range of 0.910 to 0.940 $g/cm^3$, and a MFI (melt flow index) in the range of 4.0 to 14.0 g/10 min.

When particular importance is attached to hot-fluidity and hot-adhesiveness to metals, it is preferable to form the polyolefin resin layer of some of acid-denatured polyolefin resins and ethylene-α-olefin copolymers produced by polymerization using a single site catalyst.

The foregoing acid-denatured polyolefin resins are, for example, resins produced by modifying ethylene-acrylic acid copolymers, ethylene-methacrylic acid copolymers, polyethylene resins, polypropylene resins, and resins produced by graft copolymerization including ethylene-propylene copolymers, ethylene-α-olefin copolymers, ethylene-vinyl acetate copolymers, ethylene-acrylate copolymers, ethylene-methacrylate copolymers and terpolymers of those resins by some of unsaturated carboxylic acids and anhydrides of unsaturated carboxylic acids, such as acrylic acid, methacrylic acid, maleic acid, maleic anhydride, citraconic anhydride, itaconic acid and itaconic anhydride.

Ionomers produced by cross-linking the resins having carboxyl groups included in those resins by $Na^+$ ions or $Zn^{2+}$ ions are suitable materials for forming the heat-adhesive resin layer.

A preferable acid content of those acid-denatured polyolefin resins is in the range of 0.01 to 10% by weight. The heat-adhesiveness of the acid-denatured polyolefin resins to metals is insufficient if the acid content thereof is less than 0.01% by weight. Acid-denatured polyolefin resins having a acid content exceeding 10% by weight is inferior in film forming property and is not preferable.

The first and the third base film layer may be, for example, some of PET films, ON films, OPP films, polyethylene naphthalate films, polyimide films and polycarbonate films. In view of various kinds of strength and resistance, ability including durability, processability and economic effect, PET films, ON films and OPP films are most suitable.

Although PET films, ON films and OPP films are not particularly different in properties from each other, PET films have low hygroscopic property and are excellent in rigidity, tensile strength, abrasion resistance and heat resistance, ON films have relatively high hygroscopic property and are excellent in flexibility, tensile strength, piercing strength, bending strength and low-temperature resistance. OPP films have very low hygroscopic property and are excellent in moisture-proof property, tensile strength and chemical resistance.

Preferably, the thickness of the base films is in the range of 5 to 100 μm, more preferably, 12 to 30 μm.

The heat-adhesive resin layer, i.e., the innermost layer, provides the laminated sheet with a heat-adhesive property necessary for fabricating a battery case having the shape of a pouch by processing the laminated sheet. It is preferable that, the heat-adhesive resin layer is basically adhesive to itself, is stable and unsusceptible to the swelling and corrosive actions of an electrolyte contained in the battery case, has a low hygroscopic property, and is capable of isolating the components of a battery including the electrolyte from the influence of moisture.

In view of such desirable conditions, suitable materials for forming the heat-adhesive resin layer are polyethylene resins, polypropylene resins, ethylene-propylene copolymers, ethylene-α-olefin copolymers, ethylene-vinyl acetate copolymers, ethylene-acrylate copolymers, ethylene-methacrylate copolymers and terpolymers of those resins. These materials may be used individually or in a blend.

As mentioned above, the tabs 59 and 60 extend, in some cases, in an end part of a battery case to be heat-sealed when sealing the components of a battery in the battery case. In such a case, the heat-adhesive resin layer must be heat-adhesive to the tabs 59 and 60.

The acid-denatured polyolefin resins mentioned in the description of the polyolefin resin layers to be laminated to the metal foil layer are heat-adhesive resins substantially meeting those requirements. Although acid-denatured polyolefin resins have enhanced heat-adhesiveness to metals, the same are hydrophilic and have a relatively high hygroscopic property.

Therefore, if a heat-adhesive resin layer of an acid-denatured polyolefin resin is used as the innermost layer of a battery case forming sheet, it is possible that the innermost layer absorbs moisture only a little though when a battery case formed of the battery case forming sheet and containing a battery therein is stored in a moist environment for a long term. Thus, the relatively high hygroscopic properly of the acid-denatured polyolefin resins is detrimental to the component materials of the battery, such as the electrolyte.

Accordingly, it is preferable to use, as the innermost heat-adhesive resin layer, an acid-denatured polyolefin resin layer or a laminated sheet of a polyolefin resin layer and a thin acid-denatured polyolefin resin layer in order that the amount of moisture contained in the acid-denatured polyolefin resin layer is small even if the acid-denatured polyolefin resin layer should absorb moisture.

The polyolefin resin layer may be formed of a resin selected from a relatively large variety of resins, such as polyethylene resins, polypropylene resins, ethylene-propylene copolymers, ethylene-α-olefin copolymers, ethylene-vinyl acetate copolymers, ethylene-acrylate copolymers, ethylene-methacrylate copolymers and terpolymers of those resins. These resins may be used individually or in a blend.

A preferable thickness of the heat-adhesive resin layer is in the range of 10 to 100 μm. When a laminated sheet of a polyolefin resin layer and an acid-denatured polyolefin resin layer, a preferable thickness of the acid-denatured polyolefin resin layer is in the range of 1 to 50 μm, more preferably, in the range of 5 to 25 μm.

An acid-denatured polyolefin resin layer of a thickness less than 1 μm does not provide sufficient heat-adhesiveness to metals, and an acid-denatured polyolefin resin layer of a thickness over 50 μm is not preferable because such a thick acid-denatured polyolefin resin layer is able to contain a large amount of moisture.

The first and the third base film layer, the metal foil layer, the polyolefin resin layer contiguous with the metal foil layer and the heat-adhesive resin layer of the battery case forming sheet can be laminated by properly using well-known methods, such as a extrusion lamination method, a dry lamination method, an extrusion coating method and multilayer coextrusion coating method.

There is no particular restriction on laminating methods and order of lamination; laminating methods and order of lamination may optionally and selectively determined taking into consideration the properties of the laminated sheet, productivity, loss rate and such.

A battery case forming sheet of a laminated sheet (1) having a construction of first base film layer/polyolefin resin layer/metal foil layer/third base film layer/heat-adhesive resin layer (innermost layer) can be fabricated by, for example, extruding a molten polyolefin resin in a predetermined thickness so as to be sandwiched between the first base film layer and the metal foil layer by an extrusion lamination method, compressing the polyolefin resin layer, the first base film layer and the metal foil layer to laminate the same, laminating the third film layer to the surface of the metal foil layer by a dry lamination method, and laminating the heat-adhesive resin layer to the third base film layer by an extrusion coating method or a multilayer coextrusion coating method.

If the innermost heat-adhesive resin layer is a laminated sheet consisting of a polyolefin resin layer and an acid-denatured polyolefin resin layer, a laminated film of the polyolefin resin layer and the acid-denatured polyolefin resin layer is formed in a predetermined thickness by a multilayer tubular film extrusion method, and the polyolefin resin layer of the laminated film is attached to the third base film layer by a dry lamination method. The same method applies also to fabricating the following structures (2) and (3).

If necessary, the surfaces to be bonded together may be coated with an anchor coat (a kind of primer coat) to enhance the adhesion between the bonded layers when carrying out the extrusion lamination method and the extrusion coating method.

A battery case forming sheet of a laminated sheet (2) having a construction of first base film layer/metal foil layer/polyolefin resin layer/third base film layer/heat-adhesive resin layer (innermost layer) can be fabricated by, for example, bonding together the first base film layer and the metal foil layer by a dry lamination method, extruding a molten polyolefin resin so as to be sandwiched between the metal foil layer and the third base film layer by an extrusion lamination method, compressing the polyolefin resin layer, the metal foil layer and the third base film layer to laminate the same, and laminating the heat-adhesive resin layer to the third base film layer by the same method as that employed in fabricating the battery case forming sheet of the laminated sheet (1).

A battery case forming sheet of a laminated sheet (3) having a construction of first base film layer/polyolefin resin layer/metal foil layer/polyolefin resin layer/third base film layer/heat-adhesive resin layer (innermost layer) is similar in construction to the battery case forming sheets of the laminated sheets (1) and (2) and can be fabricated by properly using some of the extrusion lamination method, the dry lamination method, the extrusion coating method and the multilayer coextrusion coating method.

In the laminated sheets (1), (2) and (3), the polyolefin resin layer to be laminated to the metal foil layer may previously be formed in a predetermined thickness by a tubular film extrusion method or the like and may be bonded to the metal foil layer by a dry lamination method.

Examples of the sixth embodiment will concretely be described hereinafter with reference to the drawings.

Examples shown in the drawings are illustrative and not limitative. Like or corresponding parts are designated by the same reference characters throughout the drawings.

Figure 21:
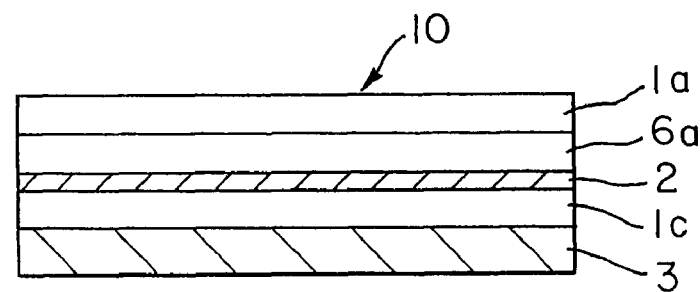
Figure 22:
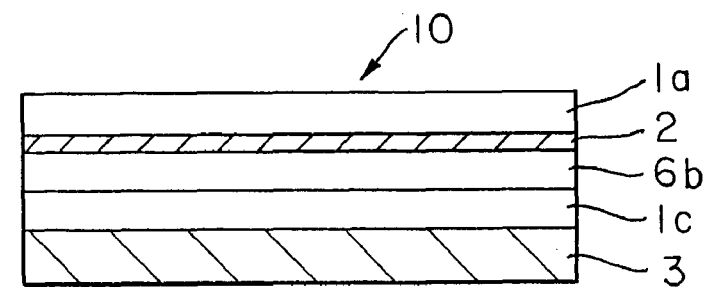

FIGS. 21 to 23 are typical sectional views of examples of battery case forming sheets in accordance with the present invention.

A battery case forming sheet 10 shown in FIG. 21 corresponds to the laminated sheet (1) and is formed by sequentially laminating a first base film layer 1a, i.e., the outermost layer, a polyolefin resin layer 6a, a metal foil layer 2, a third base film layer 1c and an adhesive layer 3.

A battery case forming sheet 10 shown in FIG. 22 corresponds to the laminated sheet (2) and is formed by sequentially laminating a first base film layer 1a, i.e., the outermost layer, a metal foil layer 2, a polyolefin resin layer 6a, a third base film layer 1c and an adhesive layer 3.

A battery case forming sheet 10 shown in FIG. 23 corresponds to the laminated sheet (3) and is formed by sequentially laminating a first base film layer 1a, i.e., the outermost layer, a polyolefin resin layer 6a, a metal foil layer 2, a polyolefin resin layer 6b, a third base film layer 1c and an adhesive layer 3.

When forming the battery case forming sheets shown in FIGS. 21 to 23, it is preferable to use PET films, ON films or OPP films to form the first base film 1a and the third base film layer 1c.

The tabs 59 and 60 of a metal foil or the like extend in an open end part of a battery case having the shape of a pouch formed by processing the battery case forming sheets of the present invention and the open end part is heat-sealed under somewhat heavy heat-sealing conditions. Accordingly, the third base film layer 1c must be strong enough to withstand the tearing action of the tabs 59 and 60 that is exerted thereto during heat-sealing and to protect the metal foil layer, i.e., an intermediate layer, with reliability and must be excellent in mechanical strength and heat resistance. In view of such conditions, PET films are particularly preferable for forming the third base film layer 1c.

The first base film layer 1a and the third base film layer 1c may be the same kind of films or may be different kinds of films.

An aluminum foil is a preferable material for forming the metal foil layer 2. The thicknesses of the polyolefin resin layers 6a and 6b contiguous with the metal foil layer 2 are in the range of 10 to 100 μm.

Although the heat-adhesive resin layer 3 may be a single layer of a polyolefin resin, it is preferable, when the tabs 59 and 60 are bare metal foils, to form the heat-adhesive resin layer 3 of an acid-denatured polyolefin resin highly adhesive to metals. It is more preferable to form the heat-adhesive resin layer 3 by laminating a polyolefin resin layer and an acid-denatured polyolefin resin layer to limit the increase of the moisture content of the heat-adhesive resin layer 3 due to moisture absorption by the acid-denatured polyolefin resin layer to the least possible extent.

The following are representative examples of the foregoing laminated sheets shown in FIGS. 21 to 23.

Laminated sheet Shown in FIG. 21

① PET film (12 μm thick)/Acid-denatured polyolefin resin layer (50 μm thick)/Aluminum foil (9 μm thick)/PET film (12 μm thick)/Polyethylene resin layer (30 μm thick)/Acid-denatured polyolefin resin layer (10 μm thick) (innermost layer)

② ON film (15 μm thick)/Ethylene-α-olefin copolymer layer produced by using a single site catalyst (50 μm thick)/Aluminum foil (9 μm thick)/Acid-denatured polyolefin resin layer (10 μm thick) (innermost layer)

③ OPP film (20 μm thick)/Ethylene-α-olefin copolymer layer produced by using a single site catalyst (50 μm thick)/Aluminum foil (9 μm thick)/PET film (12 μm thick)/Polyethylene resin layer (30 μM thick)/Acid-denatured polyolefin resin layer (10 μm thick) (innermost layer)

Laminated sheet Shown in FIG. 22

① PET film (12 μm thick)/Aluminum foil (9 μm thick)/Acid-denatured polyolefin resin layer (50 μm thick)/PET film (12 μm thick)/Polyethylene resin layer (30 μm thick)/Acid-denatured polyolefin resin layer (10 μm thick) (innermost layer.)

② ON film (15 μm thick)/Aluminum foil (9 μm thick)/Ethylene-α-olefin copolymer produced by using a single site catalyst (50 μm thick)/PET film (12 μm thick)/Polyethylene resin layer (30 μm thick)/Acid-denatured polyolefin resin layer (10 μm thick) (innermost layer)

③ OPP film (20 μm thick)/Aluminum foil (9 μm thick)/Ethylene-α-olefin copolymer produced by using a single site catalyst (40 μm thick) Polyolefin layer (35 μm thick)/PET film (12 μm thick)/Polyethylene resin layer (30 μm thick)/Acid-denatured polyolefin resin layer (10 μm thick) (innermost layer)

Laminated sheet Shown in FIG. 23

① PET film (12 μm thick)/Acid-denatured polyolefin resin layer (30 μm thick)/Aluminum foil (9 μm thick)/Acid-denatured polyolefin resin layer (30 μm thick)/PET film (12 μm thick)/Polyethylene resin layer (30 μm thick)/Acid-denatured polyolefin resin layer (10 μm thick) (innermost layer)

② ON film (15 μun thick)/Ethylene-α-olefin copolymer produced by using a XXXX catalyst (30 μm thick)/Aluminum foil (9 μm thick)/Ethylene-α-olefin copolymer produced by using a single site catalyst (30 μm thick)/PET film (12 μm thick)/Polyethylene resin layer (30 μm thick)/Acid-denatured polyolefin resin layer (10 μm thick) (innermost layer)

③ OPP film (20 μm thick)/Ethylene-α-olefin copolymer produced by using a single site catalyst (30 μm thick)/Aluminum foil (9 μm thick)/Ethylene-α-olefin copolymer produced by using a single site catalyst (30 μm thick)/PET film (12 μm thick)/Polyethylene resin layer (30 μm thick)/Acid-denatured polyolefin resin layer (10 μm thick) (innermost layer)

In the battery case forming sheet 10 thus constructed, the metal foil layer 2, i.e., an intermediate layer, is protected by the first base film layer 1a and the third base film layer 1c contiguous with the opposite surfaces of the metal foil layer 2. Thus, the first base film layer 1a and the third base film layer 1c provide the battery case forming sheet 10 with excellent mechanical strength including tensile strength, impact strength, piecing strength and bending strength, and resistance including abrasion resistance, water resistance, chemical resistance, solvent resistance, heat resistance, chemical resistance, heat resistance and low-temperature resistance. The metal foil layer 2, such as an aluminum foil layer, serves as a reliable barrier impermeable to moisture and gases. The heat-adhesive resin layer 4 of an acid-denatured polyolefin resin serving as the innermost layer is adhesive not only to itself, but also to metals. The heat-adhesive layer 4 of a laminated sheet consisting of a polyolefin resin layer and an acid-denatured polyolefin resin layer is not only adhesive to itself and to metals, but also is effective in enhancing the moisture impermeability of the battery case forming sheet 10.

Since the polyolefin resin layer 6a is sandwiched between the metal foil layer 2 and the first base film layer 1a, the polyolefin resin layer 6b is sandwiched between the metal foil layer and the third base film layer 1c, or the polyolefin resin layer 6a is sandwiched between the metal foil layer 2 and the first base film layer 1a, and the polyolefin resin layer 6b is sandwiched between the metal foil layer and the third base film layer 1c, and the polyolefin resin layers 6a and 6b has thicknesses in the range of 10 to 100 μm, part of the polyolefin resin layer 6a, part of the polyolefin resin layer 6b, or part of the polyolefin resin layers 6a and 6b is extruded through the edge of the open end of a pouch formed by processing the battery case forming sheet so as to cover an end surface of the metal foil layer 2 exposed on the edge of the open end only by heat-sealing the end edge parts of the pouch under slightly heavy heat-sealing conditions. Consequently, the tabs 59 and 60 extending from the battery case so as to extend outside the battery case will not come into contact with the metal foil layer even if the tabs 59 and 60 are bent, which improves the safety of the battery.

When printing a picture of letters and patterns on the surface of each of the battery case forming sheets 10 shown in FIGS. 21 to 23, the picture is printed on the inner surface of the first base film layer 1a to be bonded to the surface of the adjacent layer for second-surface decoration, and then the first base film layer is laminated to the adjacent layer. The thus printed picture will not be damaged even if the surface of the sheet 10 is abraded and is highly resistant to abrasion.

As is apparent form the foregoing description, the present invention provides lightweight, thin, flexible, battery case forming sheets excellent in various kinds of mechanical strength, resistance to detrimental effects, impermeability to moisture and gases, heat-sealability and processability, and capable of protecting the component materials of a battery sealed in a battery case formed by processing the battery case forming sheet from detrimental effects of moisture and of preventing the accidental contact between the terminals of metal foils extending from the inside of the battery case so as to extend outside the battery case, and the metal foil layer serving as the intermediate layer of the battery case forming sheet even if the terminals are bent and of being efficiently produced.

Seventh Embodiment

A seventh embodiment according to the present invention will be described with reference to FIGS. 24 to 28. Battery case forming sheets in the seventh embodiment according to the present invention are substantially the same as those in the first embodiment excluding that the battery case forming sheet in the seventh embodiment is a laminated sheet formed by laminating at least one kind of base film layer and a heat-adhesive resin layer, and the heat-adhesive resin layer is formed in a pattern.

The battery case forming sheets are put together with the heat-adhesive layers forming the inner surfaces thereof in contact with each other, and bonded together by, for example, heat-sealing to form a battery case having the shape of a pouch having one open end. The component materials of a polymer battery 50a are assembled in the battery case, tabs 59 and 60 are extended from the inside of the battery case through the open end so as to extend outside the battery case, and then the open end of the battery case is sealed by heat-sealing to complete a battery.

Although there is not any particular restrictions on the pattern of the heat-adhesive resin layer, the pattern of the heat-adhesive resin layer has parts of a width corresponding to a heat-sealing width extending along the edges of the battery case forming sheet. The heat-adhesive resin layer can be formed by preparing a dope of a heat-adhesive resin, and printing the dope in a heat-adhesive resin layer of a predetermined pattern by gravure printing, silk-screen printing or flexographic printing, and drying the printed heat-adhesive resin layer.

The base film layer provides the battery forming sheet with various kinds of strength and resistance, and the heat-adhesive resin layer formed in a pattern enables the effective use of the heat-adhesive resin, avoid wasting the heat-adhesive resin and achieves effective heat-sealing using the least necessary amount of the heat-adhesive resin.

Since the patterned heat-adhesive resin layer can be formed by a printing means and the heat-adhesive resin is used in a dope, an optimum heat-adhesive resin can be selected out of a large variety of resins, and the patterned heat-adhesive resin layer can be formed by a desired quantity of the heat-adhesive resin in a desired pattern.

The laminated sheet may additionally be provided with a barrier layer impermeable to gases and moisture. The barrier layer may be a metal foil, a thin layer of a metal, an inorganic oxide or a resin, such as a polyvinylidene chloride resin, a polyacrylonitrile resin or a saponified ethylene-vinyl acetate copolymer.

The laminated sheet provided with such a barrier layer is impermeable to moisture and gases.

When forming a laminated sheet provided with such a barrier layer, it is preferable to sandwich the barrier layer between base film layers. The barrier layer thus sandwiched between the base films is protected from damage and is able to exercise its ability more effectively.

A metal foil, among those barrier layers, has the most barrier property. A battery case forming sheet having an enhanced barrier property can be provided by sandwiching a metal foil between base film layers.

When the intermediate layer of a laminated sheet as a barrier layer is a thin film layer of an inorganic oxide, or a resin, such as a polyvinylidene chloride resin, a polyacrylonitrile resin or a saponified ethylene-vinyl acetate copolymer, all the component layers of the laminated sheet are electrically nonconducting. Therefore, the terminals are not shorted by the laminated sheet even if the terminals are bare metal foils. Thus, a battery case forming sheet excellent in both barrier property and safety can be provided.

The base film layer is a biaxially oriented polyethylene terephthalate film, a biaxially oriented nylon film or a biaxially oriented polypropylene film.

Hereinafter, biaxially oriented polyethylene terephthalate films, biaxially oriented nylon films and biaxially oriented polypropylene films will be designated as PET films, ON films and OPP films, respectively.

Since the foregoing films are excellent in various kinds of strength and resistance, printability and processability including capability of being laminated, and are relatively inexpensive, an economical battery case forming sheet having a satisfactory ability can easily formed.

Materials and processes for fabricating battery case forming sheets in accordance with the present invention will be described in connection with examples.

As mentioned above, a battery case forming sheet in accordance with the present invention is used for forming a battery case for containing the component materials of a battery to form the battery. The sheet is a laminated sheet formed by laminating at least one base film layer and a heat-adhesive resin layer formed in a pattern. When necessary, a barrier layer impermeable to moisture and gases is sandwiched between base film layers.

The base film layer may be, for example, a PET film, an ON film, an OPP film, a polyethylene naphthalate film, a polyimide film, a polycarbonate film or the like. When printability, processability including capability of being laminated and economical effect are taken into consideration in addition to various kinds of strength and resistance, PET films ON films and OPP films are particularly suitable materials.

PET films, in particular, have a low hygroscopic property, and are excellent in rigidity, tensile strength, bending strength, impact strength, abrasion resistance, heat resistance and water resistance. Thus, PET films have generally well balanced ability and only a few drawbacks.

Though relatively hygroscopic, ON films are excellent in flexibility, piercing strength, impact strength, bending strength and low-temperature resistance.

OPP films are excellent in moisture resistance, water resistance, chemical resistance, tensile strength and bending strength, and are inexpensive, which is a significant advantage.

Preferably, the thicknesses of those base films are in the range of 5 to 100 µm, more preferably, in the range of 12 to 30 µm.

The base film layer may be a single layer of any one of the foregoing films or may be a laminated layer formed by putting together different kinds of those films.

As mentioned above, the barrier layer impermeable to moisture and gases may be a metal foil, a metal thin film, a thin film layer of an inorganic oxide, or a layer of a resin, such as a polyvinylidene chloride resin, a polyacrylonitrile resin, or a saponified ethylene-vinyl acetate copolymer.

An aluminum foil and a copper foil are suitable metal foils. An aluminum foil is the most preferable material for forming the metal foil layer because an aluminum foil is inexpensive, easy to process and easy to bond to a film.

A suitable thickness of the metal foil layer is in the range of 5 to 25 µm.

For example, if a 9 µm thick aluminum foil is used for forming the metal foil layer, the metal foil layer has a satisfactorily low water vapor permeability less than 0.01 g/m²·24 hr or below at 40° C. and 90% RH. The moisture impermeability of the metal foil layer can easily be enhanced.

Metals suitable for forming the barrier layer are aluminum, tin, nickel and the like. Aluminum is preferable. Inorganic oxides suitable for forming the barrier layer are silicon dioxide, alumina, titanium oxide, iron oxides and magnesium oxide. Silicon dioxide and alumina are particularly suitable.

These thin film layers having barrier property can be formed on a plastic base film in thicknesses in the range of 100 to 2000 Å by a vacuum evaporation method, a sputtering method or the like.

The adhesion of the thin film layer to the surface of a base film can be enhanced by subjecting a surface of the base film on which one of these thin film layers is to be formed to a well-known pretreatment, such as a corona discharge treatment or a plasma treatment, or coating the same with a primer, such as a urethane resin.

If the barrier layer is a film of a resin, such as a polyvinylidene chloride resin, a polyacrylonitrile resin or a saponified, ethylene-vinyl acetate copolymer, the resin may be extruded by a dry lamination method or an extrusion lamination method, for example, so as to be sandwiched between base films. A polyvinylidene chloride resin can be prepared in a dope, and the dope of the polyvinylidene chloride resin can be spread in a film on a base film by a coating process. A saponified ethylene-vinyl acetate copolymer can be formed in a film on a surface of a base film by an extrusion coating process.

A suitable thickness of the barrier layer of such a resin is in the range of 5 to 25 µm.

A heat-adhesive resin layer (sealant layer), i.e., the innermost layer, to be formed in a pattern can be formed by a printing means, such as gravure printing, flexographic printing or silk-screen printing.

A material for forming a heat-adhesive resin layer is prepared in a solution, an emulsion or a dispersion according to a processing means to be employed.

The heat-adhesive resin must be heat-adhesive not only to itself, but also to the surfaces of electrodes. Heat-adhesive resins meeting such requirements are, for example, ethylene-α-olefin copolymers, ethylene-vinyl acetate copolymers, ethylene-acrylate copolymers, ethylene-methacrylate copolymers, ethylene-acrylic acid copolymers, ethylene-methacrylic acid copolymers, chlorinated polypropylene resins, Urethane vinyl chloride-vinyl acetate copolymers. These resins may be used individually or in a blend.

A suitable resin may be selected according to the material of a surface on which the heat-adhesive resin layer is to be formed, the quality of the surfaces of the terminals and the like from those resins.

A suitable weight per unit area of the heat-adhesive resin layer is in the range of 4 to 10 g/m² (solid content).

If the adhesion of the heat-adhesive resin layer to the base film is insufficient, the surface of the base film may be pretreated by a well-known pretreatment, such as a corona discharge treatment, a plasma treatment or a glow discharge treatment, or may be coated with a primer.

Examples of the seventh embodiment will be described hereinafter with reference to the drawings.

Examples shown in the drawings are illustrative and not limitative. Like or corresponding parts are designated by the same reference characters throughout the drawings.

FIGS. 24 and 25 are typical sectional views of examples of battery case forming sheets in accordance with the present invention.

Figure 26:
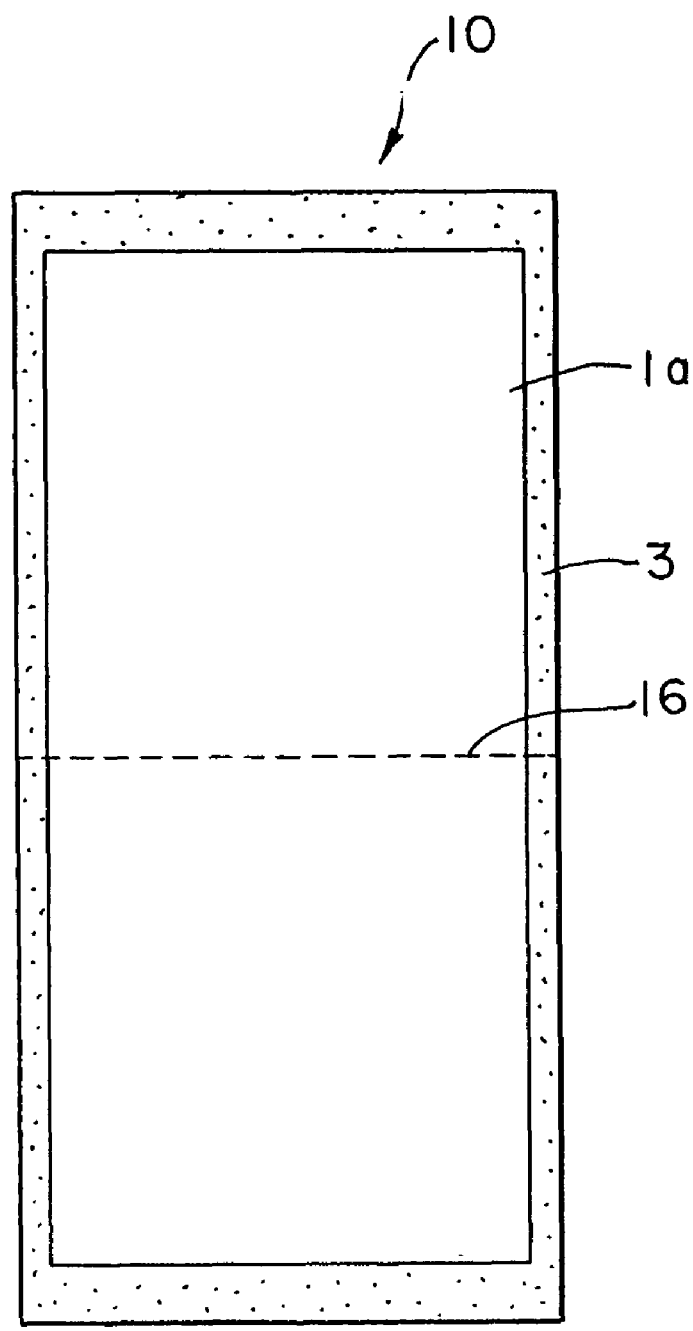

FIG. 26 is a plan view of a battery case forming sheet provided with a heat-adhesive resin layer formed in a pattern on the innermost layer thereof and placed flat with its inner surface facing up.

Figure 27:
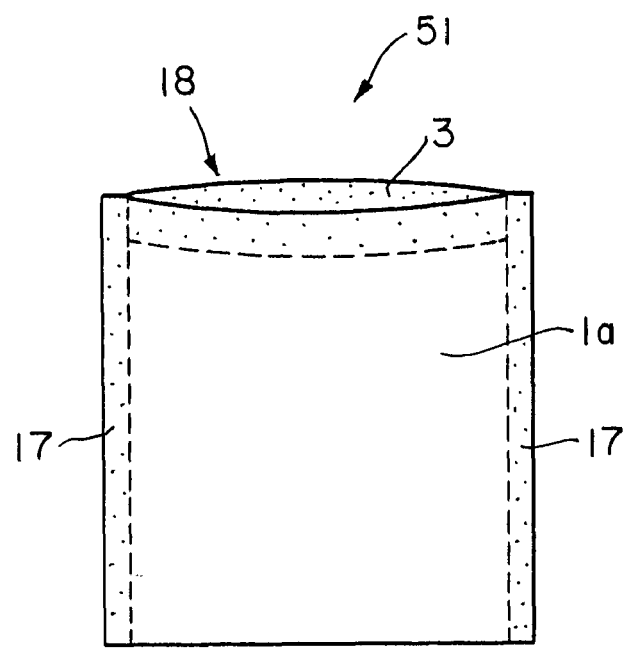

FIG. 27 is a perspective view of an example of a battery case formed by processing the battery case forming sheet in accordance with the present invention shown in FIG. 26.

Figure 28:
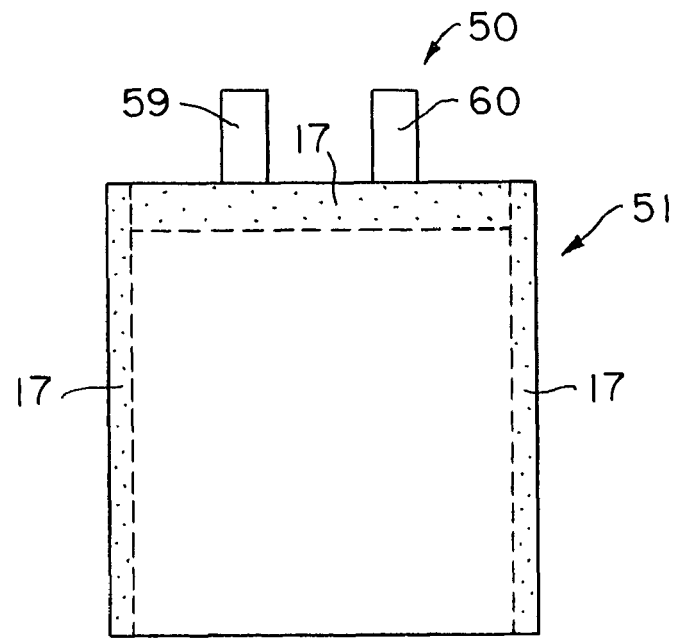

FIG. 28 is a front elevation of a battery fabricated by using the battery case shown in FIG. 27.

Referring to FIG. 24, a battery case forming sheet 10 is formed by forming an heat-adhesive resin layer 3 in a pattern on one surface (an inner surface) of a base film layer (first base film layer) 1a.

The base film layer 1a may be a single film or a laminated film formed by a well-known method, such as a dry lamination method or an extrusion lamination method.

The following are representative examples of laminated films. The laminated films will be described below, in which pretreatment processes and adhesive layers employed therein will be omitted.

(1) PET film (25 μm thick)/Patterned heat-adhesive resin layer (5 μm thick) (Sealant layer)

(2) OPP film (30 μm thick)/Patterned heat-adhesive resin layer (5 μm thick) (Sealant layer)

(3) ON film (25 μm thick)/Patterned heat-adhesive resin layer (5 μm thick) (Sealant layer)

(4) PET film (12 μm thick)/OPP film (20 μm thick)/Patterned heat-adhesive resin layer (5 μm thick) (Sealant layer)

(5) PET film (12 μm thick)/ON film (15 μm thick)/Patterned heat-adhesive resin layer (5 μm thick) (Sealant layer)

A battery case forming sheet 10 shown in FIG. 25 has a laminated construction formed by sequentially laminating a first base film layer 1a (the outermost layer), a barrier layer 12, a third base film layer 1c and a patterned heat-adhesive resin layer formed on the inner surface of the third base film layer 1c.

The base film layers 1a and 1c may be a single film or a laminated film formed by laminating a plurality of films by a dry lamination method or an extrusion lamination method.

The following are representative examples of laminated films. The laminated films will be described below, in which pretreatment processes and adhesive layers employed therein will be omitted.

(1) PET film (12 μm thick)/Aluminum foil (9 μm thick)/PET film (12 μm thick)/Patterned heat-adhesive resin (2) ON film (15 μm thick)/Aluminum foil (9 μm thick)/PET film (12 μm thick)/Patterned heat-adhesive resin layer (5 μm thick) (Sealant layer)

(3) OPP film (20 μm thick)/Aluminum foil (9 μm thick)/PET film (12 μm thick)/Patterned heat-adhesive resin layer (5 μm thick) (Sealant layer)

(4) PET film (12 μm thick)/Aluminum foil (9 μm thick)/OPP film (20 μm thick)/Patterned heat-adhesive resin layer (5 μm thick) (Sealant layer)

(5) PET film (12 μthick)/Aluminum foil (9 μm thick) ION film (15 μm thick)/Patterned heat-adhesive resin layer (5 μm thick) (Sealant layer)

(6) PET film (12 μm thick)/Silicon dioxide thin film layer (600 Å thick)/PET film (12 μm thick)/Patterned heat-adhesive resin layer (5 μm thick) (Sealant layer)

(7) ON film (15 μm thick)/Silicon dioxide thin film layer (600 Å thick)/PET film (12 μm thick)/Patterned heat-adhesive resin layer (5 μm thick) (Sealant layer)

(8) OPP film (20 μm thick)/Silicon dioxide thin film layer (600 Å thick)/PET film (12 μm thick)/Patterned heat-adhesive resin layer (5 μm thick) (Sealant layer.)

(9) PET film (12 μm thick)/Silicon dioxide thin film layer (600 Å thick)/OPP film (20 μm thick)/Patterned heat-adhesive resin layer (5 μm thick) (Sealant layer)

(10) PET film (12 μm thick)/Silicon dioxide thin film layer (600 Å thick)/ON film (15 μm thick)/Patterned heat-adhesive resin layer (5 μm thick) (Sealant layer)

(11) PET film (12 μm thick)/Polyvinylidene chloride thin film layer (3 μm thick)/PET film (12 μm thick)/Patterned heat-adhesive resin layer (5 μm thick) (Sealant layer)

(12) ON film (15 μm thick)/Polyvinylidene chloride thin film layer (3 μm thick)/PET film (12 μm thick)/Patterned heat-adhesive resin layer (5 μm thick) (Sealant layer)

(13) OPP film (20 μm thick)/Polyvinylidene chloride thin film layer (3 μm thick)/PET film (12 μm thick)/Patterned heat-adhesive resin layer (5 μm thick) (Sealant layer)

(14) PET film (12 μm thick)/Polyvinylidene chloride thin film layer (3 μm thick)/OPP film (20 μm thick)/Patterned heat-adhesive resin layer (5 μm thick) (Sealant layer)

(15) PET film (12 μm thick)/Polyvinylidene chloride thin film layer (3 μm thick)/ON film (15 μm thick)/Patterned heat-adhesive resin layer (5 μm thick) (Sealant layer)

(16) PET film (12 μm thick)/ON film (15 μm thick)/Aluminum foil (9 μm thick)/PET film (12 μm thick)/Patterned heat-adhesive resin layer (5 μm thick) (Sealant layer)

(17) ON film (15 μm thick)/OPP film (20 μm thick)/Aluminum foil (9 μm thick)/PET film (12 μm thick)/Patterned heat-adhesive resin layer (5 μm thick) (Sealant layer)

(18) PET film (12 μm thick)/OPP film (20 μm thick)/Aluminum foil (9 μm thick)/PET film (12 μm thick)/Patterned heat-adhesive resin layer (5 μm thick) (Sealant layer)

(19) PET film (12 μm thick)/ON film (15 μm thick)/Saponified ethylene-vinyl acetate copolymer layer (20 μm thick)/PET film (12 μm thick)/Patterned heat-adhesive resin layer (5 μm thick) (Sealant layer)

(20) ON film (15 μm thick)/PET film (12 μm thick)/Saponified ethylene-vinyl acetate copolymer layer (20 μm thick)/PET film (12 μm thick)/Patterned heat-adhesive resin layer (5 μm thick) (Sealant layer)

(21) PET film (12 μm thick)/OPP film (20 μm thick)/Polyacrylonitrile resin film (20 μm thick)/PET film (12 μm thick)/Patterned heat-adhesive resin layer (5 μm thick) (Sealant layer)

FIG. 26 is a plan view of a battery case forming sheet provided with a heat-adhesive resin layer formed in a pattern on the innermost layer thereof and placed flat with its inner surface facing up.

Referring to FIG. 26, a battery case forming sheet 10 is provided with a heat-adhesive resin layer 3 formed in a pattern having parts extending along the edges thereof.

This battery case forming sheet 10 is folded in two leaves along a folding line 16 dividing the battery case forming sheet 10 into two equal halves so that the corresponding parts of the heat-adhesive resin layer 3 are in contact with each other, and the parts of the heat-adhesive resin layer 3 formed in the opposite side edge parts of the folded battery case forming sheet 10 are heat-sealed to form a battery case 51 having on open end as shown in FIG. 27.

A battery case 51 having the shape of a pouch having one open end can be formed by putting together two battery case forming sheets 10 in a superposed structure so that the corresponding parts of the heat-adhesive resin layers 3 are in contact with each other, and heat-sealing three edge parts of the superposed structure.

The battery case 51 shown in FIG. 27 has a bottom part formed by folding the battery case forming sheet, opposite heat-sealed side edge parts 17, and an open upper end 18.

This battery case 51 can be formed by folding the battery case forming sheet 10 in two leaves along the folding line 16 dividing the battery case forming sheet 10 into two equal halves so that the corresponding parts of the heat-adhesive resin layer 3 are in contact with each other, and heat-sealing the parts of the heat-adhesive resin layer 3 formed in the opposite side edge parts of the folded battery case forming sheet 10 so as to form heat-sealed edge parts 17. Since parts of a predetermined width of the heat-adhesive resin layer 3 are formed on the inner surfaces of the upper end edge parts of the open upper end 18 of the battery case 51, the component materials of a battery 50a can be assembled in the battery case 51, tabs 59 and 60 are extended from the inside through the open upper end 18 so as to extend outside the battery case 51, and then the open upper end 18 can be heat-sealed.

A polymer battery packet 50 shown in FIG. 28 is fabricated by assembling the component materials of a battery 50a in the battery case 51 shown in FIG. 27, extending tabs 59 and 60 from the inside through the open upper end 18 so as to extend outside the battery case 51, and heat-sealing an upper heat-sealed edge part 17 with the tabs 59 and 60 hermetically sandwiched between the upper end edge parts of the battery case 51.

As is apparent form the foregoing description, the present invention provides lightweight, thin, flexible, laminated sheet excellent in various kinds of mechanical strength, resistance to detrimental effects, and impermeability to moisture and gases. Since the laminated sheet is provided with the heat-sealing resin layer formed in a pattern on its inner surfaces, parts of the heat-adhesive resin layer are formed only on necessary parts of the laminated sheet, and a battery case having the shape of a pouch can effectively be formed without wasting materials. The battery case forming sheet for fabricating a battery by assembling the component materials of a battery in a battery case, extending terminals from the inside through the open upper end so as to extend outside the battery case, and heat-sealing an open end edge part of the battery case through which the terminals are extend can efficiently be produced.

Eighth Embodiment

An eighth embodiment according to the present invention will be described with reference to FIGS. 29 to 33. A battery case in the eighth embodiment is substantially the same as that in the first embodiment, except that the battery case in the eighth embodiment has at least a part formed of a laminated film formed by sandwiching an aluminum foil layer, i.e., an intermediate layer, between synthetic resin layers, and a pressure relieving part provided with incisions formed by irradiation with a laser beam is formed in at least one of the surfaces of the laminated film.

According to the present invention, the term, "pressure relieving part" (burst-proof structure) designates a structure formed by melting and evaporating linear portions of some or all of the synthetic resin layers on one side of the aluminum foil layer, i.e., the intermediate layer, by irradiating the same with a laser beam.

Furthermore, the term, "burst-proof structure" designates a structure having a reduced breaking strength, provided with cuts formed in a predetermined shape in the laminated film and capable of making the laminated film break when a pressure in a predetermined range is applied thereto before the same bursts.

A battery case forming laminated film of the foregoing construction is provided with an aluminum foil layer, i.e., an intermediate layer, having an excellent barrier property not permitting moisture and gases to pass through, and a burst-proof structure having a reduced breaking strength formed by forming cuts at least in a layer on one side of the intermediate layer. The aluminum foil layer will not be damaged when the battery case forming laminated film is processed and is able to maintain its excellent barrier property. The burst-proof structure breaks when pressure in a battery case formed by shaping the battery case forming laminated film increases, to a predetermined level to relieve the pressure in the battery case, so that the battery case will not burst. Thus, the battery case is excellent in safety.

The breaking strength of the burst-proof structure, i.e., the pressure relieving part, is in the range of 5 to 10 $kg/cm^2$.

Since the burst strength of the battery case is adjusted to a properly value by the burst-proof structure, the battery case will not burst even if pressure in the battery case increases abnormally because the burst-proof structure breaks before the battery case bursts, which enhances the safety of the battery case.

If the breaking strength of the burst-proof structure is less than 5 $kg/cm^2$, the breaking strength of the laminated film is excessively low and the laminated film may possibly be damaged during the use of the battery. If the breaking strength of the burst-proof structure is above 10 $kg/cm^2$, the battery case may possible explode to cause danger and the effect of the burst-proof structure is insufficient.

The pressure relieving part may be provided with linear incisions intersecting each other or meeting on a point.

Such linear cuts facilitate the adjustment of the lower limit of the breaking strength of the pressure relieving part, reduce the deviation of the breaking strength from a desired value and form a stable burst-proof structure.

The laminated film may be provided with pressure relieving parts formed in both the surfaces thereof so as to coincide with each other.

Such pressure relieving parts formed in both the surfaces of the laminated film enable setting the breaking strength of the pressure relieving part, i.e., the burst-proof structure, at a further reduced value, reduces the deviation of the breaking strength from a desired value and ensures the formation of a further safe burst-proof structure.

The battery case is a pouch formed by processing the laminated sheet and heat-sealing the peripheral parts of the pouch, and is provided with a pressure relieving part in a peripheral part thereof.

The battery case of such a construction can be formed of only the laminated film. Therefore, the battery case is thin, light and inexpensive. Since the battery case is provided with the pressure relieving part in its peripheral part, a stress can easily be induced in the pressure relieving part by the pressure in the battery case. Therefore, the reliability of the burst-proof structure is further enhanced.

Examples of materials of battery cases provided with a burst-proof structure in accordance with the present invention and methods of fabricating such battery cases will be described below.

As mentioned above, a battery case provided with a burst-proof structure in accordance with the present invention is used for fabricating a battery by assembling the component materials of the battery in the battery case. The battery case has at least a part formed of a laminated film formed by sandwiching an aluminum foil layer, i.e., an intermediate layer, between synthetic resin layers, and a pressure relieving part, i.e., a burst-proof structure, provided with cuts formed by irradiation with a laser beam is formed in at least one of the surfaces of the laminated film.

Although it is preferable to form a battery case only of the laminated film by shaping the laminated film provided with the burst-proof structure in a pouch, a battery case may be formed by attaching the laminated sheet provided with the burst-proof structure as a wall member to a frame formed by molding a plastic material.

The laminated film is formed by laminating synthetic resin layers serving as outer and inner surfaces, respectively, of a battery case to the opposite surfaces of an aluminum foil layer serving as a barrier layer, a laser beam intercepting layer and an intermediate layer.

The outer synthetic resin layer has various kinds of strength and resistance, and a pressure relieving part provided with cuts is to be formed therein by irradiation with a laser beam. Therefore, the outer synthetic resin layer must absorb the laser beam, and must generate heat, melt and evaporate upon the absorption of the laser beam. It is preferable that the outer synthetic resin layer is printable and processable for lamination and the like. Suitable materials for forming the outer synthetic resin layer are, for example, biaxially oriented polyethylene terephthalate resin films, biaxially oriented nylon resin films, biaxially oriented polyethylene naphthalate resin films and biaxially oriented polypropylene resin films. The outer synthetic resin layer may be one of those films or may be a laminated film formed by laminating some of those films.

Hereinafter, biaxially oriented polyethylene terephthalate films, biaxially oriented nylon films and biaxially oriented polypropylene films will be designated as PET films, ON films and OPP films, respectively.

PET films, in particular, have a low hygroscopic property, and are excellent in rigidity, tensile strength, bending strength, impact strength, abrasion resistance, heat resistance and water resistance. Since PET films have generally well balanced ability and are relatively inexpensive and economically advantageous, PET films are suitable material.

Though relatively hygroscopic as compared with PET films, ON films are excellent in flexibility, piercing strength, impact strength, bending strength and low-temperature resistance. ON films are suitable when such functions are important.

OPP films are excellent in moisture resistance, water resistance, chemical resistance, tensile strength and bending strength, and are inexpensive, which is a significant advantage.

The outer synthetic resin layer can be formed by laminating the foregoing film by dry lamination or the like to the aluminum foil serving as an intermediate layer.

Preferably, the thicknesses of the plastic film, i.e., the outer synthetic resin layer, is in the range of 8 to 80 μm, more preferably, in the range of 12 to 30 μm.

The inner synthetic resin layer of the laminated film must be capable of reinforcing the laminated film, of protecting the intermediate aluminum foil layer, of being processed with a laser beam to form a pressure relieving part, and of being heat-adhesive not only to itself, but also to the surfaces of terminals to enable the laminated film to be shaped in a pouch and to enable and open end of the pouch to be satisfactorily heat-sealed.

Since it is difficult to form the inner synthetic resin layer meeting such requirements of a single resin layer (film), it is preferable to form the inner synthetic resin layer of a laminated sheet consisting of at least two layers.

For example, the inner synthetic resin layer may be formed of a two-layer structure consisting of a plastic film layer similar to that forming the outer synthetic resin layer, and a heat-adhesive resin layer (sealant layer). The inner synthetic resin layer may be laminated to the inner surface of the intermediate aluminum foil layer so as to serve as the innermost layer.

Suitable materials for forming the heat-adhesive resin layer are polyethylene resins, ethylene-α-olefin copolymers, ethylene-vinyl acetate copolymers, ethylene-acrylate copolymers, ethylene-methacrylate copolymers, ethylene-acrylic acid copolymers, ethylene-methacrylic acid copolymers, acid-denatured polyolefin resins and ionomers. These materials may be used individually or in a blend.

A suitable resin may be selected according to the quality of the surfaces of the terminals (coated or not coated) from those resins.

The plastic film for forming the inner synthetic resin layer need not be very thick; a suitable thickness of the plastic film is in the range of about 8 to about 30 μm.

Preferably, the innermost heat-adhesive resin layer is in the range of 15 to 100 μm, more preferably, in the range of 30 to 80 μm.

Preferably, the thickness of the intermediate aluminum foil layer is in the range of 5 to 25 μm, more preferably, in the range of 7 to 25 μm.

An aluminum foil layer of a thickness less than 5 μm is undesirable because many pinholes are liable to be formed in such a thin aluminum foil layer to reduce the barrier property not to permit moisture and gases to pass through of the aluminum foil layer. An aluminum foil layer of a thickness above 25 μm is undesirable because such a thick aluminum foil layer has an excessively high barrier property and provides the pressure relieving part with an excessively high breaking strength.

For example, if a 9 μm thick aluminum foil is used for forming the intermediate layer, the intermediate layer has a satisfactorily low water vapor permeability less than 0.01 $g/m^2 \cdot 24$ hr or below at 40° C. and 90% RH. The moisture impermeability of the intermediate layer can easily be enhanced.

According to the present invention, a part of the laminated film formed of the foregoing materials is irradiated with a laser beam to form a pressure relieving part provided with cuts by melting and evaporating linear portions of some or all of the synthetic resin layers on the opposite sides of the aluminum foil layer. The pressure relieving part serves as a burst-proof structure of a reduced breaking strength in the range of 5 to 10 $kg/cm^2$.

The cuts for forming the pressure relieving part can be formed by a well-known laser beam projecting means. A laser beam projecting means provided with a carbon dioxide gas laser is particularly suitable.

A carbon dioxide gas laser emits Laser light of 10.6 m in wavelength. The PET films, ON films and OPP films mentioned above as materials suitable for forming the synthetic resin layers of the laminated film generate heat upon the absorption of the laser light of such a wavelength emitted by a carbon dioxide gas laser, and hence a pressure relieving part provided with cuts can easily be formed in those films.

Low-density polyethylene resins generally used as heat-adhesive resins absorb a laser beam of this wavelength scarcely and transmit the same. Therefore, low-density polyethylene resins do not generate heat when irradiated with a laser beam of this wavelength and hence cannot be processed with the laser beam. However, a low-density polyethylene resin film can be used in combination with some one of the PET films, the ON films and the OPP films and cuts can be formed therein because the PET films, ON films and OPP films generate heat when irradiated with the laser beam, and the low-density polyethylene resin film is melted by the heat.

Accordingly, if the inner synthetic resin layer of the laminated film is a two-layer laminated sheet consisting of a PET film, an ON film or an OPP film, and a heat-adhesive resin layer of a low-density polyethylene resin, a pressure relieving part provided with a pattern of linear cuts can be formed by removing, for example, parts of both the two component layers of the inner synthetic resin layer in the pattern of a pressure relieving part provided with a pattern of linear hollows formed by removing only parts of the PET, the ON or the OPP film, temporarily melting parts of the low-density polyethylene resin layer and allowing the molten parts of the low-density polyethylene resin layer to repair its initial shape by properly determining the respective thicknesses of the two component layers of the inner synthetic resin layer and properly adjusting conditions for irradiation with a laser beam.

The present invention will more specifically be described with reference to the accompanying drawings. The present invention is not limited in its practical application to the examples shown in the accompanying drawings.

FIG. 29 is a typical sectional view of a laminated film for forming a battery case provided with a burst-proof structure in accordance with the present invention.

FIGS. 30(a), 30(b), 30(c) and 30(d) are representative patterns of linear cuts formed in laminated films by irradiation with a laser beam.

FIGS. 31(a) and 1(b) are typical sectional views of examples of pressure relieving parts formed in laminated films.

FIG. 32 is a development of a battery case provided with a burst-proof structure in accordance with the present invention and having the shape a pouch having three sides sealed by heat-sealing.

FIG. 33 is a front view of a battery employing the battery case shown in a development in FIG. 32.

Referring to FIG. 29, a laminated sheet 10 has an aluminum foil layer (metal foil layer) 2, i.e., an intermediate layer, an outer synthetic resin layer (first base film layer) 1a laminated to the outer surface (upper surface as viewed in FIG. 29) of the aluminum foil layer 2, and an inner synthetic resin layer (third base film layer) 1c laminated to the inner surface (lower surface as viewed in FIG. 29) of the aluminum foil layer 2.

Concretely, the outer synthetic resin layer 1a is a PET film, an ON film or an OPP film, and the inner synthetic resin layer 1c is a PET film, an ON film or an OPP film. A heat-adhesive resin layer 3, an innermost layer, is laminated to the inner synthetic resin layer 1c.

Each of the outer synthetic resin layer 1a and the inner synthetic resin layer 1c may be one of a PET film, an ON film and an OPP film or may be a laminated film consisting of one or some of a PET film, an ON film and an OPP film, and a film of another kind.

The innermost heat-adhesive resin layer 3 may be of either a single-layer construction or a multilayer construction.

Although it is preferable to laminate the first base film layer 1a and the third base film layer 1c, i.e., some of PET films, ON films and OPP films, to the intermediate aluminum foil layer 2 by a well-known dry lamination method using an adhesive, the same may be laminated to the aluminum foil layer 2 by an extrusion lamination method using a heat-adhesive resin.

Although it is easy and simple to form the innermost heat-adhesive resin layer 3 by an extrusion coating method, the heat-adhesive resin layer 3 may be formed by laminating a heat-adhesive resin film to the third base film layer 1c by a dry lamination method or an extrusion lamination method.

The following are representative examples of the laminate films. In the following description, pretreatment processes and adhesive layers employed in forming the laminated films are omitted.

(1) PET film (16 µm thick)/Aluminum foil (9 µm thick)/PET film (12 µm thick)/Heat-adhesive resin layer (40 µm thick) (Sealant layer)

(2) ON film (15 µm thick)/Aluminum foil (9 µm thick)/PET film (12 µm thick)/Heat-adhesive resin layer (40 µm thick) (Sealant layer)

(3) OPP film (20 µm thick)/Aluminum foil (9 µm thick)/PET film (12 µm thick)/Heat-adhesive resin layer (40 µm thick) (Sealant layer)

(4) PET film (16 µm thick)/Aluminum foil (9 µm thick)/OPP film (20 µm thick)/Heat-adhesive resin layer (40 µm thick) (Sealant layer)

(5) PET film (16 µm thick)/Aluminum foil (9 µm thick) ION film (15 µm thick)/Heat-adhesive resin layer (40 µm thick) (Sealant layer)

(6) ON film (15 µm thick)/PET film (12 µm thick)/aluminum foil (9 µm thick)/PET film (12 µm thick)/Heat-adhesive resin layer (40 µm thick) (Sealant layer)

(7) PET film (12 µm thick)/ON film (15 µm thick)/Aluminum foil (9 µm thick)/PET film (12 µm thick)/Heat-adhesive resin layer (40 µm thick) (Sealant layer)

(8) PET film (12 µm thick)/OPP film (15 µm thick)/Aluminum foil (9 µm thick)/PET film (12 µm thick)/Heat-adhesive resin layer (40 µm thick) (Sealant layer)

According to the present invention, cuts are formed in a pattern by irradiating the foregoing laminated film with a laser beam to form a burst-proof structure having a breaking strength in the range of 5 to 10 kg/cm$^2$.

There is not any particular restrictions on the pattern of the cuts, and the cuts may be formed in an optional pattern, taking into consideration the qualities and the thicknesses of the synthetic resin layers of the laminated film.

Patterns of cuts shown in FIGS. 30(a) to 30(d) are suitable for forming a pressure relieving part 20.

All the patterns for forming the pressure relieving part 20 shown in FIGS. 30(a) to 30(d) are formed of cuts extending radially from a central point.

The pattern shown in FIG. 30(a) is formed by radially extending three straight cuts from a central point at angular intervals of 120°. The pattern shown in FIG. 30(b) is formed by radially extending four straight cuts from a central point at angular intervals of 90°. The pattern shown in FIG. 30(c) is formed by radially extending six straight cuts from a central point at angular intervals of 60°. The pattern shown in FIG. 30(a) is formed by radially extending eight straight cuts from a central point at angular intervals of 45°.

The pressure relieving part 20 having a pattern of a greater number of cuts has a lower breaking strength. Suitable one of the pressure relieving parts 20 shown in FIGS. 30(a) to 30(d) is selected, taking into consideration the construction of the laminated film sheet. Although there is not any particular restrictions on the size of the pattern, a suitable length of the straight cuts is in the range of about 10 to about 15 mm, and hence a suitable diameter of a circle circumscribed about the pattern is in the range of about 20 to about 30 mm.

Although the pressure relieving part 20 having such a pattern of cuts may be formed only on one side of the laminated film, the breaking strength of the laminated film can further be reduced when the pressure relieving parts 20 are formed in both the synthetic resin layers so as to coincide with each other.

FIGS. 31(a) and 31(b) are typical sectional views of pressure relieving parts 20 formed in the opposite synthetic resin layers, respectively, of laminated films each formed by laminating a PET film layer (the outermost layer) 1a, an aluminum foil layer 2, a PET film layer 1c, and a polyolefin resin layer (sealant layer) 3.

The inner synthetic resin layer 1c assumes either a shape shown in FIG. 31(a) or a shape shown in FIG. 31(b) when the innermost polyolefin resin layer 3 is a resin layer which does not absorb laser light, such as a low-density polyethylene resin, depending on its thickness and conditions for irradiation with a laser beam.

The pressure relieving part 20 shown in FIG. 31(a) is formed by removing linear parts of the synthetic resin layers 1a and 1c and the sealant layer 3. If the polyolefin resin layer is as thick as 40 μm or above and the energy of the laser beam is adjusted to a certain fixed level, linear parts of both the inner synthetic resin layer 1c, i.e., the PET film layer, and the polyolefin resin layer are melted and torn, and the sealant layer 3, i.e., the polyolefin resin layer, is allowed to repair its initial shape to form a pattern of linear hollows only in the inner synthetic resin layer 1c as shown in FIG. 31(b).

FIG. 32 is a development of a battery case 51 provided with a burst-proof structure in accordance with the present invention and having the shape a pouch having three sides sealed by heat-sealing.

The battery case shown in this development is formed by shaping the laminated sheet 10 shown in FIG. 29. This laminated sheet 10 has a rectangular shape of a predetermined dimensions, is provided with pressure relieving parts 20 each having four straight cuts radially extending from a central point at angular intervals of 90° in the opposite surfaces thereof so as to correspond to each other at a position near a folding line 16 dividing the laminated sheet 10 into two equal halves, and is provided with side sealing parts 17a, 17b, 17c and 17d in its side edge parts and end sealing parts 18a and 18b in its end edge parts.

A battery case having the shape of a rectangular pouch and an open end having the end sealing parts 18a and 18b can be formed by folding the laminated sheet 10 in two leaves along the folding line 16 so that the heat-adhesive layers come into contact with each other, and bonding the side sealing parts 17a and 17b together and the side sealing parts 17c and 17d together by heat-sealing.

A polymer battery packet 50 provided with a burst-proof structure having the pressure relieving part 20 as shown in FIG. 33 is fabricated by assembling the component materials of the battery in the battery case 51 having the shape of a pouch, extending tabs 59 and 60 from the inside through the open upper end 18 so as to extend outside the battery case 51, and sealing an open upper end by bonding together the heat-adhesive resin layers by heat-sealing with the tabs 59 and 60 hermetically sandwiched between the upper end edge parts of the battery case 51.

FIG. 33 is a front elevation of a battery packet 50 employing the battery case 51 formed by shaping the laminated sheet 10 shown in FIG. 32 in a development. The battery case 51 is formed by folding the laminated sheet 10 in two leaves, and bonding the side sealing parts 17a and 17b together and the side sealing parts 17c and 17d together by heat-sealing. The component materials of the battery are put in the battery case 51 through the open upper end, tabs 59 and 60 are extended from the inside of the battery case 51 through the open upper end so as to extend outside the battery case 51, and the open upper end is sealed by bonding together the end sealing parts 18a and 18b by heat-sealing. The battery case 51 is provided in its bottom part with a burst-proof structure having the pressure relieving parts 20.

As is apparent from the foregoing description, according to the present invention, the battery case is formed by processing the laminated film formed by sandwiching the intermediate aluminum foil layer between the synthetic resin layers, is light, thin, flexible, excellent in various strength and resistance, barrier property not permitting moisture and gases to pass through and heat-sealability, is provided with the burst-proof structure which relieves the pressure in the battery case if the pressure increases beyond a predetermined upper limit due to heat generation caused by the misapplication of the battery packet, and capable of securing high safety and of being efficiently produced.

Ninth Embodiment

A battery case forming sheet in a ninth embodiment according to the present invention will be described with reference to FIGS. 34 to 36. The battery case forming sheet in the ninth embodiment is a polymer battery case forming sheet. The battery case forming sheet is a laminated sheet of a construction: first base layer/metal foil layer/adhesive resin layer/third base layer/heat-adhesive resin layer. The metal foil layer and the third base layer, and the third base layer and the heat-adhesive resin layer are laminated by a sandwich lamination method or an extrusion coating method. The adhesive resin layer and/or the heat-adhesive resin layer is formed of an acid-denatured polyolefin resin. The acid-denatured polyolefin resin has a melting point of 100° C. or above. The battery case forming sheet in the ninth embodiment is substantially the same in other respects as that in the first embodiment.

Figure 34:
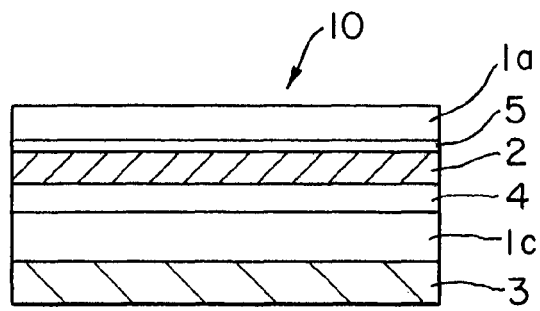
FIGS. 34 to 36 are typical views of a ninth embodiment according to the present invention.
Figure 35:
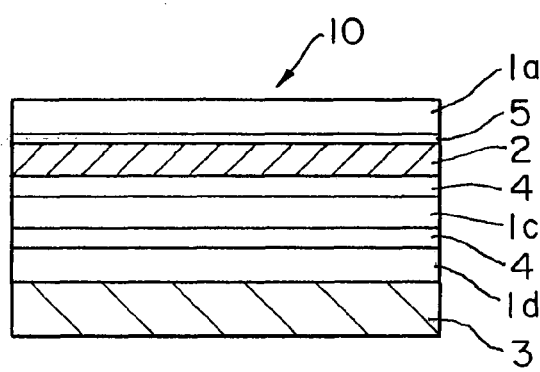

FIG. 34 is a typical sectional view of a battery case forming sheet in the ninth embodiment, FIG. 35 is a typical sectional view of another battery case forming sheet in the ninth embodiment, FIG. 36(a) is a perspective view of a polymer battery packet in accordance with the present invention, and FIG. 36(b) is a sectional view taken on line X-X in FIG. 36(a).

Figure 36:
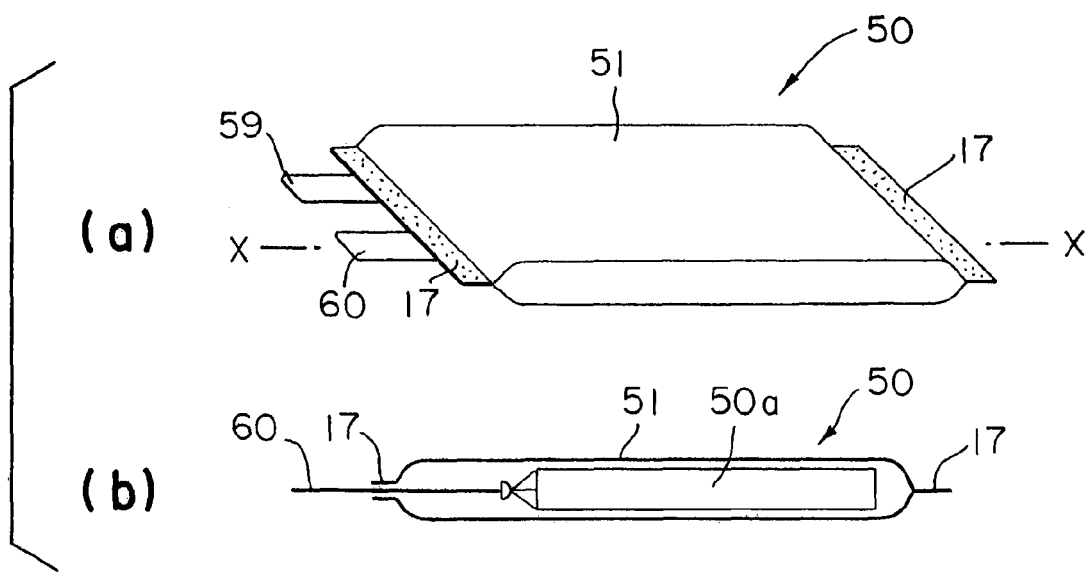

Referring to FIG. 36, the polymer battery packet in accordance with the present invention has a battery 50a, tabs 59 and 60, and a case 51 sealing the battery 50a and the tabs 59 and 60 therein. The tabs 59 and 60 are extended from the inside of the case 51 so as to extend outside the case 51, and parts of the tabs 59 and 60 are attached adhesively to an inner layer of the case 51 in a sealed part 17 of the case 51.

Battery case forming sheets of the foregoing construction are put together with their heat-adhesive resin layers in contact with each other, peripheral edge parts of the battery case forming sheets are bonded together by heat-sealing to form a battery case 51 having the shape of a pouch and an open end part. The component materials of a battery 50a including positive and negative electrodes and electrolyte are put in the battery case 51, tabs 59 and 60 are extended from the inside of the battery case 51 so as to extend outside the battery case 51, and the open upper end is sealed by bonding together the heat-adhesive resin layers, and the heat-adhesive resin layers and the tabs 59 and 60 together by heat-sealing to complete a battery packet.

Therefore, the heat-adhesive resin layers are formed of a heat-adhesive resin heat-adhesive not only to itself, but also to the tabs 59 and 60 made of a conductive material, such as copper foil or an aluminum foil.

The battery case forming sheet for a polymer battery packet is a laminated sheet consisting of an outer base layer, a metal foil layer, i.e., a barrier layer, and a heat-adhesive resin layer. Generally, a third base layer is interposed between the metal foil layer and the heat-adhesive resin layer to prevent the development of pinholes in the metal foil layer and the breakage of the same due to bending or piercing of the metal foil layer. In the battery case forming sheet of such a construction, the intermediate metal foil layer provides an excellent barrier property not permitting moisture and gases to pass through, the base layer formed on one surface of the metal foil layer, and the base layer or the heat-adhesive resin layer formed on the other surface of the metal foil layer protect the metal foil layers so that development of fissures and pinholes can be prevented to maintain satisfactory barrier property.

The base layer formed on the outer or the inner surface of the metal foil layer protects the metal foil layer and, at the same time, provides the sheet with strength and abilities. The innermost heat-adhesive resin layer provides the sheet with heat-sealability.

Since the metal foil layer is sandwiched between at least the nonconducting first and the nonconducting third base layer, the battery case forming sheet functions as a nonconducting sheet.

It was found through examinations that the battery sealed in a battery case formed by shaping the battery case forming sheet can be protected from external and internal shocks or piercing actions when the battery case forming sheet is a laminated sheet formed by sandwiching the barrier layer between the outer first base layer and the inner third base layer.

The case having the shape of a pouch is formed by bonding together laminated sheets by heat sealing. Therefore, the innermost layer of each laminated sheet is a heat-adhesive resin layer. The heat-adhesive resin layer is formed of an acid-denatured polyolefin resin heat-adhesive to a metal forming terminals T.

The acid-denatured polyolefin resin forming the heat-adhesive resin layer is satisfactorily adhesive not only to itself, but also to a metal, such as copper or aluminum. Therefore, the open end of the battery case can be heat-sealed.

Sometimes, a laminated sheet formed by a generally known dry lamination method delaminates while a case formed by processing the same is in use due to deterioration by aging during storage. It was found through the analysis of causes of delamination that an adhesive used for dry lamination is dissolved in the electrolyte of the polymer battery during long storage because the electrolyte is an organic carbonate solvent and the adhesive is soluble in an organic solvent. Thus, the electrolyte, i.e., a component of the battery, permeates the resin layer of the case and reaches the interface between the resin layer and the adhesive layer in a long time, dissolves the adhesive to cause the final delamination of the laminated sheet.

Sometimes the battery packet is used or left in a high-temperature environment. It is possible, if the case is not heat-resistant, that the heat-sealed parts of the case are unsealed and the electrolyte leaks when the case is exposed to high temperatures. For example, the battery packet is required to withstand a test called a dashboard test in which an electronic device provided with the battery packet is kept in a vehicle. More specifically, it is required that any liquid does not leak from the battery packet when the battery packet is kept in an environment of 100° C. for five hours.

It was found through the studies of the construction of various laminated sheets and the materials of laminated sheets that the foregoing problems can be solved and the requisite conditions of a case for a polymer battery can be satisfied by a laminated sheet of the following construction, and the present invention has been made on the basis of findings acquired by the studies.

The first base layer, i.e., a base member of the laminated sheet, must be sufficiently strong and satisfactorily processable for printing, lamination and the like when fabricating a laminated sheet, and must have various abilities including abrasion resistance and the like necessary for serving as the surface layer of a battery packet.

Cases of batteries including polymer batteries must have a barrier property not permitting moisture and gases to pass through. The present invention employs a metal foil as a barrier layer. A third base layer is bonded to the inner surface of the metal foil to protect the barrier layer and to reinforce a battery case. An innermost layer is formed of a heat-adhesive resin. Thus, a laminated sheet in accordance with the present invention comprises, as indispensable components, a metal foil serving as a barrier layer, a base layer and a heat-adhesive resin layer.

The metal foil layer and the third base layer are bonded together by sandwich lamination using an adhesive resin. In this laminated sheet, the heat-adhesive resin layer is formed of an acid-denatured polyolefin resin capable of withstanding temperatures of 100° C. or above.

A polymer battery case 51 in accordance with the present invention will be described hereinafter.

According to the present invention, adhesive layers of solvent-soluble adhesives dissolvable in an organic solvent are not used in forming an inner laminated sheet on the inner side of the barrier layer, the layers of the inner laminated sheet are laminated by a sandwich lamination method using an adhesive resin, and the innermost heat-adhesive resin layer of the inner laminated sheet is formed by an extrusion coating method.

The component layers of an outer laminated sheet on the outer side of the metal foil layer may be laminated by the foregoing dry lamination method.

Since the inner laminated sheet on the inner side of the metal foil layer is built without using any solvent-soluble adhesive layer, there is no possibility that the inner laminated sheet is delaminated by to the penetration of the electrolyte into the bonding interface and the dissolving of the adhesive layer by the electrolyte.

The individual layers of the laminated sheet forming a battery case forming sheet in accordance with the present invention for forming a polymer battery will be described hereinafter.

As mentioned above, a battery case forming sheet in accordance with the present invention has a metal foil layer serving as an intermediate layer and having a barrier property not permitting moisture and gasses to pass through, first, third and additional third base layers excellent in various kinds of strength and resistance are arranged property on the outer and the inner side of the metal foil layer, and a heat-adhesive resin layer is formed as an innermost layer.

Suitable materials for forming the intermediate metal foil layer providing a gas-barrier property is an aluminum foil, a copper foil or the like. An aluminum foil is the most preferable material for forming the metal foil layer because an aluminum foil is inexpensive, easy to process and easy to bond to a film. A suitable thickness of the metal foil layer is in the range of 5 to 25 µm.

Suitable materials for forming the base layer are, for example, biaxially oriented polyethylene terephthalate resin films (herein after referred to as "PET films" or PETs"), biaxially oriented nylon resin films (hereinafter referred to as "ON films" or "ON"), biaxially oriented polypropylene resin films (hereinafter designated as, "OPP films" or "OPP") polyethylene naphthalate resin films, polyimide resin films, polycarbonate resin films and the like. In view of abilities including durability, processability and economical effect, PET films and ON films are particularly suitable.

Although PET films and ON films are not particularly different in properties from each other, PET films have low hygroscopic property and are excellent in rigidity, abrasion resistance and heat resistance, ON films have relatively high hygroscopic property and are excellent in flexibility, piercing strength, bending strength and low-temperature resistance.

Preferably, the thickness of the base films is in the range of 5 to 100 µm, more preferably, 12 to 30 µm.

As mentioned above, it is preferable that the heat-adhesive resin layer, i.e., the innermost layer, is heat-adhesive not only to itself, but also to a metal forming terminals, has a low hygroscopic or moisture absorbing property to suppress the penetration of moisture into the electrolyte, and is stable and unsusceptible to the swelling and corrosive actions of the electrolyte.

In view of such desirable conditions, suitable materials for forming the heat-adhesive resin layer are, for example, ethylene-vinyl acetate copolymers, ethylene-acrylate copolymers, ethylene-methacrylate copolymers and polyolefin resins prepared by blending a polyethylene resin or a polypropylene resin, and one or some of those copolymers. Particularly preferable heat-adhesive resins are, for example, ethylene-acrylic acid copolymers, ethylene-methacrylic acid copolymers, and resins produced by modifying polyethylene resins, polypropylene resins, and resins produced by graft copolymerization including ethylene-propylene copolymers, ethylene-$\alpha$-olefin copolymers, propylene-$\alpha$-olefin copolymers, ethylene-vinyl acetate copolymers, ethylene-acrylate copolymers, ethylene-methacrylate copolymers and terpolymers of those resins by some of unsaturated carboxylic acids and anhydrides of unsaturated carboxylic acids, such as acrylic acid, methacrylic acid, maleic acid, maleic anhydride, citraconic anhydride, itaconic acid and itaconic anhydride.

Some resins having a melting point of 100° C. or above among those resins are used to form battery cases having excellent heat resistance. If the melting point of the acid-denatured polyolefin resin forming the heat-adhesive resin layer is below 100° C., there is the possibility that the sealed parts of the battery case are unsealed and the electrolyte leaks when the battery packet is exposed to high temperatures. battery case are unsealed and the electrolyte leaks when a battery packet formed by building a battery in the battery case is exposed to high temperatures.

Preferable acid content of the acid-denatured polyolefin resins is in the range of 0.01 to 10% by weight. The heat-adhesion of the resin to a metal is insufficient if the acid content is less than 0.01% by weight, and the film forming performance of the resin is inferior if the acid content is higher than 10% by weight.

A suitable thickness of the heat-adhesive resin layer is in the range of 10 to 100 µm.

The component layers may be laminated that on the inner side of the metal foil layer by a known sandwich lamination method which extrudes a molten adhesive resin between two layers to be laminated and compresses the layers and a layer of the heat-adhesive resin sandwiched between the layers.

The foregoing acid-denatured polyolefin resin is used as the adhesive resin.

The innermost heat-adhesive resin layer is formed by extruding a molten acid-denatured polyolefin resin directly on the third base layer. When forming the laminated sheet in accordance with the present invention as a sheet for forming a polymer battery case, whereas the laminated layer on the inner side of the metal foil layer is formed by a dry lamination method using an acid-denatured polyolefin resin as the adhesive resin instead of by a dry lamination method using an organic adhesive, the laminated layer on the outer side of the metal foil layer may be formed by a dry lamination method.

The present invention will more concretely be described with reference to the accompanying drawings.

Examples shown in the drawings are illustrative and not limitative. Like or corresponding parts are designated by the same reference characters throughout the drawings.

FIGS. 34 and 35 are typical sectional views of battery case forming sheets in examples in accordance with the present invention for forming the battery case 51.

Referring to FIG. 34, a battery case forming sheet 10 is formed by sequentially laminating a first base layer (first base film layer) 1a, an adhesive resin layer 5, a metal foil layer 2, an adhesive resin layer 4, a third base layer (third base film layer) 1c and a heat-adhesive resin layer 3.

The first base layer 1a is a PET film or an ON film. The metal foil layer 2 is, for example, an aluminum foil. Each of the adhesive resin layers and the heat-adhesive resin layer 3 is formed of an acid-denatured polyolefin resin having an acid content in the range of 0.01 to 10% by weight.

The first base layer 1a, such as a PET film or an ON film, forming the outermost layer of the battery case forming sheet 10 provides the battery case forming sheet 10 with mechanical strength including tensile strength, piercing strength and bending strength, and resistance including abrasion resistance, water resistance, chemical resistance, heat resistance and low-temperature resistance. The metal foil layer, such as an aluminum foil layer, i.e., an intermediate layer, serves as a barrier layer impermeable to moisture and gases. The heat-adhesive resin layer 3, i.e., the innermost layer, is a layer of an acid-denatured polyolefin resin having an acid content in the range of 0.01 to 10% by weight and provides the battery case forming sheet 10 with excellent heat-sealable property.

If the metal foil layer 2 is a 9 µm thick aluminum foil, the metal foil layer 2 has a water vapor permeability of 0.01 $g/m^2 \cdot 24$ hr or below at 40° C. and 90% RH. The water vapor impermeability can easily be enhanced.

The following are representative examples of the foregoing laminated sheet.

(1) PET (12 µm thick)/Aluminum foil (9 µm thick)/Acid-denatured polyolefin resin layer (15 µm thick)/PET (12 µm thick)/Acid-denatured polyolefin resin (30 µm thick)

(2) PET film (12 µm thick)/Aluminum foil (9 µm thick)/Acid-denatured polyolefin resin layer (15 µm thick)/ON (15 µm thick)/Acid-denatured polyolefin resin layer (30 µm thick)

(3) ON film (15 µm thick)/Aluminum foil (9 µm thick)/Acid-denatured polyolefin resin layer (15 µm thick)/PET (12 µm thick)/Acid-denatured polyolefin resin layer (30 µm thick)

(4) ON film (15 µm thick)/Aluminum foil (9 µm thick)/Acid-denatured polyolefin resin layer (15 µm thick)/ON (12 µm thick)/Acid-denatured polyolefin resin layer (30 µm thick)

The battery case forming sheet 10 is provided additionally with the third base layer 1c to improve various kinds of mechanical strength and resistance. Since the metal foil layer 2 is sandwiched between the first base layer 1a and the third base layer 1c, the metal foil layer 2 is protected more securely from external and internal impacts, abrasion, physical and chemical actions, and provides more stable barrier property.

Referring to FIG. 35, a battery case forming sheet 10 is formed by sequentially laminating a first base layer 1a, a metal foil layer 2, an adhesive resin layer 5, a third base layer 1c, an adhesive resin layer 4, an additional third base layer 1d and a heat-adhesive resin layer 3. The first base film layer 1a is the outermost layer.

The battery case forming sheet 10 is provided with the additional third base layer 1d to improve the ability of the third base layer 1c on the inner side of the intermediate metal foil layer 3, and the battery case forming sheet 10 has an enhanced strength. Each of the first base layer 1a the third base layer 1c and the additional third base layer 1d is a PET film or an ON film.

Although all the base layers may be the same types of films, it is preferable to use different types of films, such as a PET film and an ON film as the first base layer 1a, and the third base layer 1c or the additional third base layer 1d, respectively, in view of complementing the respective disadvantages and making the most of advantages of the first base layer 1a, and the third base layer 1c or the additional third base layer 1d.

The battery case forming sheet 10 shown in FIG. 35 having the two base layers on the inner side of the intermediate metal foil layer 2 is superior in strength to the battery case forming sheet 10 shown in FIG. 34. In those laminated sheets, whereas the adhesive layer 5 bonding together the first base layer 1a and the metal foil layer 2 may be formed by either a dry lamination method or a sandwich lamination method, the layers of the laminated layer on the inner side of the metal foil layer 2, i.e., the metal foil layer 2 and the third base layer 1c, and the third base layer 1c and the additional third base layer 1d, are bonded together by a sandwich lamination method using the adhesive resin layer 4, and the heat-adhesive resin layer 3 is formed by an extrusion coating method. The adhesive resin for use in the dry lamination method and the resin for forming the heat-adhesive resin layer are acid-denatured polyolefin resins.

The surface of the third base layer 1c or the additional third base layer 1d may be finished by a well-known surface treatment, such as corona treatment, flame treatment or plasma treatment, to improve the adhesion of the acid-denatured polyolefin resin to the surface. The laminated sheet may be compressed and heated (after heating) after laminating the component layers to enhance the adhesion between the metal foil layer or the base layer, and the heat-adhesive resin.

As shown in FIG. 35, the first base layer 1a is formed on the outer side of the metal foil layer 2, and the adhesive resin layer 4, the third base layer 1c, the adhesive resin layer 4, the additional third base layer 1d and the heat-adhesive resin layer 3 are formed in that order on the inner side of the metal foil layer, The heat-adhesive resin layer 3 is the innermost layer formed by an extrusion coating method. The metal foil layer 2 and the third base layer 1c, the third base layer 1c and the additional third base layer 1d are bonded together by a sandwich lamination method using an acid-denatured polyolefin resin. In this laminated sheet, it is desirable to use ON films for forming the third base layer 1c and the additional third base layer 1d.

In this battery case forming sheet in accordance with the present invention, the base layers 1a, 1c and 1d provides various kinds of improved mechanical strength and resistance, the metal foil layer 2 is sandwiched between the first base layer 1a and the third base layer 1c, and the additional third base layer 1d is laminated to the third base layer 1c to provide the battery case forming sheet with an improved barrier property by protecting the metal foil layer 2 from a piercing action from inside.

When printing a picture of letters and patterns on the surface of each of the battery case forming sheets 10 shown in FIGS. 34 and 35, the picture is printed on the inner surface of the first base layer 1a to be bonded to the surface of the adjacent layer for second-surface decoration, and then the first base film layer is laminated to the adjacent layer. The thus printed picture will not be damaged even if the surface of the sheet 10 is abraded.

As is apparent form the foregoing description, the present invention provides lightweight, thin, flexible, battery case forming sheets excellent in various kinds of mechanical strength, heat-resistance, impermeability to moisture and gases, heat-sealability and processability, and capable of being efficiently produced.

Since the inner laminated layer on the inner side of the metal foil layer is formed without using adhesive layers of a solvent-dissolvable adhesive, the inner laminated layer will not be caused to delaminate by the electrolyte of a battery.

Since the adhesive resin layer and the heat-adhesive resin layer are formed of acid-denatured polyolefin resins having a meting point of 100° C., there is no possibility that the sealed parts of the battery case are unsealed and the electrolyte leaks when the battery packet is exposed to high temperatures.

Tenth Embodiment

Battery packets in a tenth embodiment according to the present invention will be described with reference to FIGS. 37 to 44. A battery packet in the tenth embodiment using a battery case is featured by terminals covered with an insulating sheet provided with at least one opening for each terminal in a part thereof extending outside the battery case. The outer surface of the insulating sheet is bonded by heat-sealing to the inner surface of the battery case, the insulating sheet has at least one surface provided with a layer capable of being bonded to the terminals, the insulating sheet has a base layer of a polyethylene terephthalate resin, a polyamide resin, a polyimide resin or a polycarbonate resin, and the battery case and/or the insulating sheet is printed with a picture. The tenth embodiment is substantially the same in other respects as the first embodiment.

The battery packet in accordance with the present invention is a thin battery packet formed by sealing a battery in a battery case, flat tabs are extended from the battery, the tabs are covered with an insulating film, and openings are formed in predetermined parts of the insulating film to connect the battery to a device to be powered by the battery.

FIG. 37(a) is a perspective view of a battery packet, FIG. 37(b) is a perspective view of a battery provided with terminals covered with a protective film, and FIG. 37(c) is a sectional view taken on line $X_1$-$X_1$ ($X_2$-$X_2$) in FIG. 37(a).

FIGS. 38(a) and 38(b) are perspective views of assistance in explaining a method of covering electrodes with an insulating film, showing a state before covering and a state after covering, respectively. FIG. 39(a) is a perspective view of a battery case in a preferred embodiment according to the present invention in a state before sealing a battery therein and FIG. 39(b) is a sectional view taken on line $X_2$-$X_2$ in FIG. 39(a). FIG. 40 is a top view of a battery packet having electrodes of a construction similar to that of the battery case in the foregoing embodiment. FIG. 41(a) is a sectional view taken on line $X_3$-$X_3$ ($X_4$-$X_4$) in FIG. 40, FIG. 41(b) is an enlarged view of a part W in FIG. 41(a), FIG. 42(a) is a sectional view taken on line $Y_1$-$Y_1$ in FIG. 40, FIG. 42(b) is a sectional view taken on line $Y_2$-$Y_2$ in FIG. 42(a), FIGS. 43(a), 43(b) and 43(c) are typical sectional views of assistance in explaining the constitution of an electrode protecting film in accordance with the present invention, FIG. 44(a) is a typical sectional view of a prior art battery case, FIG. 44(b) is a prior art battery packet, and FIG. 44(c) is an enlarged view taken along the direction of the arrow Z.

Referring to FIGS. 44(a) and 44(c), when a flexible packaging sheet 10 forming a battery case 51 is provided with a conductive layer 2, such as a metal foil, the conductive layer 2 of the packaging sheet 10 is exposed in an end surface 10a of the battery case 51, and it is possible that accidental contact between tabs 59 and 60, and the edge of the conductive layer 2 exposed in the end surface 10a occurs if the tabs 59 and 60 are flexible sheets, such as metal foils. The sheet 10 is formed by laminating a first base film layer 1a, a metal foil layer 2, a third base film layer 1c, a heat-adhesive resin layer 3 by using adhesive layers 5a and 5b.

If such accidental contact occurs, the electromotive force of the battery decreases or decreases to zero due to discharge. If such accidental contact occurs in a device loaded with the battery, the device may possibly malfunction or break.

The inventors of the present invention made earnest studies to solve such a problem and solved the problem by forming the electrodes in the following construction.

Figure 37:
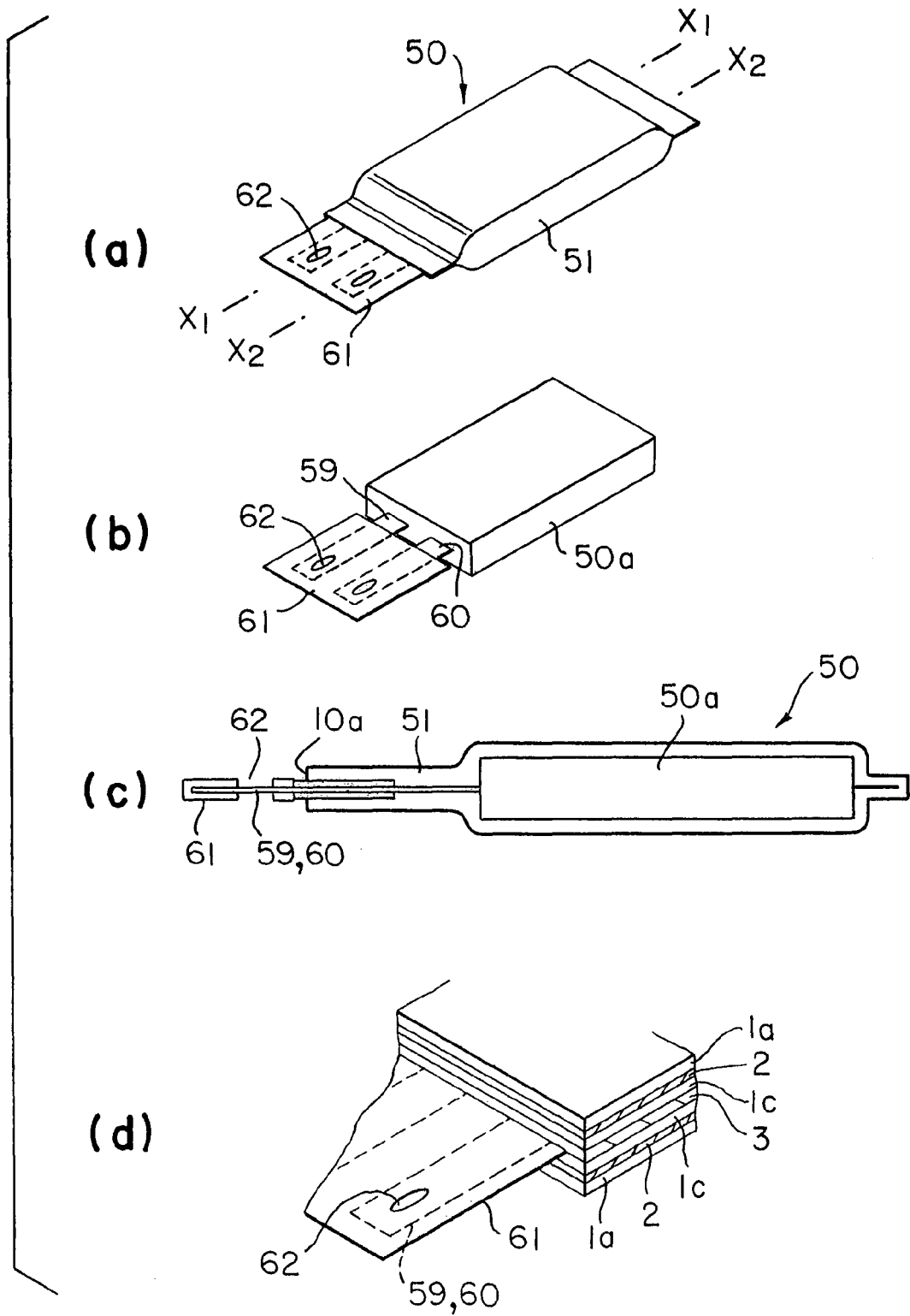
Figure 39:
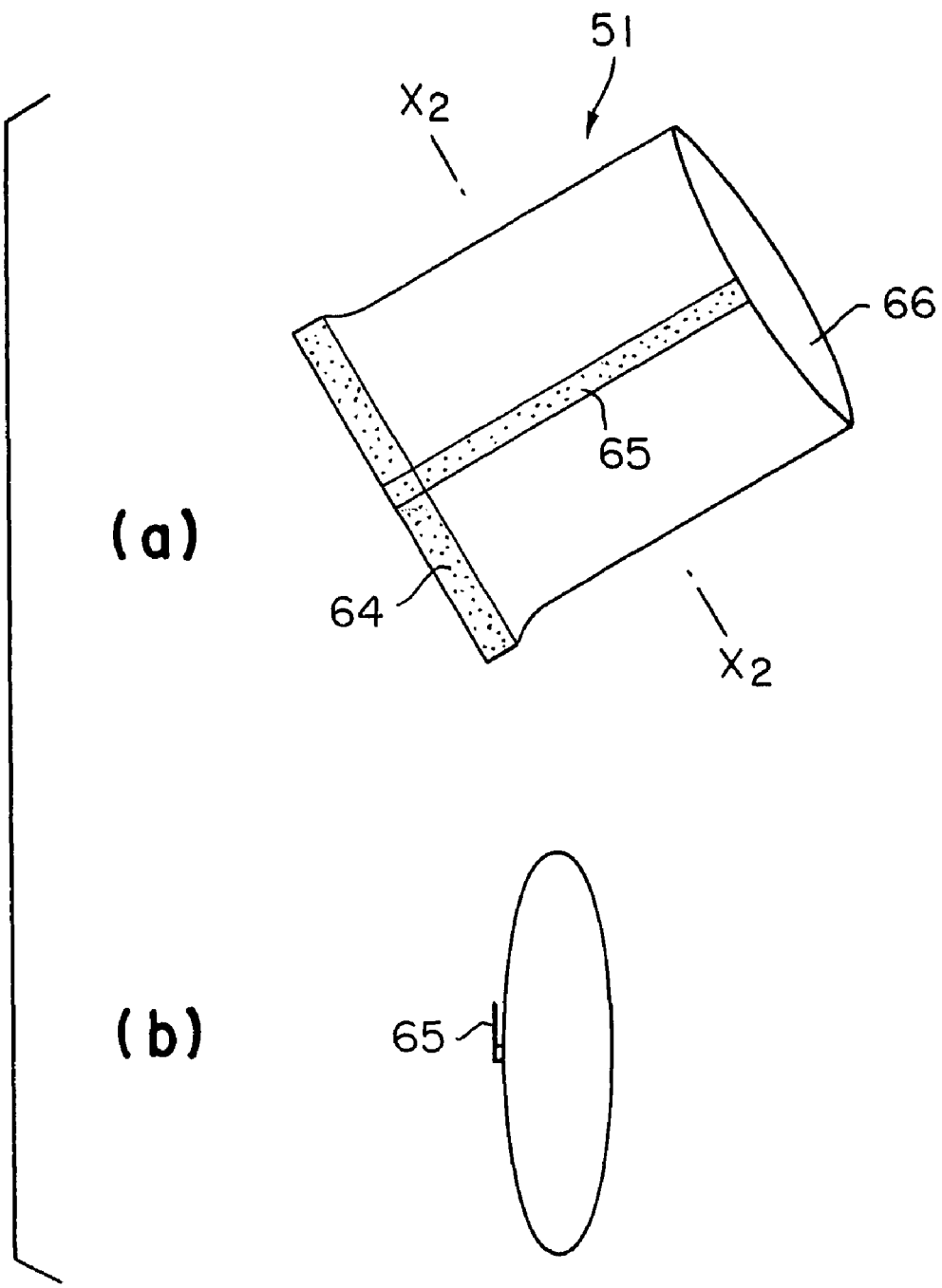

As shown in FIG. 37, exposed parts of strip-shaped tabs 59 and 60 projecting outward from an end of a battery case 51 are covered with an insulating electrode protecting film 61 to prevent accidental contact.

There is not any particular restrictions on the method of covering the tabs 59 and 60 with the electrode protecting film 61, except that the tabs 59 and 60 should not entirely be covered and at least contact parts of the tabs 59 and 60 to be brought into contact with the input terminals of a device to be powered by the battery packet (hereinafter referred to as "contact parts") must be exposed.

More specifically, openings 62 are formed in the electrode protecting film 61, and the electrode protecting film 61 is put on the tabs 59 and 60 so as to cover both the surfaces of the tabs 59 and 60. In this state, contact parts of the tabs 59 and 60 corresponding to the openings 62 are exposed for connection to the input terminals of the device.

The electrode protecting film 61 must be attached to the tabs 59 and 60 carefully with an adhesive so as not to cover the contact parts with an insulating film of the adhesive.

Although it is desirable to use a heat-sealing method for forming the battery case 51 of the present invention, a method using an adhesive may be used instead of the heat-sealing method, provided that the battery case 51 and the electrode structure meeting the present invention can be formed.

Materials for forming the battery case 51 must be capable of forming a sealed structure and of maintaining a satisfactory barrier property not to permit moisture and corrosive gases to pass through into the battery case 51 for a very long period, and have heat resistance and low-temperature resistance as basic thermal conditions. Materials forming the outermost and the innermost layer of the battery case must be electrically nonconductive.

A battery case forming sheet 10 having such required physical properties can be formed by various kinds of materials. Desirably, the battery case forming sheet is a laminated sheet formed by laminating flexible films and a metal foil. Such a laminated sheet is able to make the most of excellent physical properties of the films and the metal foil, and to make the films and the metal foil complement each other.

The case 51 may be formed by any one of suitable methods including a method using an adhesive, a method using ultrasonic waves, a method using high-frequency waves and a heat-sealing method using heat and pressure.

According to the present invention, it is desirable that the inner layer of the laminated sheet for forming the case 51 is formed of a heat-adhesive material, and the case is formed by heat-sealing necessary parts of the laminated sheet.

The battery case forming laminated sheet 10 of the present invention will be concretely be described.

FIG. 37(d) shows an example of the laminated sheet. The construction of the laminated sheet is:

Outermost layer 1a/Barrier layer 2/Reinforcing layer 1c/Sealant layer 3 (innermost layer)

Those layers are laminated by dry lamination or sandwich lamination.

Preferably, the thickness of the laminated sheet is in the range of 50 to 200 μm. A laminated sheet of a thickness below 50 μm is inferior in impermeability to moisture and may possibly permit moisture to pass through into the electrolyte. A laminated sheet of a thickness exceeding 200 * μm does not conform to a basic idea of providing a polymer battery packet of the least possible weight and thickness, and the effect of a laminated sheet of such a great thickness in not permitting moisture and gases to pass through cannot be expected to be as great as its thickness.

Materials of the layers of the laminated sheet are selectively determined according to desired physical properties of the laminated sheet.

Concrete construction of the laminated sheet may be:

PET (outermost layer)/AL/PET (or Ny)/Sealant (innermost layer)

PET: polyethylene terephthalate, AL: aluminum (foil), Ny: nylon

The outermost layer (first base film layer) 1a is the outer surface layer of a battery case. Therefore, the outermost layer 1a must be electrically nonconductive, must have a smooth surface, must be sufficiently resistant to chemicals and abrasion, must have sufficiently high tensile and piercing strength, and must be capable of protecting a battery from external, detrimental, destructive, physical and chemical actions. Biaxially oriented films of resins, particularly, biaxially oriented films of PET resins are preferable materials for forming the outermost layer 1a.

A desirable thickness of the outermost layer 1a is in the range of 5 to 30 μm. If the thickness of the outermost layer 1a is below 5 μm, the piercing strength of the outermost layer 1a is insufficient and it is highly possible that pinholes are formed in the outermost layer 1a. If the thickness of the outermost layer 1a is above 30 μm, the outermost layer 1a will adversely affect the heat-sealability of the laminated sheet.

It is preferable to form the barrier layer (metal foil layer) 2 contiguously with the outermost layer 1a. The barrier layer 2 has barrier property to prevent moisture and gases from permeating the battery case. Suitable materials for forming the barrier layer 2 are films of ethylene-vinyl alcohol copolymers and the like, coated films produced by coating polyethylene terephthalate films and the like with metals, silicon dioxide and inorganic oxides by evaporation, and coated films produced by coating films with barrier coating agents including polyvinylidene chloride resins. It is more preferable to use a metal foil, such as an aluminum foil, as the barrier layer 2. Desirably, an aluminum foil for forming the barrier layer 2 has a thickness in the range of 5 to 30 μM. Aluminum foils of a thickness below 5 μm has many pinholes and are inferior in barrier property. Aluminum foils of a thickness above 30 μm affect adversely to the heat-sealability of the laminated sheet when forming a case.

It is preferable to form the reinforcing layer (third base film layer) 1c on the inner surface of the barrier layer 2 to reinforce the strength of a battery case formed by processing the laminated sheet. It is particularly desirable to reinforce a battery case against the scratching and piecing actions of sharp projections. The reinforcing layer 1c may be a biaxially oriented resin film, preferably, a biaxially oriented PET or Ny film. Desirably, the reinforcing layer 1c has a thickness in the range of 5 to 30 μm. The reinforcing layer 1c is inferior in resistance to the piercing action of a battery contained in the case, pinholes are liable to be formed in the reinforcing layer 1c, and it is possible that the electrolyte leaks and the laminated sheet delaminates if its thickness is below 5 μm. The reinforcing layer 1c will adversely affect the sealability of the laminated sheet if its thickness is above 30 μm.

Necessary parts of the sealant layer (heat-adhesive resin layer 3) of the laminated sheet are bonded together by heat-sealing when forming the battery case 21. As mentioned above, it is desirable, in view of facility in operation and sealing capability, to form the battery case by processing the laminated sheet by a heat-sealing method. When necessary parts of the sealant layer of the laminated sheet are bonded together by a heat-sealing method, the sealant layer is formed of a heat-adhesive material. The heat-adhesive material must be heat-adhesive to the tabs 59 and 60, or the electrode protecting film 61.

The sealant layer 3 is formed of a material heat-adhesive to itself and to metal foils forming the terminals, or the electrode protecting film. Materials suitable for forming the sealant layer 3 are, for example, ethylene-acrylic acid resins (EAA), ethylene-methacrylic acid resins (EMAA), ethylene-ethylacrylate resins (EEA) and ionomers.

The sealant layer 3 may be formed either by laminating a film of one of the foregoing resins to the reinforcing layer 1c or by melting and extruding one of the foregoing resins over the surface of the reinforcing layer 1c by an extruder.

Desirably, the thickness of the sealant layer 3 is in the range of 10 to 100 μm. If the thickness of the sealant layer 3 is below 10 μm, the piercing strength of the sealant layer 3 is insufficient and it is highly possible that pinholes are formed in the sealant layer 3 and it is possible that the electrolyte leaks and the laminated sheet delaminates. If the thickness of the sealant layer is greater than 100 μm, the amount of moisture absorbed by the sealant layer 3 is large and it is possible that moisture permeates the sealant layer 3.

As mentioned above, the outermost layer 1a, the barrier layer 2, the reinforcing layer 1c and the sealant layer 3 may be laminated by dry lamination using a polyurethane adhesive or by sandwich lamination which extrudes an adhesive resin between the adjacent layers.

Terminals relating with the present invention will be described below. The tabs 59 and 60 are flat terminals of a metal foil or the like. As mentioned above, exposed parts of the tabs 59 and 60 excluding the contact parts to be brought into contact with the input terminals of a device to be powered by the battery packet are covered with the insulating electrode protecting film 61. Particularly, the parts of the tabs 59 and 60 corresponding to the end edge 10a of the battery case 51 are securely covered to prevent troubles due to the accidental contact between the tabs 59 and 60, and the conductive layer 2 exposed in the end edge 10a of the battery case 51.

Referring to FIG. 38(a), openings 62 are formed in predetermined parts of the electrode protecting film 61 and the electrode protecting film 61 is folded in two leaves. The openings 62 are formed so as to correspond to the contact parts of the tabs 59 and 60 when the electrode protecting film 61 is folded in two leaves. The tabs 59 and 60 are disposed between the halves of the folded electrode protecting film 61, the halves of the electrode protecting film 61 are bonded together by heat-sealing or the like so as to sandwich the tabs 59 and 60 therebetween.

The tabs 59 and 60 may be covered with the electrode protecting film 61 by spreading an adhesive over the inner surface of the electrode protecting film 61, folding the electrode protecting film 61 in two leaves so as to sandwich the tabs 59 and 60, and compressing the folded electrode protecting film 61 and the tabs 59 and 60 for a predetermined time.

Although the tabs 59 and 60 may have uncovered parts 67 near the battery 50a in the battery case 51, The electrode protecting film 61 covering the tabs 59 and 60 will be described below. The electrode protecting film 61 may be of any type, provided that the same is electrically nonconductive and capable of being bonded by heat-sealing to the tabs 59 and 60. The electrode protecting film 61 may be a film (adhesive layer 71) as shown in FIG. 43(a), a two-layer film consisting of a support layer 72 and an adhesive layer 71 as shown in FIG. 43(b) or a three-layer film consisting of an adhesive layer 71, an outer layer 73, and a support layer 72 sandwiched between the adhesive layer 71 and the outer layer 73 as shown in FIG. 43(c).

As mentioned above, it is preferable to cover the terminals with the electrode protecting film by a heat-sealing method similarly to forming the battery case by a heat-sealing method.

The adhesive layer 71 and the outer layer 73 of the electrode protecting film 61 are formed of materials heat-adhesive to the metal foils forming the terminals, such as ethylene-acrylic acid resins (EAA), ethylene-methacrylic acid resins (EMAA), ethylene-ethylacrylate resins (EEA) and ionomers.

The support layer 72 is formed of a film dimensionally stable when heated and having a high tensile strength. Preferable materials for forming the support layer 72 are biaxially oriented films of polyethylene terephthalate resins, polyamide resins, polyimide resins, polycarbonate resins.

The electrodes are flat strips of a conductive material. Suitable materials for forming the electrodes are foils of metals including aluminum, copper and tin, and alloys of some of those metals.

The electrode protecting film 61 employed in the present invention will be described. The exposed parts of the tabs 59 and 60 excluding the contact parts to be brought into contact with the input terminals of a device to be powered by the battery packet are covered with the insulating electrode protecting film 61. Although other parts of the tabs 59 and 60 may be either covered or not covered, it is desirable to cover the largest possible parts of the tabs 59 and 60 excluding the contact parts with the electrode protecting film 61 because the electrodes projecting from the battery case are flexible and it is possible that the tabs 59 and 60 are deformed before or during the use of the battery packet and the battery cannot properly be connected to a device.

As shown in FIG. 38, the openings 62 are formed in predetermined parts of the electrode protecting film 61 and the electrode protecting film 61 is folded in two leaves. The openings 62 are formed so as to correspond to the contact parts of the tabs 59 and 60 when the electrode protecting film 61 is folded in two leaves and put on the tabs 59 and 60. The folded electrode protecting film 61 is put on the tabs 59 and 60 so as to cover both the surfaces of the tabs 59 and 60 and to extend beyond the outer sides of the tabs 59 and 60.

Thus the contact parts of the tabs 59 and 60 are exposed in the openings 62 to serve as the terminals of the battery 50. The openings may be formed in the electrode protecting film 61 either only on one side of the tabs 59 and 60 or on both sides of the same. It is also possible to form the openings so that the end edge parts of the tabs 59 and 60 or the respective outer side edge parts of the tabs 59 and 60 are exposed when the tabs 59 and 60 are covered with the electrode protecting film 61.

The tabs 59 and 60 must be covered with the electrode protecting film 61 so that the surfaces of the contact parts are exposed. At least the layer to be bonded to the tabs 59 and 60 of the electrode protecting film 61 is formed of a material heat-adhesive to the tabs 59 and 60. The openings 62 are formed in the electrode protecting film 61, and then the electrode protecting film 61 is bonded by heat-sealing to the tabs 59 and 60. When an adhesive is spread over the surface of the electrode protective film 61 to bond the electrode protective film 61 to the tabs 59 and 60, the openings 62 are formed first in the electrode protective film 61, and then the surface of the electrode protective film 61 excluding regions corresponding to the openings 62 is coated with the adhesive. Then, the electrode protective film 61 is bonded to the tabs 59 and 60.

Most preferably, the electrode protective film 61 has at least one heat-adhesive layer of a material heat-adhesive to the tabs 59 and 60 on one side thereof, is provided with the openings 62, the electrode protective film 61 is folded in two laves to sandwich the tabs 59 and 60 between the two parts of the heat-adhesive layer, and the combination of the electrode protective film 61 and the tabs 59 and 60 is heated and compressed to cover the tabs 59 and 60 with the electrode protective film 61.

Since the electrodes projecting outside from the battery case are thus covered, troubles due to the accidental contact between the tabs 59 and 60, and the conductive layer 2 exposed in the end edge 10a of the battery case 51 can be prevented and the parts of the tabs 59 and 60 extending outside the battery case 51 are reinforced.

The battery case 51 in accordance with the present invention is formed by processing the laminated sheet. The outermost layer 1a may be a transparent film and trade name, and directions for use or precautionary statement may be printed on the transparent film. When necessary, information can be printed on the electrode protecting film 61. When information needs to be printed on the electrode protecting film 61, a laminated film formed by laminating the support layer 72 printed on its inner surface with information, the adhesive layer 71 and/or the outer layer 72 is used as the electrode protecting film 61. Since a printed layer thus formed can be formed by backing printing between other layers, the printed layer will not be abraded and may be formed by printing an ordinary printing ink which is not particularly abrasion-resistant.

EXAMPLES

A sheet 10 for forming the battery case 51 was formed by the following procedure. A 15 μm thick aluminum foil (commercially available from Mitsubishi Aluminum Co.) as the barrier layer 2, i.e., an intermediate layer, was laminated to a 12 μm thick polyethylene terephthalate film ("RUMIRA" commercially available from Toray Industries, Inc.) as the outermost layer 1a with a two-component polyurethane adhesive.

The polyurethane adhesive has isocyanate ("TAKER-AKKU A511" commercially available from Takeda Chemical Industries, Ltd.) as a main component, and a polyol ("POLYOL A50" commercially available from Takeda chemical Industries, Ltd.). The coating weight per unit area of the two-component polyurethane adhesive was in the range of 3 to 5 g/m$^2$.

A 12 μm thick biaxially oriented nylon film ("ENBU-REMU" commercially available from Yunichika K.K.) as the reinforcing layer 1c was laminated to the surface of the aluminum foil by a dry lamination using the same polyurethane adhesive, and then a 50 μm thick layer of an ethylene-methacrylic acid resin (EMAA) ("NYUKURERU" commercially available from Mitsui Porikemikaru K.K.) was formed as the sealant layer 3 over the surface of the nylon film by an extrusion method.

A film to be used as the electrode protecting film 61 was formed by the following procedure. Two 20 μm thick layers of an ethylene-methacrylic acid resin (EMAA) ("NYUKURERU" commercially available from Mitsui Porikemikaru K.K.) were formed on both the surfaces of a 12 μm thick polyethylene terephthalate film ("RUMIRA" commercially available from Toray Industries, Inc.) by an extrusion method.

Then, the battery case 51 having a sealed part 65 and an open end 66 as shown in FIG. 39(a) was fabricated by processing the sheet 10. The tabs 59 and 60 extending from the battery 50a were copper foil strips of 40 tun in thickness, 15 mm in width and 30 mm in length openings 62 were formed in the electrode protecting film and the tabs 59 and 60 were covered with the electrode protecting film by the method previously described with reference to FIG. 38.

The battery 50a provided with the tabs 59 and 60 extending therefrom and covered with the electrode protecting film 61 was inserted through the open end 66 into the battery case 51, and the open end 66 was heat-sealed to sandwich the tabs 59 and 60 covered with the electrode protecting film 61 between the edge parts of the open end 66 of the battery case 51 to complete a polymer battery packet 50 as shown in FIG. 40.

In this example, the opening 62 (and the contact parts of the tabs 59 and 60) are elliptic, and both the surfaces of the contact parts of the tabs 59 and 60 were exposed.

Figure 42:
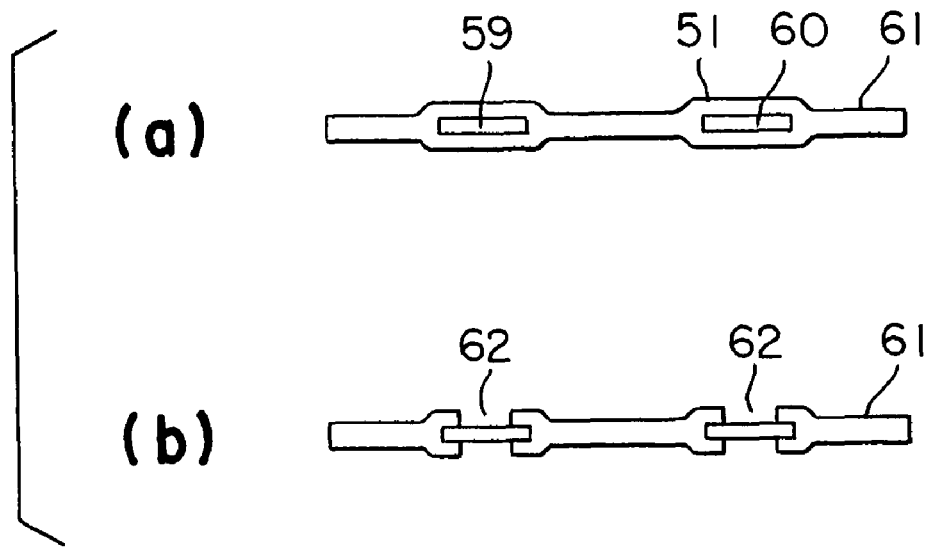
Figure 43:
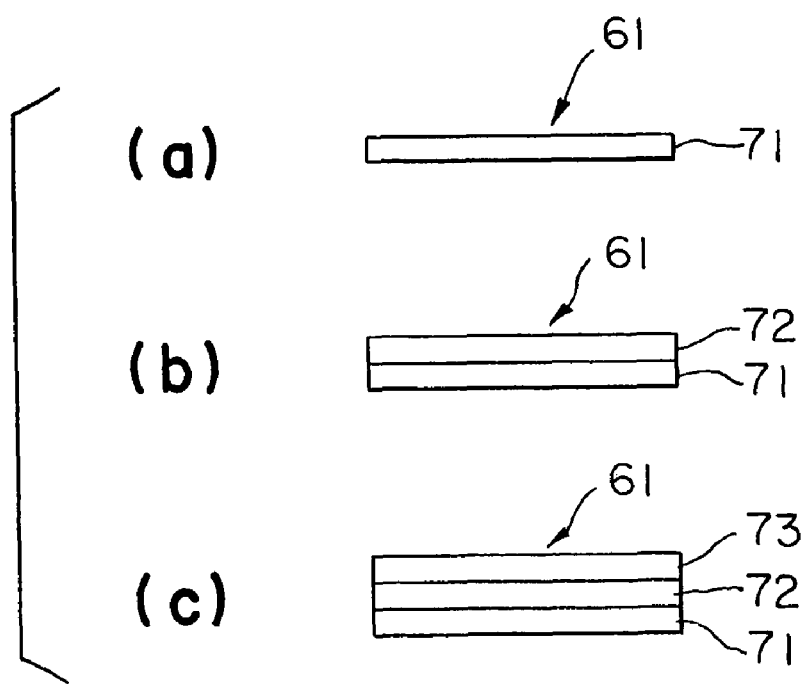
Figure 44:
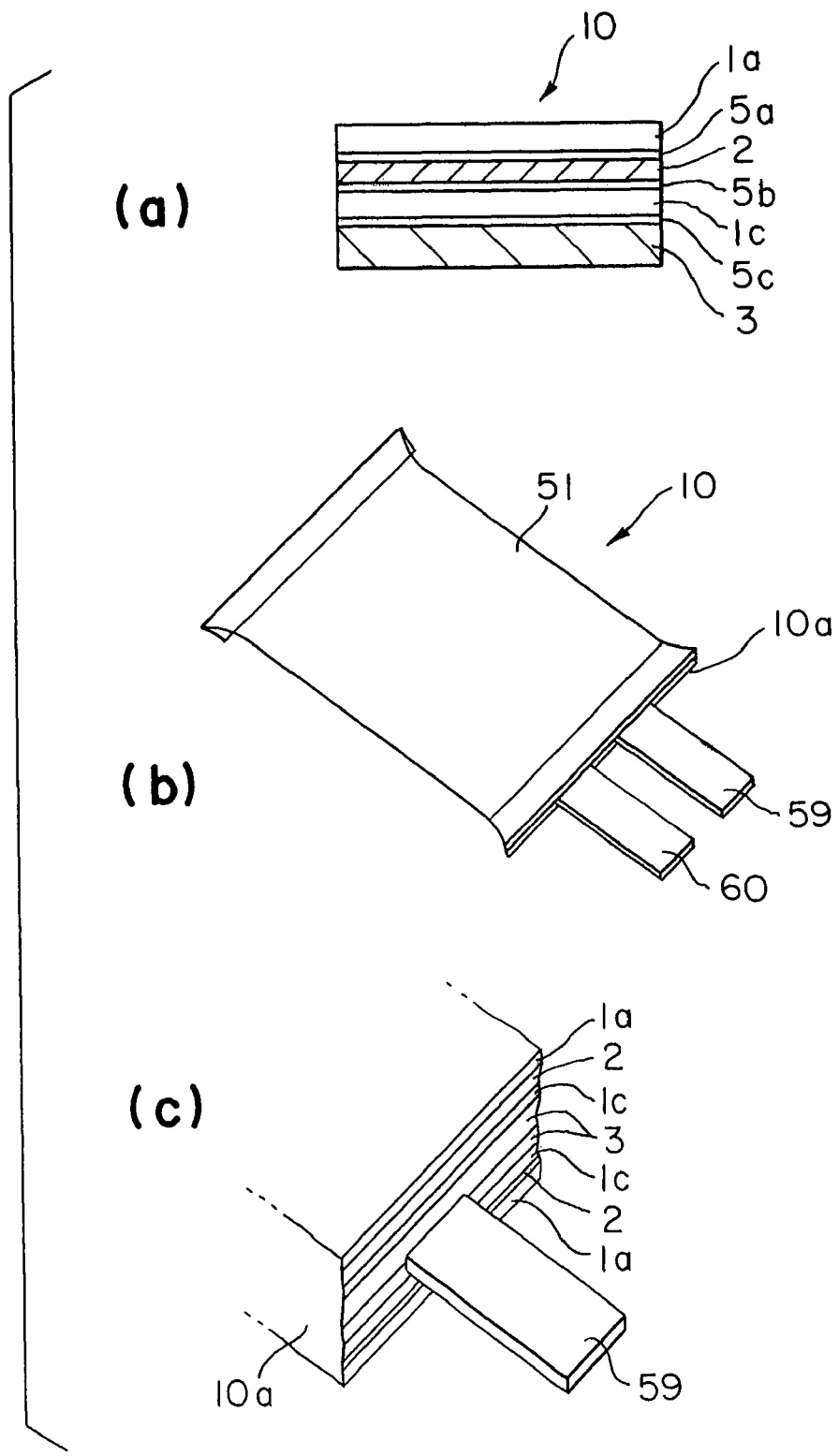
Figure 45:
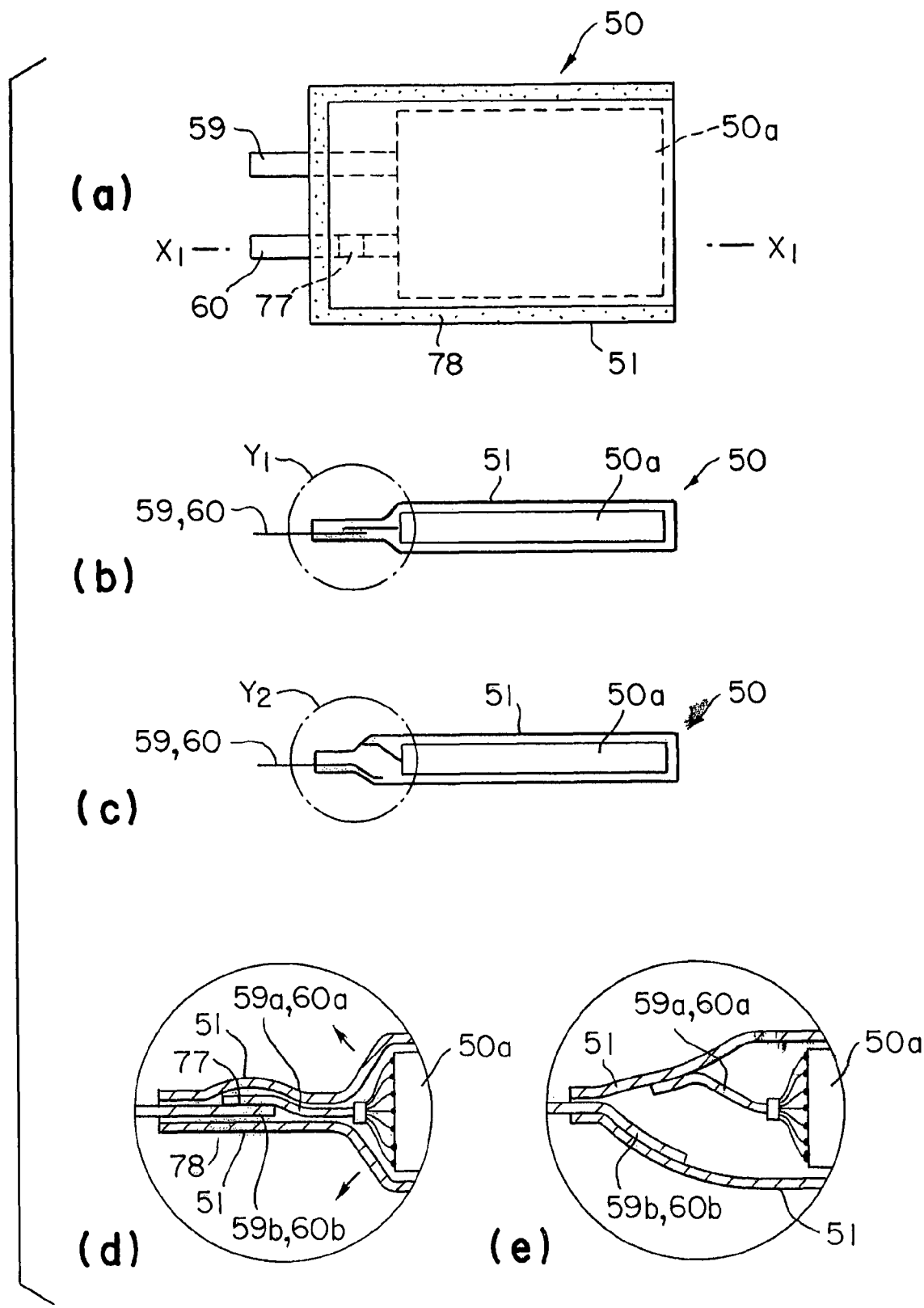

As shown in FIGS. 41 and 42, in the electrode structure of the battery case 51 of the polymer battery packet 50, the openings 62 of the electrode protecting film 61 (the contact parts of the tabs 59 and 60) are formed at positions near the extremities of the tabs 59 and 60, and parts of the tabs 59 and 60 near the end edge 10a of the battery case 51 are covered with the insulating electrode protecting film 61. Therefore, there is no possibility of troubles due to short-circuiting at all.

In the electrode structure of the battery case 51 covered with the electrode protecting film 61, the tabs 59 and 60 are not short-circuited even if the tabs 59 and 60 are bent, the electrodes are difficult to bend, and the tabs 59 and 60 are reinforced.

The electrodes are never short-circuited by the metal foil of the laminated sheet forming the battery case, and the stable functioning of the case and the electrodes can be ensured.

Since the electrodes are covered with the insulating sheet, the rigidity of the terminal part extending from the end edge of the battery case is enhanced, the terminals are never bent while the battery is used, and the stability of the terminals are improved.

Eleventh Embodiment

An eleventh embodiment according to the present invention will be described with reference to FIGS. 45 to 48, in which parts like or corresponding to those of the first embodiment are designated by the same reference characters and the description thereof will be omitted.

The construction and functions when a gas is produced of a battery in accordance with the present invention will be described with reference to the accompanying drawings.

FIG. 45(a) is a top view of a polymer battery packet in the eleventh embodiment, FIG. 45(b) is a sectional view taken on line $X_1$-$X_1$ in FIG. 45(a) in a state where the polymer battery packet is tuned on, FIG. 45(c) is a sectional view taken on line $X_1$-$X_1$ in FIG. 45(a) in a state where the polymer battery packet is tuned off, FIG. 45(d) is an enlarged view of a part $Y_1$ in FIG. 45(b), and FIG. 45(e) is an enlarge view of a part $Y_2$ in FIG. 45(c). FIG. 46(a) is a perspective view of a pressing device in accordance with the present invention employing a plate spring, FIG. 46(b) is a perspective view of a pressing device in accordance with the present invention employing a coil spring, FIG. 46(c) is a sectional view taken on line $X_2$-$X_2$ in FIG. 46(a), and FIG. 46(d) is a sectional view taken on line $X_3$-$X_3$ in FIG. 46(b). FIG. 47 is a schematic sectional view of a pressing device in accordance with the present invention mounted on a device to be powered by a polymer battery packet, and FIG. 48 is a typical sectional view of a laminated sheet for forming a battery case for a polymer battery packet in accordance with the present invention.

The present invention incorporates a mechanism for turning off the battery of the polymer battery packet when a gas is produced in the battery case of the polymer battery packet without changing the basic construction of the polymer battery packet.

A laminated film for forming the battery case of the polymer battery packet has various kinds of strength and resistance, barrier property not permitting moisture and gases to pass through and heat-sealability. One or each of both of tabs has a first part extending from the battery to a middle position between the battery and the sealed end of the battery case, and a second part extending from the middle position through the sealed end of the battery case outside the battery case, and the corresponding end parts of the first and the second part of the tab overlap each other so as to be electrically connected to form an overlap contact part.

Referring to FIGS. 45(a) and 45(b) showing the polymer battery packet in the eleventh embodiment according to the present invention, a battery case 51 has the shape of a pouch having four sealed side parts, and a battery 50a is sealed in the battery case 51. Tabs 59 and 60 extend from the battery 50a through a sealed end 78 of the battery case 51. The tab 59 has a first part 59a extending between the battery 50a and a position slightly beyond a middle position between the battery 50a and the sealed part 78, and a second part 59b extending from a position slightly behind the middle position through the sealed part 78 outside the battery case 51 so that corresponding end parts of the first part 59a and the second part 59b overlap each other to form an overlap contact part 77. The tab 60 has a first part 60a extending between the battery 50a and a position slightly beyond a middle position between the battery 50a and the sealed part 78, and a second part 60b extending from a position slightly behind the middle position through the sealed part 78 outside the battery case 51 so that corresponding end parts of the first part 60a and the second part 60b overlap each other to form an overlap contact part 77.

The battery 50a is able to supply power when the tabs 59 and 60 are in a state shown in FIG. 45(b).

The polymer battery packet 50 is fabricated by assembling the component materials of the battery including an electrolyte, an electrolyte support impregnated with the electrolyte, a positive electrode, a negative electrode and tabs in the battery case 51, evacuating the battery case 51, and hermetically sealing the battery case 51. In the normal state, the overlap contact part 77 remains connected because the battery case 51 is compressed by the atmospheric pressure as shown in FIG. 45(b) or 45(d), and the first part 59a (60a) of the tab 59 (60) and the second part 59b (60b) of the same are kept in contact with each other.

If a gas is produced in the battery case 51 of the polymer battery packet 50, the pressure in the battery case 51 increases and a part of the battery case 51 around the overlap contact part 77 is expanded as indicated by the arrows in FIG. 45(d), and the same part of the battery case 51 is expanded further to a state shown in FIG. 45(e) as the pressure in the battery case 51 further increases. Consequently, the first part 59a (60a) and the second part 59b (60b) of the tab 59 (60) are disconnected from each other, the overlap contact part 77 becomes disconnected and, consequently, the polymer battery packet 50 is turned off. As is obvious from FIG. 45(e), the overlap contact part 77 can more surely be disconnected if the tabs 59 (60) is attached adhesively to the inner surfaces of the battery case 51.

If the first part, 59a (60a) is attached to the lower wall of the battery case 51 and the second part 59b (60b) is attached to the upper wall of the battery case 51, the overlap contact part 77 can more surely be disconnected when a gas is produced in the battery case 51.

The polymer battery packet 50 in accordance with the present invention may be contained in an outer battery case 51a of a hard material in view of facility in handling and protection from external pressure. When the polymer battery packet 50 is contained in such an outer battery case 51a of a hard material, a pressing device may be disposed in the outer battery case 51a to press the overlap contact part with reliability.

The pressing device may press the overlap contact part 77 by any suitable method, provided that the pressing device allows the overlap contact part 77 to become disconnected to interrupt a current when a gas is produced in the polymer battery packet 50 and the pressure in the battery case of the polymer battery packet 50 increases.

For example, the pressing device may be provided with a plate spring 76P disposed inside the outer battery case 51a as shown in FIG. 46(a) or may be provided with a coil sprig 76S disposed inside the outer battery case 51a as shown in FIG. 46(b).

Figure 46:
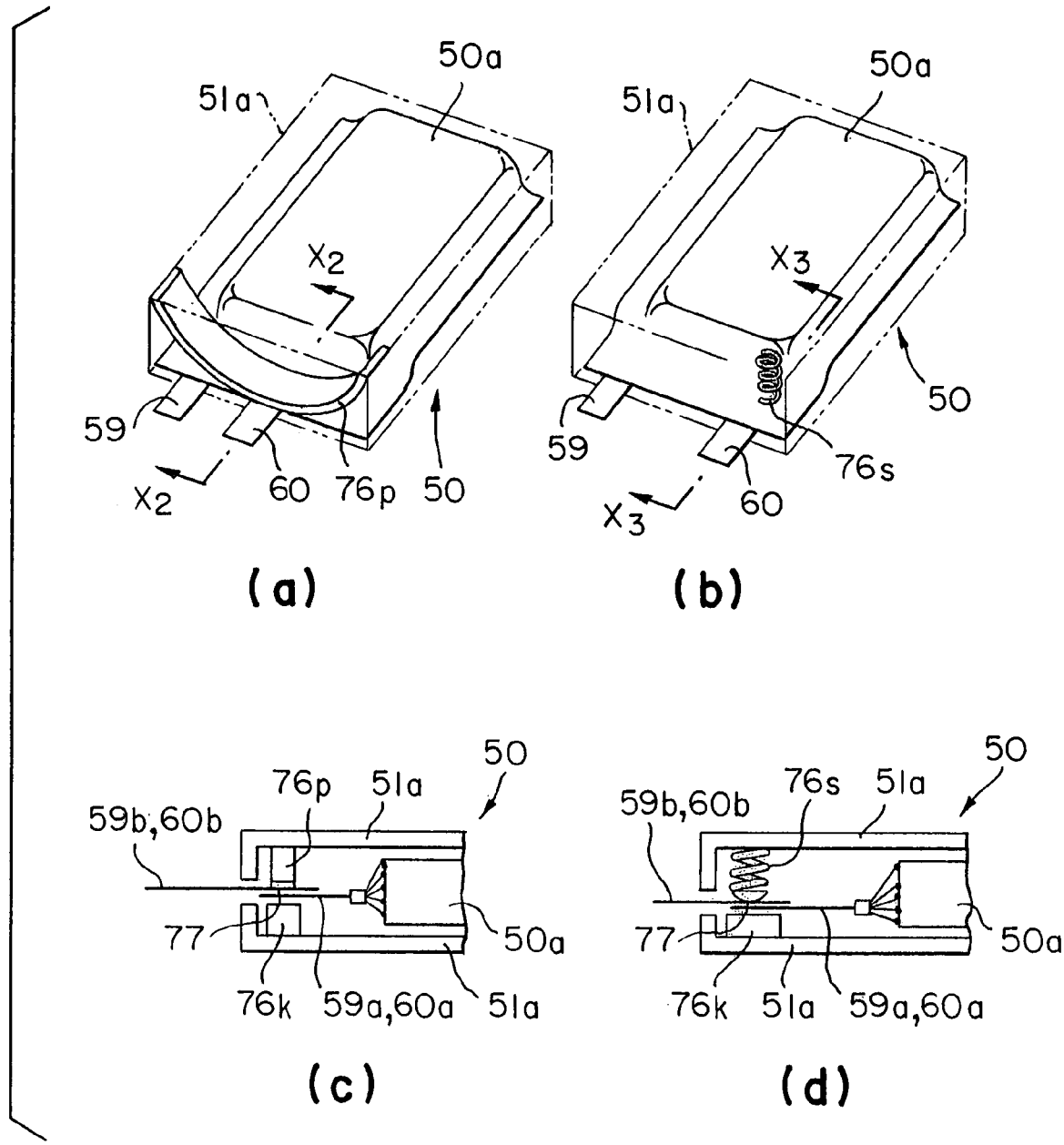

Although the pressing devices shown in FIG. 46 are typical ones employing a spring, there is not any restrictions on materials and construction of the pressing devices, provided that the pressing devices can be caused to release pressure from the overlap contact part by the pressure of the gas.

For example, the overlap contact part 77 may be pressed by an elastic member, not shown, set in a height so as to exert a compressive force on the lid of the outer battery case 51a at a position for depressing the overlap contact part 77.

Although the pressing device is attached to the inner surface of the outer battery case 51a in the polymer battery packet 50 in accordance with the present invention, the pressing device may be disposed in the battery chamber of a device 79 to be powered by the polymer battery packet 50.

As mentioned above, the battery case 51 in accordance with the present invention is formed of a flexible laminated sheet formed by laminating materials having properties capable of providing the battery case 51 with required functions. The laminated sheet is shaped in a pouch, the battery is placed in the pouch and the pouch is sealed to complete the polymer battery packet 50.

Basically, the laminated sheet comprises a first base film layer 1a, a metal foil layer 2, a third base film layer 1c and the heat-adhesive resin layer 3 as shown in FIG. 48.

Materials for forming the polymer battery packet 50 in accordance with the present invention and the construction of the laminated sheet forming the battery case 51 will be described hereinafter. In most cases the tabs 59 and 60 of the electrode structure in accordance with the present invention are metal foils, such as aluminum foils or copper foils, and the battery case 51 is formed of a flexible laminated sheet.

The battery case 51 containing the polymer battery 50a is formed of a laminated sheet impermeable to moisture and corrosive gases and capable of protecting the polymer battery 50a from damage that may be caused by piecing and abrasion and the like during transportation and use.

A laminated sheet 10 formed in the construction as shown in FIG. 48 may be used.

(Outer Side) Outermost Layer/Barrier Layer/Reinforcing Layer/Sealant layer (Inner Side)

These layers can be laminated by dry lamination or sandwich lamination.

Preferably, the thickness of the laminated sheet 10 is in the range of 50 to 400 µm. A laminated sheet of a thickness below 50 µm is inferior in impermeability to moisture and strength, and may possibly permit moisture to pass through into the electrolyte. A laminated sheet of a thickness exceeding 400 µm has inferior heat-sealability, increases the weight of the battery and case does not conform to a basic idea of providing a polymer battery packet of the least possible weight. The effect of a laminated sheet of a thickness exceeding 400 µm in not permitting moisture and gases to pass through cannot be expected to be as great as its thickness. Materials of the layers of the laminated sheet are selectively determined according to desired physical properties of the laminated sheet. The following is an example of the materials and the construction of the laminated sheet.

(Outer side) PET/AL/PET (or Ny)/EMAA (Inner side) where PET is a polyethylene terephthalate resin, AL is aluminum (foil), Ny is a nylon resin, and EMAA is an ethylene-methacrylic acid copolymer.

The outermost layer (first base film layer) $1a$ is the outer surface layer of a battery case. Therefore, the outermost layer $1a$ must be electrically nonconductive, must have a smooth surface, must be sufficiently resistant to chemicals and abrasion, must have sufficiently high tensile and piercing strength, and must be capable of protecting a device from external, detrimental, destructive, physical and chemical actions. Biaxially oriented films of resins, particularly, biaxially oriented films of PET resins are preferable materials for forming the outermost layer $1a$. A desirable thickness of the outermost layer $1a$ is in the range of 5 to 30 µm. If the thickness of the outermost layer $1a$ is below 5 µm, the piercing strength of the outermost layer $1a$ is insufficient and it is highly possible that pinholes are formed in the outermost layer $1a$. If the thickness of the outermost layer $1a$ is above 30 µm, the outermost layer $1a$ will adversely affect the heat-sealability of the laminated sheet and will reduce production efficiency.

It is preferable to form the barrier layer (metal foil layer) $2$ contiguously with the outermost layer $1a$. The barrier layer $2$ has barrier property to prevent moisture and gases from permeating the battery case. It is desirable to use a metal foil, such as an aluminum foil, as the barrier layer $2$. Desirably, an aluminum foil for forming the barrier layer $2$ has a thickness in the range of 5 to 30 µm. Aluminum foils of a thickness below 5 µm has many pinholes and are inferior in barrier property. Aluminum foils of a thickness above 30 µm affect adversely to the production of the battery case. When a battery case is formed of a laminated sheet provided with a metal foil, such as an aluminum foil, it is possible that tabs T are short-circuited by an exposed edge of the conductive metal foil. Although troubles including short circuit can be avoided if the barrier layer $2$ is formed of a nonconductive material, the use of such a material inevitably entails reduction in the barrier property of the laminated sheet.

It is preferable to form the reinforcing layer (third base film layer) $1c$ on the inner surface of the barrier layer $2$ to reinforce the strength of a battery case $51$ formed by processing the laminated sheet. It is particularly desirable to reinforce a battery case against the damaging actions of sharp projections. The reinforcing layer $1c$ may be a biaxially oriented resin film, preferably, a biaxially oriented polyethylene terephthalate or nylon film. Desirably, the reinforcing layer $1c$ has a thickness in the range of 5 to 30 µm. The reinforcing layer $1c$ is inferior in resistance to the piercing action of a battery $50a$ contained in the battery case, pinholes are liable to be formed in the reinforcing layer $1c$ if its thickness is below 5 µm. The reinforcing layer $1c$ will adversely affect the sealability of the laminated sheet if its thickness is above 30 µm.

The innermost layer of the laminated sheet $10$ forming the battery case $51$ is a heat-adhesive resin layer $3$. Necessary parts of the heat-adhesive resin layer $3$ are bonded together by heat-sealing when forming the battery case $51$. As mentioned above, it is desirable, in view of facility in operation and sealing capability, to form the battery case by processing the laminated sheet by a heat-sealing method. When the battery case $51$ is formed by a heat-sealing method, the heat-adhesive resin layer $3$ is formed of a heat-adhesive material. The heat-adhesive material must be heat-adhesive to itself and to the metal foils forming the tabs T. Desirable materials for forming the heat-adhesive layer $3$ are polyolefin copolymers including ethylene-acrylic acid resins (EAA), ethylene-methacrylic acid resins (EMAA), ethylene-ethylacrylate resins (EEA) and ionomers.

The heat-adhesive resin layer $3$ may be formed either by laminating a film of one of the foregoing resins to the reinforcing layer $1c$ or by melting and extruding one of the foregoing resins over the surface of the reinforcing layer $1c$ by an extruder. Desirably, the thickness of the heat-adhesive resin layer $3$ is in the range of 10 to 100 µm. If the thickness of the heat-adhesive resin layer $3$ is below 10 µm, the piercing strength of the heat-adhesive resin layer $3$ is insufficient and it is highly possible that pinholes are formed in the heat-adhesive resin layer $3$. If the thickness of the heat-adhesive resin layer $3$ is greater than 100 µm, a heat-sealing operation for forming the battery case $51$ takes much time and reduces production efficiency.

As mentioned above, the outermost layer $1a$, the barrier layer $2$, the reinforcing layer $1c$ and the heat-adhesive resin layer $3$ may be laminated by dry lamination using a polyurethane adhesive or by sandwich lamination in which adhesive resin are extruded between the adjacent layers.

The hard outer battery case $51a$ containing the polymer battery packet $50$ in accordance with the present invention is made of a hard material, usually a hard plastic material, in a flat shape by an injection molding method. Suitable plastic materials for forming the hard outer battery case $51a$ are polyethylene resins, polypropylene resins, polyester resins, polyamide resins, polycarbonate resins, polystyrene resins, acrylonitrile butadiene styrene resins and polyurethane resins.

As is apparent from the foregoing description, according to the present invention, the polymer battery packet can be turned off without breaking the battery case $51$ and hence the contents will not be scattered.

The operating pressure of the pressing device can optionally be determined by using the spring capable of being moved so as to remove pressure from the overlap contact part when the pressure in the battery case rises, the polymer battery packet has a simple construction and can efficiently be produced.

Whereas the principal object of a conventional safety means for a polymer battery packet is gas purging, the battery case of the polymer battery packet in accordance with the present invention does not permit a gas produced therein to leak.

EXAMPLES

A trial thin polymer battery packet having the following battery case and tab structure was fabricated and the performance of the same was evaluated.

Polymer Battery Packet

Battery case: A pouch of 60 mm×95 mm in external size with three sealed sides

Overlap contact part: Positive tab of 5 mm in width with an overlap contact part of 5 mm in length Laminated sheet forming the battery case:

PET (12 μm thick)/AL (15 μm thick)/DL/ON (15 μm thick)/Acid-denatured polyolefin[*1] (40 μm thick) *1: ADOMA NF0060 commercially available from Mitsui Sekiyu Kagaku Kogyo K.K.)

Note: ON: Biaxially oriented nylon film

*1: ADOMA NF0060 commercially available from Mitsui Sekiyu Kagaku Kogyo K.K.)

The tabs were attached by point heat-sealing similar to spot welding to the inner surface of the battery case.

The battery case was sealed by a vacuum packaging machine. A rubber valve to blow air into the battery case of the polymer battery packet was attached to the battery case. The polymer battery packet was loaded into a device. The supply of power was interrupted when air was blown through the rubber valve into the battery case while power was being supplied from the polymer battery packet.

The polymer battery packet was contained in an outer case made of an ABS resin, and the overlap contact part was pressed by a disk of 3 mm$^2$ in area.

The polymer battery packet contained in the outer case was loaded into the device. The supply of power was interrupted when air was blown into the battery case while power was being supplied from the polymer battery packet.

The polymer battery packet in accordance with the present invention can be tuned off without breaking the battery case when a gas is produced in the battery case. Therefore, the contents of the battery case will not be scattered.

Since the supply of power is interrupted by the action of the spring capable of being moved by the pressure in the battery case, the operating pressure of the pressing device can optionally be determined without taking into consideration temperature and contents.

The strength of the pouch need not be reduced and the pressing device is able to operate stably at a very low pressure.

Twelfth Embodiment

A twelfth embodiment according to the present invention will be described with reference to FIGS. 49 to 54, in which parts like or corresponding to those of the first embodiment are designated by the same reference characters and the description thereof will be omitted.

Figure 50:
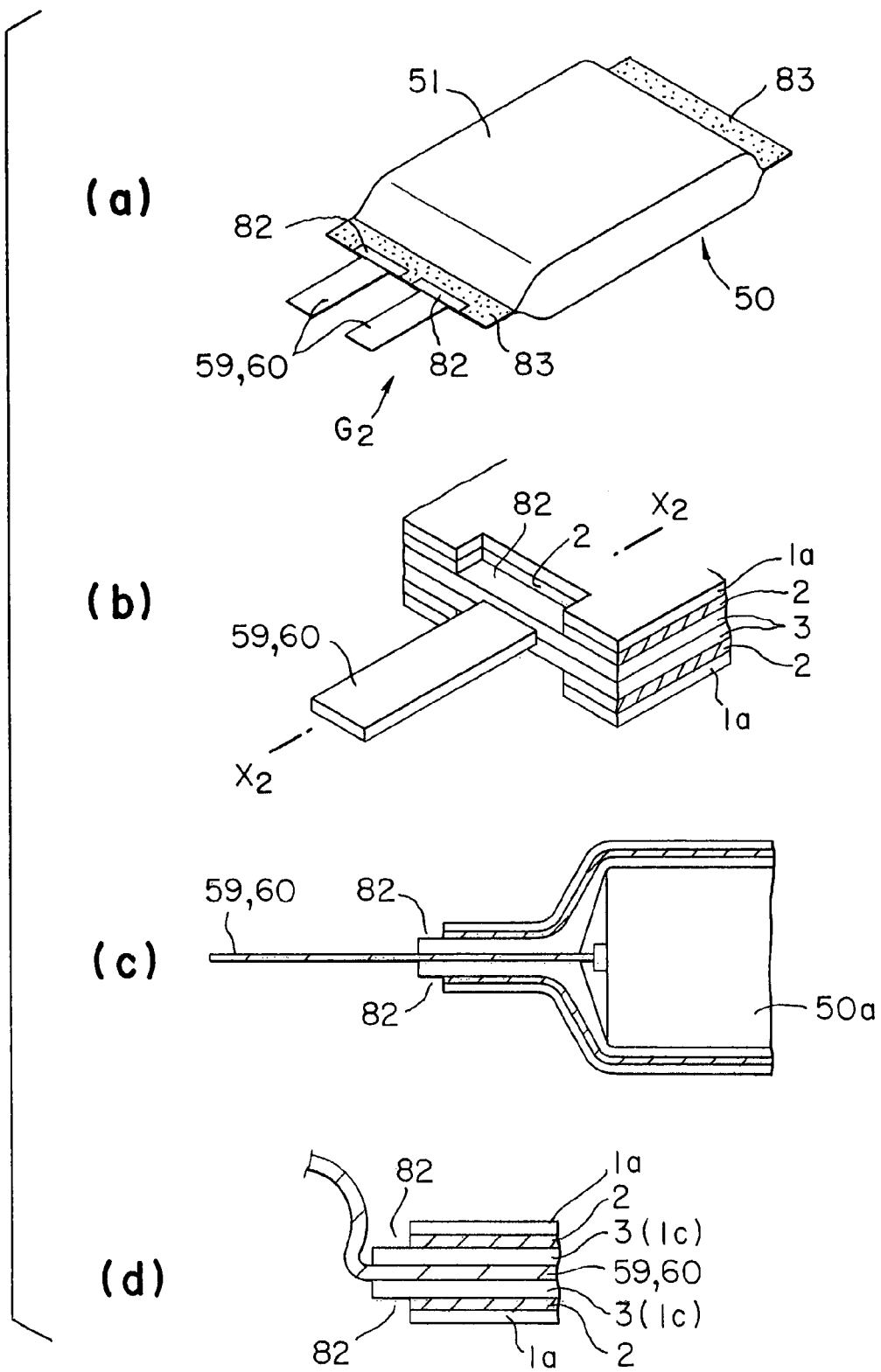
Figure 51:
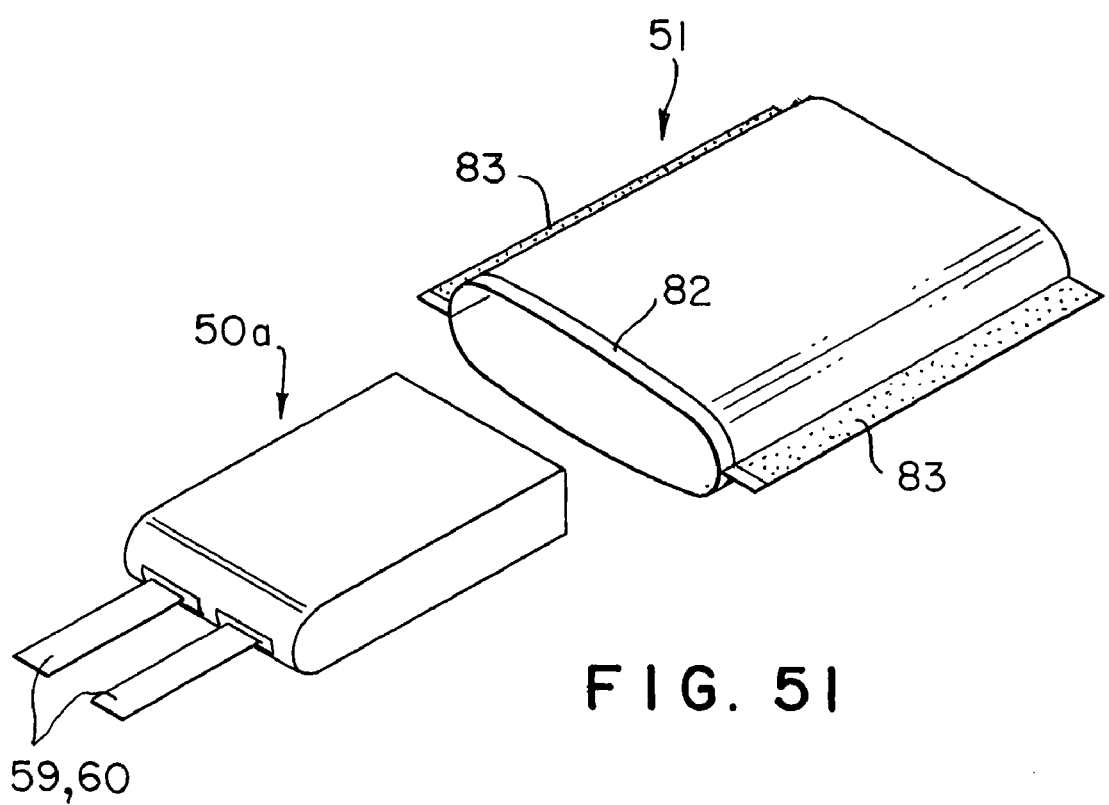
Figure 54:
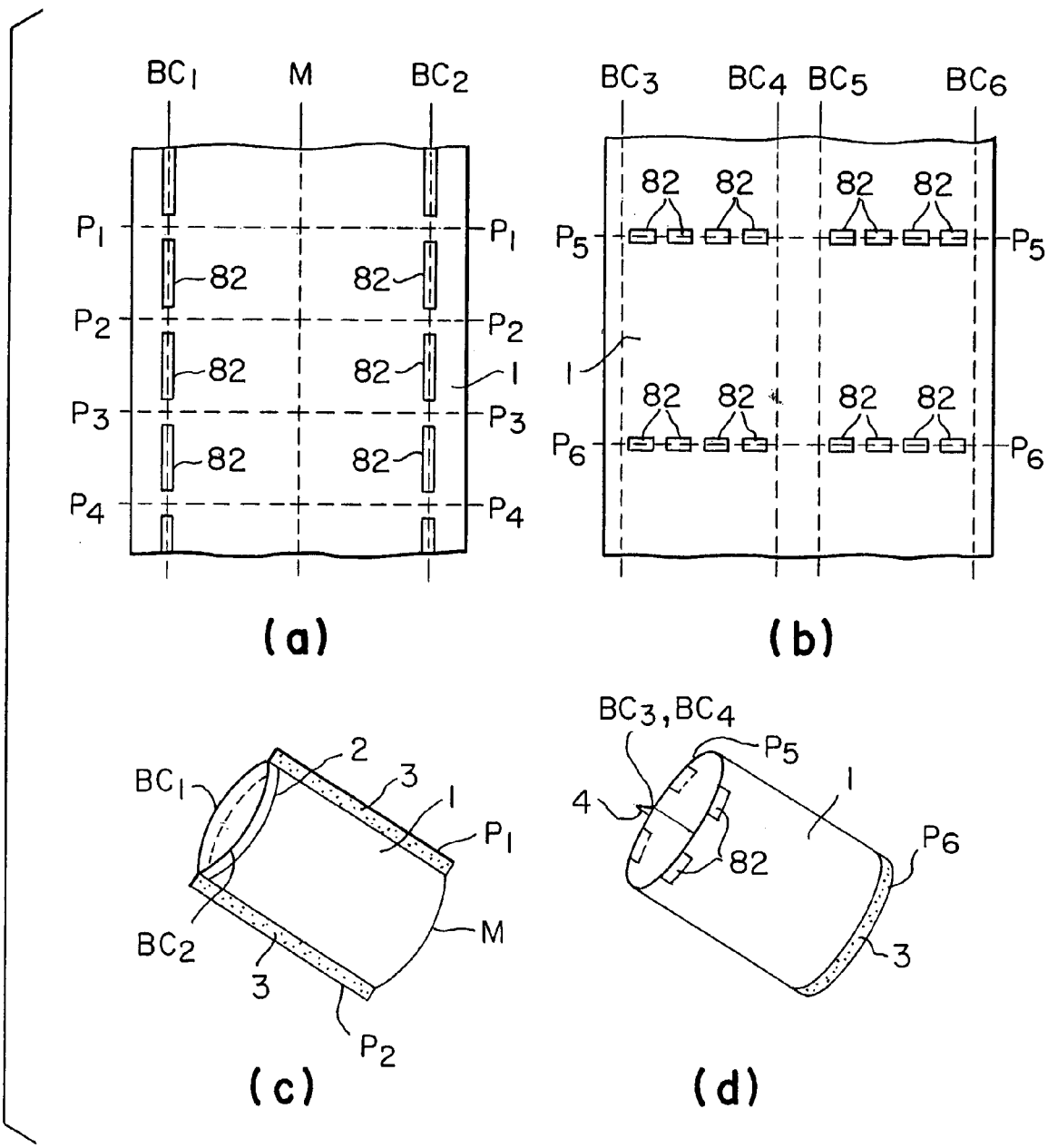

FIG. 49(*a*) is a perspective view of a battery packet in accordance with the present invention provided with tabs, FIG. 49(*b*) is an enlarged view of a part G, in FIG. 49(*a*), FIG. 49(*c*) is an enlarged sectional view taken on line $X_1$-$X_1$ in FIG. 49(*b*) and FIG. 49(*d*) is a fragmentary, typical sectional view showing bent tabs. FIG. 50(*a*) is a perspective view of another battery packet in accordance with the present invention provided with tabs, FIG. 50(*b*) is an enlarged view of a part $G_2$ in FIG. 50(*a*), FIG. 50(*c*) is an enlarged sectional view taken on line $X_2$-$X_2$ in FIG. 50(*b*) and FIG. 50(*d*) is a fragmentary, typical sectional view showing bent tabs. FIG. 51 is a perspective view of assistance in explaining a procedure for putting a battery in accordance with the present invention in a battery case. FIGS. 52(*a*), 52(*b*) and 52(*c*) are plan views of battery cases in accordance with the present invention, and FIGS. 52(*d*), 52(*e*) and 52(*f*) are sectional views of the battery cases shown in FIGS. 52(*a*), 52(*b*) and 52(*c*), respectively. FIG. 53 is a typical sectional view of a laminated sheet in accordance with the present invention for forming a battery case. FIGS. 54(*a*) and 54(*b*) are plan views of webs of laminated sheets unwound from rolls, respectively, and FIGS. 54(*c*) and 54(*d*) are perspective views of empty battery cases.

A laminated sheet 10 in accordance with the present invention includes a conductive layer (metal foil layer) 2. Flexible tabs 59 and 60 extending from a battery contained in a flexible battery case 51 project from the battery case 51.

The laminated sheet 10 has a construction as shown in FIG. 53. In the following description, it is assumed that the laminated sheet 10 has the construction shown in FIG. 53.

(Outer Side) Outermost Layer/Barrier Layer/Reinforcing Layer/Heat-Adhesive Resin Layer (Inner Side)

A metal foil, such as an aluminum foil, is used as the barrier layer 2 to intercept the passage of moisture and gases through the laminated sheet 10.

The laminated sheet 10 can be formed by laminating the component layers by dry lamination or sandwich lamination.

Generally, the battery case 51 is formed by processing the laminated sheet 10, which will be described in detail later, by a heat-sealing method used for forming bags.

The battery case 51 in accordance with the present invention for containing a battery 50*a* is formed in the shape of a pouch having side heat-sealed parts 83 or a back heat-sealed part 84, such as a pouch having three sealed side parts as shown in FIGS. 52(*a*) and 52(*d*), a pouch having four sealed side parts as shown in FIG. 42(*b*) and 52(*e*) or a pillow type pouch as shown in FIGS. 52(*c*) and 52(*f*).

The battery case in accordance with the present invention may be any one of those pouches.

FIGS. 52(*d*), 52(*e*) and 52(*f*) are sectional views taken on line $X_3$-$X_3$ in FIG. 52(*a*), on line $X_4$-$X_4$ in FIG. 52(*b*) and on line $X_5$-$X_5$ in FIG. 52(*c*), respectively.

It was found through studies made to find measures capable of avoiding contact between an edge of the conductive layer 2 exposed in an end surface of the battery case, and the bent tabs T that any troubles attributable to the above-mentioned short circuit never occur when the edges of the conductive layer 2 are recessed behind the end edge of the laminated sheet forming the battery case 51 from which the tabs 59 and 60 project outside (hereinafter referred to "edge recession"). The edges of the conductive layer 2 may wholly be recessed or only portions of the edges of the conductive layer 2 corresponding to the tabs 59 and 60 may be recessed.

The battery case having such edge recession may be formed by any suitable method. The following is an example of a method of forming the battery case. The outermost layer (generally, a biaxially oriented plastic film) is printed, and the barrier layer (metal foil) is laminated to the printed outermost layer by a predetermined method. A web of the plastic film for forming the outermost layer and a web of the metal foil for forming the barrier layer are supplied from a roll of the film and a roll of the metal foil, respectively, the web of the plastic film and the web of the metal foil are laminated in a web of a primary laminated sheet, and the web of the primary laminated sheet is taken up in a roll.

The roll of the primary laminated sheet is punched by a rotary die cutter in a predetermined shape and a predetermined size to form cuts (edge recessions) 82 as shown in FIG. 54(*a*) or 54(*b*), and the web of the punched primary laminated sheet is taken up in a roll.

When it is desired to form an edge recession along the entire length of the edge, the cuts 82 are formed so as to extend in the moving direction of the web of the primary laminated sheet as shown in FIG. 54(*a*) and, therefore, there is no possibility that the web of the primary laminated sheet is broken.

When it is desired to form edge recessions only in portions of the edge corresponding to the tabs, the cuts 82 are formed so as to extend across the moving direction of the web of the primary laminated sheet as shown in FIG. 54(*b*).

Subsequently, the web of the primary laminated sheet provided with the cuts 82 is unwound from the roll, and then the reinforcing layer 1c and the heat-adhesive resin layer 3 are laminated in that order to the barrier layer 2 to complete a laminated sheet.

The cuts 82 are formed by die cutting in a shape and a size suitable for forming the edge recessions.

The laminated sheet shown in FIG. 54(*a*) has sections for forming battery cases having three sealed sides arranged in a single longitudinal row. Each section of the laminated sheet shown in FIG. 54(*a*) is folded along a folding line M to form a battery case having three sealed sides. The laminated sheet shown in FIG. 54(*b*) has sections for forming pillow type battery cases arranged in two longitudinal rows, i.e., one rows demarcated by cutting lines BC3 and BC4, and the other row demarcated by cutting lines BC5 and BC6.

As shown in FIG. 49(*b*) or 50(*b*), the laminated sheet thus formed has parts formed by removing parts of the outermost layer and the barrier layer, and a battery case provided with edge recessions at positions corresponding to the tabs 59 and 60 can be formed by processing the laminated sheet.

The shape of the edge recessions when the battery case 51 is formed by processing the laminated sheet is dependent on the shape of the cuts 82. An edge recession can be formed along the entire length of edge or edge recessions can be formed only in portions of the edge corresponding to the tabs 59 and 60.

Thus, there is no possibility for the battery case to short-circuit the tabs 59 and 60 by the conductive layer 2 of the laminated sheet 10.

Even if the tabs 59 and 60 are bent as shown in FIG. 49(*d*) or 50(*d*) while the battery packet is in use, it is scarcely possible that the tabs 59 and 60 come into contact with the recessed edge of the barrier layer 2.

Materials for the laminated sheet for forming the battery case and the construction of the laminated sheet will be described hereinafter.

In most cases, the tabs 59 and 60 are formed of a metal foil, such as an aluminum foil or a copper foil. As mentioned above, the tabs 59 and 60 are flexible and easy to bend. The battery case 51 of the polymer battery packet 50 is formed by processing the flexible laminated sheet provided with a conductive layer.

The battery case 51 containing the battery 50*a* is formed of a laminated sheet 10 impermeable to moisture and corrosive gases and capable of protecting the battery 50*a* from damage that may be caused by piecing and abrasion and the like during transportation and use.

A laminated sheet 10 formed in the construction as shown in FIG. 53 may be used.

(Outer Side) Outermost Layer/Barrier Layer/Reinforcing Layer/Heat-Adhesive Resin Layer (Inner Side)

These layers can be laminated by dry lamination or sandwich lamination.

Preferably, the thickness of the laminated sheet 10 is in the range of 50 to 400 μm. A laminated sheet of a thickness below 50 μm is inferior in impermeability to moisture and strength, and may possibly permit moisture to pass through into the electrolyte. A laminated sheet of a thickness exceeding 400 μm has inferior heat-sealability, increases the weight of the battery case and does not conform to a basic idea of providing a polymer battery packet of the least possible weight. The effect of a laminated sheet of a thickness exceeding 400 μm in not permitting moisture and gases to pass through cannot be expected to be as great as its thickness.

Materials of the layers of the laminated sheet are selectively determined according to desired physical properties of the laminated sheet. The following is an example of the materials and the construction of the laminated sheet.

(Outer side) PET/AL/PET (or Ny)/EMAA (Inner side) where PET is a polyethylene terephthalate resin, AL is aluminum (foil), Ny is a nylon resin, and EMAA is an ethylene-methacrylic acid copolymer.

The outermost layer (first base film layer) 1*a* is the outer surface layer of a battery case. Therefore, the outermost layer 1*a* must be electrically nonconductive, must have a smooth surface, must be sufficiently resistant to chemicals and abrasion, must have sufficiently high tensile and piercing strength, and must be capable of protecting a device from external, detrimental, destructive, physical and chemical actions. Biaxially oriented films of resins, particularly, biaxially oriented films of PET resins are preferable materials for forming the outermost layer 1*a*. A desirable thickness of the outermost layer 1*a* is in the range of 5 to 30 μm. If the thickness of the outermost layer 1*a* is below 5 μm, the piercing strength of the outermost layer 1*a* is insufficient and it is highly possible that pinholes are formed in the outermost layer 1*a*. If the thickness of the outermost layer 1*a* is above 30 μm, the outermost layer 1*a* will adversely affect the heat-sealability of the laminated sheet and will reduce production efficiency.

It is preferable to form the barrier layer (metal foil layer) 2 contiguously with the outermost layer 1*a*. The barrier layer 2 has barrier property to prevent moisture and gases from permeating the battery case. It is desirable to use a metal foil, such as an aluminum foil, as the barrier layer 2. Desirably, an aluminum foil for forming the barrier layer 2 has a thickness in the range of 5 to 30 μm. Aluminum foils of a thickness below 5 μm has many pinholes and are inferior in barrier property. Aluminum foils of a thickness above 30 μm affect adversely to the production of the battery case. When a battery case is formed of a laminated sheet provided with a metal foil, such as an aluminum foil, it is possible that tabs 59 and 60 are short-circuited by an exposed edge of the conductive metal foil. Although troubles including short circuit can be avoided if the barrier layer 2 is formed of a nonconductive material, the use of such a material inevitably entails reduction in the barrier property of the laminated sheet.

It is preferable to form the reinforcing layer (third base film layer) 1*c* on the inner surface of the barrier layer 2 to reinforce the strength of a battery case 51 formed by processing the laminated sheet. It is particularly desirable to reinforce a battery case against the damaging actions of sharp projections. The reinforcing layer 1*c* may be a biaxially oriented resin film, preferably, a biaxially oriented polyethylene terephthalate or nylon film. Desirably, the reinforcing layer 1*c* has a thickness in the range of 5 to 30 μm. The reinforcing layer 1*c* is inferior in resistance to the piercing action of a battery 50*a* contained in the battery case, pinholes are liable to be formed in the reinforcing layer 1*c* if its thickness is below 5 μm. The reinforcing layer 1*c* will adversely affect the sealability of the laminated sheet if its thickness is above 30 μm.

The innermost layer of the laminated sheet 10 forming the battery case 51 is a heat-adhesive resin layer 3. Necessary parts of the heat-adhesive resin layer 3 are bonded together by heat-sealing when forming the battery case 51. As mentioned above, it is desirable, in view of facility in operation and sealing capability, to form the battery case by processing the laminated sheet by a heat-sealing method. When the battery case 51 is formed by a heat-sealing method, the heat-adhesive resin layer 3 is formed of a heat-adhesive material. The heat-adhesive material must be heat-adhesive to itself and to the metal foils forming the tabs 59 and 60. Desirable materials for forming the heat-adhesive layer 3 are polyolefin copolymers including ethylene-acrylic acid resins (EAA), ethylene-methacrylic acid resins (EMAA), ethylene-ethylacrylate resins (EEA) and ionomers.

The heat-adhesive resin layer 3 may be formed either by laminating a film of one of the foregoing resins to the reinforcing layer 1c or by melting and extruding one of the foregoing resins over the surface of the reinforcing layer 1c by an extruder.

Desirably, the thickness of the heat-adhesive resin layer 3 is in the range of 10 to 100 µm. If the thickness of the heat-adhesive resin layer 3 is below 10 µm, the piercing strength of the heat-adhesive resin layer 3 is insufficient and it is highly possible that pinholes are formed in the heat-adhesive resin layer 3. If the thickness of the heat-adhesive resin layer 3 is greater than 100 µm, a heat-sealing operation for forming the battery case 51 takes much time and reduces production efficiency.

As mentioned above, the outermost layer 1a, the barrier layer 2, the reinforcing layer 1c and the heat-adhesive resin layer 3 may be laminated by dry lamination using a polyurethane adhesive or by sandwich lamination in which adhesive resin are extruded between the adjacent layers.

EXAMPLES

A thin battery packet (electric device) in accordance with the present invention was fabricated.

| Tabs: | Aluminum foil (50 µm thick) |
|---|---|
| Case: | Pillow type pouch |
| Laminated sheet: | |
| Outermost layer: | Biaxially oriented polyester film (12 µm thick) |
| Barrier layer: | Aluminum foil (12 µm thick) |
| Reinforcing layer: | Biaxially oriented nylon film (20 µm thick) |
| Heat-adhesive resin layer: | Ethylene-methylacrylate (EMA) (60 µm thick) |

The outermost layer the barrier layer, the reinforcing layer and the heat-adhesive resin layer were laminated by a dry lamination method using a two-component adhesive.

| Edge recession: | (1) Entire edge, Recession of 2 mm |
|---|---|
| | (2) Parts of edge, Recession of 3 mm |
| Tabs: | 7 mm wide (Width of edge recessions: 10 mm) |

The tabs extending outside the battery case were bent for short circuit testing. There was no possibility at all that the tabs come into contact with the edge of the conductive layer of the battery case.

The battery case of the present invention capable of preventing contact between the tabs and the conductive layer is applicable for containing various electric devices.

Thirteenth Embodiment

A thirteenth embodiment according to the present invention will be described with reference to FIGS. 55 to 57, in which parts like or corresponding to those of the first embodiment are designated by the same reference characters and the description thereof will be omitted.

FIG. 55(a) is a perspective view of a battery packet in accordance with the present invention, FIG. 55(b) is an enlarged view of a part $G_1$ in FIG. 55(a), FIG. 55(c) is an enlarged sectional view taken on line $X_1$-$X_1$ in FIG. 55(b). FIG. 56 is a perspective view of assistance in explaining a procedure for putting a battery in accordance with the present invention in a case. FIGS. 57(a) and 57(b) are perspective views of tabs coated with insulating film layers in different manners, respectively.

A battery packet in accordance with the present invention comprises a battery 50a provided with flexible tabs 59 and 60 extending therefrom, and a flexible case 51 formed of a laminated sheet 10 having a conductive layer 2 and containing the battery 50a so that the tabs 59 and 60 extend through a heat-sealed part 94. The case 51 has a construction capable of preventing the tabs 59 and 60 from being short-circuited by the conductive layer 2 of the laminated sheet 10.

In most cases, the tabs 59 and 60 are formed of a metal foil, such as a copper foil and are flexible and easy to bend. The case 51 of the battery packet 50 is flexible and has a conductive layer. In a conventional battery packet 50, tabs 59 and 60 are very close to an end edge of a case 51. Therefore it is possible that the tabs 59 and 60 come into contact with an exposed edge of a conductive layer included in a laminated sheet 10 forming the case 51 when the tabs 59 and 60 are bent. If the tabs 59 and 60 come into contact with the edge of the conductive layer, the battery packet 50 does not function normally, and troubles may possibly occur. It is possible that a battery included in the battery packet is caused to discharge and to reduce electric energy stored therein and, in the worst case, the battery is exhausted and is unable to function.

The inventors of the present invention made earnest studies to solve such a problem and found that any troubles attributable to the above-mentioned short circuit never occur when each of the tabs 59 and 60 excluding a contact part 93 is coated with an insulating film layer 92 as shown in FIG. 55. More specifically, each of the tabs 59 and 60 of the battery packet of the present invention is covered with an insulating film layer 92 in a desired shape as shown in FIG. 57(a) or 57(b). Suitable materials for forming the insulating film layer 92 are hot-melt resins containing an acid-denatured polyolefin resin as a principal component, epoxy resins, polyimide resins, reactive acrylic resins and elastomers.

Short-circuiting of electrodes by a component of a case formed of a conventional laminated sheet occurs because tabs are very close to an edge of the conductive layer of the laminated sheet, and flexible and easy to bend. The present invention has been made on the basis of a finding that such a short-circuit trouble can be prevented by coating a predetermined part of each tab, including the boundary between the end edge of the case and the tab with an insulating film in a predetermined shape.

It is desirable that the insulating film 92 has an insulation resistance of $10^{13}$ Ω or above.

Various materials for forming such an insulating film were examined and it was found that suitable materials for forming such an insulating film are hot-melt acid-denatured polyolefin coating materials containing an acid-denatured polyolefin resin as a principal component, epoxy resins, polyimide resins, reactive acrylic resins and elastomers.

More specifically, hot-melt acid-denatured polyolefin coating materials are ethylene-acrylic acid resins (EAA), ethylene-methacrylic acid resins (EMAA), ethylene-ethylacrylate resins (EEA) and ionomers.

The tab can be coated with an insulating film of a hot-melt acid-denatured polyolefin coating material by a nozzle coating method, a roller coating method, a slot coating method, spray coating method, a melt-blown coating method, a wheel coating method or a screen coating method. The insulating film may be formed on the tabs after attaching the tab to the battery 50a, on a metal foil before the metal foil is punched or cut into the tabs. The insulating film may be formed by applying the hot-melt acid-denatured polyolefin resin to predetermined parts of the tabs 59 and 60 by a hot-melt applicator before putting the battery 50a into a case.

The hot-melt acid-denatured polyolefin resin may be applied to predetermined parts of a web of metal foil for forming the tabs 59 and 60 by a gravure coating method or a roller coating method, the web may be cut or punched into tabs 59 and 60 of a predetermined size, and the tabs 59 and 60 may be bonded to a principal part C.

The insulating film 92 is formed on a part of the tab 59 (60) extending on the outer and the inner side of the end edge of the case 51 from which the tab 59 (60) projects outside. Suppose that a boundary line M shown in FIG. 57 corresponds to the end edge of the case 51, the insulating film 92 is formed so as to extend in a predetermined length on each of the opposite sides of the boundary line M. The length is not less than the thickness of the laminated sheet 10 and may be a length great enough to prevent short circuit even if the tabs 59 and 60 are bent.

The insulating film 92 is formed so as to cover both the surfaces of the tabs 59 and 60. If necessary, the side surfaces of the tabs 59 and 60, as well as both the surfaces of the same, may be coated with the insulating film 62 as shown in FIG. 57(b).

The battery 50a is inserted in the case 51, and a part of the case 51 corresponding to the boundary line M shown in FIG. 57(a) or 57(b) is sealed. Preferably, the part of the case 51 is sealed by a heat-sealing method so that the sealant layer 3 serving as the innermost layer of the laminated sheet 10 forming the case 51 is bonded to the insulating films 92 partly coating the tabs 59 and 60, and parts of the tabs 59 and 60 not coated with the insulating film 92.

The insulating films 92 coating the tabs 59 and 60 may be those of a hot-melt acid-denatured polyolefin coating material, an epoxy resin, a polyimide resin, a reactive acrylic resin or an elastomer.

An epoxy resin, a polyimide resin, a reactive acrylic resin or an elastomer for forming the insulating film 92 may be applied to predetermined parts of a web of a material for forming the tabs 59 and 60 by a gravure printing method, a gravure-offset printing method, a letterpress printing method, an offset printing method or a silk-screen printing method.

The position and area of the insulating film 92 formed of an epoxy resin a polyimide resin, a reactive acrylic resin or an elastomer are the same as those of the insulating film 92 formed of a hot-melt acid-denatured polyolefin resin.

EXAMPLES

Example 1

| Device: | Flat battery packet |
|---|---|
| Case: | Pillow type pouch |
| Laminated sheet: | PET/AL/ON/LLDPE |
| Tabs: | Aluminum foil (50 μm thick) |
| Insulating film: | Acid-denatured polyolefin resin (PURIMAKORU commercially available from Dau Kemikaru Nippon K.K.) was spread in a 30 μm thick film by a hot-melt applicator. |
| Shape of insulating film: | The insulating film of 16 mm in length was formed so as to cover both the surfaces of a part of 8 mm in length of each tab extending outside the case from the end edge of the case, and both the surfaces of another part of 8 mm in length of the tab extending inside the case from the end edge of the case. |
| Coating method: | The tabs were coated with the insulating films by a hot-melt applicator after attaching the same to a main part of the device. |

The flat battery packet was subjected to a short circuit test in which the tabs extending from the end edge of the case were bent forcibly to bring the same into contact with the edge of the conductive layer exposed in the end edge of the case. Short circuit did not occur and the reliable function of the insulating films was verified.

Incidentally, a flat battery packet in a comparative example was fabricated under the same conditions as those under which the foregoing example was fabricated, excluding that tabs were not coated with any insulating films, and the flat battery packet in the comparative example was subjected to the same short circuit test. Short circuit occurred in the flat battery packet in the comparative example.

The electrode structure in accordance with the present invention eliminates the possibility of the tabs coming into contact with the conductive layer of the case. The electrode structure in accordance with the present invention is applicable to the tabs of various devices.

Fourteenth Embodiment

A fourteenth embodiment according to the present invention will be described with reference to FIGS. 58 to 60, in which parts like or corresponding to those of the first embodiment are designated by the same reference characters and the description thereof will be omitted.

A polymer battery packet in accordance with the present invention described herein is illustrative and not restrictive and many changes are possible therein without departing from the scope of the present invention.

FIG. 58(a) is a perspective view of a battery packet in accordance with the present invention, FIG. 58(b) is an enlarged view of a part $G_1$ in FIG. 58(a), FIG. 58(c) is an enlarged sectional view taken on line $X_1$-$X_1$ in FIG. 58(b). FIG. 59 is a perspective view of assistance in explaining a procedure for putting a battery in accordance with the present invention in a case.

FIGS. 60(a), 60(b) and 60(c) are perspective views of tabs coated with insulating film layers in different manners, respectively.

Referring to FIGS. 58(a), 58(b) and 58(c), a battery packet 50 has a flexible case 51 formed of a laminated sheet 10 (FIG. 53) having a conductive layer 2 formed of a conductive material, a battery 50a contained in the case 51, and flexible tabs 59 and 60, i.e., electrodes, extending from the battery 50a contained in the case 51. A part of each of the tabs 59 and 60 extending outside from a sealed end edge of the case 51 excluding a contact part 93 is covered with a heat-adhesive insulating film (insulating cover) 92 to prevent the tabs 59 and 60 from coming into contact with and being short-circuited by the conductive layer 2 of the laminated sheet 10. The case S is formed by rolling the laminated sheet 10 in a tubular structure, and heat sealing the opposite end parts of the tubular structure in end heat-sealed parts 94 and the joint of the side edge parts of the laminated sheet 10 in a back heat-sealed part 95.

In most cases, the tabs 59 and 60 of an electrode structure in accordance with the present invention are formed of a metal foil, such as a copper foil and a flexible and easy to bend. The case 51 is formed by processing the flexible laminated sheet 10 including a conductive layer 2, such as a metal foil. Parts of the tabs 59 and 60 extending outside the case 51 are very close to the conductive layer 2 of the laminated sheet 10 forming the case 51. Therefore, it is possible that the tabs 59 and 60 come into contact with an exposed edge of the conductive layer 2 of the laminated sheet 10 when the tabs 59 and 60 are bent. If the tabs 59 and 60 come into contact with the edge of the conductive layer 2, the battery packet 50 does not function normally, and troubles may possibly occur. It is possible that the battery of the battery packet 50 is caused to discharge and to reduce electric energy stored therein and, in the worst case, the battery is exhausted and is unable to function.

The inventors of the present invention made earnest studies to solve such a problem and found that any troubles attributable to the above-mentioned short circuit never occur when parts of the tabs 59 and 60 extending outside from the case 51 and adjacent to the end edge of the case 51 are coated with insulating film layers 92 as shown in FIG. 58.

The tabs 59 and 60 of the electrode structure in accordance with the present invention are flexible foils of copper, aluminum, tin, gold, silver or an alloy of some of those metals.

The present invention has been made on the basis of a finding that such a short-circuit trouble can be prevented by coating parts of a predetermined area of the tabs 59 and 60 extending outside from the case 51 and including the boundary between the end edge of the case 51 and the tabs 59 and 60 with insulating films 92. The parts of a predetermined area of the tabs 59 and 60 are those possible to come into contact with the exposed edge of the conductive layer 2 of the case 51 and extending outside and inside the case 51 from a boundary line M corresponding to the end edge of the case 51 in a length in the range of about 5 to about 20 mm. The area of the parts of the tabs 59 and 60 may properly be determined taking into consideration the thickness of the laminated sheet 10 forming the case 51 and the flexibility of the tabs 59 and 60. As shown in FIG. 58(*a*), free end parts or parts near the free ends of the tabs 59 and 60 are not coated with the insulating film to use the same as contact parts 93.

The contact parts 93 need not necessarily be formed in a rectangular shape; the part extending outside the case 51 of each of the tabs 59 and 60 may entirely be coated with the insulating sheets 92 provided with a punched round hole at a position corresponding to an end part of each of the parts of the tabs 59 and 60, and a part of each of the tabs 59 and 60 exposed in the round hole may be used as a contact part.

The adhesive insulating film for the electrode structure in accordance with the present invention will be described.

The adhesive insulating film 92 for the electrode structure in accordance with the present invention is bondable to the tabs 59 and 60, and the innermost layer 3 of the case 51 by heat-sealing. When wrapping the adhesive insulating film 92 around and bonding the same by heat-sealing to the part of the tab 59 (60) contiguous with the end edge of the case 51, the adhesive insulating film 92 can be bonded to both the tab 59 (60) and the innermost layer 3 of the case 51. Therefore, the battery 50*a* can satisfactorily be sealed hermetically in the case 51. Suitable materials for forming the insulating film 92 meeting the foregoing requirements are acid-denatured polyolefin resins including ethylene-acrylic acid resins (EAA), ethylene-methacrylic acid resins (EMAA), ethylene-ethylacrylate resins (EEA) and ionomers.

When the tab 59 (60) is connected to the battery 50*a*, the tab 59 (60) can be coated with the insulating films 92 of a predetermined area by putting insulating films 92 on both the surfaces of the tab 59 (60) as shown in FIG. 60(*a*) and applying pressure and heat to the insulating films 92. Thus, parts of the tab 59 (60) respectively extending on the opposite sides of the boundary line M corresponding to the end edge of the case 51 are coated with the insulating films 92.

The battery 50*a* is inserted in the case 51, and the end edge part of the case 51 is heat-sealed hermetically so as to sandwich the tabs 59 and 60 between the walls of the case 51.

The side surfaces of the necessary parts of the tabs 59 and 60, as well as both the surfaces of the same, may be coated with the insulating film 62 as shown in FIG. 60(*b*) or the necessary parts of the tabs 59 and 60 may be sandwiched between insulating films 92 of a length greater than the width of the tabs 59 and 60 as shown in FIG. 60(*c*). FIGS. 60(3), 60(*f*) and 60(*g*) are sectional views taken on lines $X_2$-$X_2$, $X_3$-$X_3$ and $X_4$-$X_4$ in FIGS. 60(*a*), 60(*b*) and 60(*c*), respectively.

It is also possible to bond insulating tapes to a web of a metal foil unwound from a roll, to cut the web into tabs as shown in FIG. 60(*a*), and to connect the tabs to the battery. The battery 50*a* thus provided with the tabs may be inserted in the case 51 and the open end of the case 51 may be heat-sealed to seal the battery 50*a* in the case 51.

As mentioned above, the insulating film 92 is formed of an acid-dematired polyolefin resin which is highly adhesive to both the tabs 59 and 60 of a metal foil or the like, and a highly water- and moisture-proof polyolefin resin, such as a polyethylene resin. Generally, the innermost layer 3 of the case 51 is formed of an acid-denatured resin only in view of securing heat-adhesion to metal foils or the like. According to the present invention, both the tabs 59 and 60 and the insulating sheet 92 can surely be bonded to the innermost layer 3 of the case 51, and the end surface of the acid-denatured polyolefin resin layer is exposed in only portions of the end surface of the case corresponding to the tabs 59 and 60 projecting from the case, when only the insulating film 92 is formed of the acid-denatured polyolefin resin, and the sealant layer of a polyolefin resin takes most part of the end surface. Accordingly, the case has an improved moisture-proof ability and is capable of maintaining the ability of the electric device for a long period.

EXAMPLES

| | |
|---|---|
| Device: | Battery packet |
| Case: | Pillow type pouch |
| Laminated sheet: | PET (12 μm thick)/AL (40 μm thick)/ON (25 μm thick)/CPP (70 μm thick) |
| Adhesive insulating film: | EMAA (30 μm thick) |
| Tabs: | Copper foil (50 μm thick) Aluminum foil (50 μm) |

The flat battery packet was subjected to a short circuit test in which the tabs extending from the end edge of the case were bent forcibly to bring the same into contact with the edge of the conductive layer exposed in the end edge of the case. Short circuit did not occur and the reliable function of the insulating films was verified.

Incidentally, a battery packet in a comparative example was fabricated under the same conditions as those under which the foregoing example was fabricated, excluding that tabs were not coated with any insulating films, and the battery packet in the comparative example was subjected to the same short circuit test. Short circuit occurred in the battery packet in the comparative example.

The electrode structure in accordance with the present invention eliminates the possibility of the tabs coming into contact with the conductive layer of the case. The construction of the battery packet in accordance with the present invention is applicable to various electric devices.

The innermost layer of the case can be formed of a polyolefin resin when the insulating film is formed of an acid-denatured polyolefin resin. Consequently, the case for electric devices has improved water- and moisture-proof properties, the case is impermeable to moisture and the deterioration of the ability of the electric device can be prevented.

Fifteenth Embodiment

A fifteenth embodiment according to the present invention will be described with reference to FIGS. 61 to 64, in which parts like or corresponding to those of the first embodiment are designated by the same reference characters and the description thereof will be omitted designated by the same reference characters and the description thereof will be omitted.

A battery packet in accordance with the present invention has a construction capable of preventing tabs extending from a battery contained in a soft case formed of a laminated sheet including a conductive material from coming into contact with the conductive material of the laminated sheet and from being short-circuited by the conductive material.

Figure 61:
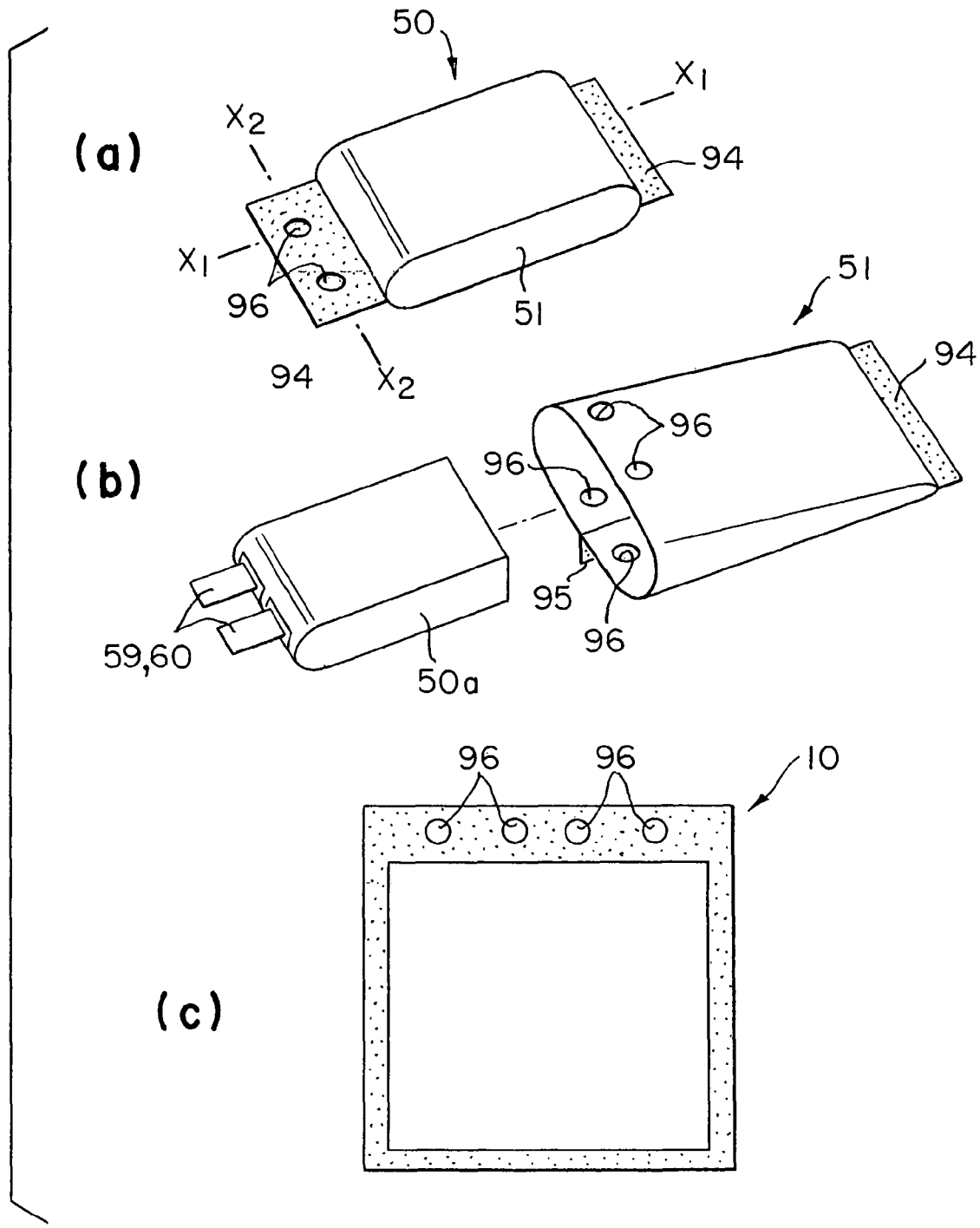
FIGS. 61 to 64 are typical views of a fifteenth embodiment according to the present invention.
Figure 62:
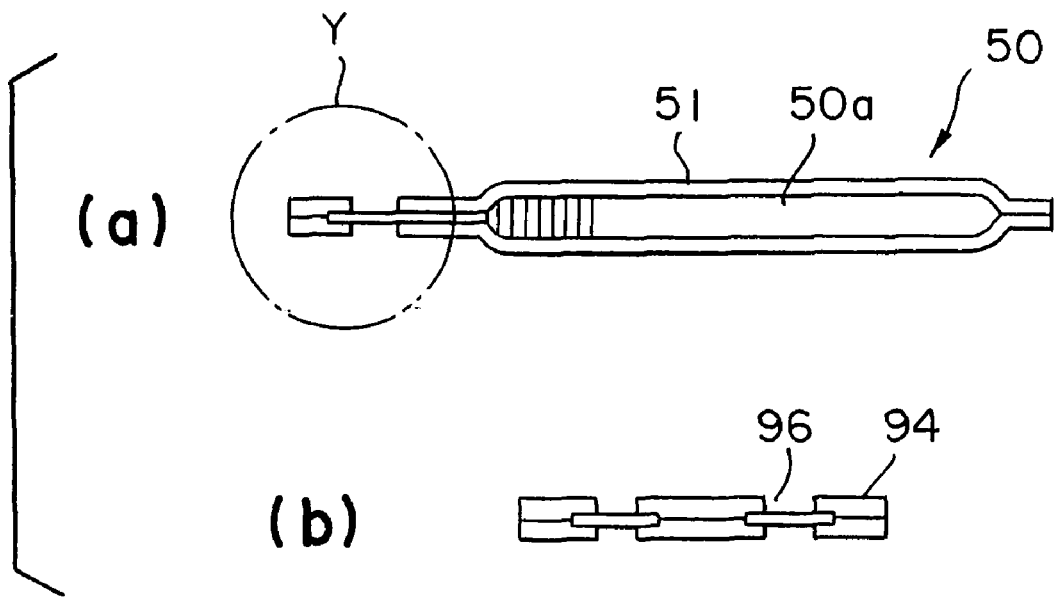
Figure 63:
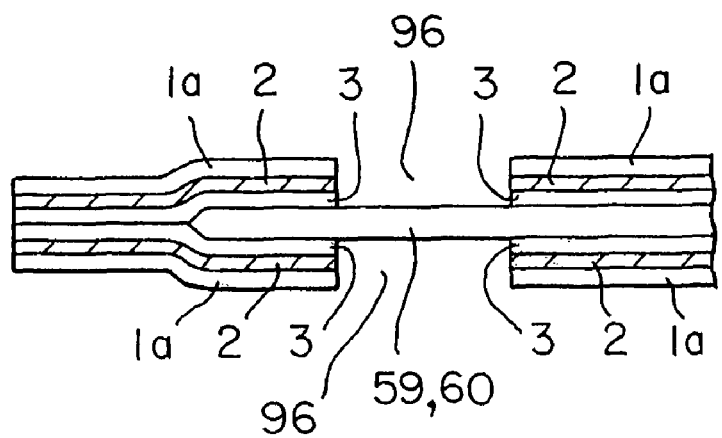
Figure 64:
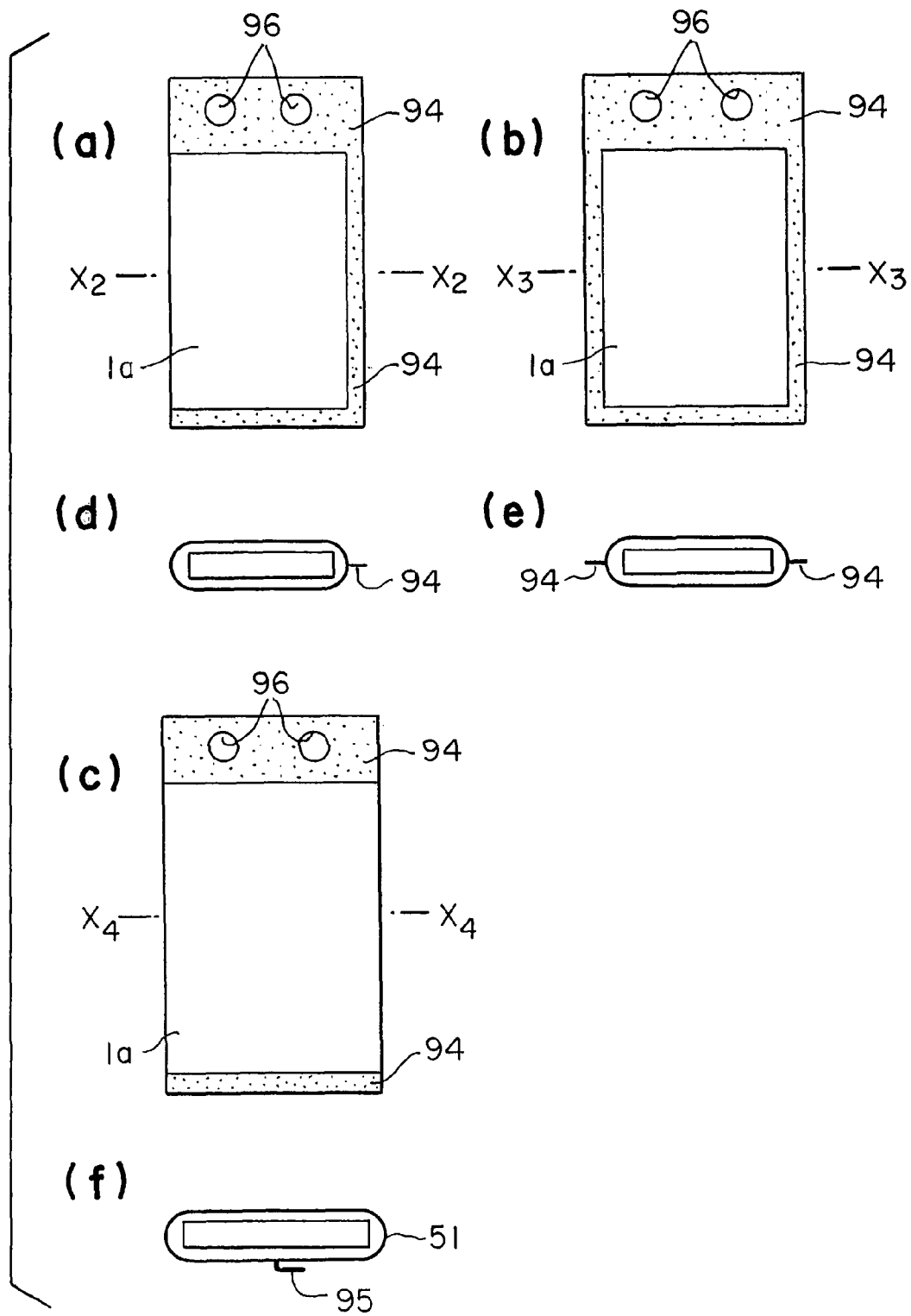

FIG. 61(*a*) is a perspective view of a battery packet in accordance with the present invention, FIG. 61(*b*) is a perspective view of a battery and a case for containing the battery, and FIG. 61(*c*) is a development of the case. FIG. 62(*a*) is a sectional view taken on line $X_1$-$X_1$ in FIG. 61(*a*) and FIG. 62(*b*) is a sectional view taken on line $X_2$-$X_2$ in FIG. 61(*a*). FIG. 63 is an enlarged view of a part Y in FIG. 62(*a*). FIGS. 64(*a*), 64(*b*) and 64(*c*) are plan views of cases in accordance with the present invention, and FIGS. 64(*d*), 64(*e*) and 64(*f*) are sectional views taken on lines $X_2$-$X_2$, $X_3$-$X_3$ and $X_4$-$X_4$ in FIGS. 64(*a*), 64(*b*) and 64(*c*), respectively.

Referring to FIG. 61, a battery packet has a case 51 provided with openings 96 at predetermined positions, and a battery 50*a* sealed in the case 51. Parts of tabs 59 and 60 exposed in the openings 96 serve as contact parts. Embodiments of the present invention will be described hereinafter with reference to the drawings. The present invention is not limited in its practical application to the embodiments specifically described below and changes may be made therein without departing from the scope of the invention.

In most cases, the case 51 of the battery packet in accordance with the present invention is formed of laminated sheet 10 formed by laminating layers of different materials. The laminated sheet 10 may be provided with a layer of a conductive material to protect a device from piercing and abrading actions, and chemical changes which may be caused by moisture and corrosive gases.

The case 51 in accordance with the present invention is formed, in most cases, by processing the laminated sheet 10 shown in FIG. 53 by a heat-sealing method in the shape of a pouch having sealed end heat-sealed parts 94 and a back heat-sealed part 95. More specifically, the case 51 may be a pouch having three sealed sides as shown in FIGS. 52(*a*) and 52(*d*), a pouch having four sealed sides as shown in FIGS. 52(*b*) and 52(*d*) or a pillow type pouch as shown in FIGS. 52(*c*) and 52(*f*). In the following description, the case 51 is assumed to be a pillow type pouch.

The battery packet 50 in accordance with the present invention is formed by inserting the battery 50*a* provided with the tabs 59 and 60 in the case 51 and heat-sealing an open end part of the case 51. The case 51 containing the battery 50*a* is provided with the openings 96 of a predetermined size at positions corresponding to parts of the tabs 59 and 60 connected to the battery 50*a*. When the open end part of the case 51 is sealed, the openings 96 corresponds to the contact parts of the tabs 59 and 60, respectively. The openings 96 may be formed at two positions on the laminated sheet 10 to form two contact parts on one side of the tab 59 and one side of the tab 60, respectively, or may be formed at four positions on the laminated sheet 10 as shown in FIGS. 61(*b*) and 61(*c*) to form four contact parts on both sides of the tab 59 and both sides of the tab 60, and two contact parts, respectively. The battery 50*a* is inserted in the case 51, the open end part of the case 51 through which the tabs 59 and 60 extend outside is sealed hermetically to complete the battery packet 50. The open end part of the case 51 is sealed after evacuating the case 51 or reducing the pressure in the case 51 to make the case 51 come into close contact with the battery 50*a* in order that the battery packet 50 can be used with facility. As mentioned above, a sealant layer 3 of an acid-denatured polyolefin resin included in the laminated sheet 10 forming the case 51 is adhesive to the tabs 59 and 60. Therefore, moisture and gases are unable to penetrate into the case 51 through the brims of the contact parts, and hence the battery 50*a* can be kept in a satisfactory condition for a long time.

Preferably, the openings 96 of the case 51 are formed in the laminated sheet 10 by a punching machine using a die set before shaping the same in the case 51. The battery packet 50 in accordance with the present invention is fabricated by forming the case 51 by a bag forming process using a bag forming machine, and inserting and sealing the battery 50*a* in the case 51 by another process, or by forming the case 51, inserting the battery 50*a* in the case 51 and sealing the case by a single process of an automatic packaging system. In either case, the laminated sheet 10 is supplied in a web unwound from a roll of the laminated sheet 10. Resister marks (eye marks) are printed on the web of the laminated sheet 10 when printing necessary matters on the web, the eye marks are detected by a photoelectric device and the tension of the web is controlled to form the openings 96 at correct positions.

The sealant layer 3 of an acid-denatured polyolefin resin included in the laminated sheet 10 forming the case 51 is ensures the bonding of the inner surface of the case 51 by heat-sealing, and the bonding of the case 51 to the tabs 59 and 60. Accordingly, the tabs 59 and 60 can be fixed to the case 51 and, consequently, the tabs 59 and 60 will not easily be bent and there is no possibility that the tabs 59 and 60 come into contact with an edge of the conductive layer exposed on an end edge of the case 51.

Parts of the tabs 59 and 60 of the battery packet 50 in accordance with the present invention are exposed as shown in FIG. 63 to form contact parts 5 to be brought into contact with the electrodes of a device which uses the battery packet 50. Since the laminated sheet 10 forming the case 51 is bonded by heat-sealing to the tabs 59 and 60 so as to cover the tabs 59 and 60 entirely, excluding the contact parts, the tabs 59 and 60 covered with the laminated sheet 10 are rigid as compared with the bare metal foil forming the tabs 59 and 60, the tabs 59 and 60 will not easily be bent, and there is no possibility that the tabs 59 and 60 come into contact with an exposed edge of a conductive layer 2 included in the laminated sheet 10.

EXAMPLE

A battery packet was fabricated by inserting and sealing a flat battery provided with tabs of a 300 μm thick cooper foil in a case.

| | |
|---|---|
| Flat battery: | 50 mm × 500 mm × 2 mm |
| Tabs: | 100 mm wide, 20 mm long, 200 μm thick, Two tabs extended from one end of the battery |

-continued

Case:

Laminated-sheet: (Outer side) PET (12 μm thick)/AL (40 μm thick)/ONy (25 μm thick)/EAA (70 μm thick) (Inner side)
Pillow type pouch of 75 mm in width and 130 mm in length with heat-sealed end parts and heat-sealed back part of 7 mm in width Four openings were formed in the laminated sheet before shaping the laminated sheet in a pouch to form contact parts on both surfaces of each of the tabs.

Assembly: The flat battery was inserted in the case, and the open end part of the case was pressed and heated for two seconds with a hot plate heated at 210° C. to heat-seal the case and to bond the case to the tabs so that the tabs excluding the contact parts are covered entirely with the case.

The tabs covered with the case were bent forcibly for short circuit testing. The tabs could not be brought into contact with an edge of an aluminum foil exposed on an edge of the case.

In the battery packet in accordance with the present invention, there is no possibility that the tabs are shorted by the conductive layer of the case. Since the tabs excluding their contact parts are covered entirely with the laminated sheet forming the case, the tabs thus covered are rigid and able to serve as stable electrodes.

Sixteenth Embodiment

A sixteenth embodiment according to the present invention will be described with reference to FIGS. 65 to 69, in which parts like or corresponding to those of the first embodiment are designated by the same reference characters and the description thereof will be omitted.

Figure 65:
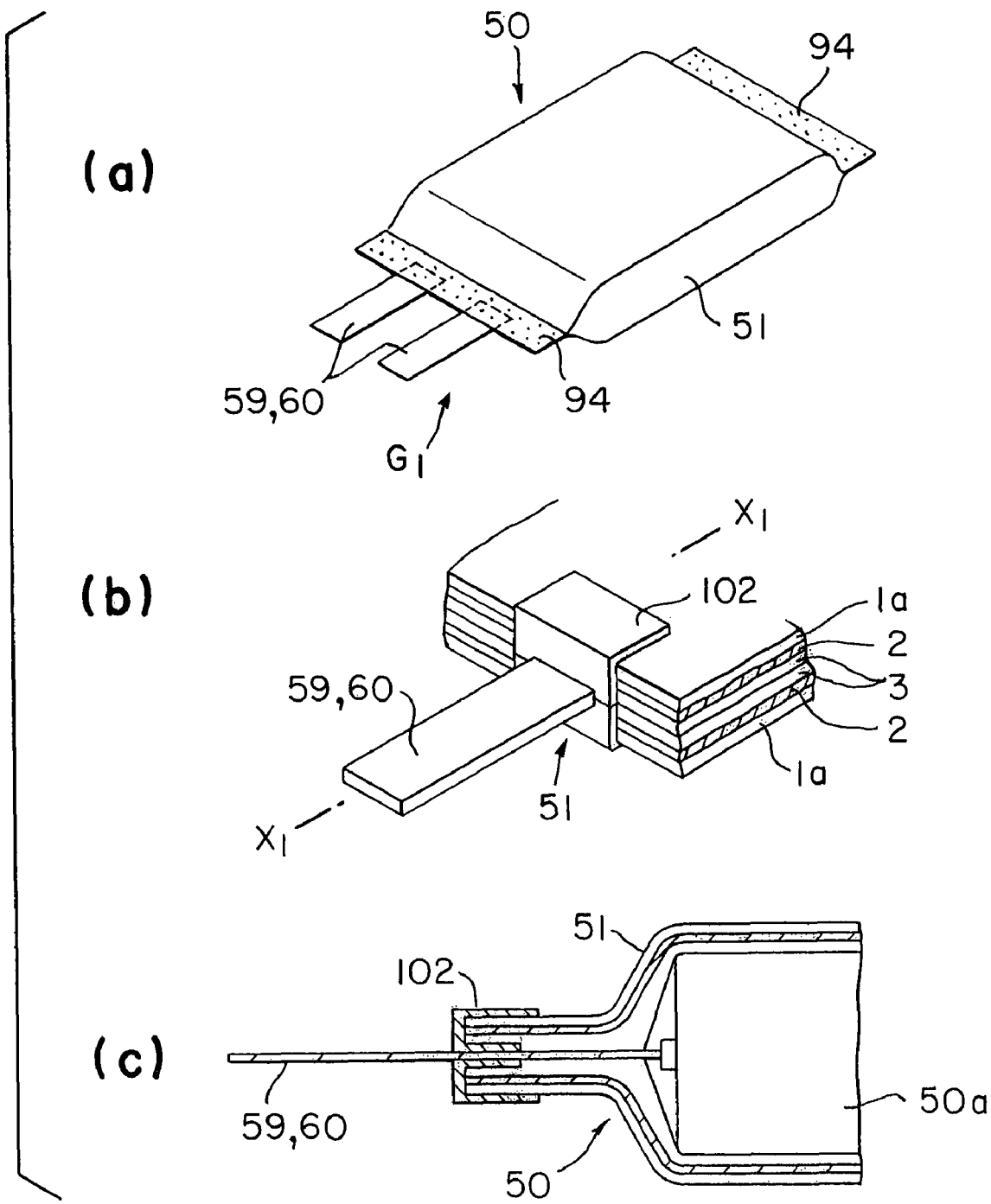

FIG. 65($a$) is a perspective view of a battery packet in accordance with the present invention, FIG. 65($b$) is an enlarged view taken in the direction of the arrow $G_1$ in FIG. 65($a$), and FIG. 65($c$) is an enlarge sectional view taken on line $X_1$-$X_1$ in FIG. 65($b$). FIG. 66($a$) is a perspective view of a battery and a case having an open end part for containing the battery, and FIG. 66($b$) is a sectional view taken on line $X_2$-$X_2$ in FIG. 66($a$). FIG. 67 is a perspective view of a case in accordance with the present invention, and FIG. 68 is a perspective view of another case in accordance with the present invention.

Referring to FIGS. 65($a$), 65($b$) and 65($c$), a battery 50$a$ is inserted in a flexible case 51 formed by processing a laminated sheet 10 (FIG. 53) including a conductive layer formed of a conductive material, and flexible tabs 59 and 60 extending from the battery 50$a$ project outside from the case 51. Parts of an end edge of the case 51 through which the tabs 59 and 60 project outside is covered with covering sheets 102 to prevent short-circuiting the tabs 59 and 60 by the conductive layer 2 of the laminated sheet 10.

In most cases, the tabs 59 and 60 are formed of a metal foil, such as a copper foil and hence are flexible and easy to bend. The case 51 is formed by folding the laminated sheet 10 having the conductive layer 2 of a metal foil or the like and forming heat-sealed parts 94 and a back heat-sealed part 95. The tabs 59 and 60 extending outside from the case 51 are very close to the edge of the conductive layer 2 of the laminated sheet 10 forming the case 51. Therefore, it is possible that the tabs 59 and 60 come into contact with the edge of the conductive layer 2 of the laminated sheet 10 exposed on the end edge of the case 51 if the tabs 59 and 60 are bent. If the tabs 59 and 60 come into contact with the edge of the conductive layer 2, the battery packet 50 does not function normally, and troubles may possibly occur. It is possible that the battery of the battery packet 50 is caused to discharge and to reduce electric energy stored therein and, in the worst case, the battery is exhausted and is unable to function.

The inventors of the present invention made earnest studies to solve such a problem and found that any troubles attributable to the above-mentioned short circuit never occur when the parts of the end edge of the case 51 through which the tabs 59 and 60 project outside are covered with the covering sheets 102 and the present invention has been made on the basis of such findings.

The shape of the case 51 of the battery packet 50 and the laminated sheet forming the case 51 will be described.

The case 51 of the battery packet 50 has the shape of a pouch formed by processing the laminated sheet 10 by a heat-sealing method.

The insulating covering sheets 102 for covering parts of the end edge of the case 51 formed by heat-sealing an open end part 98 will be described.

Parts of the end edge of the case 51 respectively corresponding to the tabs 59 and 60 may be covered individually with covering sheets 102 of a width nearly equal to that of the tabs 59 and 60 as shown in FIG. 67, or each of parts of the end edge of the case 51 corresponding to the two tabs 59 and 60 may be covered with a single covering sheet 102 of a width corresponding to that of the part of the end edge corresponding to the two tabs 59 and 60 as shown in FIG. 68

The covering sheet 102 has at least an outer layer formed of a nonconductive material and an inner layer formed of a material which can be bonded to the case 51 and does not come off the case 51 for a long time. The covering sheet 102 may be bonded to the case 51 with an adhesive or by a heat-sealing method. As mentioned above, it is general to form the outermost layer 1$a$ of the laminated sheet 10 forming the case 51 of a film which is scarcely heat-sealable, such as a biaxially oriented polyethylene terephthalate film, and hence the case must be provided with a heat-adhesive layer on its outer surface to bond the covering sheets 102 by a heat-sealing method to the case 51. Preferably, a tape produced by coating an insulating base film with an adhesive resin (hereinafter referred to as "adhesive tape") is used as the covering sheet 102 in accordance with the present invention.

Desirably an adhesive tape, i.e., a laminated sheet, to be used as the covering sheet 102 has an insulating base layer 102$a$ having satisfactory elasticity. Suitable materials for forming the base layer of the covering sheet 102 are a biaxially oriented film of polyethylene terephthalate resin, and films of nylon resins, polycarbonate resins, polyethylene resins, polypropylene resins, polyvinyl chloride resins, polyvinylidene chloride resins, Teflon® and the like. Uniaxxially or biaxially oriented films of those materials are more preferable (FIG. 69).

An adhesive for forming an adhesive layer 102$b$ included in the adhesive tape may be selected out of rubber, synthetic rubbers and silicone rubbers taking into consideration the adhesiveness of the adhesive to the case. The surface of the base layer may be finished by a water-repellent finishing using silicone or the like.

The covering sheets 102 may be attached to the case 51 formed in the shape of a pouch so as to cover the parts of the end edge part of the case 51 corresponding to the tabs 59 and 60 before sealing the open end part 98 of the case 51 or may be attached to parts of the laminated sheet 10 corresponding to the parts of the case 51 through which the tabs 59 and 60 extend, and then the laminated sheet 10 may be shaped in the case 51.

The covering sheets 102 must have a width greater than that of the tabs 59 and 60. It is preferable, in view of reducing the possibility of contact between the tabs 59 and 60 with the conductive layer of the case 51, to use the covering sheet 102 of a width corresponding to the width of a region of the end edge of the case 51 including the two tabs 59 and 60.

The covering sheet 102 has an inner part of a length $n_1$ lying on the inner surface of the case 51 and an outer part of a length $n_2$ lying on the outer surface of the case 51. The lengths $n_1$ and $n_2$ are great enough if the covering sheet 102 does not come off the case 51. Basically, the inner part of the length $n_1$ of the covering sheet 102 need not perfectly be bonded to the tabs 59 and 60. The length $n$, must be smaller than the width of the heat-sealed part 94.

EXAMPLE

| | |
|---|---|
| Device: | Flat battery packet of 50 mm × 100 mm × 3.5 mm |
| Case: | PET (12 μm thick)/AL (40 μm thick)/ONy (25 μm thick)/EAA (70 μm thick) |
| Tabs: | Copper foil, 30 μm thick, 14 mm wide, 45 mm long Two tabs extended from an end of the main part of the battery packet |
| Covering sheet: | Polyethylene terephthalate resin film (25 μm thick) and urethane adhesive layer (20 mm thick). |

In the battery packet, there is no possibility that the tabs come into contact with the conductive layer of the case. The construction of this battery packet is applicable to various devices.

Seventeenth Embodiment

Figure 70:
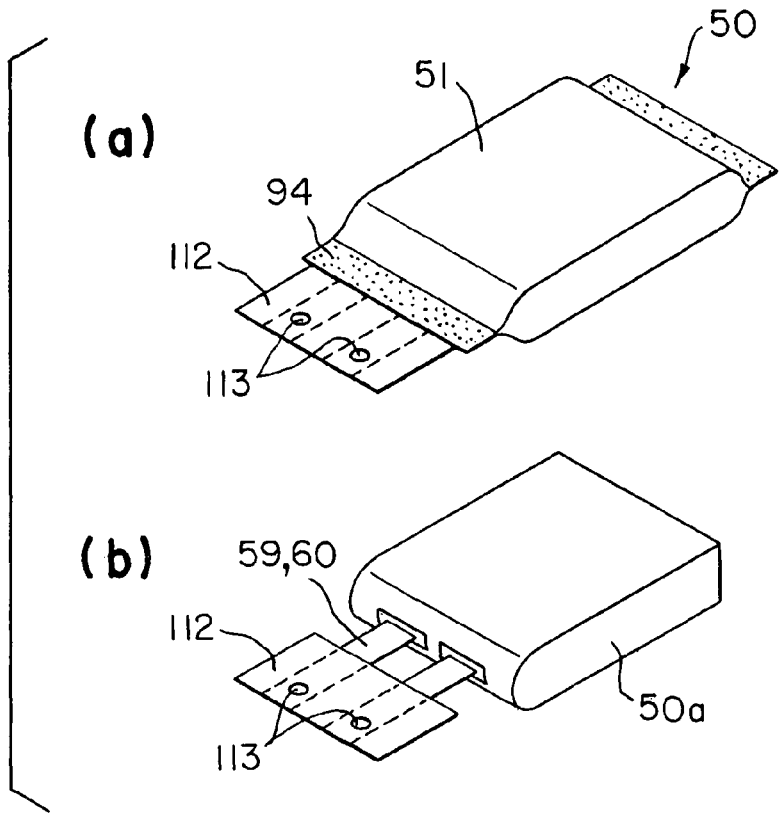
FIGS. 70 and 71 are typical views of a seventeenth embodiment according to the present invention.
Figure 71:
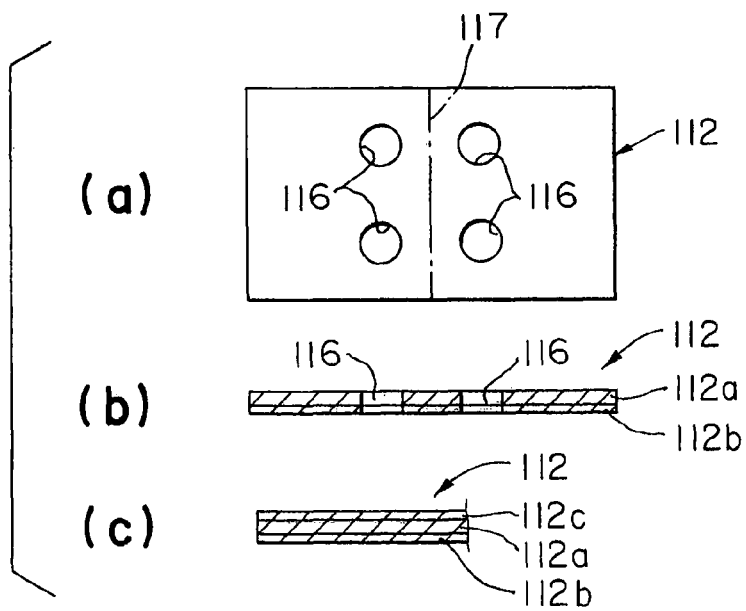

A seventeen embodiment of the present invention will be described with reference to FIGS. 70 and 71. Referring to FIGS. 70 and 71, an adhesive sheet 112 is folded in two leaves along a folding line 117, and tabs 59 and 60 are sandwiched between the two leaves of the adhesive sheet 112. As shown in FIG. 71($a$), the adhesive sheet 112 is folded along the folding line 117 in two symmetrical leaves. The adhesive sheet 112 is provided with openings 113 at positions corresponding to contact parts of tabs 59 and 60. As shown in FIG. 70($b$), the tabs 59 and 60 are sandwiched between the two leaves of the folded adhesive sheet 112, and parts of the adhesive surfaces of the leaves of the adhesive sheet 112 other than those corresponding to the tabs 59 and 60 are bonded together. A battery 50$a$ is inserted in a case 51, and open end parts of the case 51 are sealed in sealed parts 94 to complete a battery packet 50 as shown in FIG. 70($a$).

As shown in FIG. 71($b$), the adhesive sheet 112 comprises a base layer 112$a$ and an adhesive layer 112$b$. The base layer 112$a$ is a film of a nonconductive material suitable for adhesive bonding, such as an oriented or nonoriented film of one of polyethylene terephthalate resins, nylon resins, vinyl chloride resins, vinylidene chloride resins, polyethylene resins, polypropylene resins, Teflon® and the like.

As mentioned above, when fabricating the battery packet in accordance with the present invention, the open end part of the case is sealed with the adhesive sheet 112 sandwiched between the end edge parts of the opposite walls of the case 51. It is desirable that the sealant layer 3 of a laminated sheet 10 forming the case 51 is welded to the base layer 112$a$ of the adhesive sheet 112. If the base layer 112$a$ of the adhesive sheet 112 is a biaxially oriented polyethylene terephthalate film, it is difficult to bond together the sealant layer 3 of the laminated sheet 10 forming the case 51, and the adhesive sheet 112 by heat-sealing. A secondary adhesive layer 112$c$ capable of being easily bonded to the sealant layer 3 of the laminated sheet 10 forming the case 51 may be formed on the surface layer 112$a$ of the adhesive sheet 112 as shown in FIG. 71($c$). The secondary adhesive layer 112$c$ may be formed of a resin of the same kind as that forming the sealant layer 3 of the case 51. The adhesive layer 112$b$ of the adhesive sheet 112 is formed of a highly heat-resistant material capable of firmly adhering to the tabs 59 and 60 and of preventing the adhesive sheet 112 from coming off the tabs 59 and 60, such as styrene-butadiene rubber, glycerol ester of hydrogenated rosin or a petroleum hydrocarbon.

Eighteenth Embodiment

An eighteenth embodiment of the present invention will be described with reference to FIGS. 72 and 73. A case 51 in the eighteenth embodiment is formed by heat-sealing peripheral parts of a pair of laminated sheets 10 in a sealed peripheral part 115 having an improved barrier property.

If oxygen and moisture are detrimental to the contents of the case 51, the laminated sheet 10 forming the case 51 is provided with a layer having a high barrier property.

Generally, an adhesive layer employed in adhesively bonding joints of laminated sheets to form a packing case, such as a pouch does not have any barrier property, and hence oxygen and moisture penetrate the adhesive layer into the packing case to affect the contents of the packing case adversely.

Such a problem may be solved by forming the adhesive layer of a resin having barrier property. However, any resins having both adhesive strength sufficient for forming an adhesive layer and a satisfactory barrier property are unavailable at present.

The barrier property of the adhesive layer may be improved by reducing the thickness of the adhesive layer (heat-adhesive resin layer 3) as shown in FIG. 73($a$). If the adhesive layer is excessively thin, the adhesive layer is subject to heat deterioration, the strength of the adhesive layer decreases and the case breaks.

A sealed peripheral part 115 formed by bonding together peripheral parts of a pair of laminated sheets 10 may be crimped in a wavy sectional shape as shown in FIG. 73($b$). However, when the sealed edge part is crimped, the strength of the adhesive layer is reduced and, in some cases, the case breaks.

Studies were made to improve the barrier property of the sealed edge part without reducing the bonding strength of the adhesive layer, and it was found that the foregoing problem can be solved by bringing the respective barrier layers of laminated sheets forming the front and the back wall of a case close to or into contact with each other.

A case in an example will be described below with reference to the drawings.

Peripheral parts of a pair of laminated sheets 10 each having a barrier layer 2 and an adhesive layer 3 are bonded together to form a sealed peripheral part 115. As shown in FIG. 72($a$), parts of the barrier layers 2 included in the peripheral parts of the pair of laminated sheets 10 can be brought close to or into contact with each other by pressing both the pair of laminated sheets 10 to form grooves 116 in both the pair of laminated sheets 10 so as to shove aside portions of the adhesive layers 3 corresponding to the grooves 116.

As shown in FIG. 72($b$), a part of the barrier layer 2 of one of the pair of laminated sheets 10 may be brought close to or into contact with the barrier layer 2 of the other laminated sheet 10 by pressing the former laminated sheet 10 to form a groove 116 in the former laminated sheet 10.

FIG. 72($c$) shows a sealed peripheral part 115 formed by bonding together peripheral parts of a pair of laminated sheets 10, and provided with a pinched edge part formed by pressing an edge part of the sealed peripheral part 115 so as to shove aside the adhesive layers 3 to bring the barrier layers 2 of the pair of laminated sheets 10 close to or in contact with each other.

In a modification of the sealed peripheral part 115 shown in FIG. 72(c), a part of the barrier layer 2 of a peripheral part of one of the pair of laminated sheets 10 may be brought close to or into contact with the barrier layer 2 of the other laminated sheet 10 by pressing an edge part of only the former laminated sheet 10.

The parts of the barrier layers 2 of the pair of laminated sheet 10 in the sealed peripheral part can be brought close to or into contact with each other so as to shove aside the adhesive layers by a method using a hot plate or ultrasonic waves.

The laminated sheet forming the front or the back wall of the case may be processed to form the groove before, after or during a sealing process for bonding together the pair of laminated sheets to form the case.

The barrier layer 2 and the adhesive layer 3 are essential component layers of the laminated sheet the laminated sheet may be provided with additional layers including a strengthening layer.

Suitable materials for forming the barrier layer 2 are metal foils, such as aluminum foils, resin films or resin sheets coated with a metal film, such as an aluminum film formed by vacuum evaporation, films or sheets of resins having barrier property, such as saponified ethylene-vinyl acetate copolymers, polyamide resins, such as an MXD nylon 6, polyacrylonitrile resins and polyvinylidene chloride resins, and resin films or resin sheets coated with a film of an inorganic oxide, such as silicon dioxide ($SiO_2$), alumina ($Al_2O_3$) or magnesium oxide (MgO) by vacuum evaporation.

Such a film of one of the foregoing inorganic oxide can be formed on a resin film or a resin sheet by a chemical vapor deposition method (CVD method), such as a plasma-assisted chemical vapor deposition method, or a physical vapor deposition method (PVD method), such as a vacuum evaporation method.

The inorganic oxide film formed by vacuum deposition may be either a single-layer film of an inorganic oxide, such as one of silicon dioxide, alumina and the like or a laminated film having a plurality of layers of some of those inorganic oxides.

A multilayer film formed by using a chemical vapor deposition method and a physical vapor deposition method in combination. There is not any restriction on the order of forming those films by evaporation.

For example, it is possible to form a silicon dioxide film first, and then an alumina film. The order may be reversed.

A composite film of an inorganic oxide film and a barrier film of a resin having barrier property may be formed by coating the inorganic oxide film formed by vacuum evaporation with the resin having barrier property.

Nineteenth Embodiment

A nineteenth embodiment according to the present invention will be described with reference to FIGS. 74 and 75. It sometimes occurs that a laminated sheet manufactured by a generally used dry lamination method and forming a case delaminates along a plane of lamination between a metal foil layer and an inner layer included in the laminated sheet due to aging while the case is stored for a long time. It was found through the examination of causes of delamination that the adhesive layer of a solvent type adhesive used for dry lamination dissolves in an electrolyte, i.e., a component of a polymer battery, in a long time because the electrolyte is an organic carbonate solvent. The electrolyte permeates the resin layer of the case gradually, reaches the interface between the resin layer and the adhesive layer and, eventually, the laminated sheet delaminates along the adhesive layer.

The inventors of the present invention found that the delamination of a laminated sheet due to the agency of the electrolyte can be prevented by processing a surface of an inner layer to be bonded to a metal foil by a plasma arc treatment, and a battery case forming laminated sheet highly resistant to the dissolving action of the electrolyte can be produced by using either a dry lamination method or a heat lamination if a surface of an inner layer having a surface to be bonded to a metal foil is finished by a plasma arc treatment.

A surface of an inner layer to be bonded to a metal foil is finished by a plasma arc treatment. Suppose that a laminated sheet 10 has a construction: first base film layer 1a (PET)/LMD 125 (dry lamination)/aluminum foil layer 2/third base film layer 1c (ON)/heat-adhesive resin layer 3 (acid-denatured polyolefin resin layer formed by extrusion coating) as shown in FIG. 74. Then, a surface of the third base layer 1c, i.e., the ON film layer, on the side of the aluminum foil layer 2 is finished by a plasma arc treatment to form a plasma arc processed layer 126.

Figure 74:
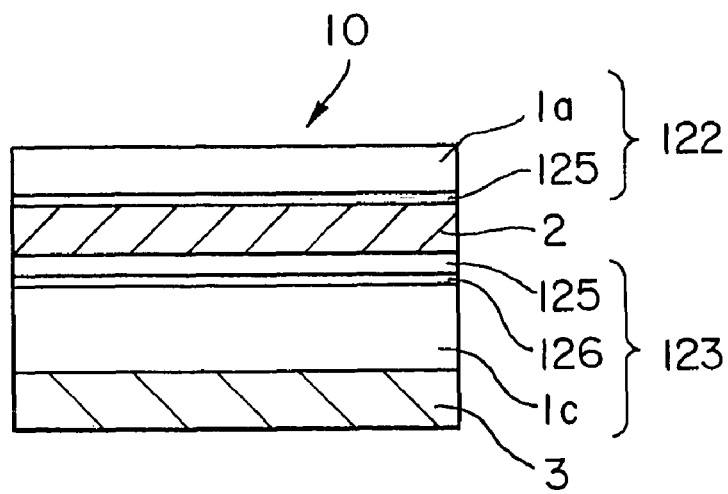
FIGS. 74 and 75 are typical views of a nineteenth embodiment according to the present invention.
Figure 75:
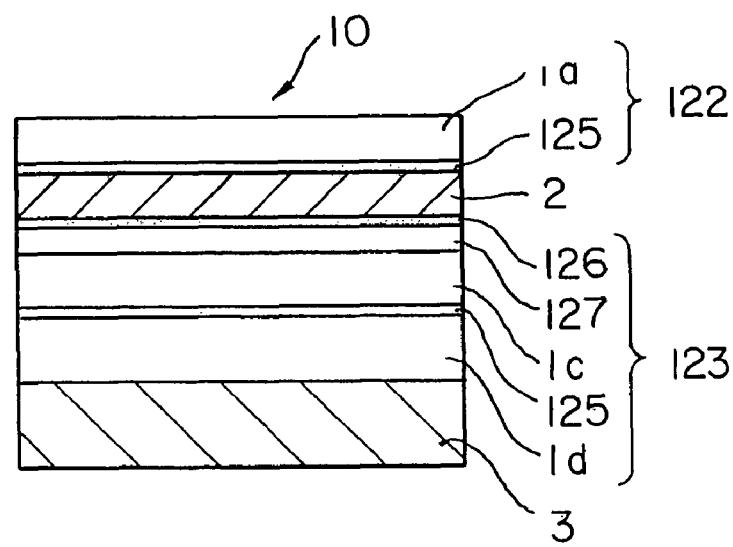

When a laminated sheet 10 has a construction: first base film layer 1a (PET)/aluminum foil layer 2/heat-adhesive resin sheet 127 (heat lamination)/third base film layer 1c (ON)/LMD 125/additional third base film layer 1d (EVOH)/heat-adhesive resin layer 3 (acid-denatured polyolefin resin layer formed by extrusion coating) as shown in FIG. 75, a surface of the heat-adhesive sheet 127 on the side of the aluminum foil layer 2 is finished by a plasma arc treatment to form a plasma arc processed layer 126. Each of the laminated sheets shown in FIGS. 74 and 75 has an outer laminated structure 122, an inner laminated structure and the heat-adhesive resin layer 3.

When processing a film by the plasma arc treatment, the film is placed in a chamber, desirably, the chamber is evacuated in a vacuum, a source gas, such as a functional group containing gas obtained by passing a rare gas through a solution containing functional groups or a mixed gas prepared by mixing a gas containing functional groups and a rare gas, is supplied into the chamber, and a plasma is generated in the chamber by a plasma generator to treat the surface of the film with the plasma.

The rare gas may be Ar, He, Kr, Xe or Rn. Preferably, Ar is used. The gas to be mixed with the rare gas or the solution through which the rare gas is passed may be an acid, a ketone, an alcohol, hydrogen fluoride, carbon fluoride, silicon fluoride, nitrogen fluoride, a hydrocarbon, an aromatic compound, diisocyanate, an acrylate monomer, water vapor, nitrogen, hydrogen, a halogen or a combination of some of those substances.

A film may be treated by an atmospheric pressure glow discharge plasma arc treatment while the film is moved continuously instead of by the plasma arc treatment using a vacuum chamber.

According to the present invention, it is desirable to process the surface of the film continuously by an atmospheric pressure glow discharge plasma arc treatment method capable of efficiently processing the film.

When processing a film by plasma arc treatment, the film is placed between first and second electrodes in a vessel, a source gas is supplied into the vessel, a radio frequency voltage is applied across the first and the second electrode to create a glow discharge region between the first and the second electrode, and the film is moved through the glow discharge region for continuous plasma arc treatment.

The laminated sheet 10 did not delaminate when a battery packet formed by using a battery case formed by processing the laminated sheet 10 obtained by bonding the inner laminated structure 123 having the plasma arc processed layer 126 to the metal foil layer 2 of the outer laminated structure 122 was subjected to a long-term storage life test under severe test conditions.

The laminated sheet in accordance with the present invention is characterized by the plasma arc processed layer of the inner laminated structure 123 to be bonded to the metal foil layer 2. Other surfaces of the component layers of the laminated sheet need not necessarily be finished by plasma arc treatment.

For example, a surface of the first base film layer 1a to be bonded to the metal foil layer 2 need not be finished by plasma arc treatment because, although the electrolyte of the battery penetrates the heat-adhesive resin layer 3 and the third base film layer 1c, reaches the surface of the metal foil layer 2, and dissolves the adhesive layer to cause delamination, the electrolyte is unable to permeate the metal foil layer. It was proved that the third base film layer 1c and the heat-adhesive resin layer 3 are not separated from each other even if the respective surfaces of the third base film layer 1c and the heat-adhesive resin layer 3 to be joined together are not finished by plasma arc treatment, which is considered that the third base film layer 1c and the heat-adhesive resin layer 3 are not separated, and delamination occurs in the interface between the metal foil layer and the layer bonded to the metal foil layer because the electrolyte passes through and does not accumulate in the adhesive layer bonding together the third base film layer 1c and the heat-adhesive resin layer 3, neither dissolves nor erodes the adhesive layer, and dissolves the adhesive layer bonding the layer to the metal foil layer to cause delamination.

EXAMPLES

Examples in accordance with the present invention will be described below. The present invention is not limited in its practical application to the examples which will be described below.

Batteries 50a using a lithium ion polymer as a polymer electrolyte, and a carbon member were fabricated. Tabs 59 and 60 were connected to end parts of collector electrodes 57 and 58, respectively. Free end parts of the tabs 59 and 60 were extended outside from a case 51. The tabs 59 and 60 were made of copper (positive terminal) and aluminum (negative terminal), respectively. The batteries 50a were sealed in cases formed by using the following laminated sheets to form battery packets, and the battery packets were subjected to performance tests.

Example 1

PET (12 μm thick)/LMD/AL (15 μm thick)/P · T ON (15 μm thick)/HS (50 μm thick)
PET: Biaxially oriented polyester resin film
LMD: Two-component polyurethane adhesive layer formed by dry lamination
P · T: Plasma arc treatment
ON: Biaxially oriented nylon resin film
HS: Heat-adhesive layer of an acid-denatured polyolefin resin[*1] formed by extrusion coating

[*1]ADOMA commercially available from Mitsui Sekiyu Kagaku Kogyo K.K.

Example 2

PET (12 μm thick)/LMD/AL (15 μm thick)/LMD/P · T ADF (40 μm thick)/ON (15 μm thick)/HS (50 μm thick)
ADF: Heat-adhesive sheet VE300 (commercially available from Tosero K.K.)

The AL and the ON were bonded together by heat lamination using the heat-adhesive sheet, and the surface of the heat-adhesive sheet contiguous with the AL were finished by plasma arc treatment. Example 2 is the same in other respects as Example 1.

Comparative Example 1

PET (12 μm Thick)/LMD/AL (15 μm Thick)/LMD/ON (15 μm Thick)/HS (50 μm Thick)
Comparative example 1 is the same as Example 1, except that the ON of Comparative example 1 does not have any surface finished by plasma arc treatment.

Comparative Example 2

PET (12 μm Thick)/LMD/AL (15 μm Thick)/LMD/ADF (40 μm Thick)/LMD/ON (15 μm Thick)/HS (50 μm Thick)
Comparative example 2 is the same as Example 2, except that the ADF of Comparative example 2 does not have any surface finished by plasma arc treatment Storage Life Test Ten sample battery packets fabricated by using the laminated sheet of each of Examples 1 and 2, and Comparative examples 1 and 2 were stored in a thermohygrostat conditioned at 40° C. and 90% RH for six months, and then the performance of the sample battery packets was tested.

Results

Example 1: No performance deterioration occurred in all the samples.

Example 2: No performance deterioration occurred in all the samples.

Comparative example 1: Delamination occurred in all the samples.

Comparative example 2: Delamination occurred in the three samples out of ten.

When it is desired to print letters and pictures on the surfaces of the laminated sheets 10 shown in FIGS. 74 and 75, the letters and the pictures are printed on the inner surface of the first base film layer, i.e., the outermost layer, to be bonded to the surface of the adjacent layer, for second-surface decoration, and then the first base film layer is laminated to the adjacent layer. The thus printed letters and pictures will not be damaged even if the surface of the battery case forming sheet is abraded.

As is apparent form the foregoing description, the present invention provides lightweight, thin, flexible, battery case forming sheets excellent in various kinds of mechanical strength, heat-resistance, impermeability to moisture and gases, heat-sealability and processability, and capable of being efficiently produced. The plasma arc treatment of the surface of the layer to be bonded to the metal foil prevents the delamination of the laminated sheet forming the case of the battery packet which occurs when the battery packet is stored for a long time.

The use of the adhesive resin layer and the heat-adhesive resin layer formed of acid-denatured polyolefin resins having a meting point of 100° C. prevents the unsealing of the sealed parts of the battery case and the resultant leakage of the electrolyte even if the battery packet is stored in a high-temperature environment.

Twentieth Embodiment

A twentieth embodiment of the present invention will be described with reference to FIGS. 76 and 77.

A conventional laminated sheet uses a nylon film as a third base film layer 1c because the nylon film has high piecing strength resistant to the piercing actions of the projection of the component members of a battery and high adhesiveness to an acid-denatured polyolefin resin forming a heat-adhesive layer, does not become thin when heat and pressure is applied thereto, and is capable of preventing a metal foil layer included in the laminated sheet coming into contact with terminals when heat-sealing an open end part of a battery case formed by processing the laminated sheet due to the reduction of the thickness of the heat-adhesive resin layer caused by heat and pressure applied to the open end part of the battery case for heat-sealing.

Figure 76:
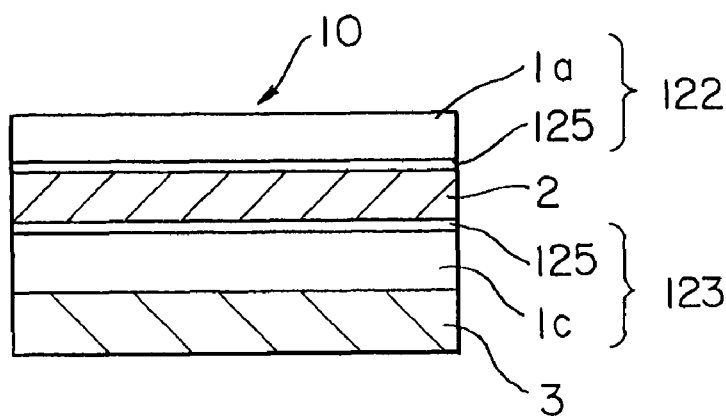
FIGS. 76 and 77 are typical views of a twentieth embodiment according to the present invention.
Figure 77:
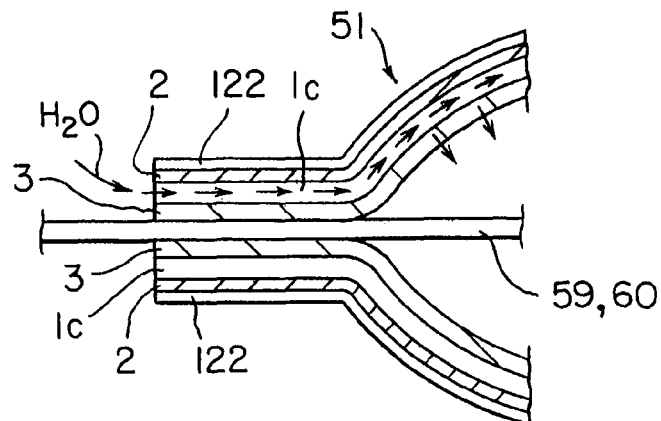

Referring to FIGS. 76 and 77, a laminated sheet 122 has an outer laminated structure 122, an inner laminated structure 123, and a heat-adhesive resin layer 3.

When a battery packet fabricated by forming a battery case by processing the laminated sheet having such a construction, and sealing a battery in the battery case is stored for a long time in an environment conditioned at a constant temperature and a constant humidity, it is possible that moisture permeates the case.

It was found through the close examination of possible causes of permeation that moisture permeates the nylon film serving as a third base film layer 1c through the end surface of a battery case 51, and penetrates the heat-adhesive resin layer 3 in the battery case 51 as indicated by the arrows in FIG. 77.

The conventional laminated sheet uses a third base film layer 1c of a normal chain aliphatic polyamide resin, such as nylon 6 or nylon 66.

A normal chain aliphatic polyamide resin film is hygroscopic. A battery case forming sheet 10 may employ a film of a material having a low hygroscopic property, such as an oriented polyester resin film. A laminated sheet in accordance with the present invention employs a nylon film which can be bonded to the heat-adhesive resin layer by stable adhesive strength. The inventors of the present invention found that aromatic polyamide resins have low hygroscopic property and meets conditions requisite for the third base film layer 1c.

However, a film of an aromatic polyamide resin is stiff and is subject to stress cracking. It was found that a blend of an aromatic polyamide resin and a normal chain aliphatic polyamide resin forms a stable layer.

EXAMPLES

Examples of the present invention will be described.

Batteries using a lithium ion polymer as a polymer electrolyte, and a carbon member were fabricated. Tabs 59 and 60 were connected to end parts of collector electrodes 57 and 58, respectively. Free end parts of the tabs 59 and 60 were extended outside from a case 51. The tabs 59 and 60 were made of copper (positive terminal) and aluminum (negative terminal), respectively.

Example 1

PET (12 μm thick)/LMD/AL (15 μm thick)/ADF (40 μm thick)/ON-A (15 μm thick)/HS (50 μm thick)
PET: Biaxially oriented polyester resin film
LMD: Two-component polyurethane adhesive layer formed by dry lamination
AL: Aluminum foil
ADF: Acid-denatured polyolefin resin film formed by heat lamination
ON-A: Biaxially oriented aromatic nylon resin film (NOBAMIDDO X21, commercially available from Mitsubishi Enginiyaringu Prastikku K.K.)
HS: Heat-adhesive resin layer of an acid-denatured polyolefin resin formed by extrusion coating Example 2

PET (12 μm thick)/LMD/AL (15 μm thick)/ADF (40 μm thick)/ON-B (15 μm thick)/HS (50 μm thick)
ON-B: Biaxially oriented nylon film of a blend of 100 parts by weight aromatic nylon resin and 10 parts by weight aliphatic nylon resin The laminated sheet in Example 2 employs the NO-B as its third base film layer and is the same in other respects as the laminated sheet in Example 1.

Comparative Example 1

PET (12 μm thick)/LMD/AL (15 μm thick)/ADF (40 μm thick)/ON-C (15 μm thick)/HS (50 μm thick)
ON-B: Biaxially oriented aliphatic nylon resin film The laminated sheet in Comparative example 1 is the same as the laminated sheet in Example 1, except that Comparative example 1 employs the ON-C as its third base film layer.

Example 2 is the same as Example 1, except that Example 2 employs a film of nylon 6 as its third base film layer.

Storage Life Test

Ten sample battery packets fabricated by using the laminated sheet of each of Examples 1 and 2, and Comparative example 1 were stored in a thermohygrostat conditioned at 40° C. and 90% RH for three months, and then the performance of the sample battery packets was tested.

Results

No performance deterioration occurred in all the samples in Examples 1 and 2. Performance deterioration occurred in the three samples out of ten in Comparative example 1.

Example 2: No performance deterioration occurred in all the samples.

When the third base film layer is formed of the film of the aromatic nylon resin or the film of the blend of the aromatic nylon resin and the aliphatic nylon resin, the battery case forming laminated sheet is capable of forming a case which does not permit the permeation of moisture through the end surface thereof.

When it is desired to print letters and pictures on the surfaces of the battery case forming laminated sheets 10 shown in FIG. 76, the letters and the pictures are printed on the inner surface of the first base film layer 1a, i.e., the outermost layer, to be bonded to the surface of the adjacent layer, of the outer laminated structure 122 for second-surface decoration, and then the first base film layer 1a is laminated to the adjacent layer. The thus printed letters and pictures will not be damaged even if the surface of the battery case forming sheet is abraded.

As is apparent form the foregoing description, the battery case forming laminated sheet in accordance with the present invention comprises at least four laminated layers, namely, the first base film layer, the metal foil layer, the second base film layer and the heat-adhesive resin layer, employs the film of the aromatic or aliphatic nylon resin as the second base film layer, is lightweight, thin, flexible, excellent in various kinds of mechanical strength, heat-resistance, impermeability to moisture and gases and capable of preventing the penetration of moisture through the battery case even if the battery packet using the battery case is stored for a long time.

Twenty-First Embodiment

Figure 78:
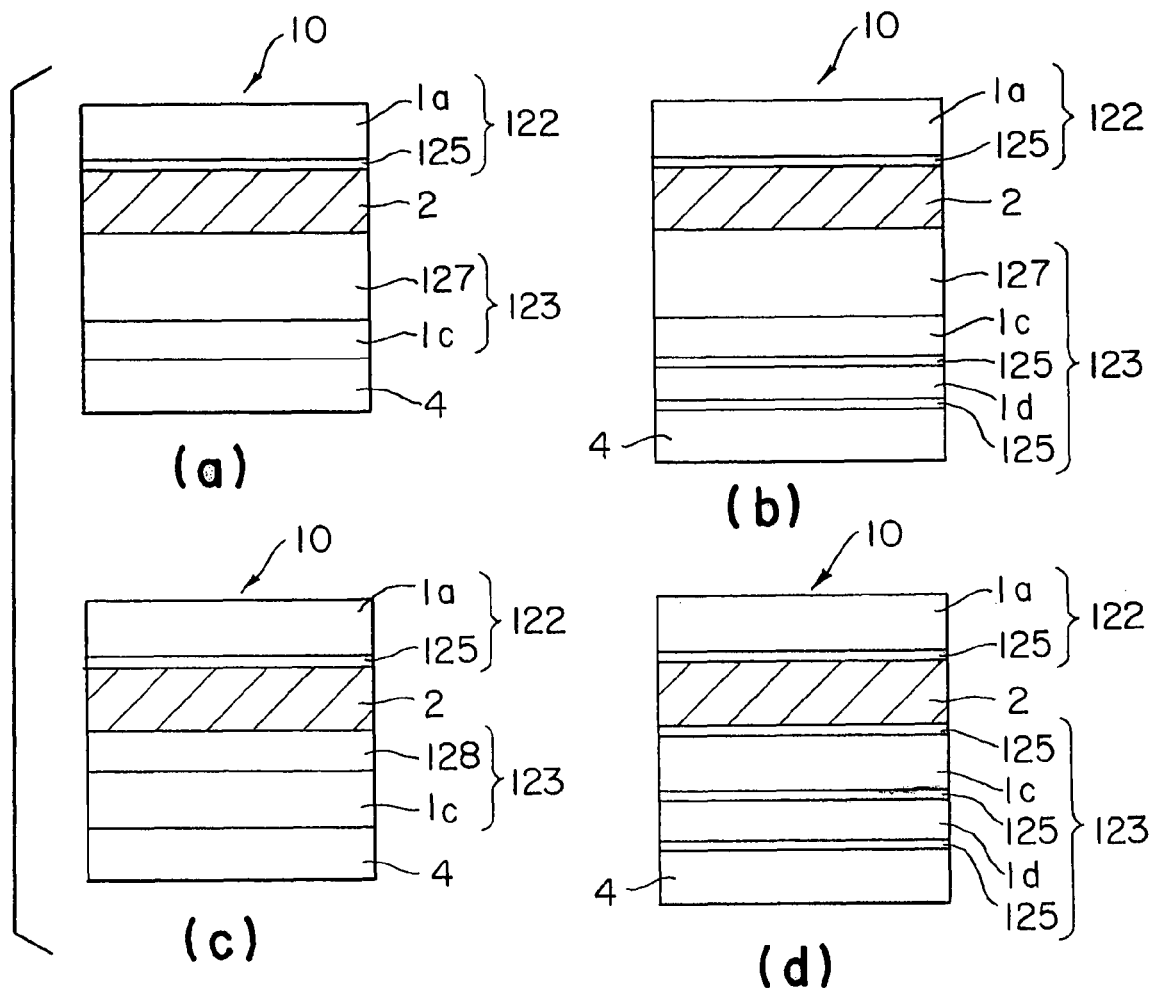
FIG. 78 is a typical views of a twenty-first embodiment according to the present invention.

A twenty-first embodiment of the present invention will be described with reference to FIG. 78.

FIGS. 78(a), 78(b), 78(c) and 78(d) show laminated sheets 10. In the laminated sheet 10, a metal foil layer 2 is bonded to an inner laminated structure 123 with a heat-adhesive resin layer 127 by a heat lamination method.

Example 1

The laminated sheet 10 shown in FIG. 78(a) has the following construction.

PET (12 μm Thick)/LMD/AL (12 μm Thick)/ADF (50 μm Thick)/ON (15 μm Thick)/HS (50 μm Thick)

In this construction, PET represents a biaxially oriented polyester resin film (first base film layer 1a), LMD represents an adhesive layer formed by dry lamination, AL represents an aluminum foil (metal foil layer 2), ADF represents an adhesive layer of VE300® commercially available from Tosero K.K. (heat-adhesive resin sheet 127), ON represents a biaxially oriented nylon film (ENBUREMU commercially available from Yunichika K.K.) (third base film layer 1c) and HS represents a heat-adhesive layer of ADOMA commercially available from Mitsui Sekiyu Kagaku Kogyo K.K.) (heat-adhesive resin layer 4).

Conditions for heat lamination: A high-frequency welding method was used. The ADF was sandwiched between the Al of a laminated structure of PET (12 μm thick)/LMD/AL (12 μm thick), and the ON to form a layered structure, pressure was applied to the layered structure and a current was induced in the layered structure by a high-frequency power of 19 KHz.

Example 2

The laminated sheet 10 shown in FIG. 78(b) has the following construction.

PET (12 μm Thick)/LMD/AL (12 μm Thick)/ADF (50 μm Thick)/ON (15 μm Thick)/LMD/EVOH (20 tμm Thick)/LMD/HS (40 μm Thick)

In this construction, EVOH represents a film of EVARU® commercially available from Kuraray Co., Ltd. (additional third base film layer 1d).

Conditions for heat lamination: A thermocompression bonding method was used. The ADF was sandwiched between the Al of a laminated structure of PET (12 μm thick)/LMD/AL (12 μm thick), and the ON to form a layered structure, and pressure and heat of 160° C. were applied to the layered structure for 1 sec.

Comparative Example 1

The laminated sheet 10 shown in FIG. 78(c) has the following construction.

PET (12 μm Thick)/LMD/AL (12 m Thick)/SL (15 μm Thick)/ON (15 μm Thick)/HS (40 m Thick)

In this construction, SL represents an adhesive resin layer 128 for sandwich lamination. The SL, i.e., the adhesive resin layer, was sandwiched between the Al of a laminated structure of PET (12 μm thick)/LMD/AL (12 μm thick), and the ON to form a layered structure to bond together the AL and the ON by sandwich lamination.

Comparative Example 2

The laminated sheet 10 shown in FIG. 78(d) has the following construction.

PET (12 μm Thick)/LMD/AL (12 μm Thick)/LMD/ON (15 μm Thick)/LMD/EVOH (20 μm Thick)/HS (40 μm thick)

Conditions for lamination: The Al of a laminated structure of PET (12 μm thick)/LMD/AL (12 μm thick), and the ON were bonded together by dry lamination using a two-component polyurethane adhesive.

Results

Cases were fabricated by using those laminated sheets, batteries using an electrolyte of an organic carbonate solvent were sealed in those cases, respectively, to form sample battery packets, and the sample battery packets were subjected to a storage life test.

Storage life test: The sample battery packets were stored in a thermohygrostat conditioned at 40° C. and 90% RH for three months, and then the cases of the sample battery packets were examined to see whether or not the separation of the metal foil layer and the inner layer bonded to the former occurred in the laminated sheets forming the cases. The results of examination are expressed by the ratio: (The number of cases in which the separation occurred) (The number of samples (ten samples))

| | |
|---|---|
| Example 1: | 0/10 |
| Example 2: | 0/10 |
| Comparative example 1: | 10/10 |
| Comparative example 2: | 2/10 |

The foregoing constructions in accordance with the present invention prevents the separation of the metal foil layer 2 and the inner laminated structure 123 attributable to the agency of the electrolyte. The first base film layer 1c and the third base film layer 1c, or the first base film layer 1c, the third base film layer 1c and the additional third base film layer 1d provide the laminated sheet with various kinds of mechanical strength and resistance. Since the metal foil layer 2 is sandwiched between the first base film layer 1a and the third base film layer 1c, and the additional third base film layer 1d is bonded to the third base film layer 1c, the laminated sheet has a high piercing strength particularly against piecing from the inner side, the metal foil layer is protected, and hence the battery case forming laminated sheet has a stable barrier property.

When it is desired to print letters and pictures on the surface of the battery case forming laminated sheet, the letters and the pictures are printed on the inner surface of the first base film layer 1a, i.e., the outermost layer, to be bonded to the surface of the adjacent layer for second-surface decoration, and then the first base film layer 1a is laminated to the adjacent layer. The thus printed letters and pictures will not be damaged even if the surface of the battery case forming sheet is abraded.

The invention claimed is:

1. A battery case forming laminated sheet for forming a battery case for containing a battery therein, said battery case forming laminated sheet comprising:
   a laminated film comprising an aluminum layer as an intermediate layer, and a first and second synthetic resin layer on both surfaces of the aluminum layer, the first synthetic resin layer being on an outer side of the aluminum layer, the second synthetic resin layer being on an inner side of the aluminum layer, wherein
   the first synthetic resin layer is a plastic film comprising a biaxially oriented layer, and the second synthetic resin layer is a plastic film layer comprising a biaxially oriented layer on the inner side of the aluminum layer and a heat-adhesive resin layer as a layer on an innermost side of the aluminum layer, so that parts of the plastic film of the first synthetic resin layer and plastic film of the second resin layer are removed by irradiation of a laser beam to the laminated sheet, in a form of melted mist to form a pressure relieving part having incisions.

2. The battery case forming laminated sheet according to claim 1, wherein said pressure relieving part has a burst strength in the range of 5 to 10 kg/cm$^2$.

3. The battery case forming laminated sheet according to claim 1, wherein said pressure relieving part has a plurality of intersecting straight incisions.

4. The battery case forming laminated sheet according to claim 1, wherein both said first synthetic resin layer and said second synthetic resin layer are provided with pressure relieving parts at corresponding positions thereon, respectively.

5. The battery case forming laminated sheet according to claim 1, wherein said pressure relieving part is located in a peripheral part of a case formed by heat-sealing a peripheral part of said heat-adhesive resin layer.

6. The battery case forming laminated sheet according to claim 1, wherein the first synthetic resin layer or the second synthetic resin layer that can absorb the laser beam is made of a biaxially oriented polyethylene terephthalate film, a biaxially oriented nylon film, or a biaxially oriented polypropylene film.

7. A battery case forming laminated sheet for forming a battery case for containing a battery therein, said battery case forming laminated sheet comprising:
   a laminated film comprising an aluminum layer as an intermediate layer, and a first and second synthetic resin layer on both surfaces of the aluminum layer, the first synthetic resin layer being on an outer side of the aluminum layer, the second synthetic resin layer being on an inner side of the aluminum layer, wherein
   the first synthetic resin layer is a plastic film comprising a biaxially oriented layer, and the second synthetic resin layer is a plastic film layer comprising a heat-adhesive resin layer as a layer on an innermost side of the aluminum layer, so that part of the plastic film of the first synthetic resin layer is removed by irradiation of a laser beam to the laminated sheet, in a form of melted mist to form a pressure relieving part having incisions.

* * * * *